United States Patent [19]

Hopper et al.

[11] Patent Number: 4,495,490

[45] Date of Patent: Jan. 22, 1985

[54] WORD PROCESSOR AND DISPLAY

[75] Inventors: Beth R. Hopper; Dan M. Howell; Robert A. Kolpek, all of Lexington, Ky.

[73] Assignee: IBM Corporation, Armonk, N.Y.

[21] Appl. No.: 268,609

[22] Filed: May 29, 1981

[51] Int. Cl.³ .............................................. G09G 1/16
[52] U.S. Cl. .................................... 340/709; 340/723; 340/750; 340/734
[58] Field of Search ............... 340/723, 709, 734, 724, 340/731, 798, 799, 744, 748, 750, 790, 735

[56] References Cited

U.S. PATENT DOCUMENTS

| | | | |
|---|---|---|---|
| 3,630,336 | 12/1971 | Johnson et al. | 197/113 |
| 3,674,125 | 7/1972 | Kolpek | 197/19 |
| 3,675,208 | 7/1972 | Bard | 340/172.5 |
| 3,780,846 | 12/1973 | Kolpek et al. | 197/19 |
| 3,786,429 | 1/1974 | Goldman et al. | 340/172.5 |
| 3,792,462 | 2/1974 | Casey et al. | 340/324 AD |
| 3,810,107 | 5/1974 | Goldman et al. | 340/172.5 |
| 3,815,104 | 6/1974 | Goldman | 340/172.5 |
| 3,822,363 | 7/1974 | Moyer et al. | 179/2 TV |
| 3,823,805 | 7/1974 | Richards | 197/19 |
| 3,829,855 | 8/1974 | Kolpek et al. | 340/172.5 |
| 3,844,397 | 10/1974 | Richards | 197/19 |
| 3,868,673 | 2/1975 | Mau, Jr. et al. | 340/709 |
| 3,894,623 | 7/1975 | Miyawaki et al. | 197/113 |
| 3,895,375 | 7/1975 | Williams | 340/723 |
| 3,903,517 | 9/1975 | Hafner | 340/324 AD |
| 3,912,065 | 10/1975 | Kashio | 197/19 |
| 3,915,278 | 10/1975 | Spence et al. | 197/19 |
| 3,976,975 | 8/1976 | Cochran | 340/172.5 |
| 4,070,710 | 1/1978 | Sukonick et al. | 364/900 |
| 4,101,879 | 7/1978 | Kawaji et al. | 340/709 |
| 4,107,664 | 8/1978 | Marino | 340/324 AD |
| 4,168,489 | 9/1979 | Ervin | 340/146.3 AH |
| 4,189,727 | 2/1980 | Vaughn, Jr. | 340/711 |
| 4,190,835 | 2/1980 | Buynak | 340/750 |
| 4,195,338 | 3/1980 | Freeman | 364/200 |
| 4,197,590 | 4/1980 | Sukonick et al. | 364/900 |
| 4,199,757 | 4/1980 | Ichimi | 340/750 |
| 4,215,422 | 7/1980 | McCray et al. | 364/900 |
| 4,223,393 | 9/1980 | Abe et al. | 364/900 |
| 4,225,943 | 9/1980 | Busch | 364/900 |
| 4,230,974 | 10/1980 | Haak | 315/399 |
| 4,231,096 | 10/1980 | Hansen et al. | 364/523 |
| 4,240,075 | 12/1980 | Bringol | 340/798 |
| 4,354,184 | 10/1982 | Woborschil | 340/709 |

OTHER PUBLICATIONS

Lindsey, "Segmented Display"; IBM TDB, vol. 14, No. 5, Oct. 1971, pp. 1528-1529.
Webb, "Combination of Alphanumeric and Formatting Data on CRT Display"; IBM TDB, vol. 15, No. 7, Dec. 1972, p. 212.
Cook et al., "Data Compression for Raster Display"; IBM TDB, vol. 16, No. 3, Aug. 1973, pp. 928-929.
Cook, "Data Compressor"; IBM TDB, vol. 16, No. 11, Apr. 1974, pp. 3775-3776.
Bringol, "Abbreviated Character Font Display"; IBM TDB, vol. 19, No. 9, Feb, 1977, pp. 3248-3249.
(List continued on next page.)

Primary Examiner—Marshall M. Curtis
Attorney, Agent, or Firm—Pollock, Vande Sande & Priddy

[57] ABSTRACT

A word processor supports two display modes, one unformatted mode comprising display of a partial page and another formatted mode displaying format of an entire page of text. Both modes impose minimal burden on the display allowing use, for example, of standard display chips with a variety of monitors including a standard TV set or TV monitor. Other advanced functions include simple addition, movement and deletion of text units or blocks; simplified underscore, underscore deletion, word underscore and word underscore deletion; and an uncluttered insert display regardless of the extent of inserted text. The hyphenate function is improved by informing the operator, via the display, of the relation between, not only the right margin and the hyphenate candidate, but also the relation between the hyphenate candidate and the actual preceding line endings.

11 Claims, 113 Drawing Figures

FIG.1
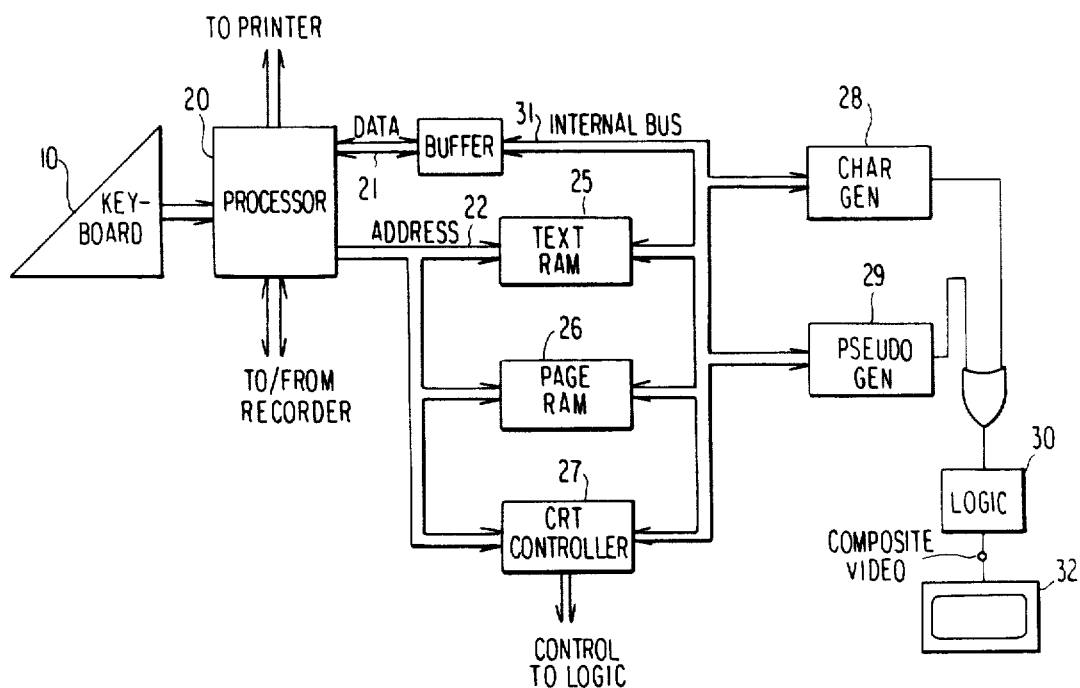
FIG.3B  FIG.3A  FIG.3C
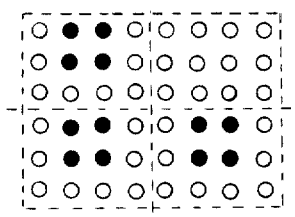
10 PITCH
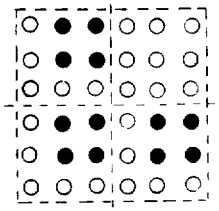
12 PITCH

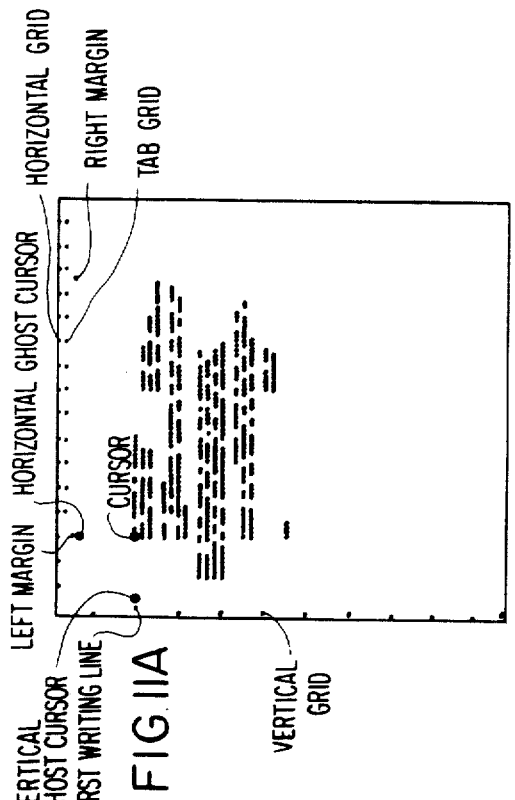
FIG IIA
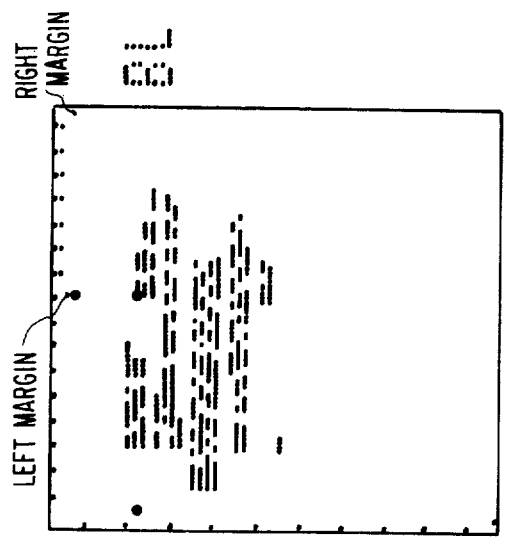
FIG IIB
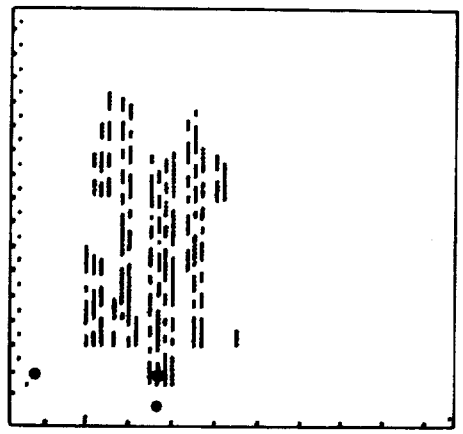
FIG IIC
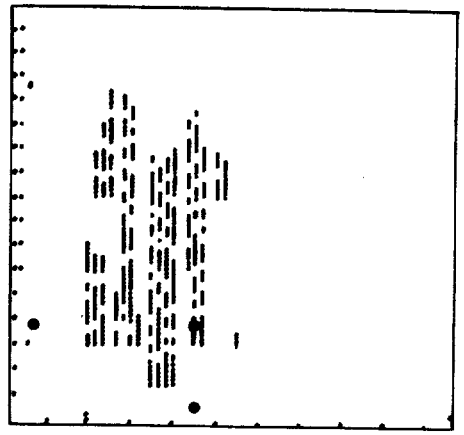
FIG IID

FIG.IIE

MESSAGE LINE

Mr. Thomas S. Marshall
9242 Westlake Drive
Austin, TEXAS 78758

→| T̲T̲Wayne John
   1888 Cactus Lane
   Water Hole Texas, 28882 |→

Dear Thomas:
→We certainly appreciate the time you spent with
our representative during his recent visit to your

FIG.IIF

MESSAGE LINE

→We certainly appreciate the time you spent with
our representative during his recent visit to your
campus.

←| T̲T̲Though we are unable to offer you a position
   L̲R̲of summer employment this year, I hope that your
   interest in IBM will continue and that you will
   contact us when considering permanent
   employment. |←

→Please accept my best wishes for success in your
studies. We also look foward to hearing from you

FIG.IIG

MESSAGE LINE studies. We also look foward to hearing from you
again in the near future.

→→→→→→Wayne John
         Water Hole

R/us

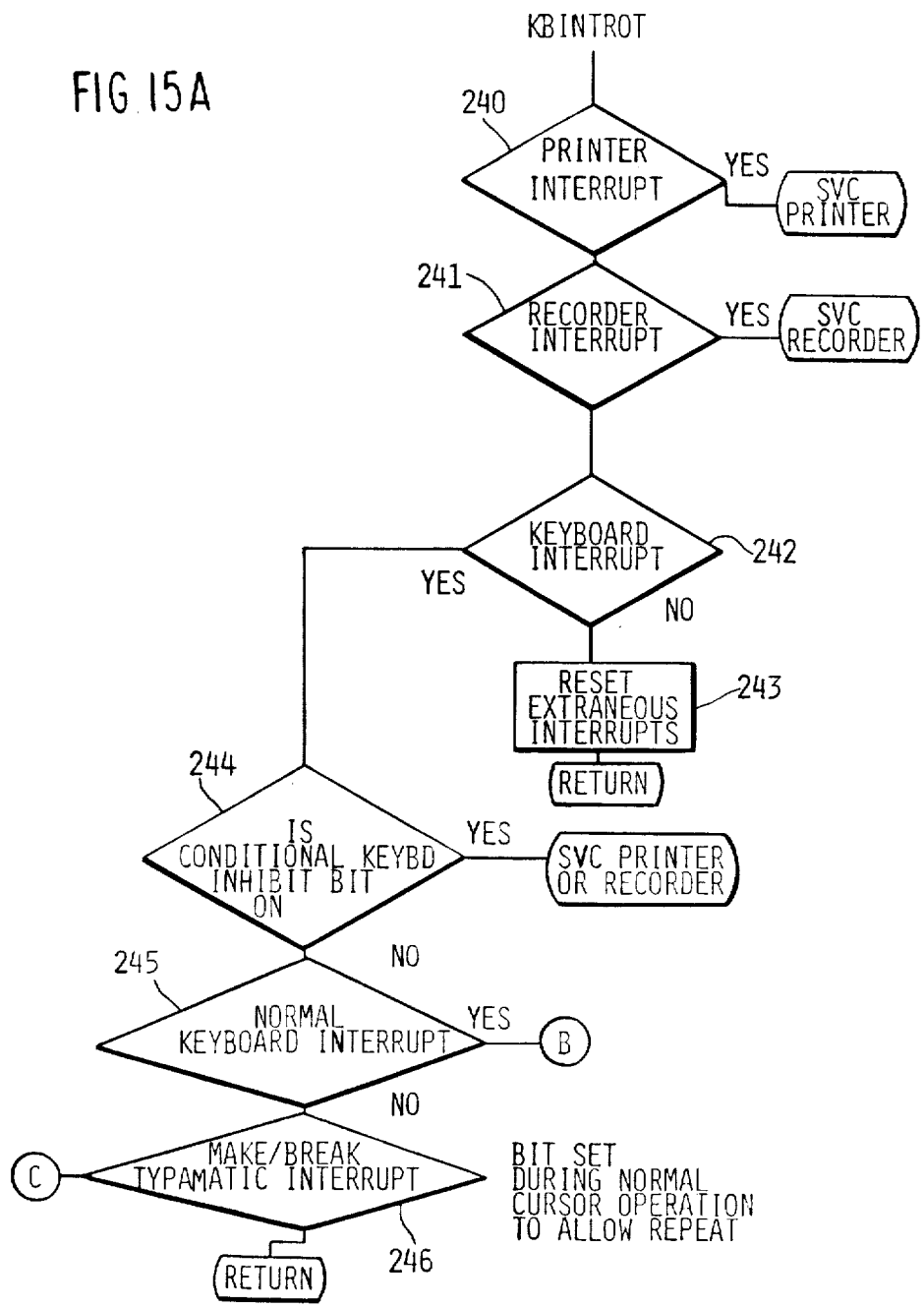

KB INTROT

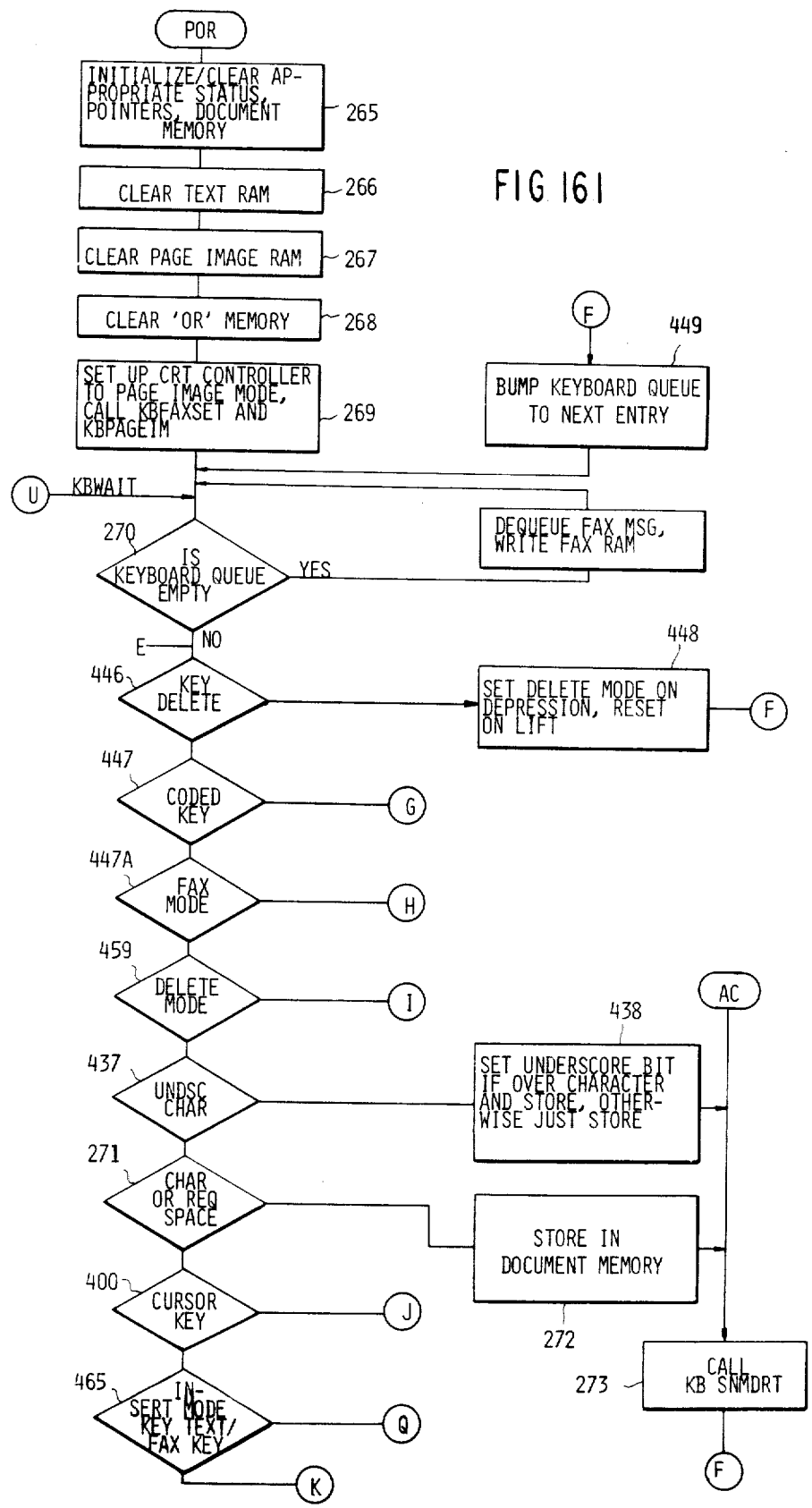

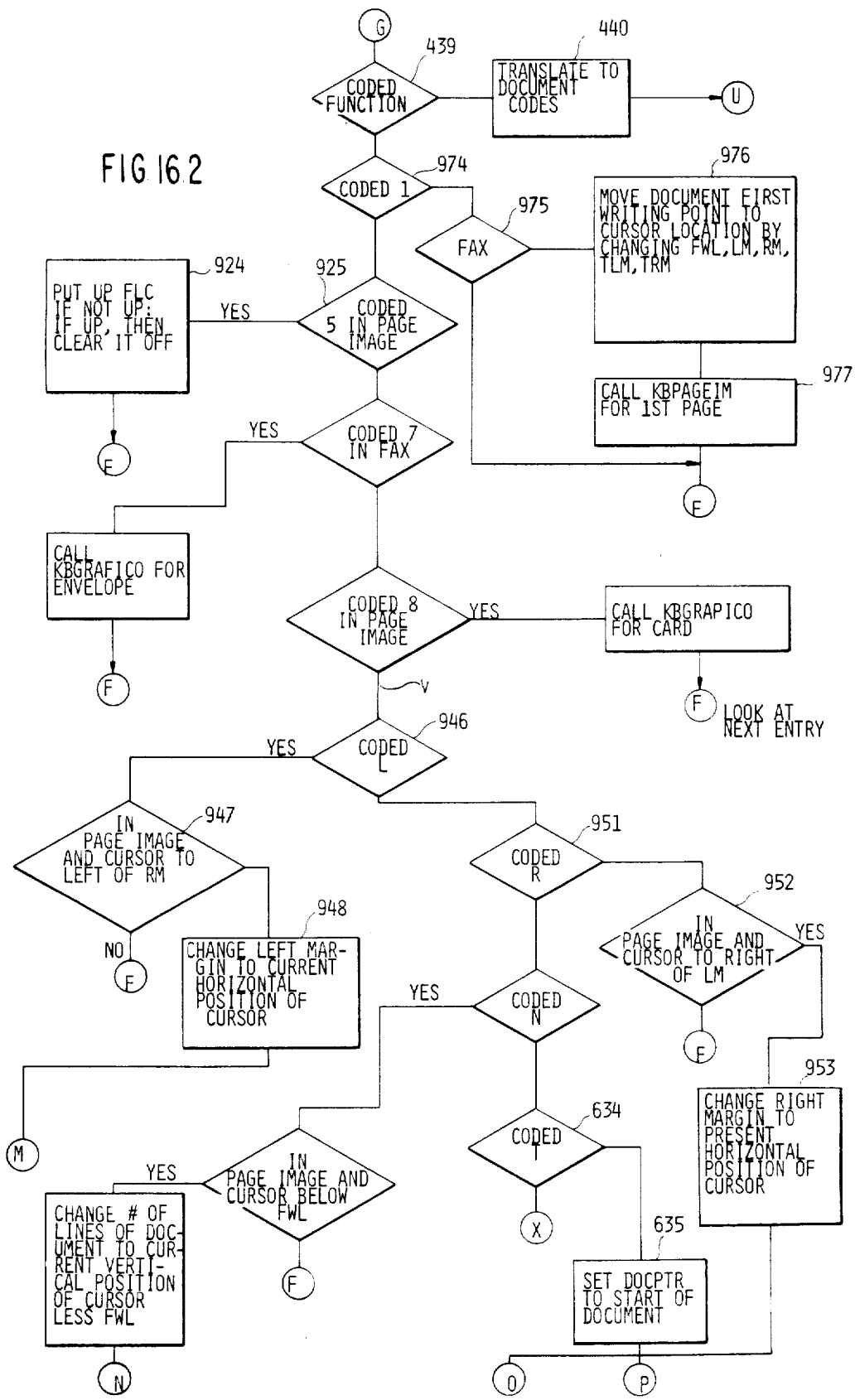
FIG 16.2

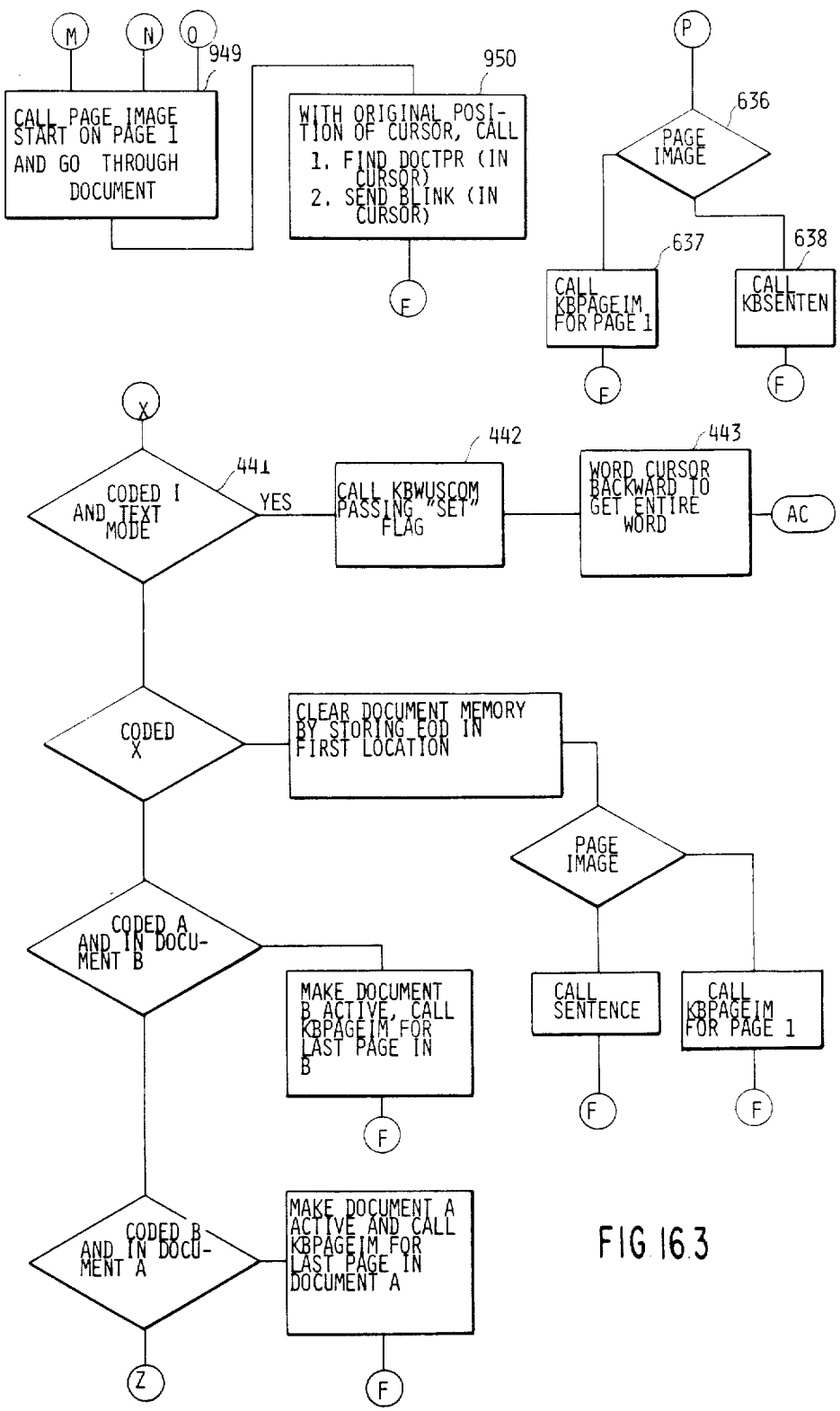
FIG 16.3

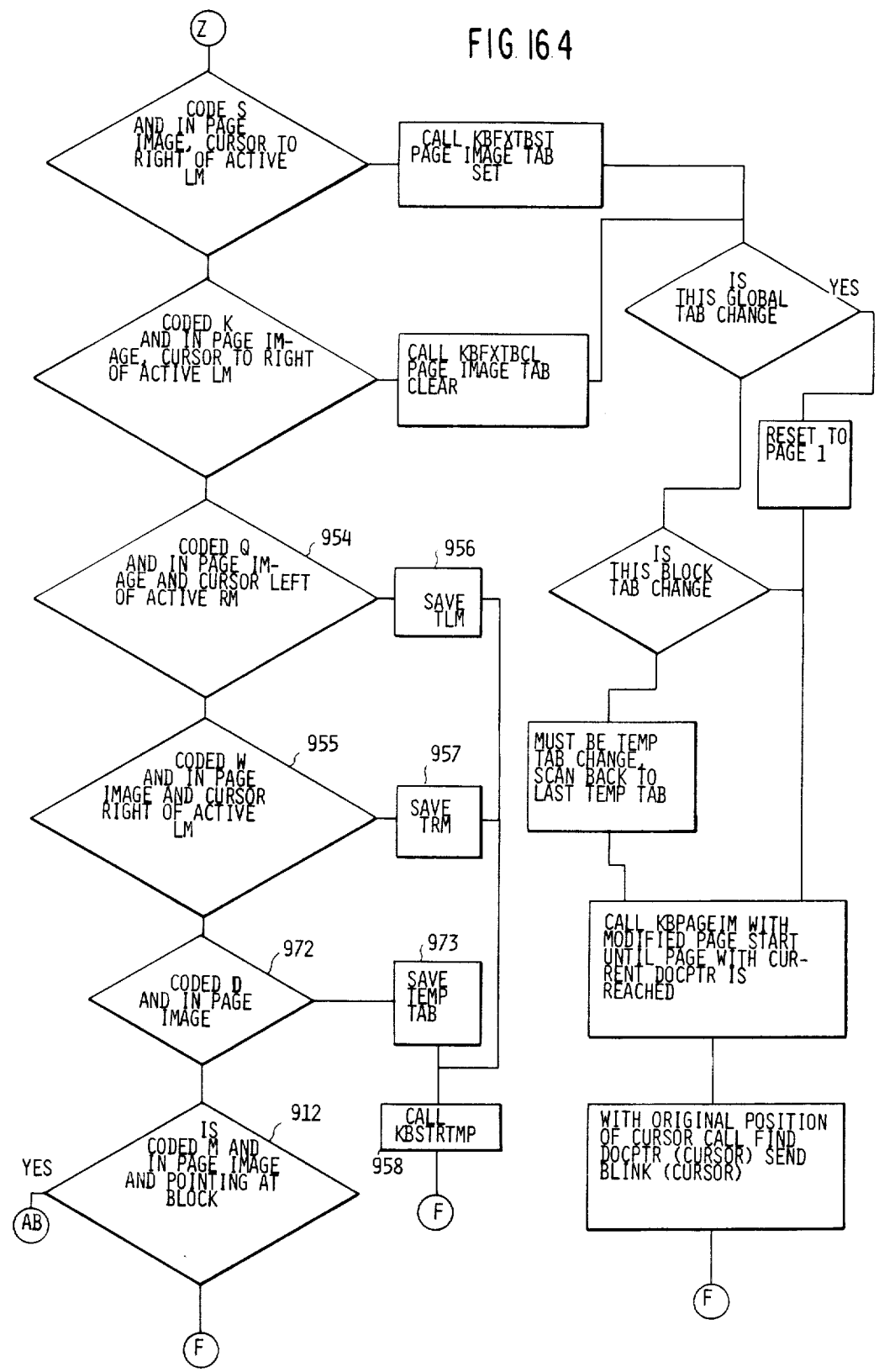
FIG. 16.4

FIG 16.5
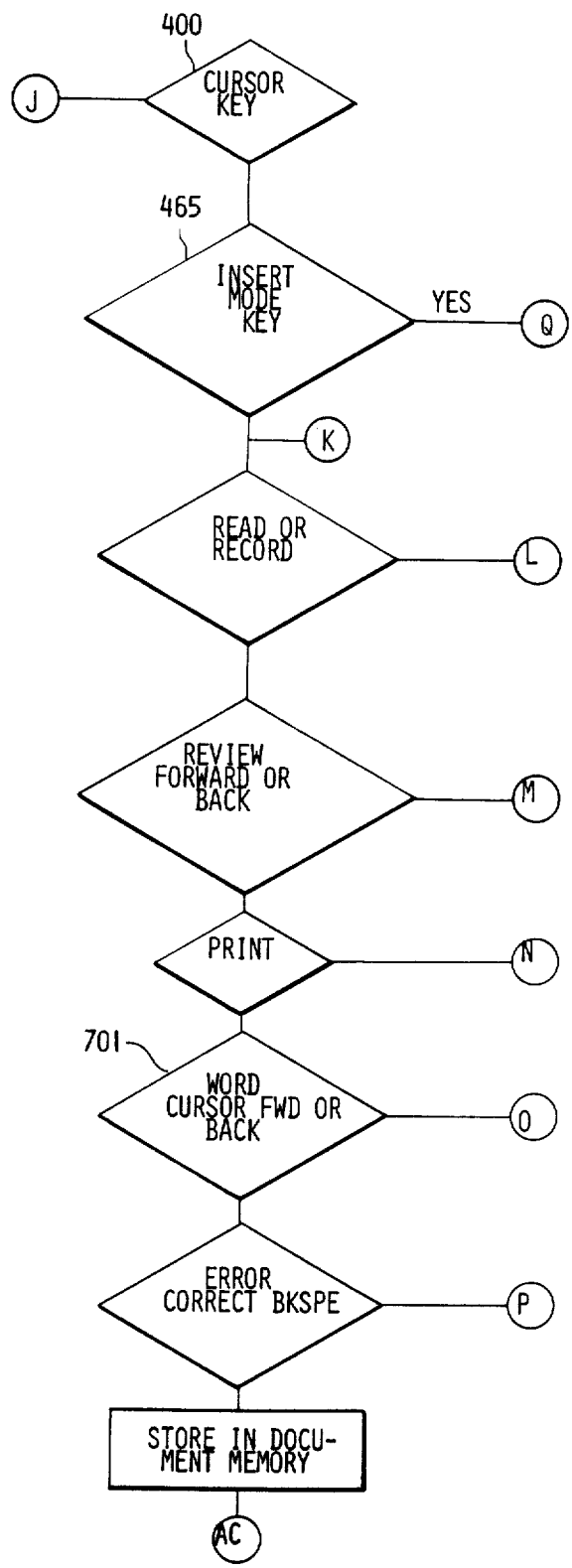

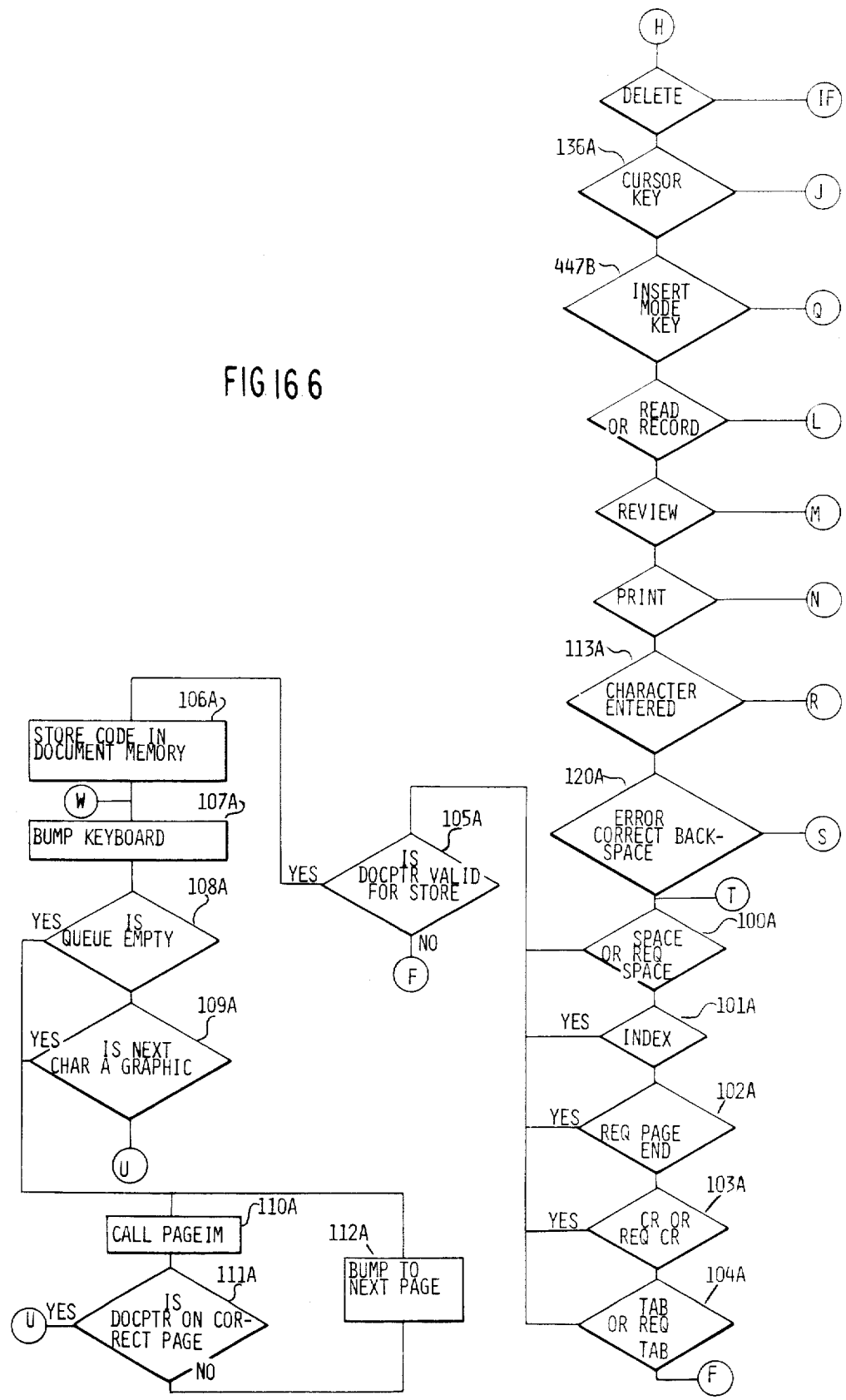
FIG 16.6

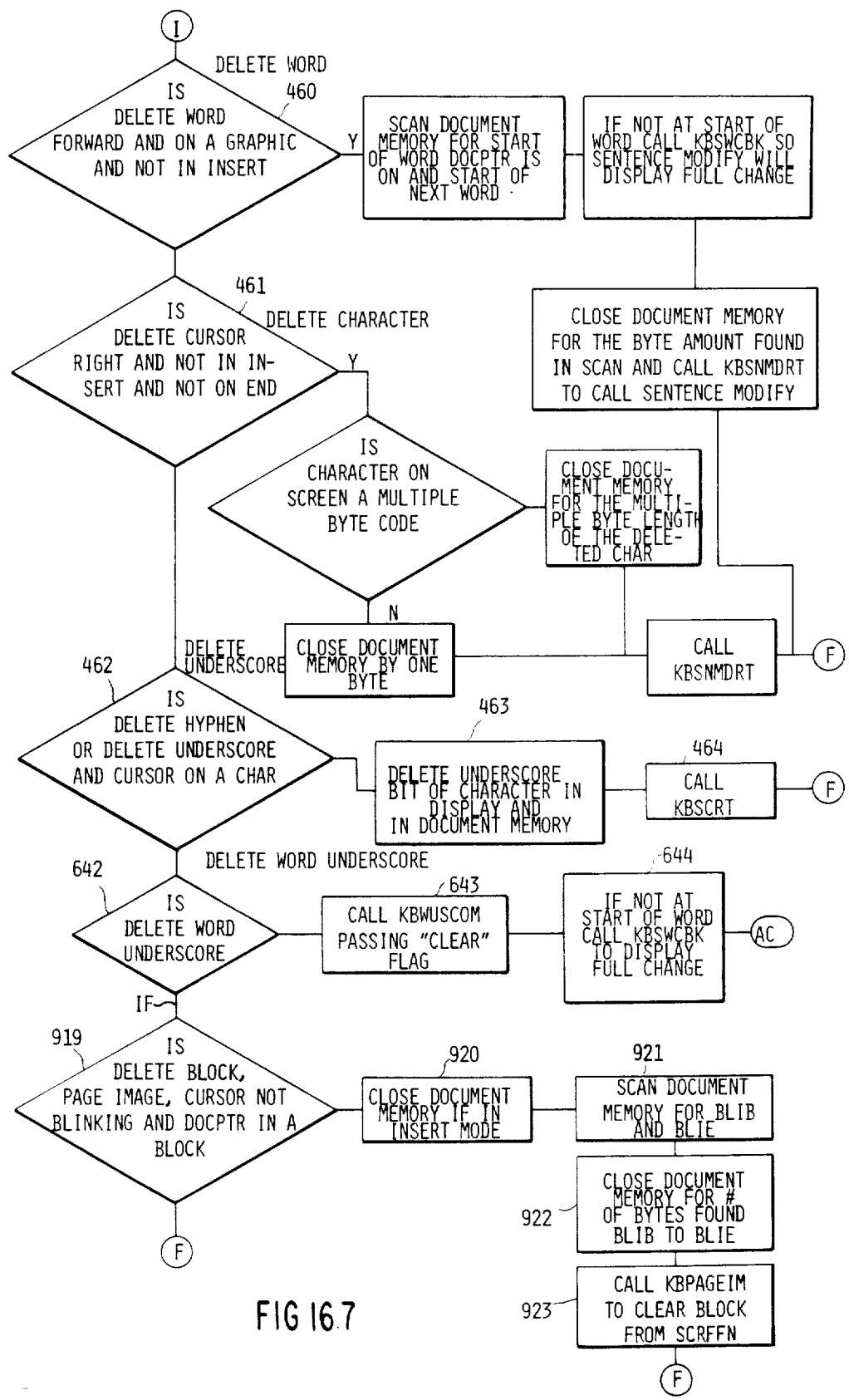
FIG 16.7

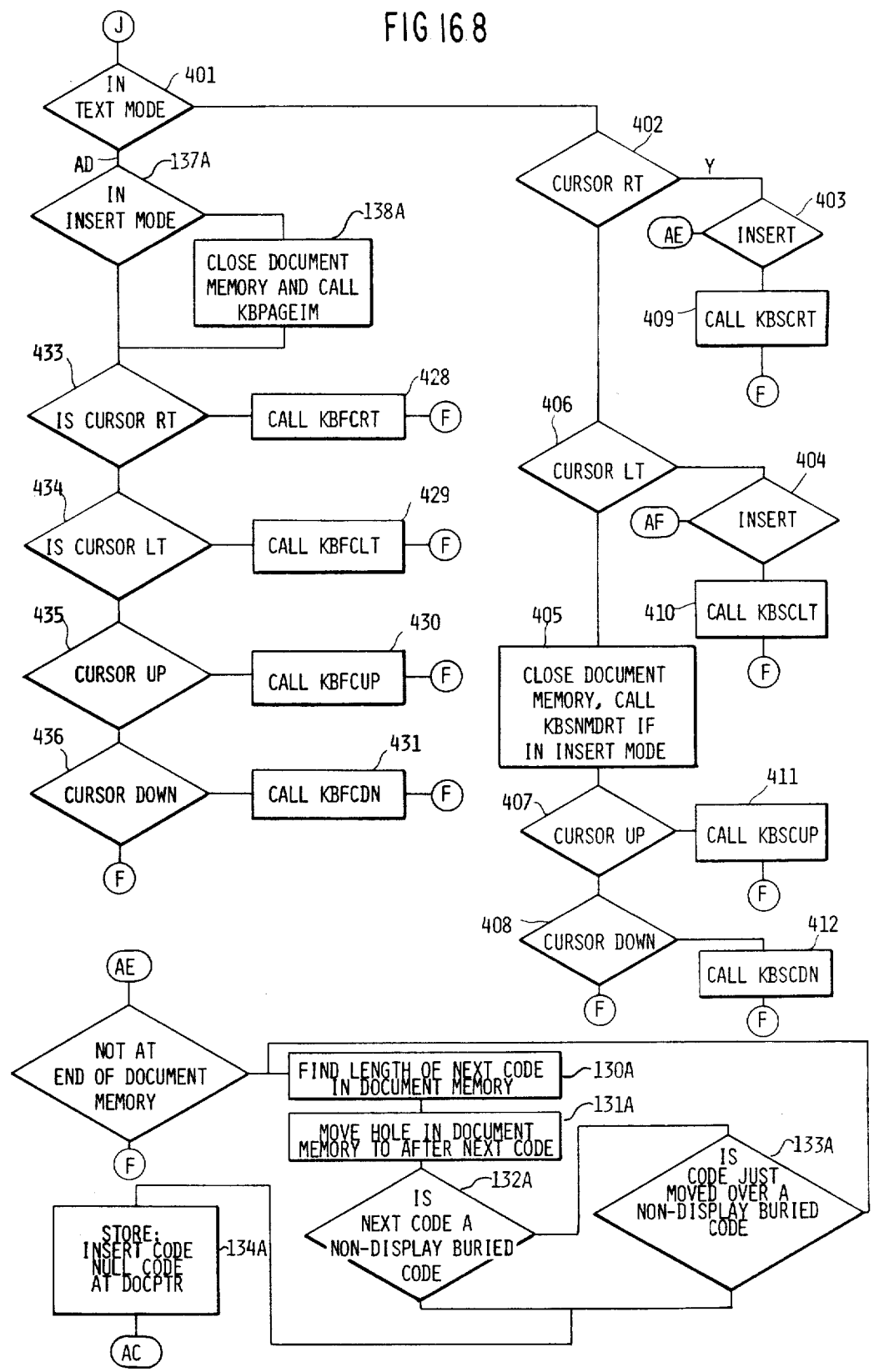
FIG 16.8

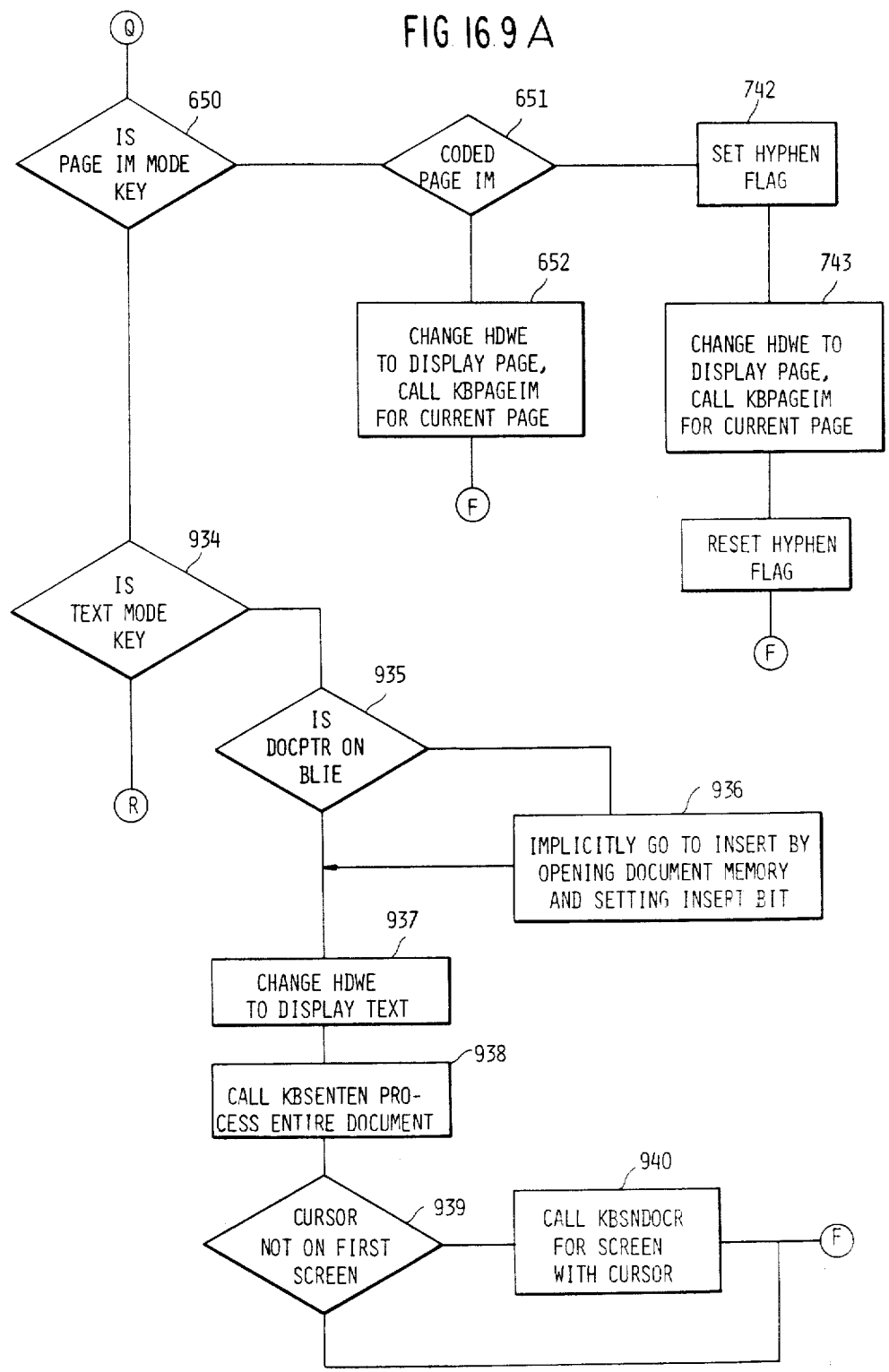
FIG. 16.9A

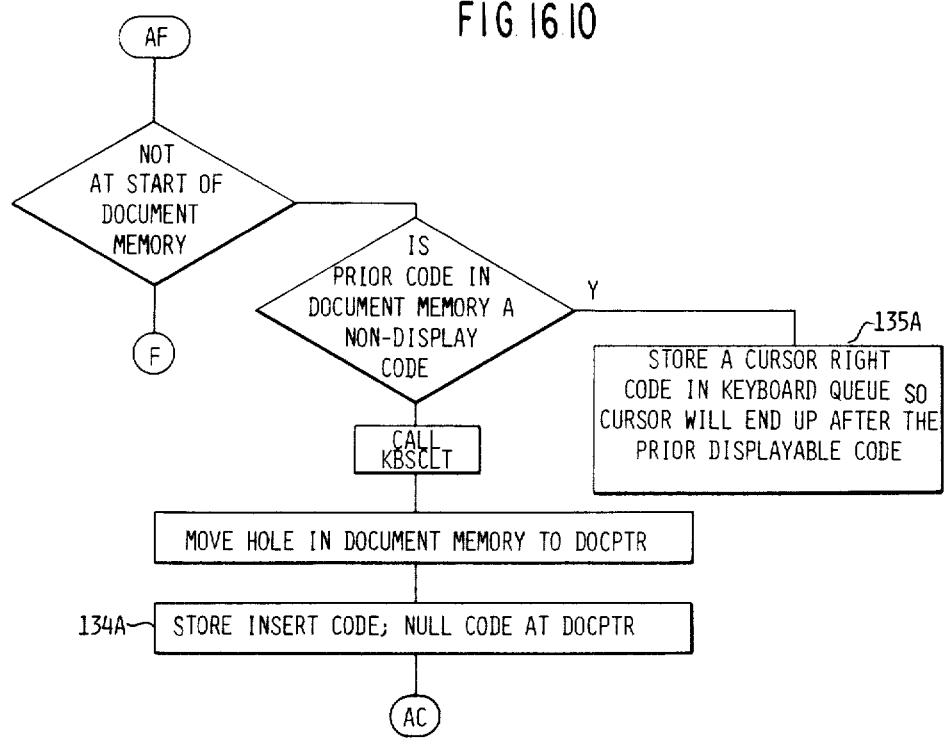
FIG. 16.10
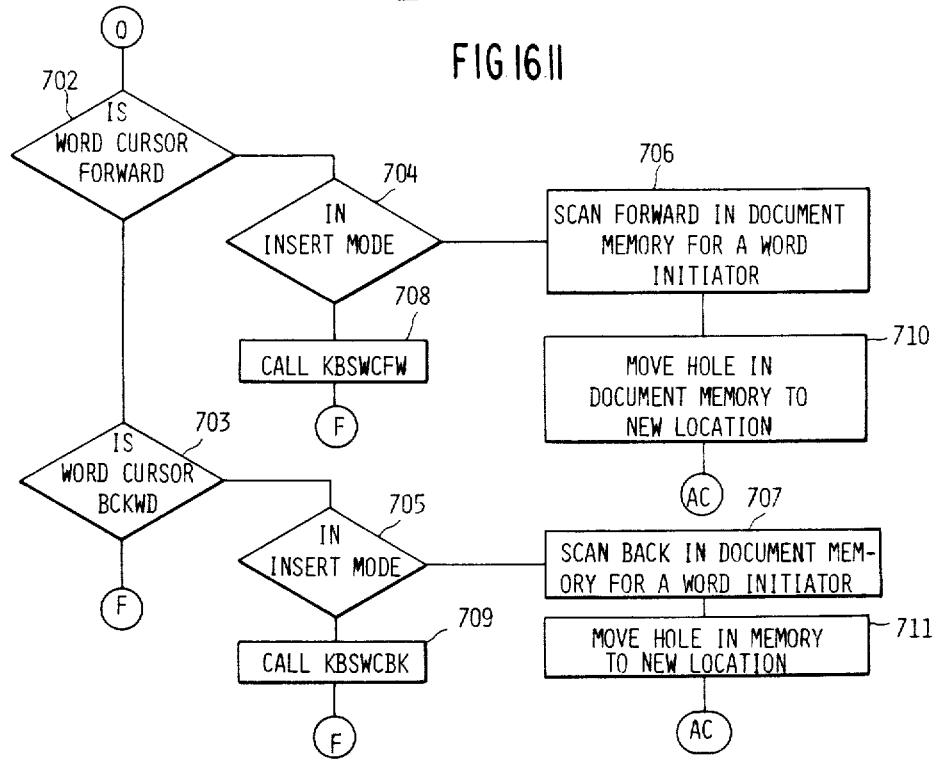
FIG. 16.11

FIG 16.12
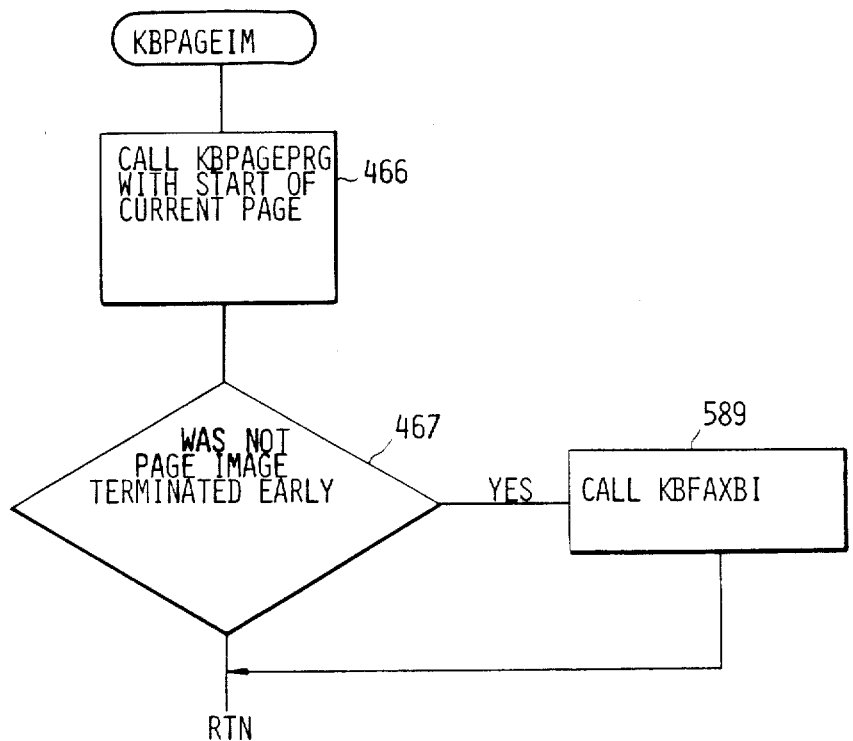
FIG 16.13
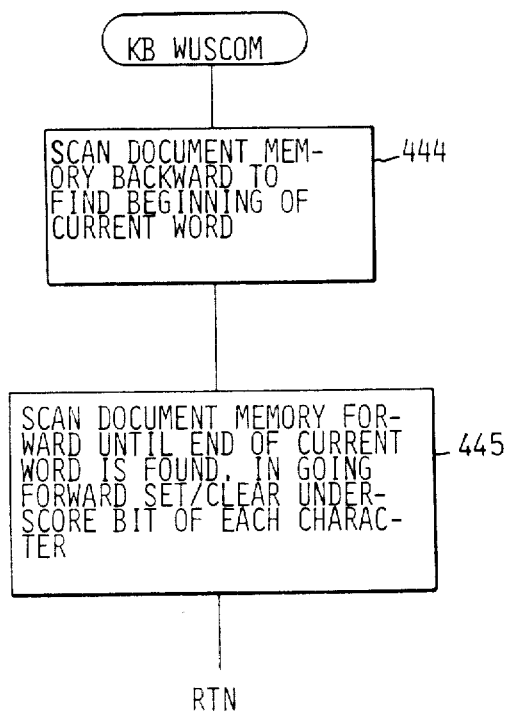

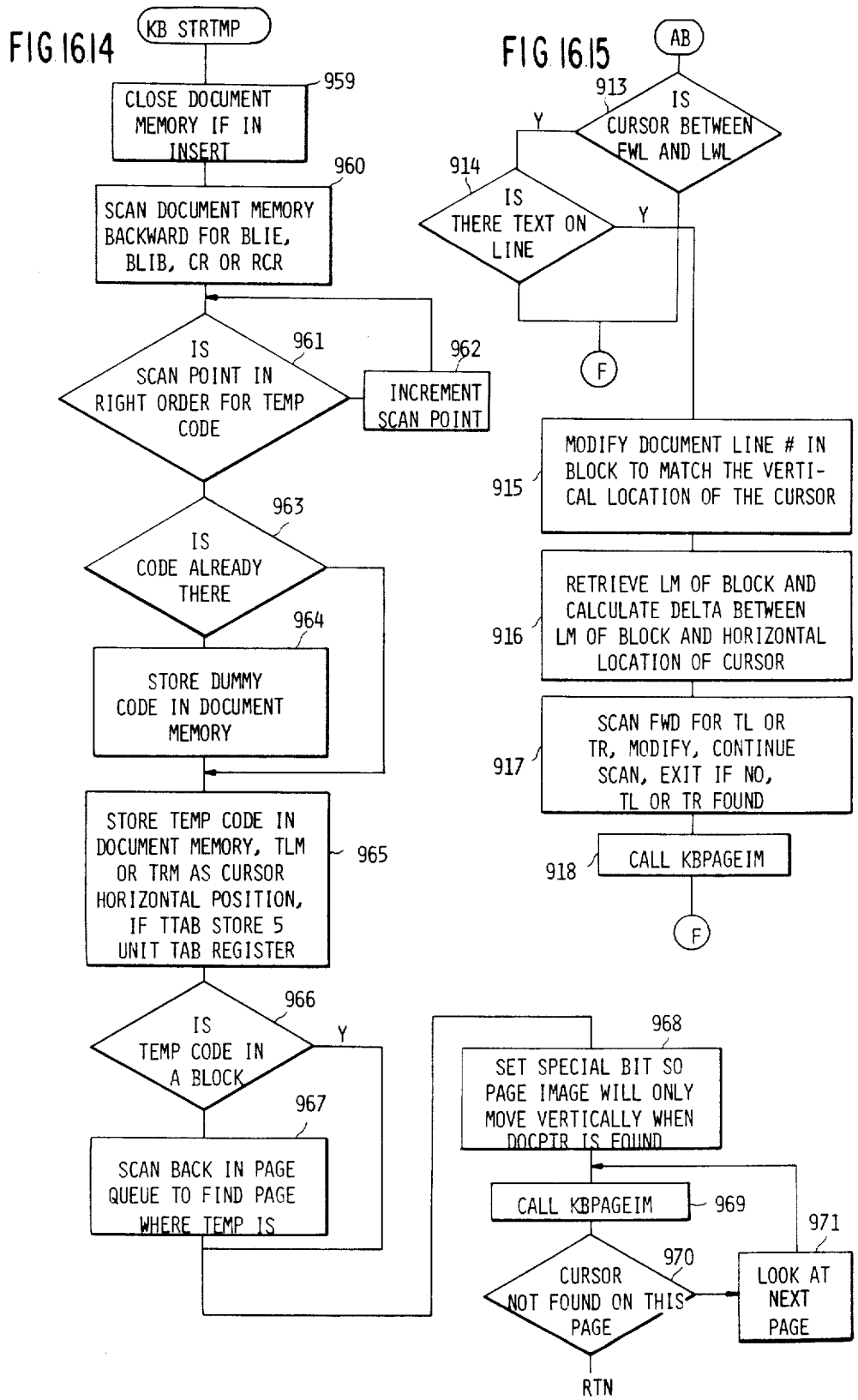

FIG. 16.16
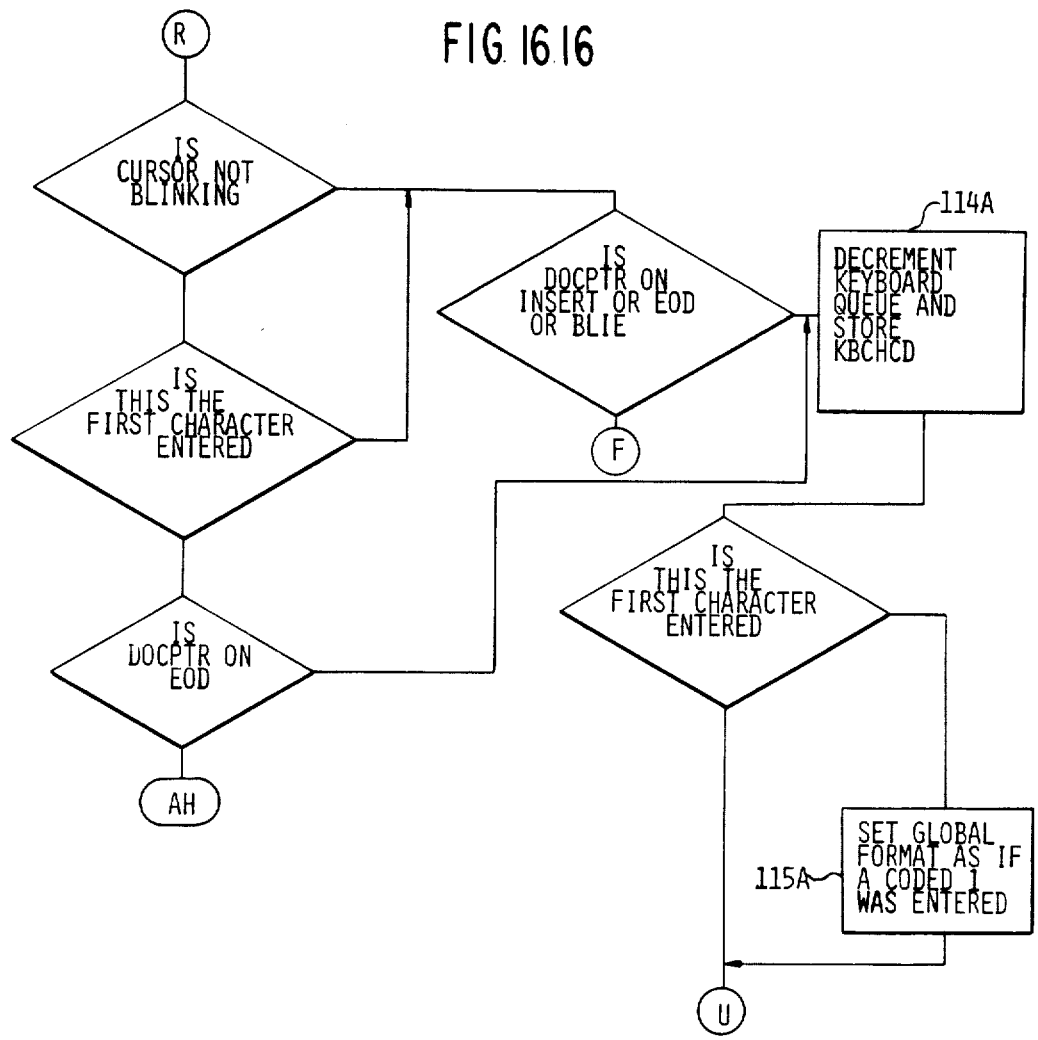
FIG. 16.17
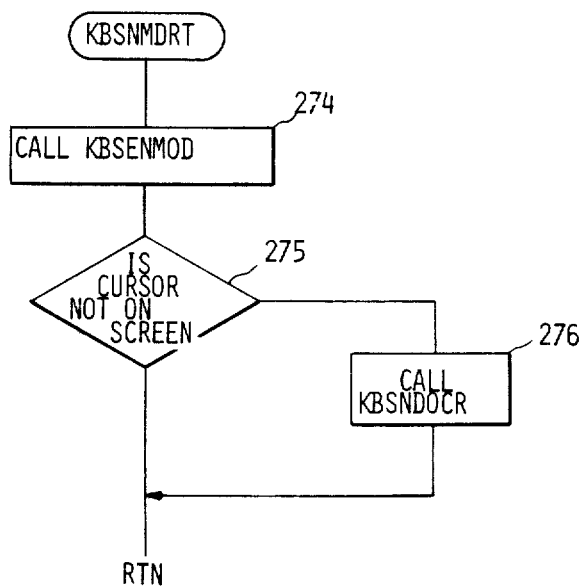

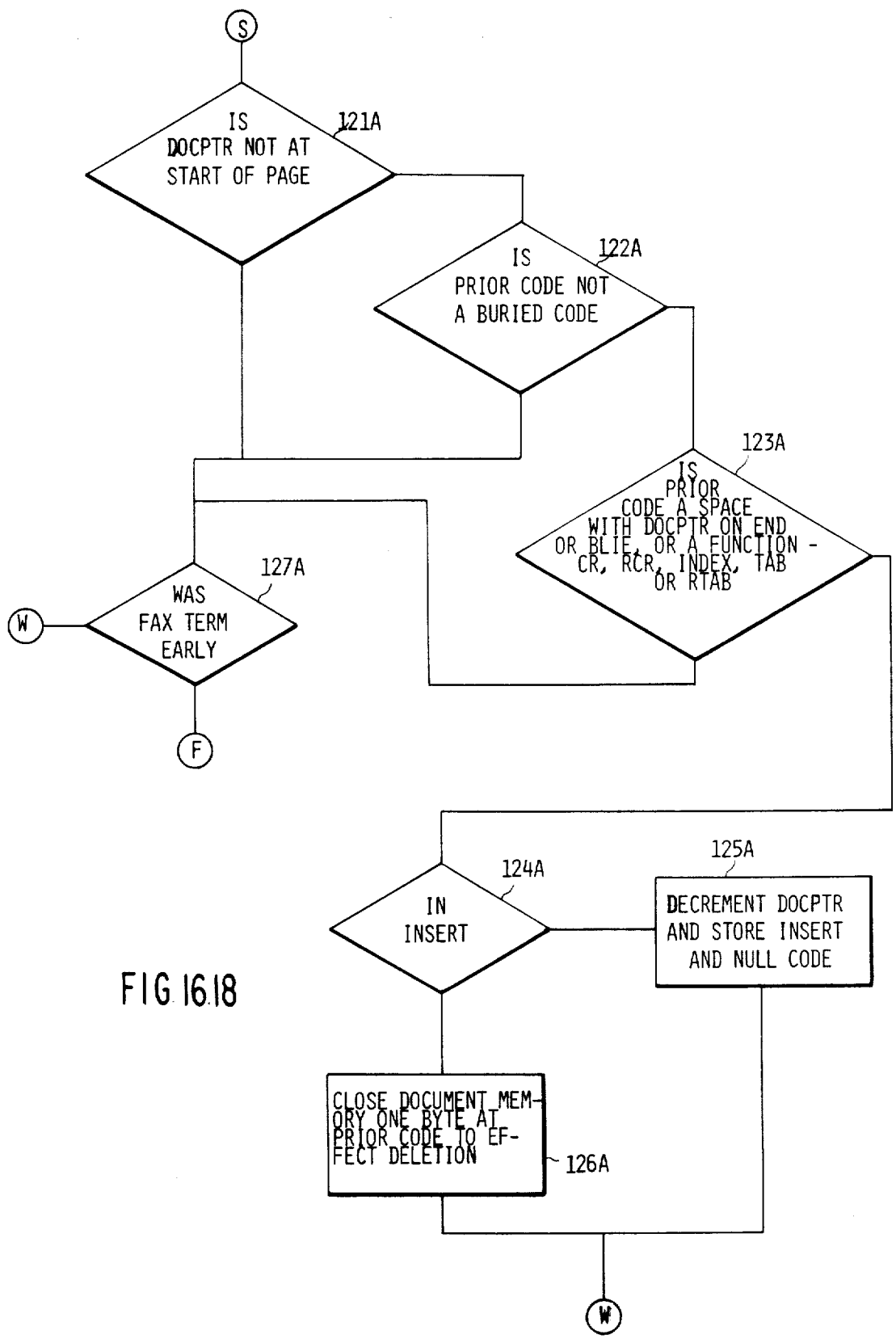
FIG. 16.18

FIG. 17.2

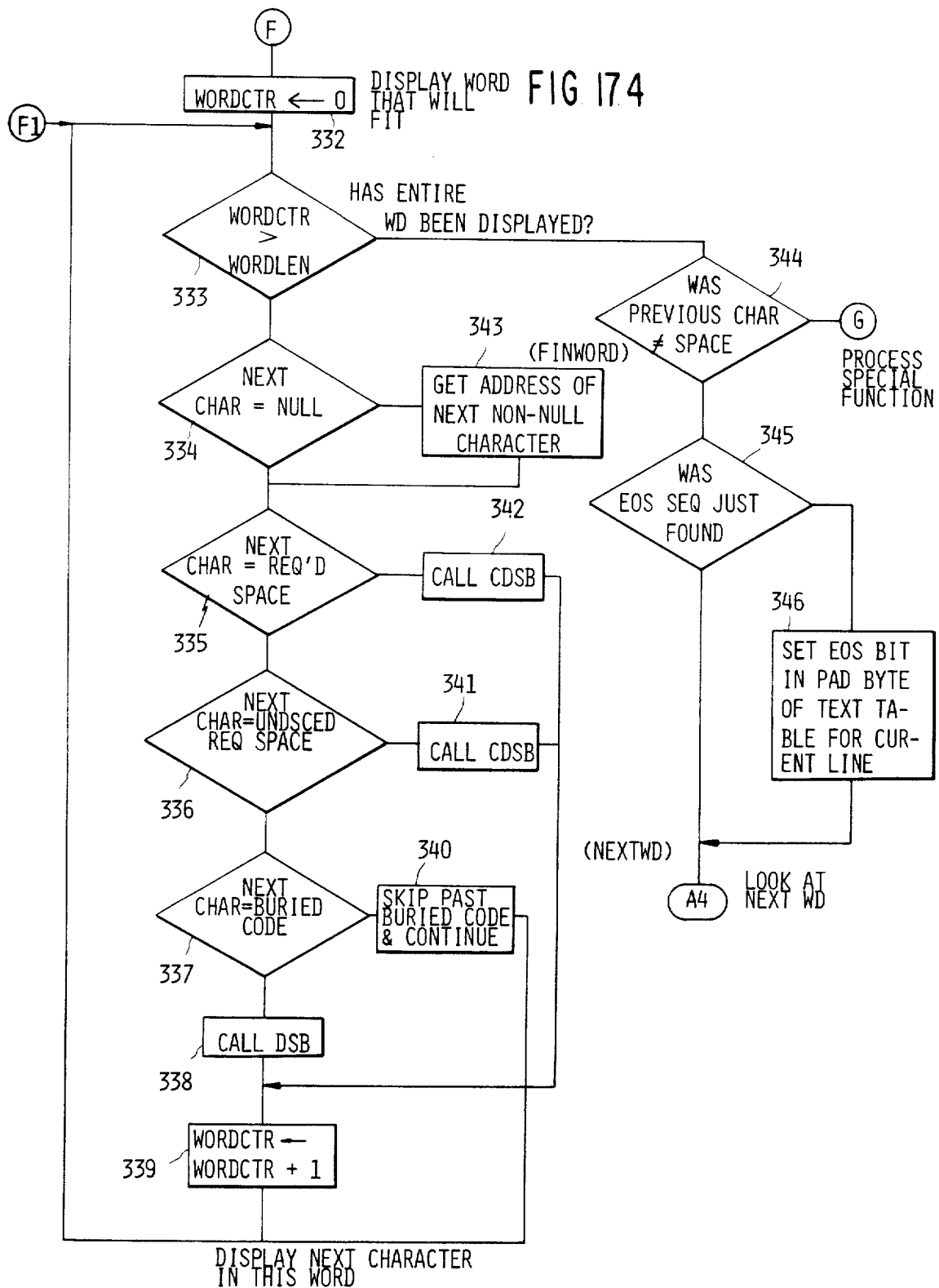

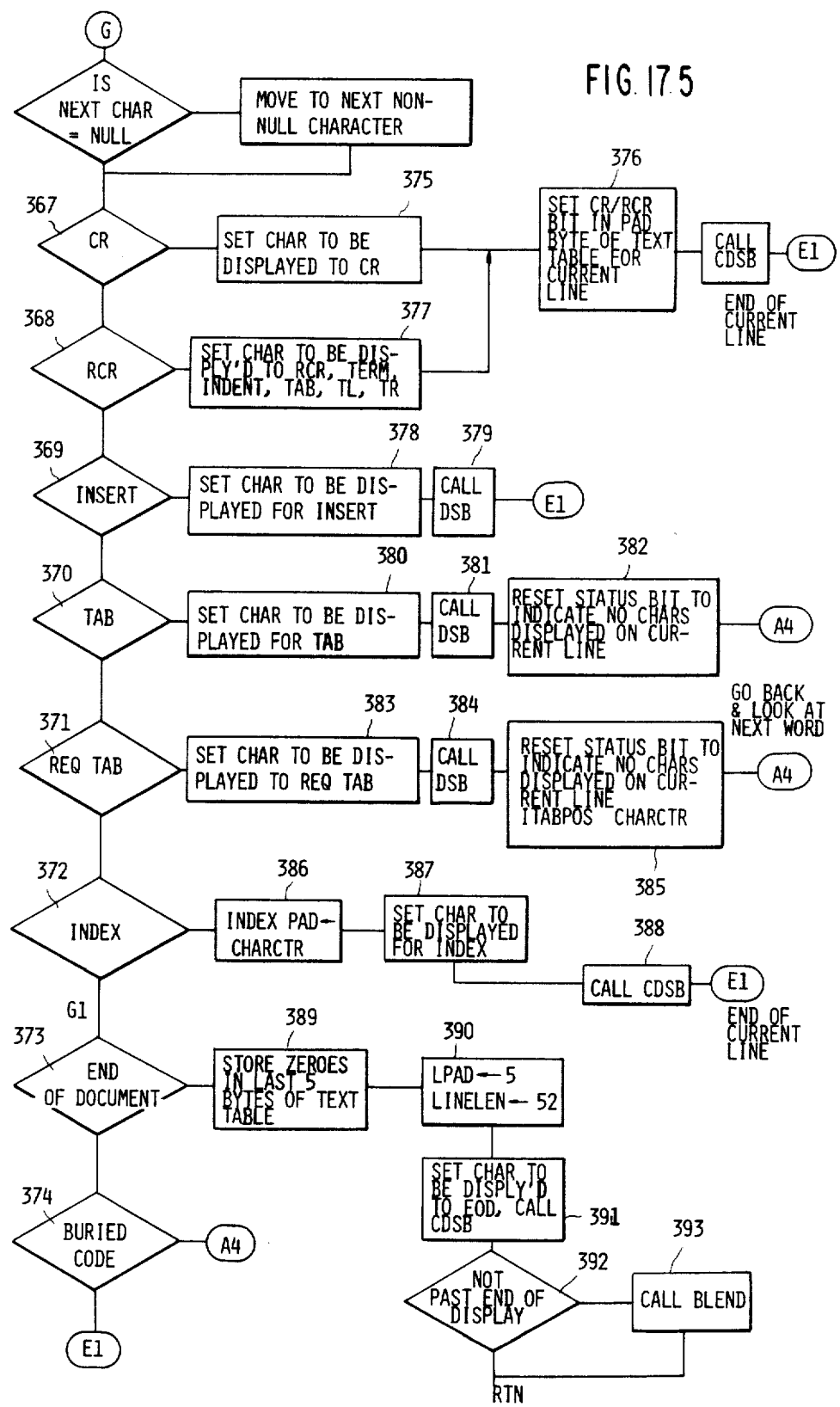
FIG. 17.5

FIG. 17.6
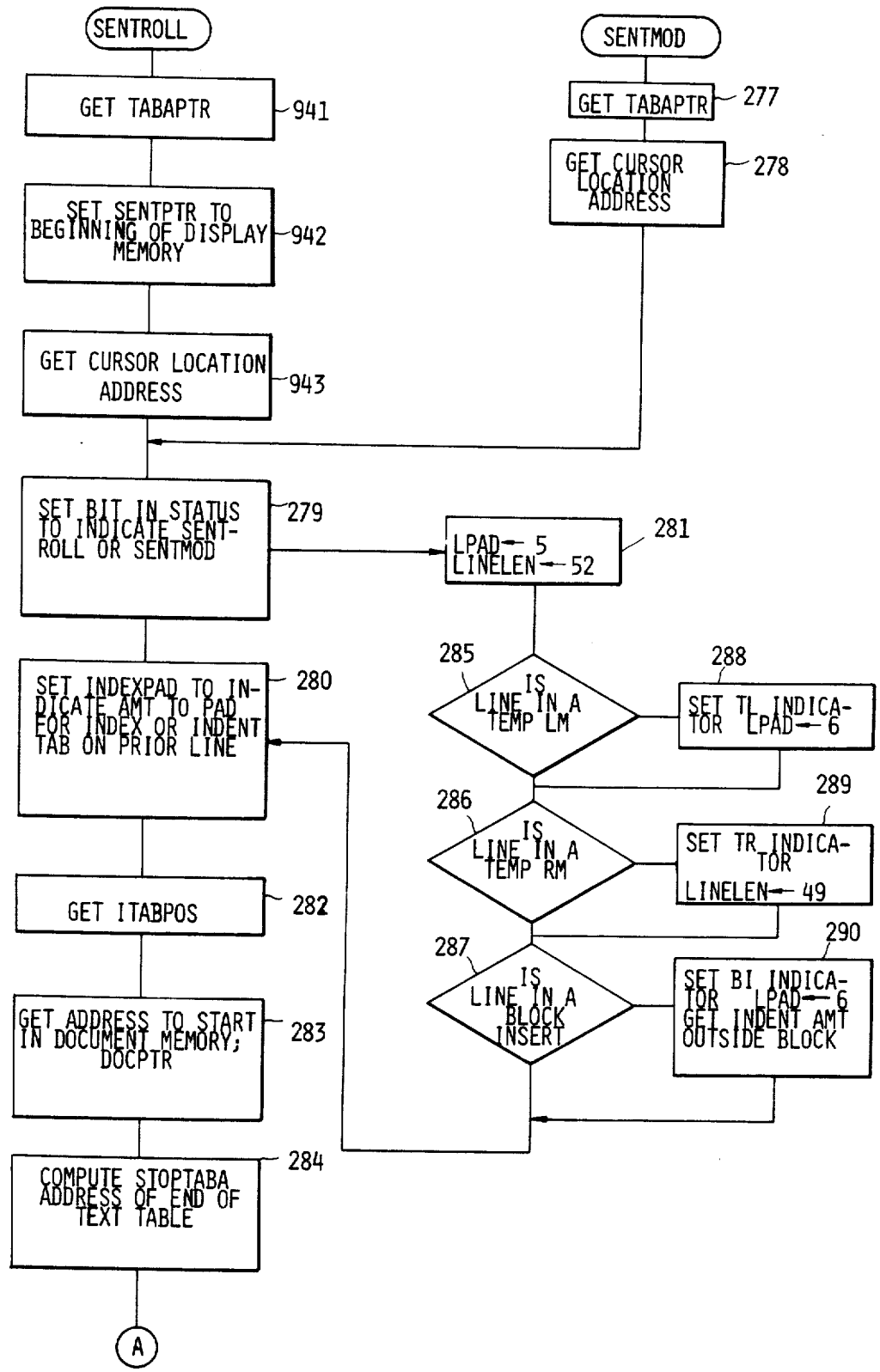

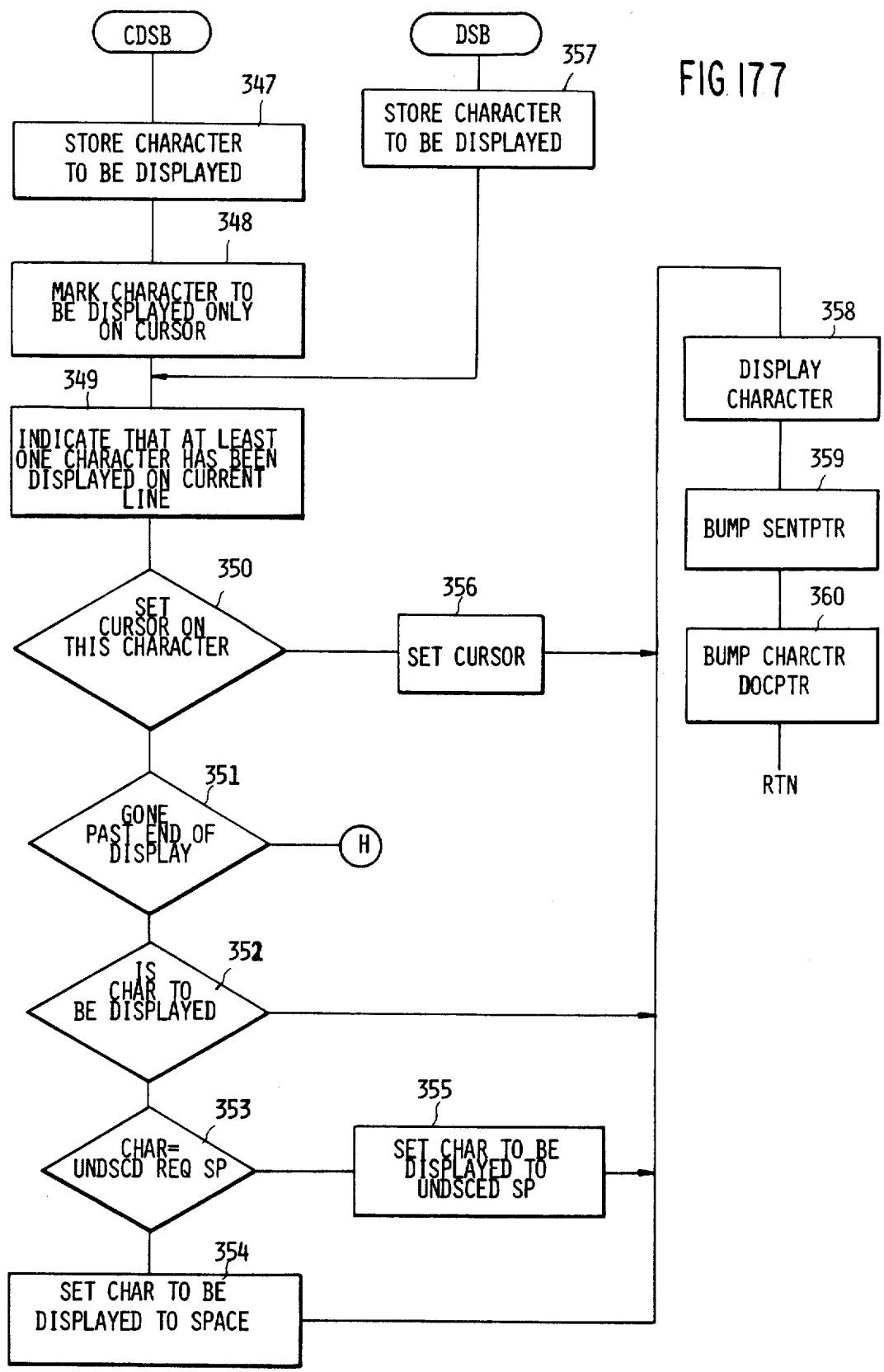

FIG. 17.8
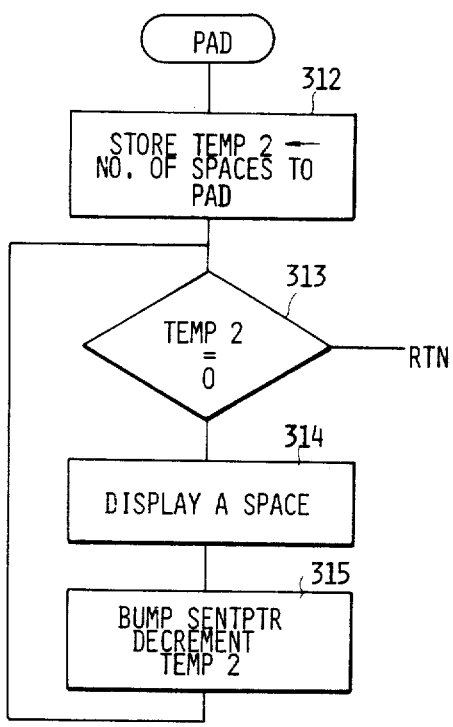
FIG. 17.9
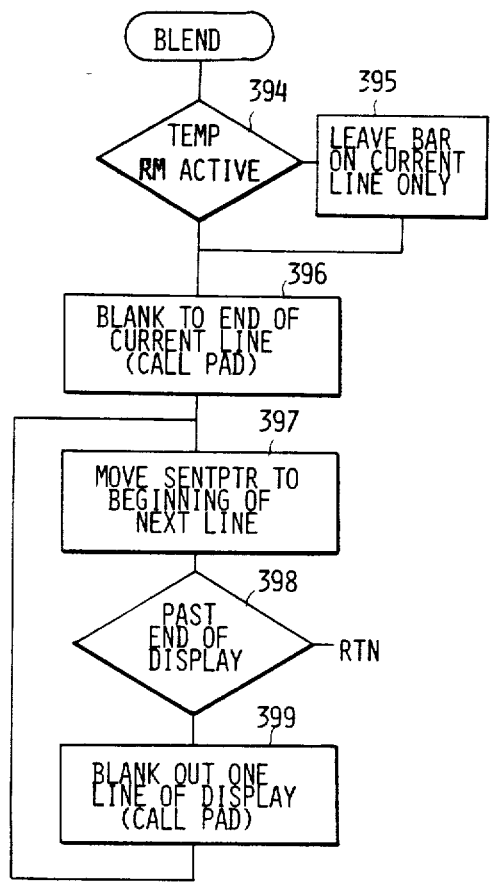
FIG. 17.10
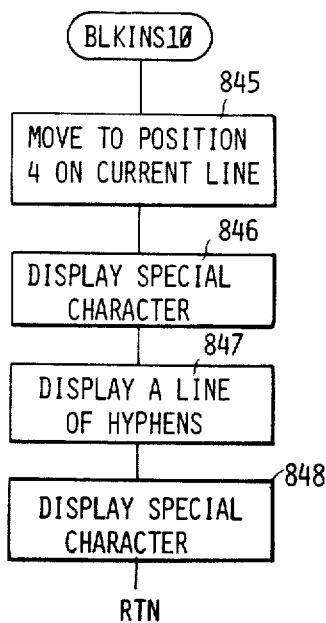

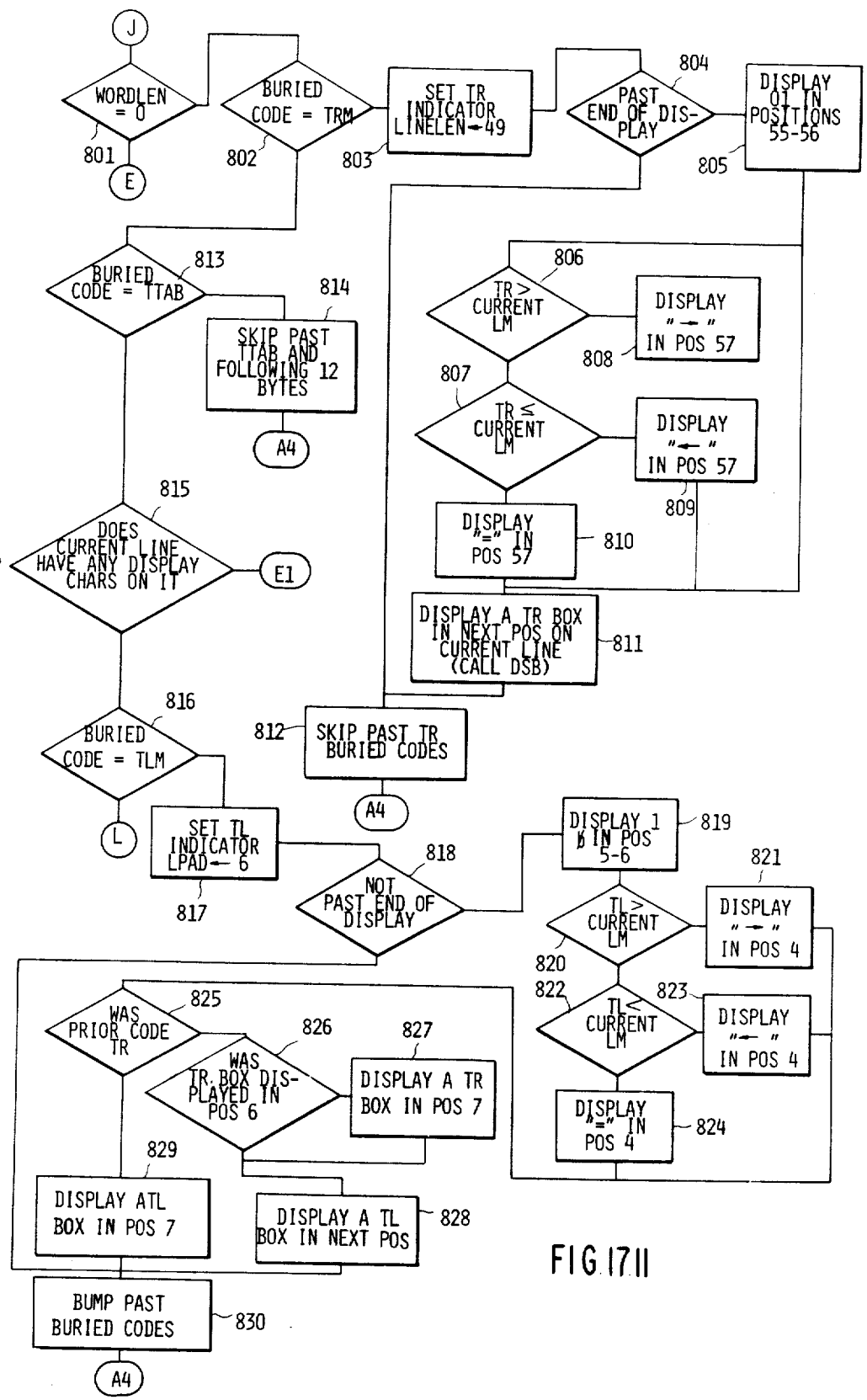
FIG. 17.11

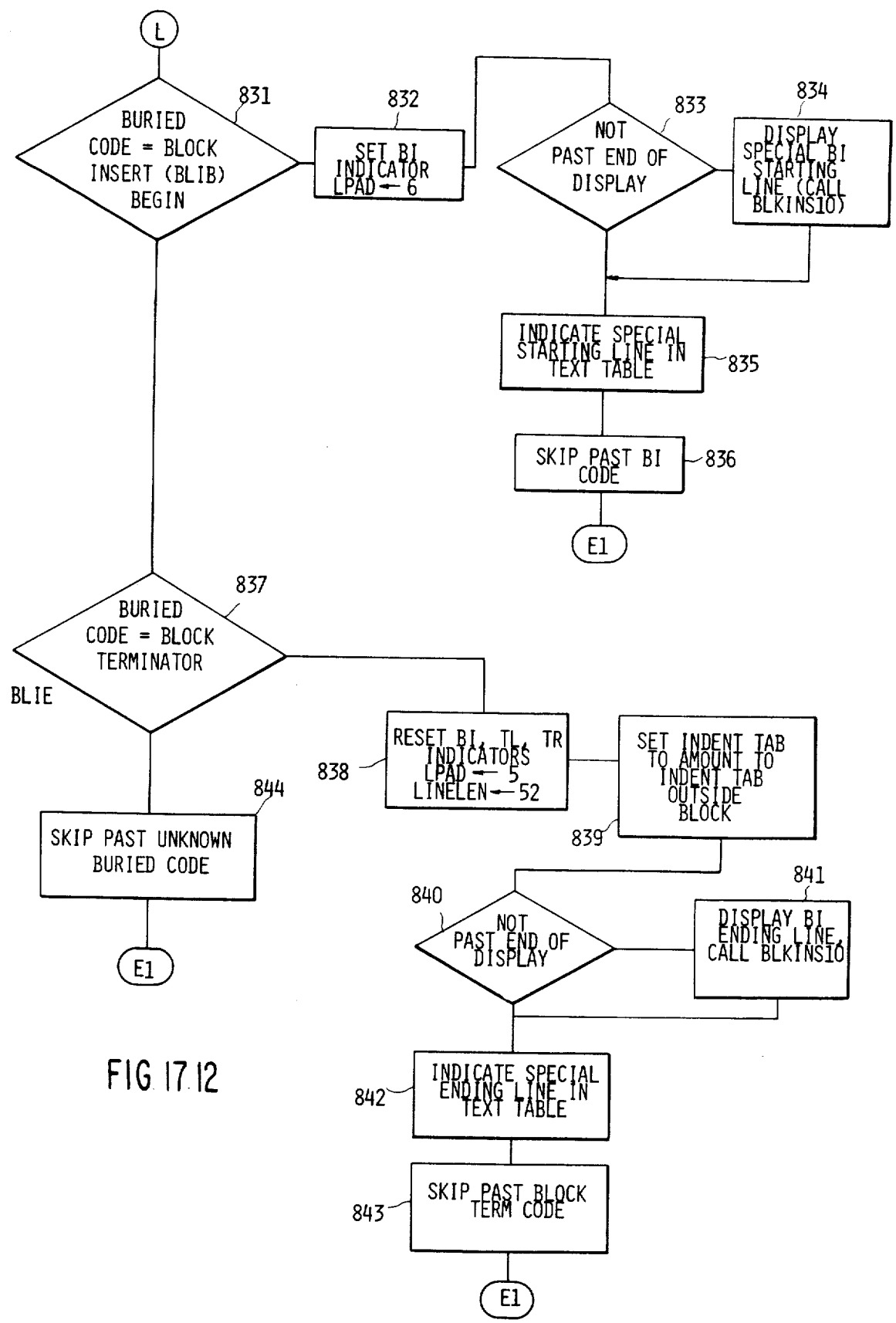
FIG. 17.12

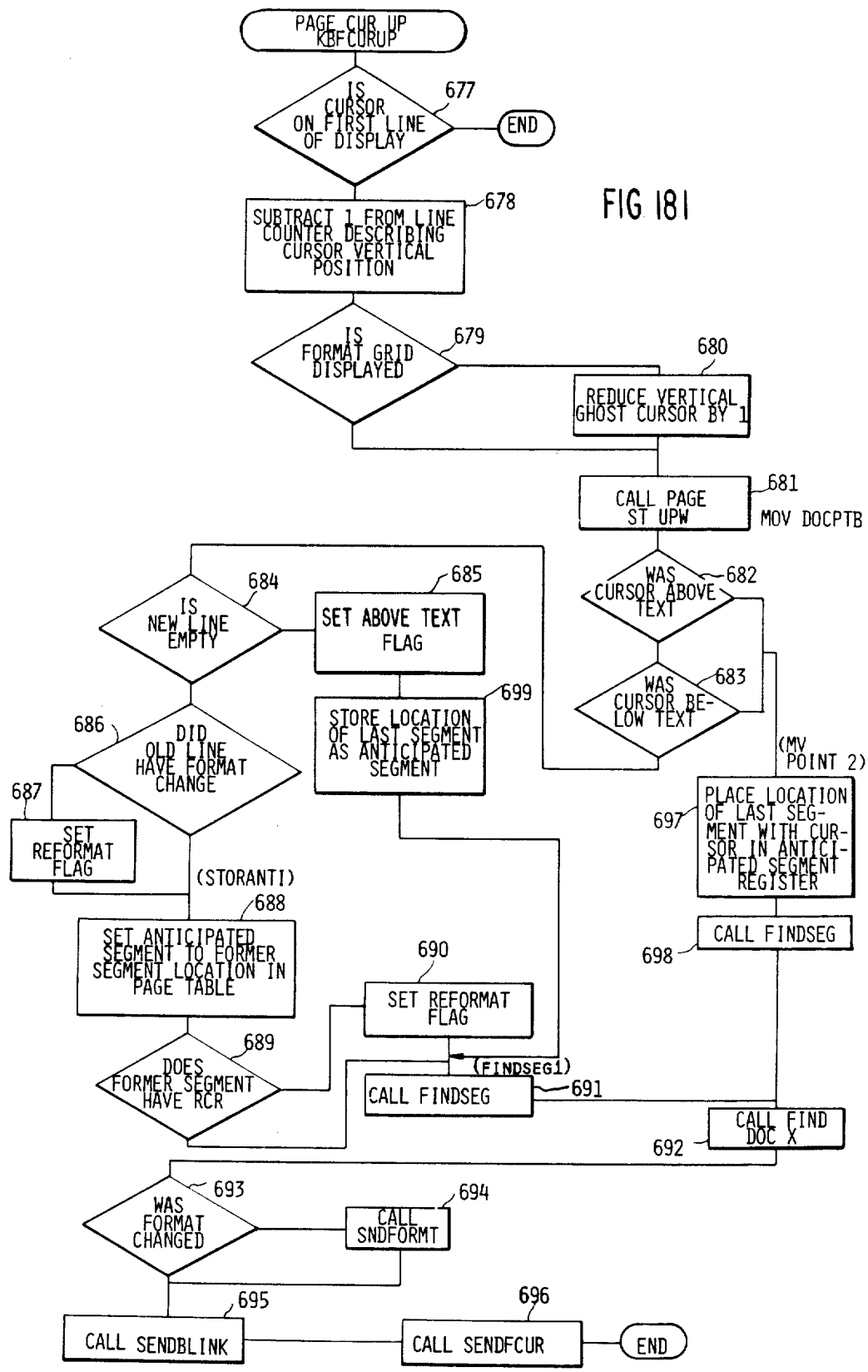

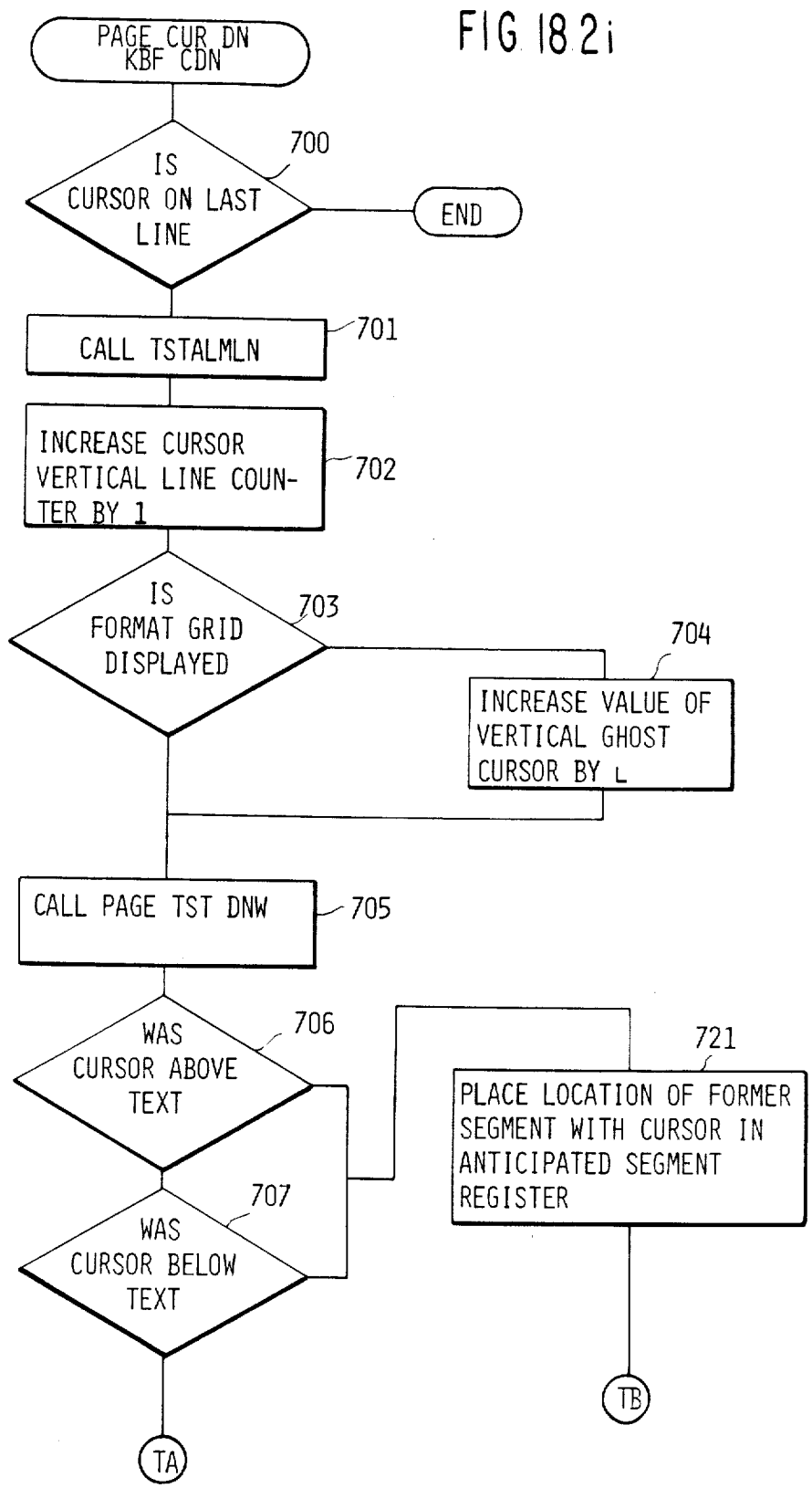
FIG. 18.2i

FIG. 18.2 ii
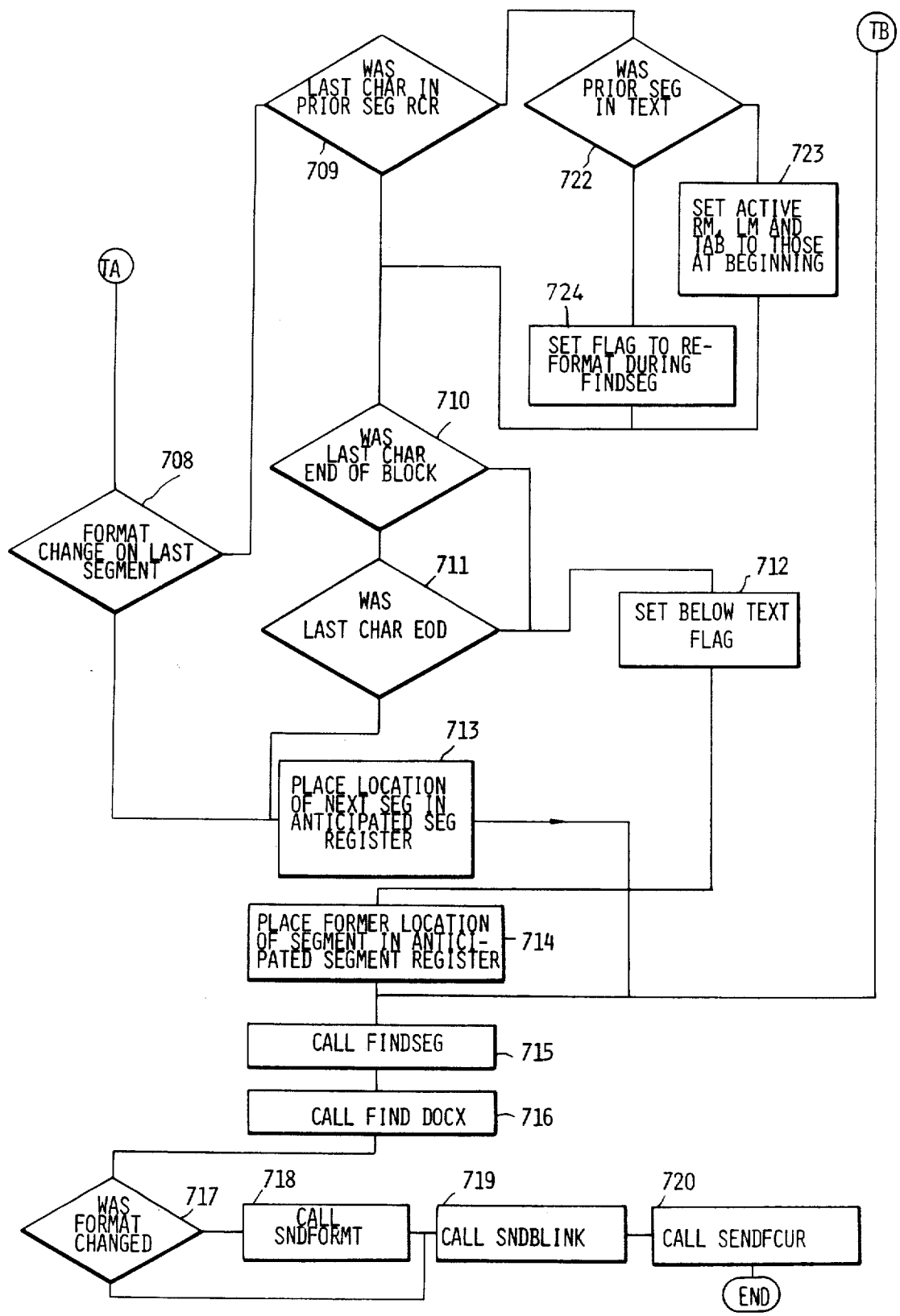

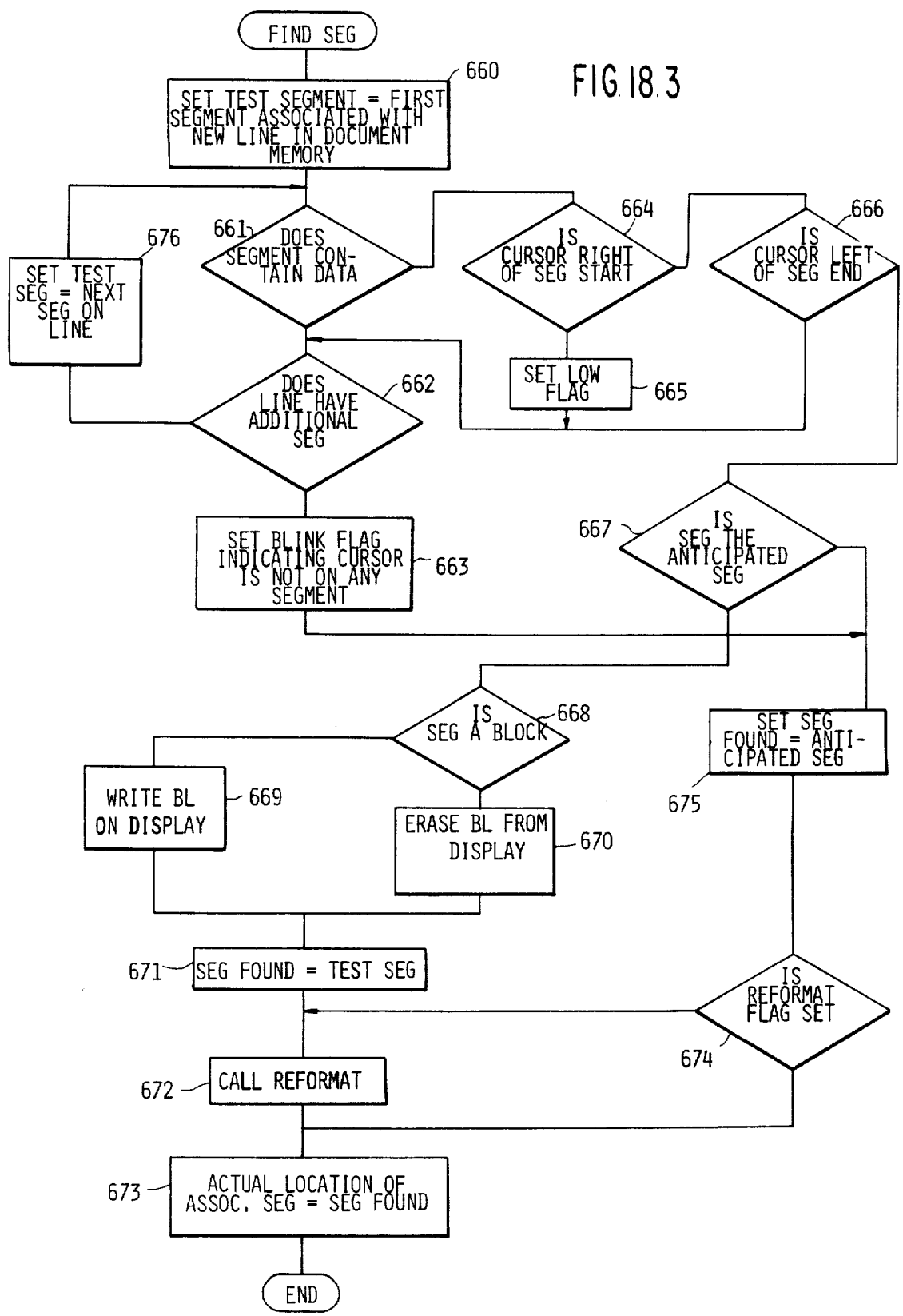

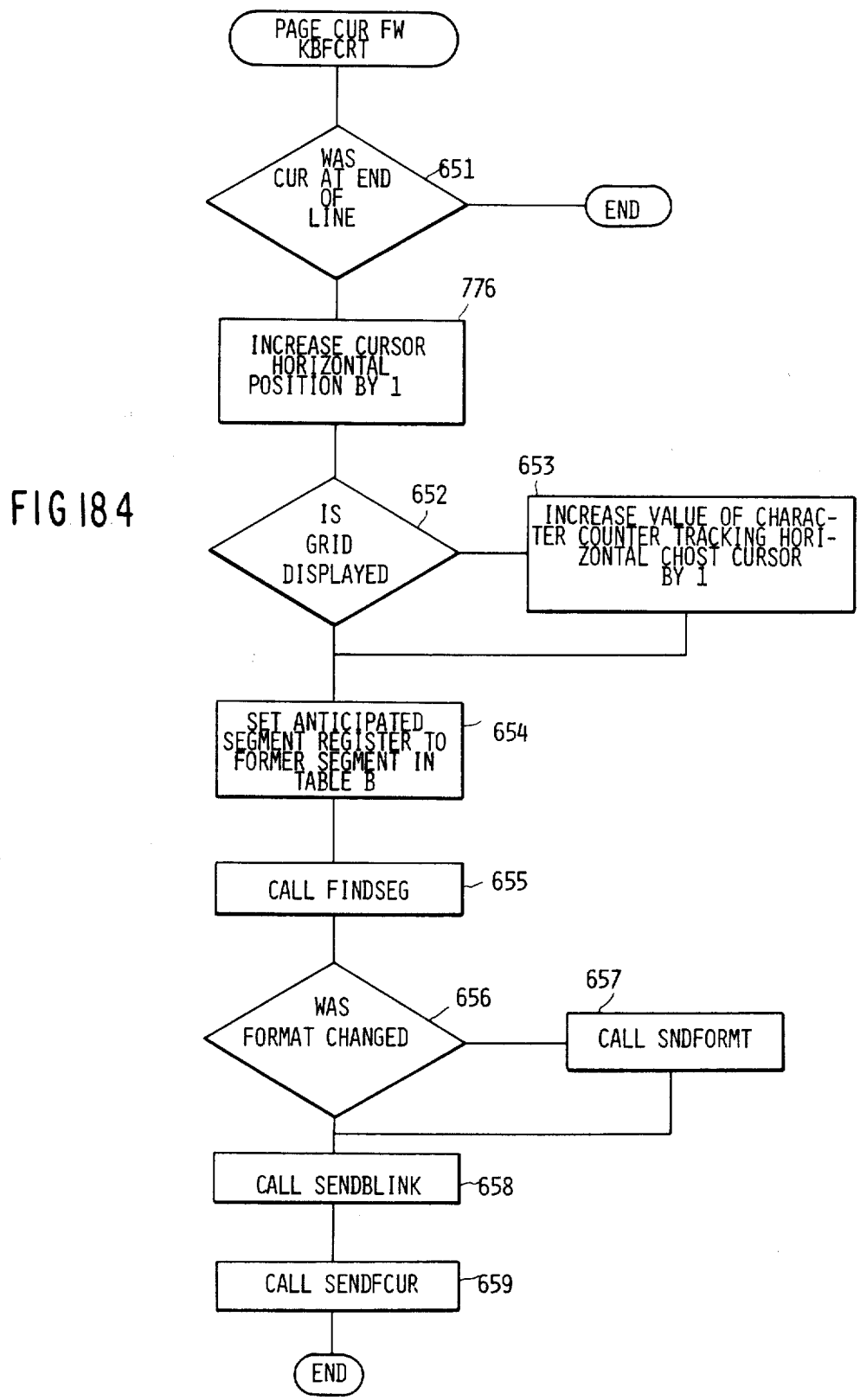
FIG.18.4

FIG. 18.5
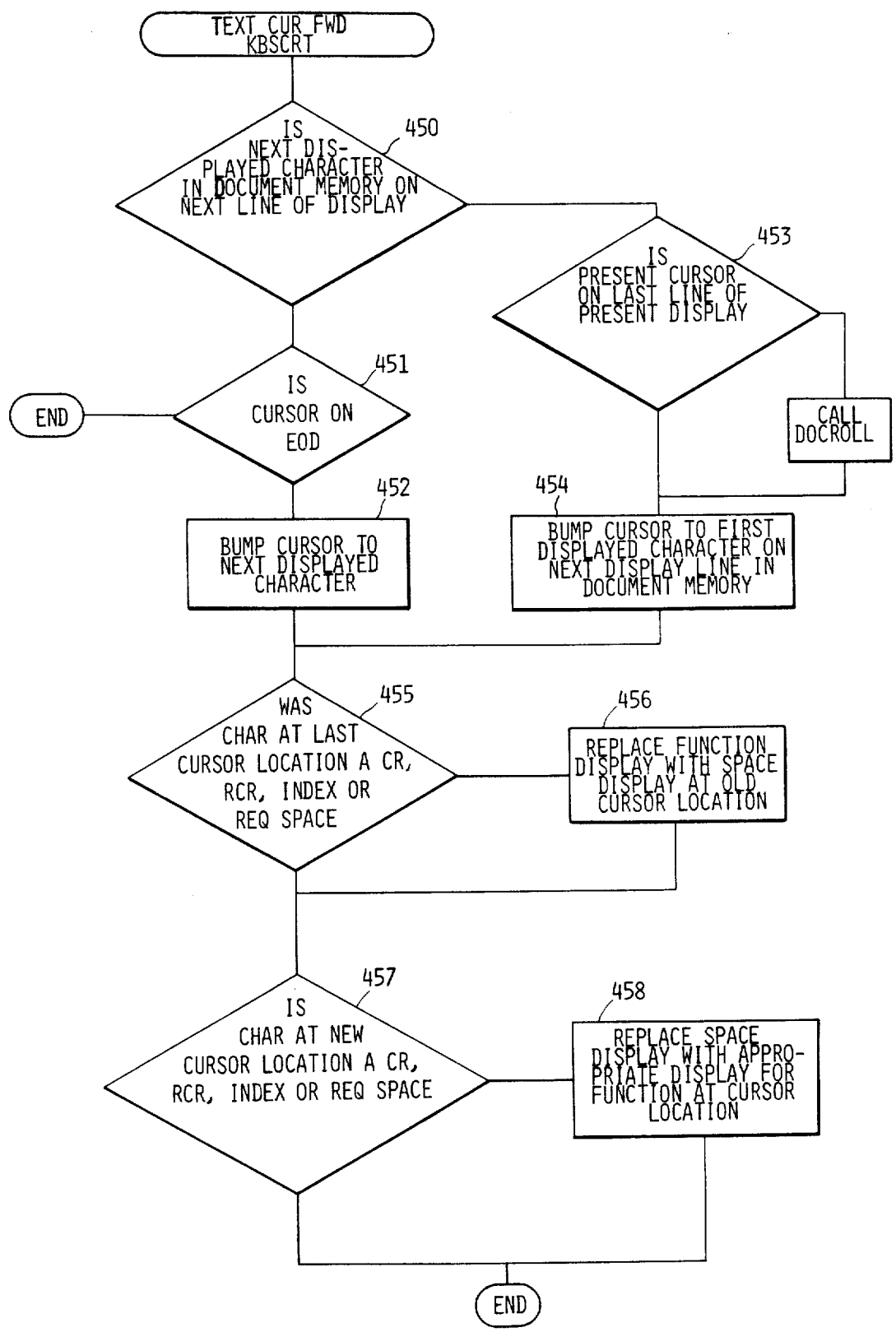

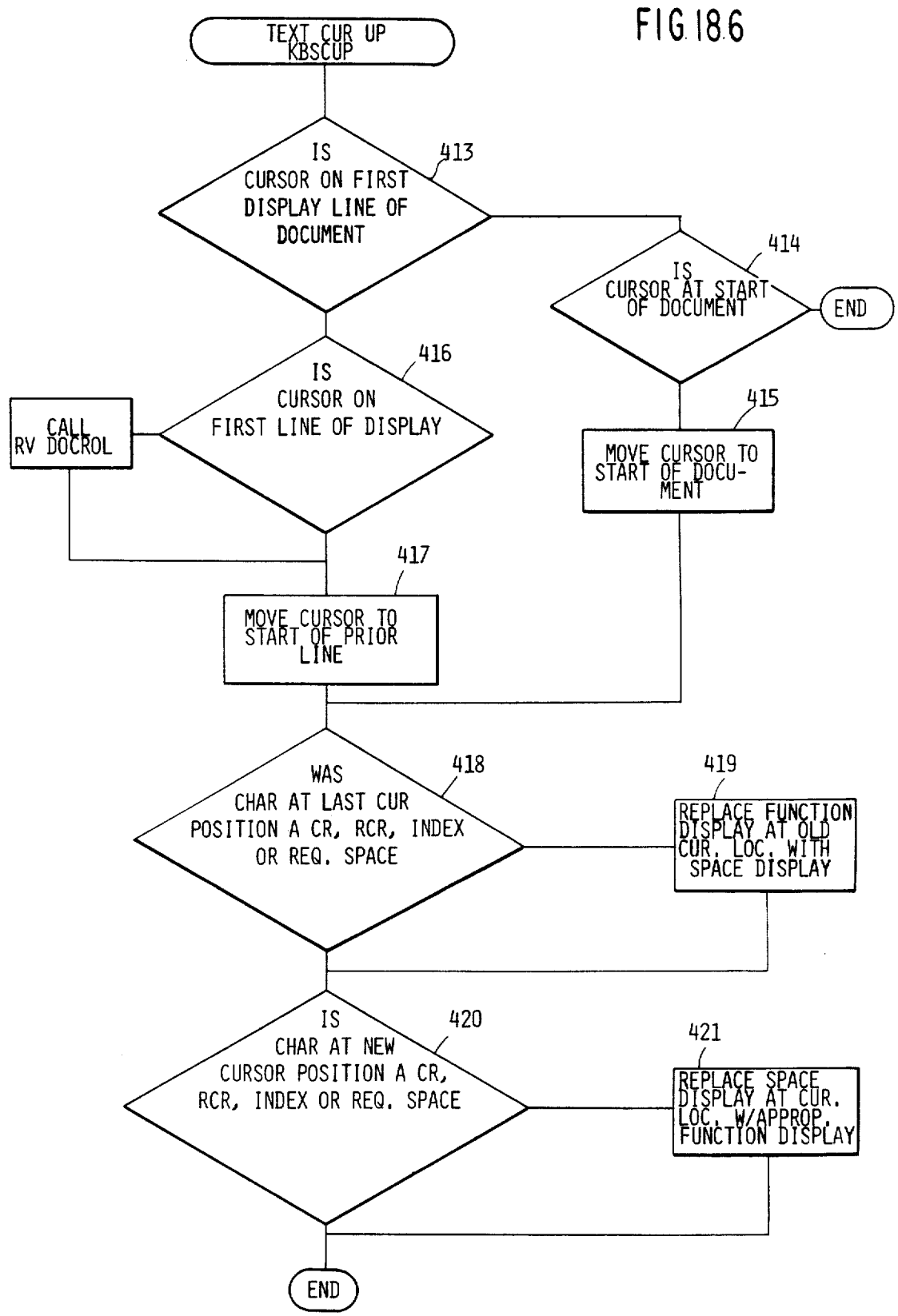
FIG. 18.6

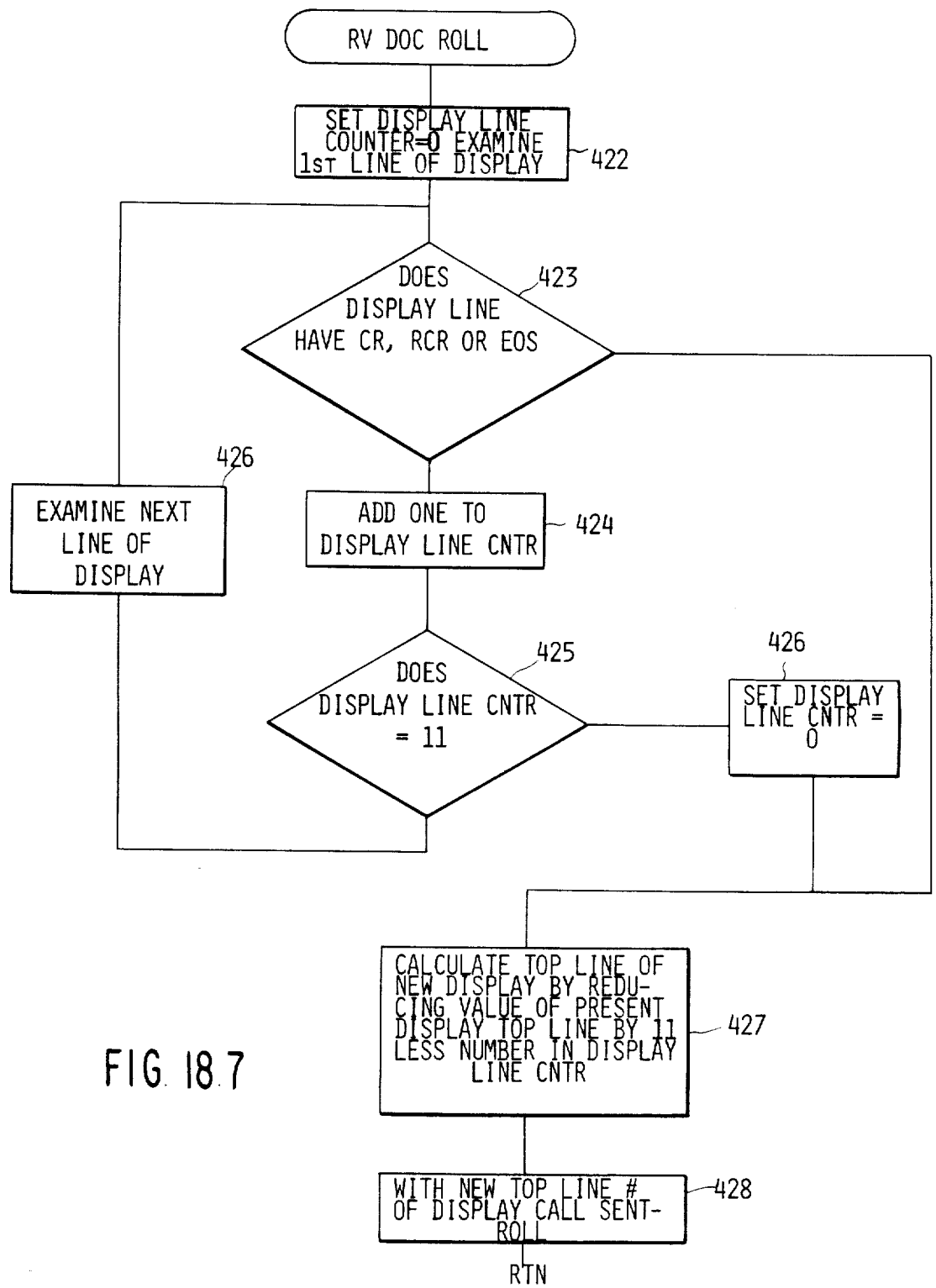
FIG. 18.7

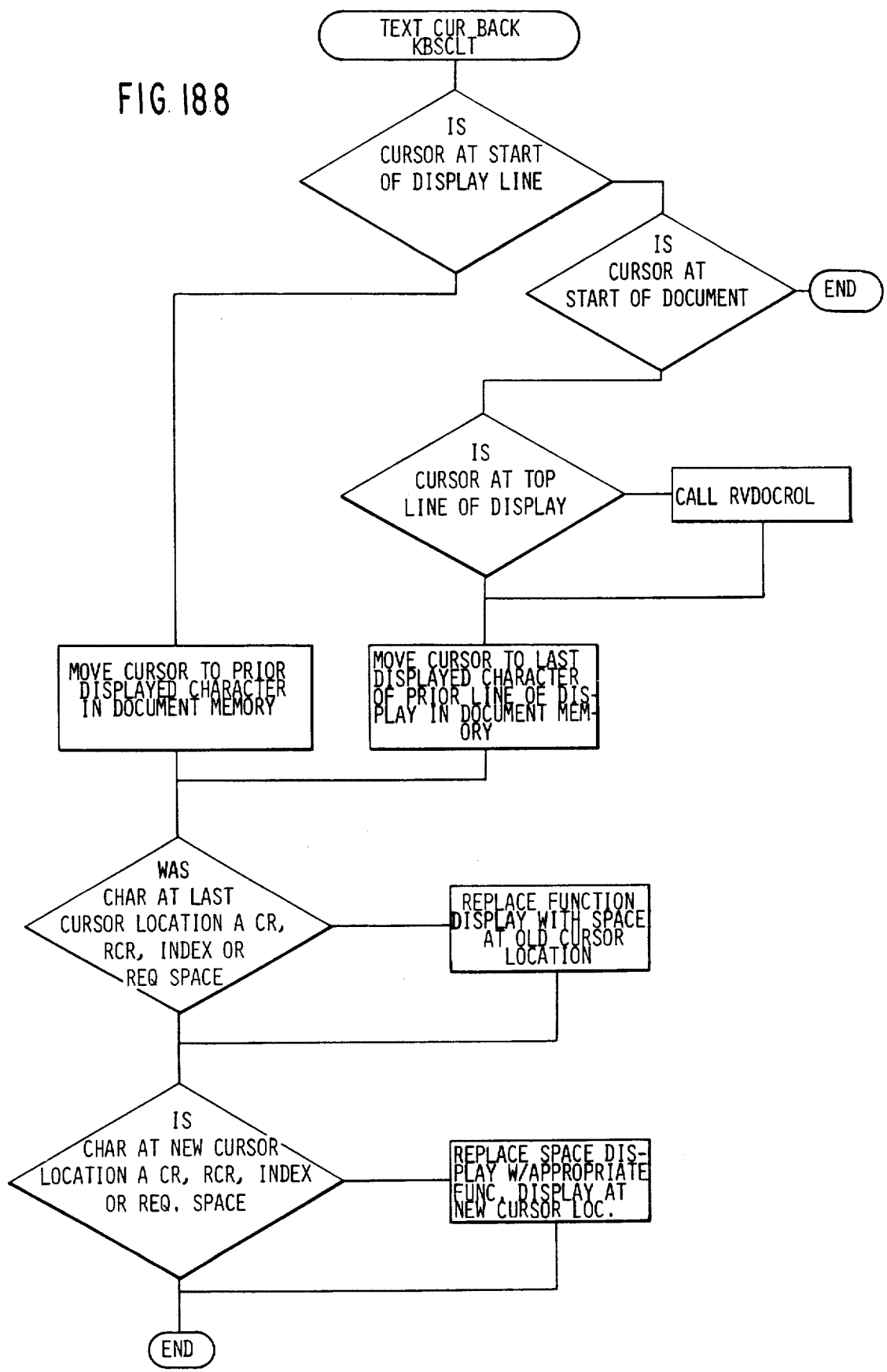
FIG. 18.8

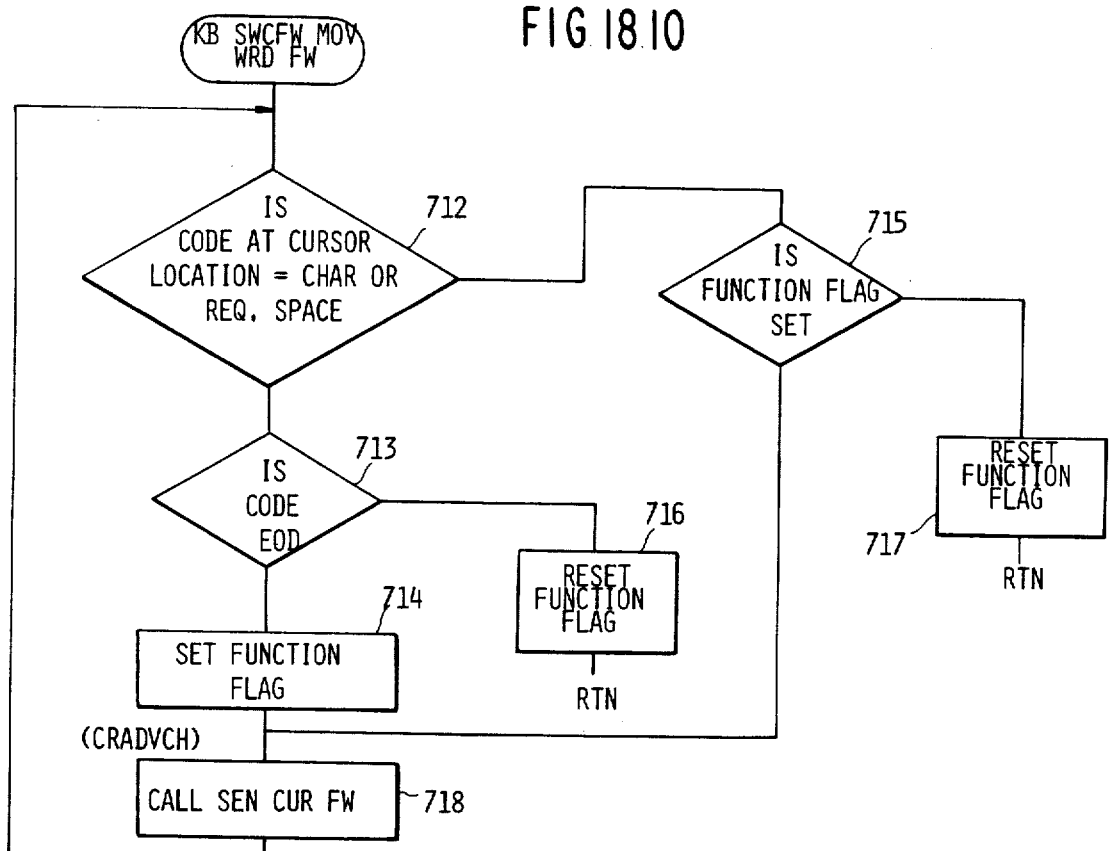
FIG. 18.10
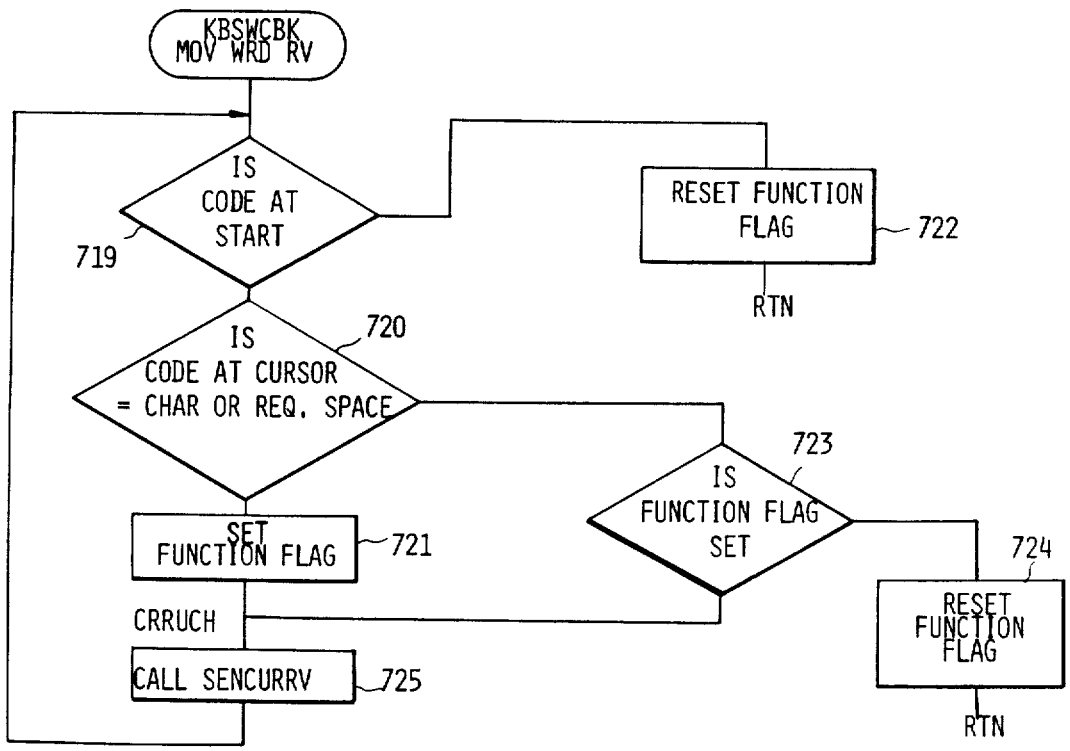
FIG. 18.11

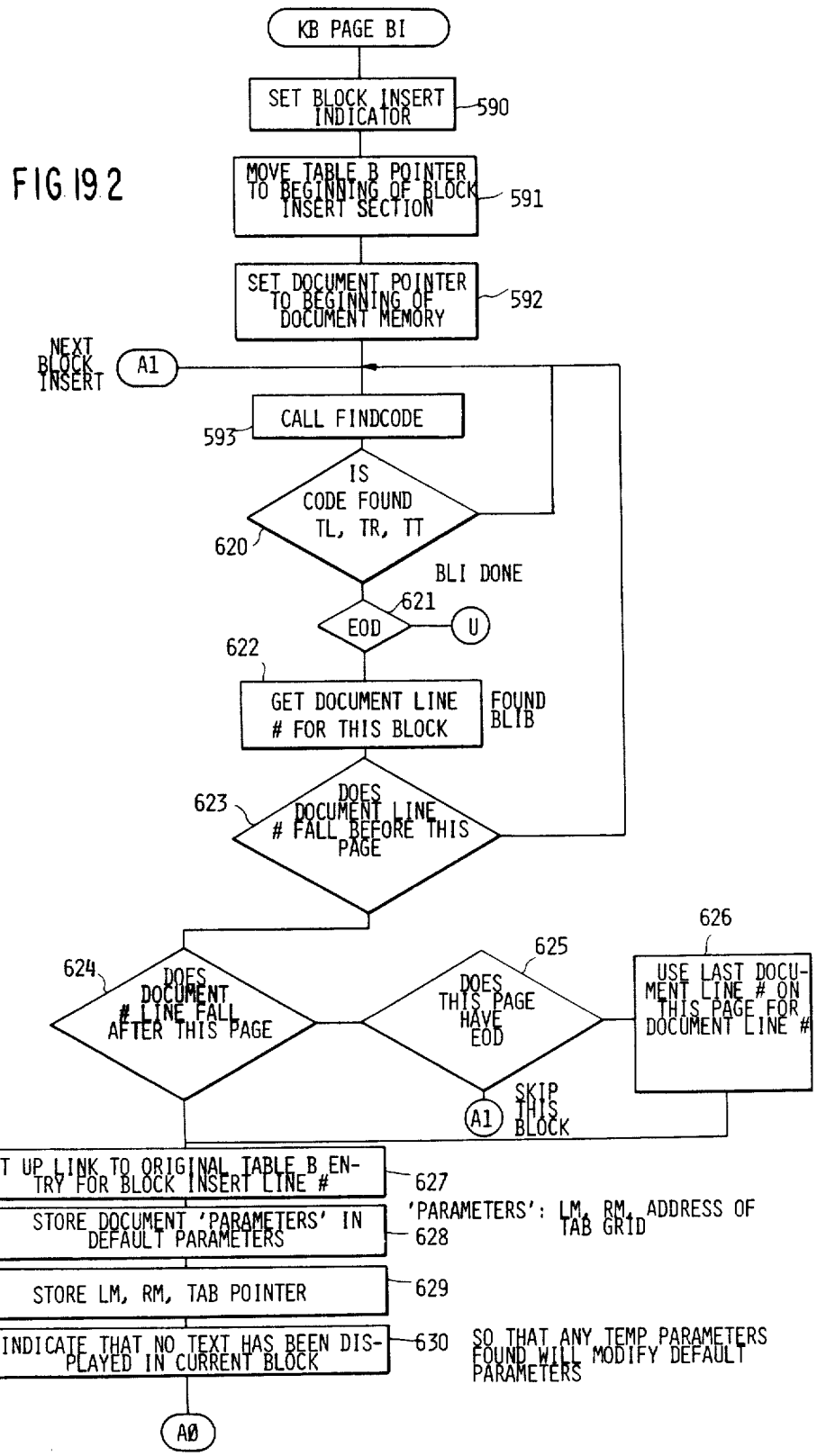
FIG. 19.2

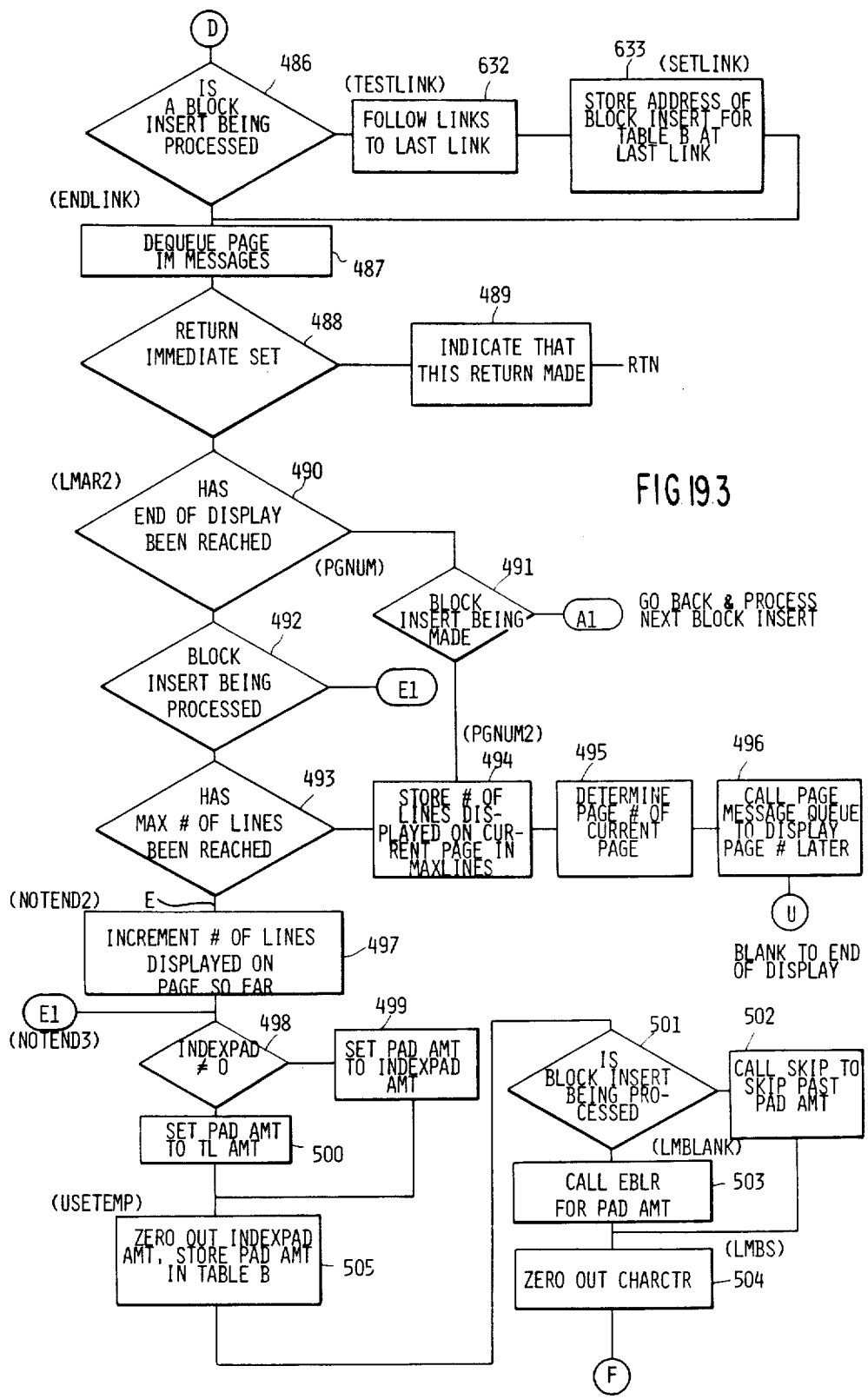
FIG 19.3

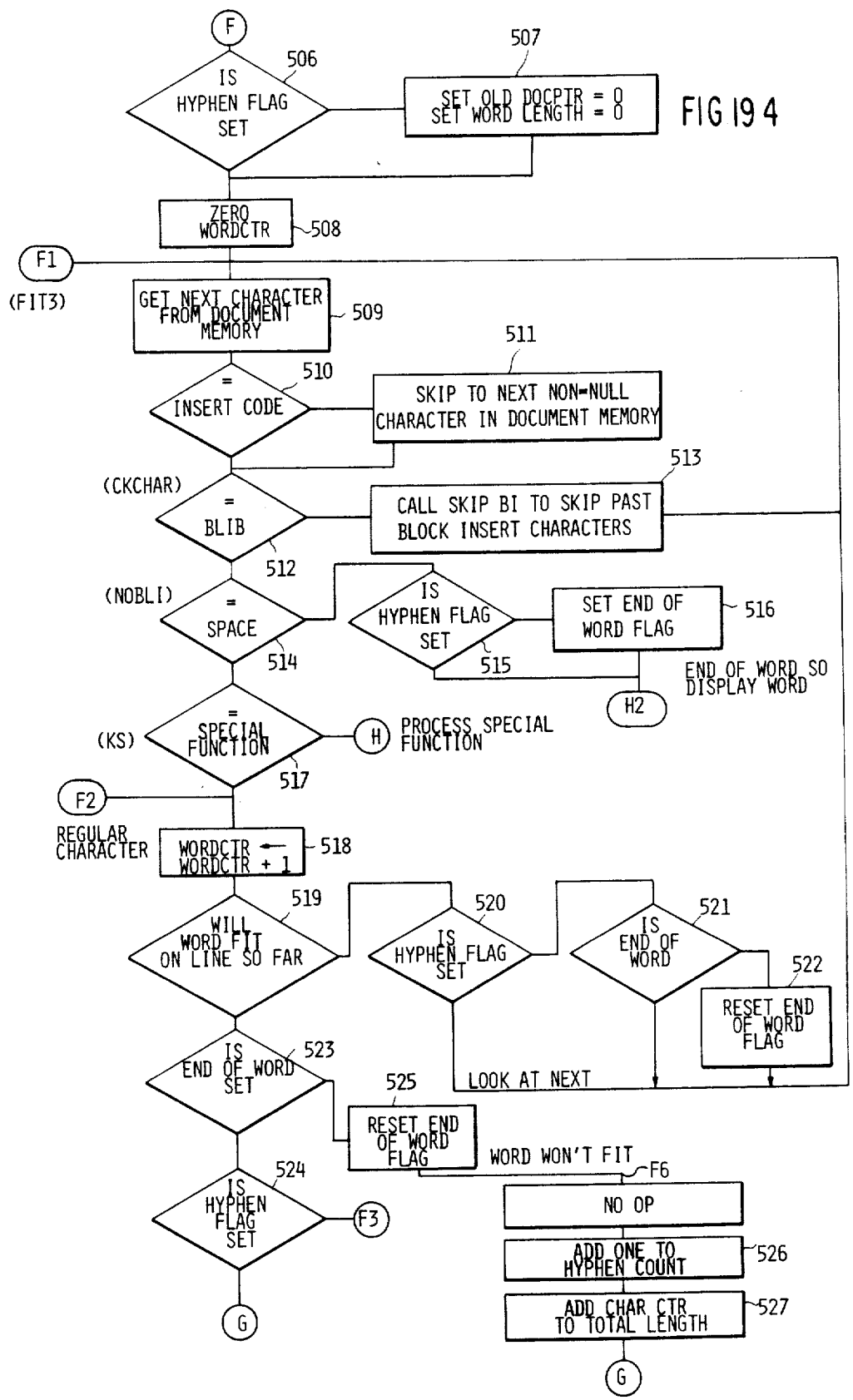
FIG 19.4

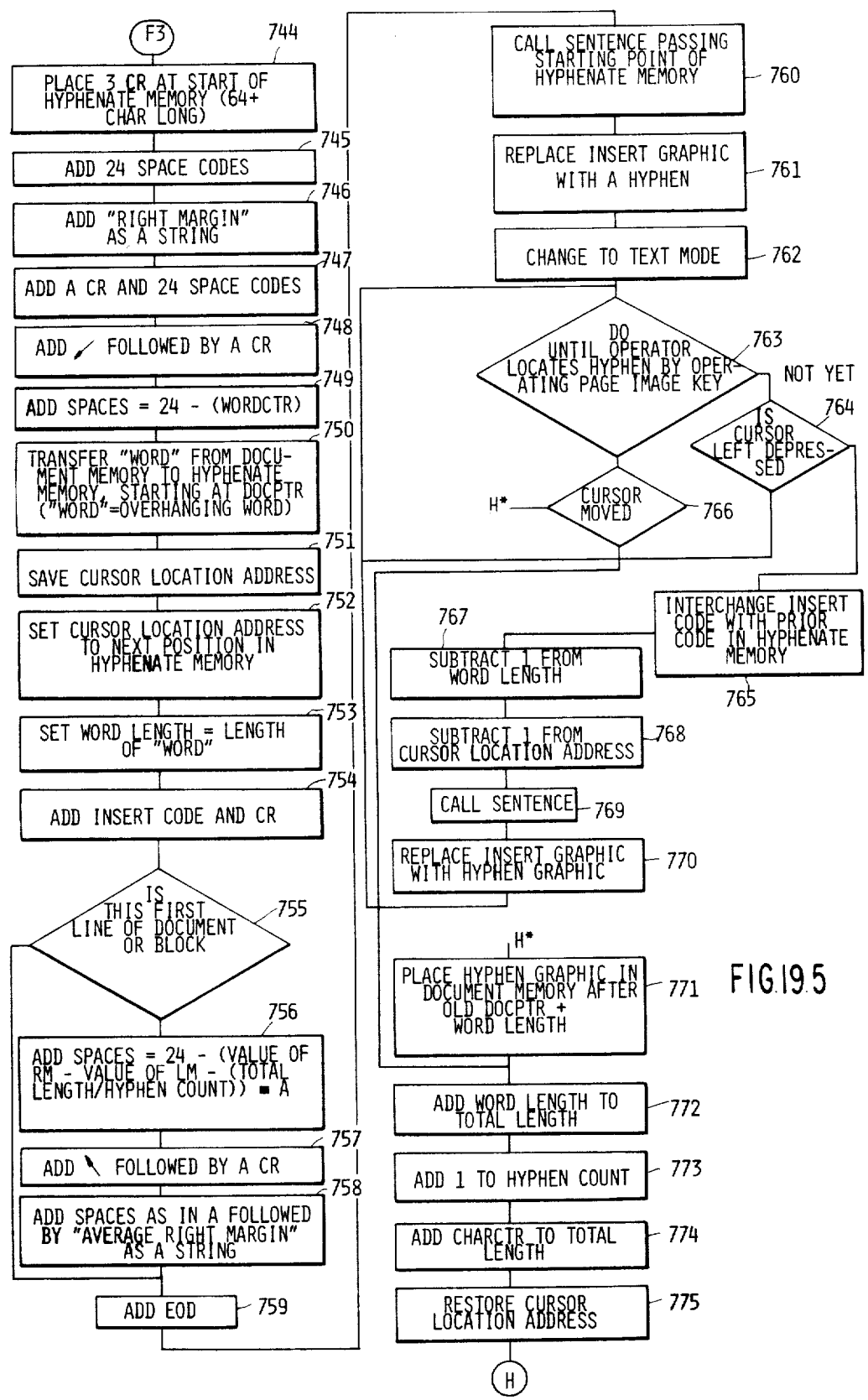
FIG.19.5

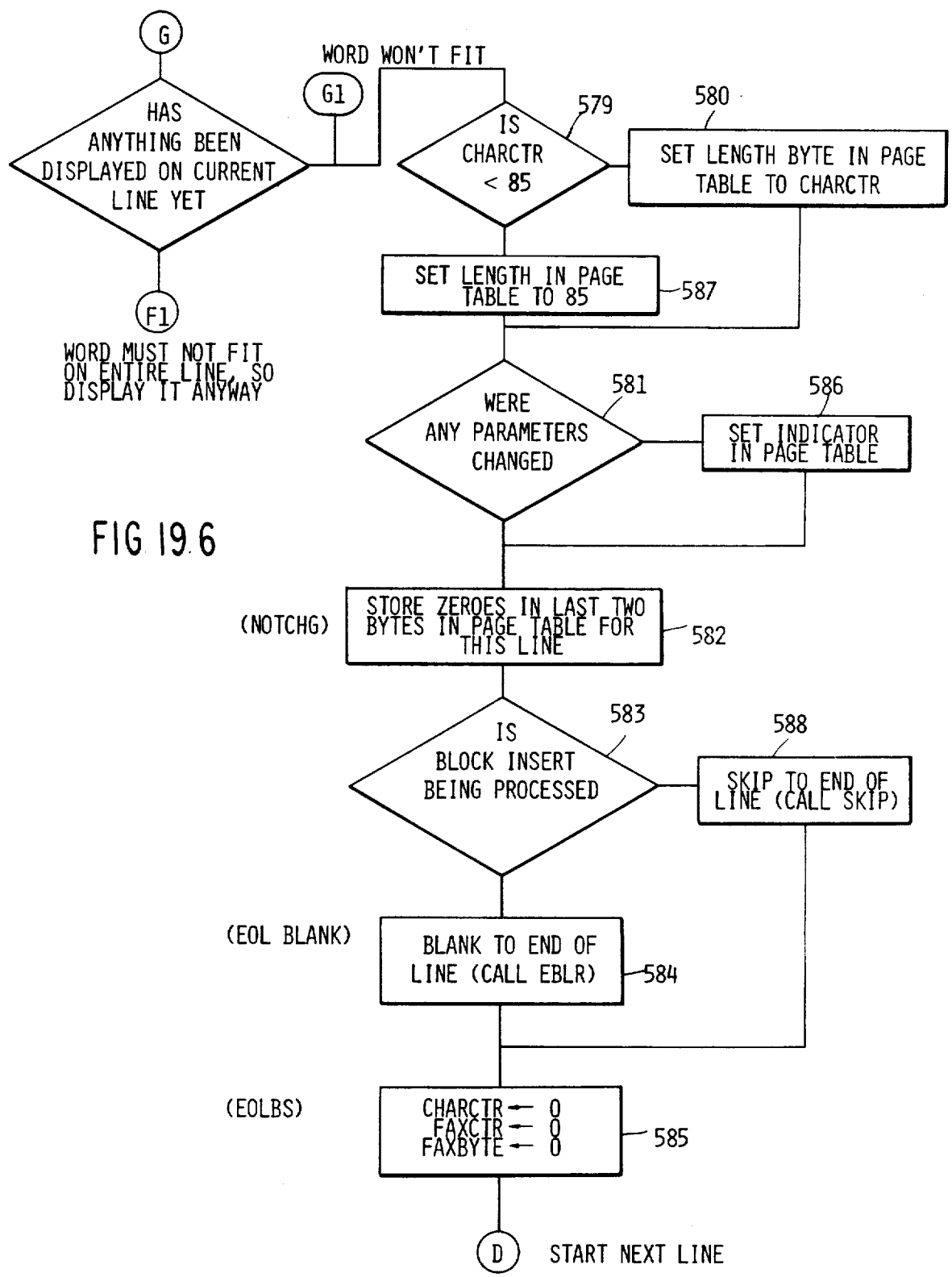
FIG. 19.6

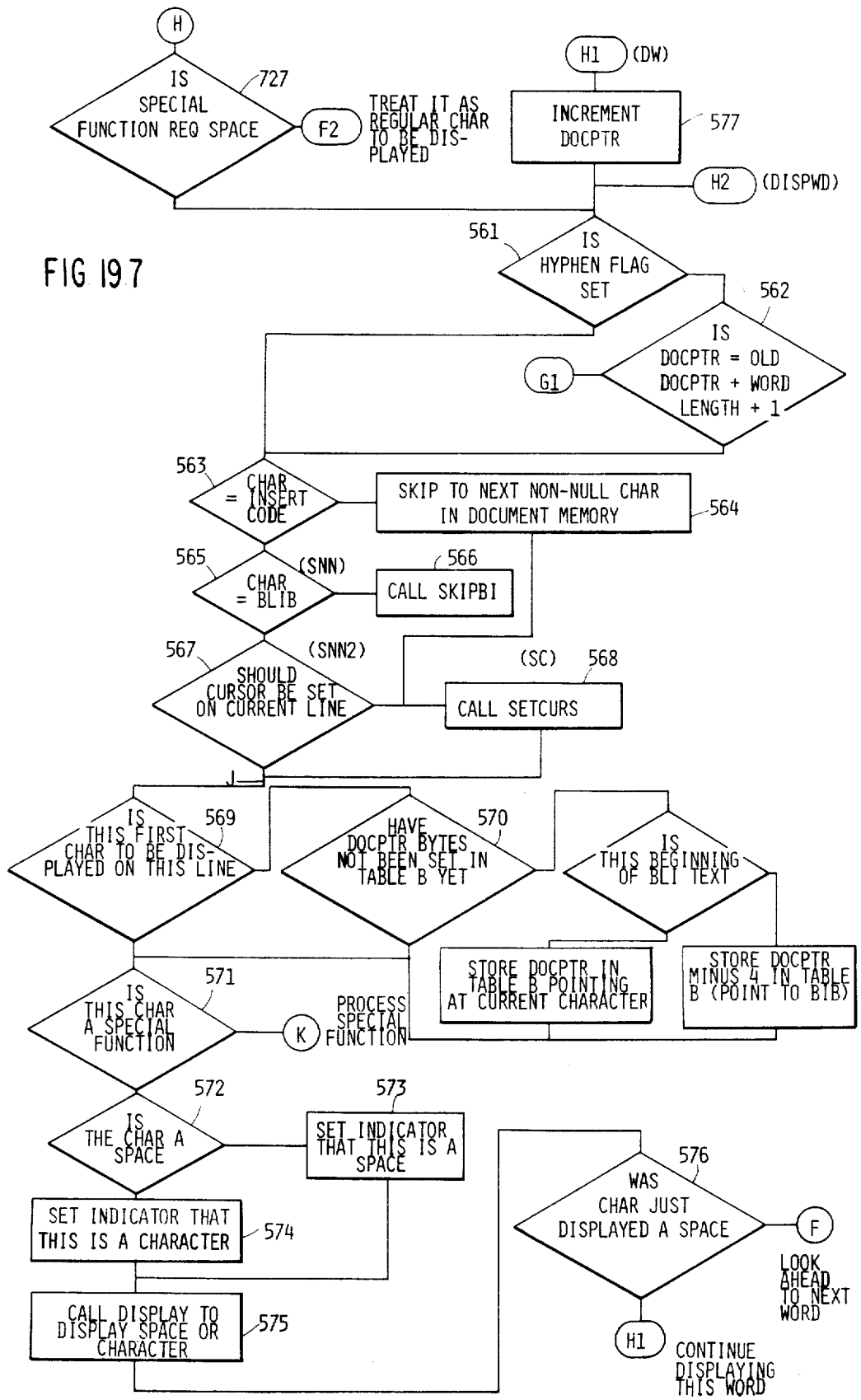
FIG 19.7

FIG.19.8

```
ENTER → LOOK AT FUNCTION → EXIT    FOR
           ⎧               L       REQUIRED SPACE
           ⎪               M1      CARRIAGE RETURN (CR)
           ⎪               M       REQ'D CARRIAGE RETURN (RCR)
           ⎪               N1      END OF DOCUMENT (EOD)
           ⎪               L1      INDEX
           ⎪               P       INDENT TAB
           ⎪    (NOITAB)   P1      TAB
       K  ⎨     (NOFTAB)   P2      TEMPORARY LEFT MARGIN (TLM)
           ⎪               M3      TEMPORARY RIGHT MARGIN (TRM)
           ⎪               L2      TEMPORARY TAB (TT)
           ⎪               BF      BURIED CODE LENGTH 4 (BC4)
           ⎪               BF      BURIED CODE LENGTH N (BCN)
           ⎪               N       PAGE END
           ⎪               Q1      BLOCK INSERT END (BLIE)
           ⎩               M1      UNRECOGNIZABLE
```

FIG. 19.9
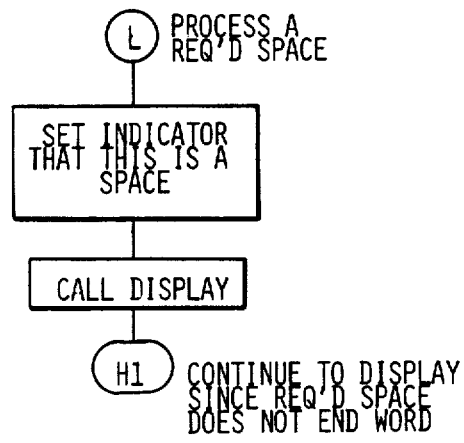
FIG. 19.10
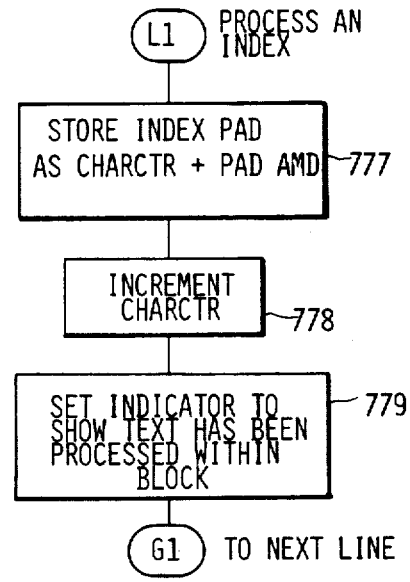
FIG. 19.11
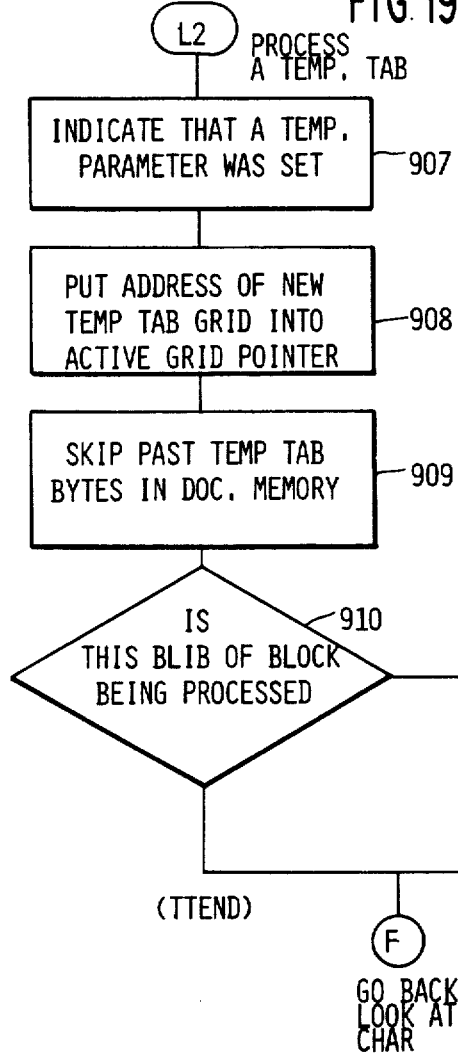
FIG. 19.12
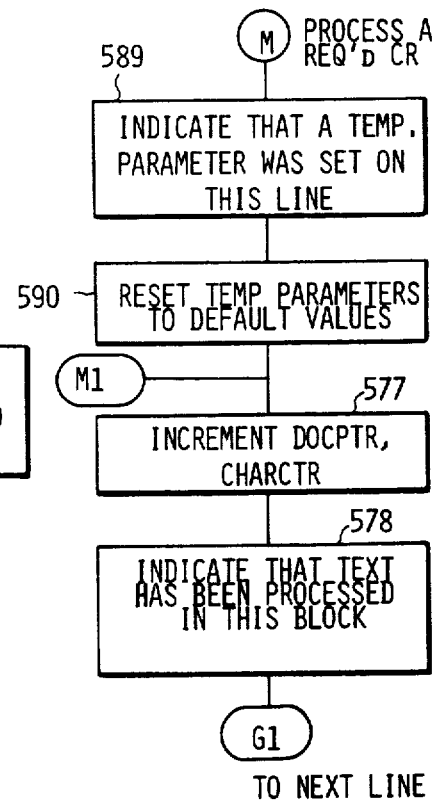

FIG 19.13
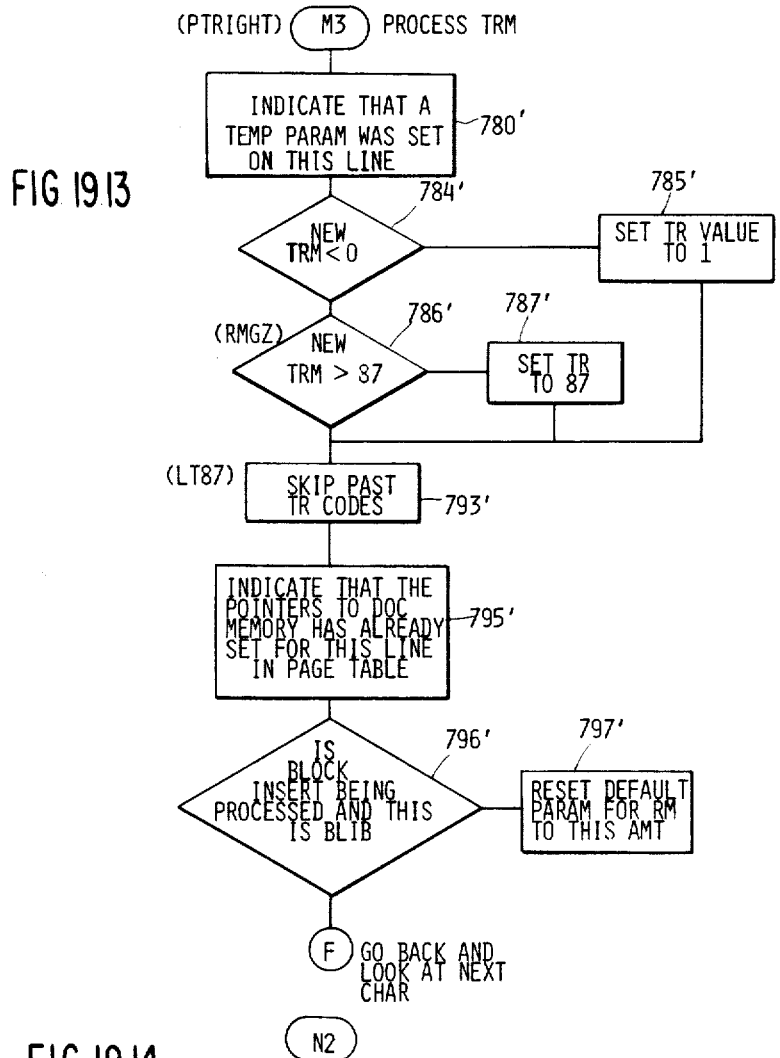
FIG 19.14
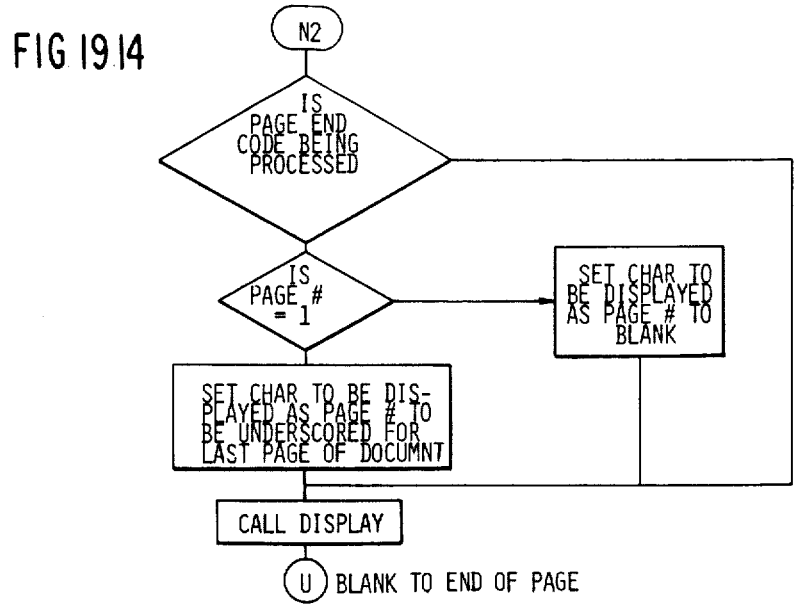

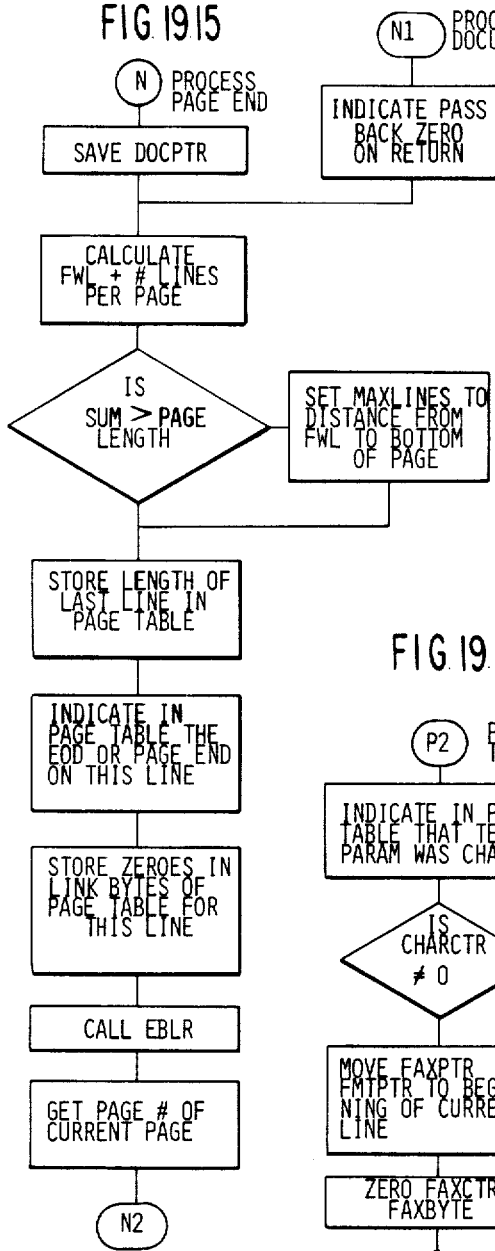
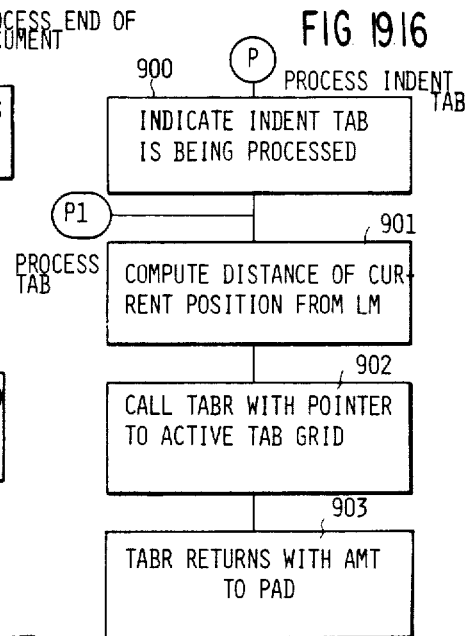
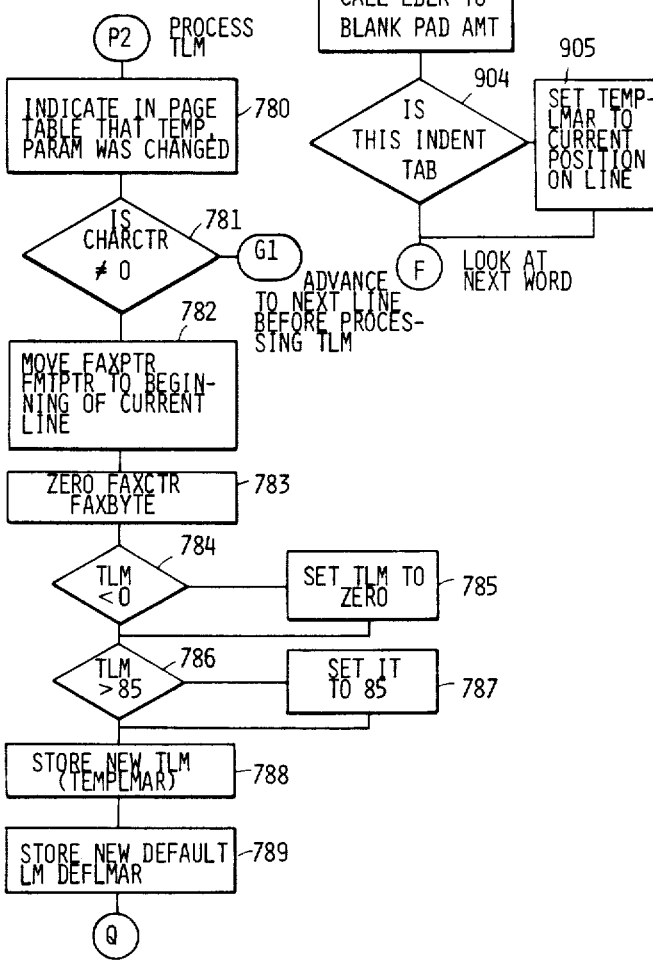

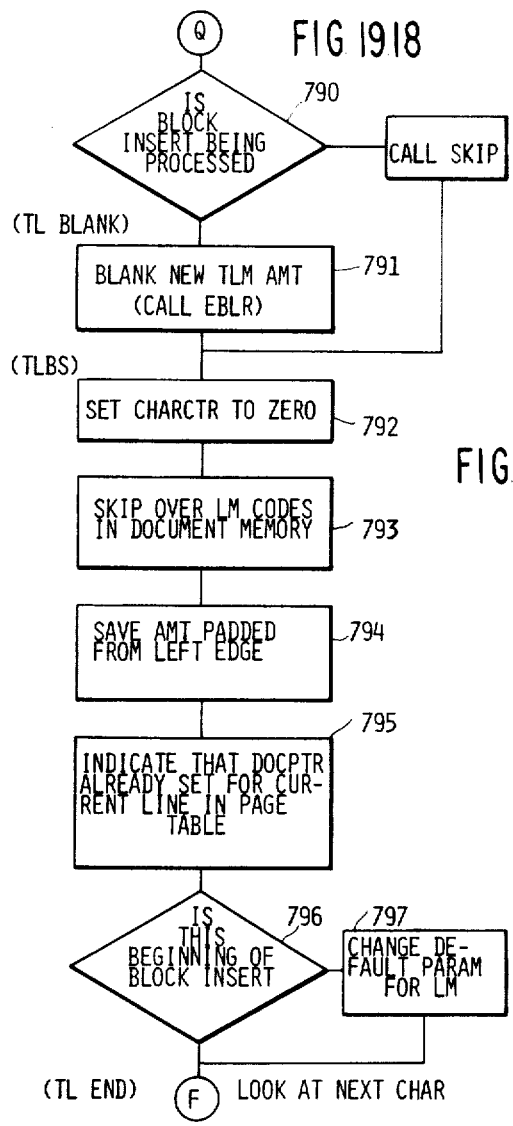
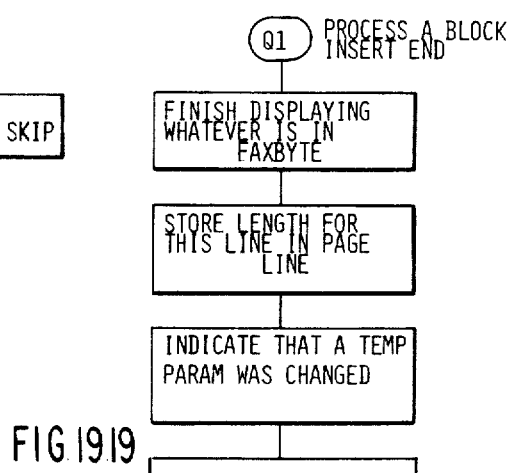
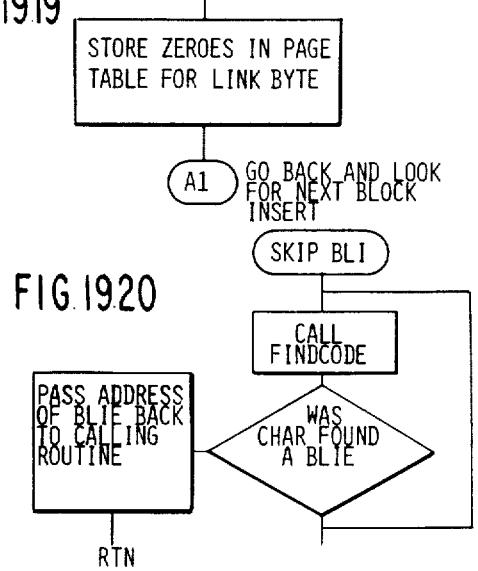
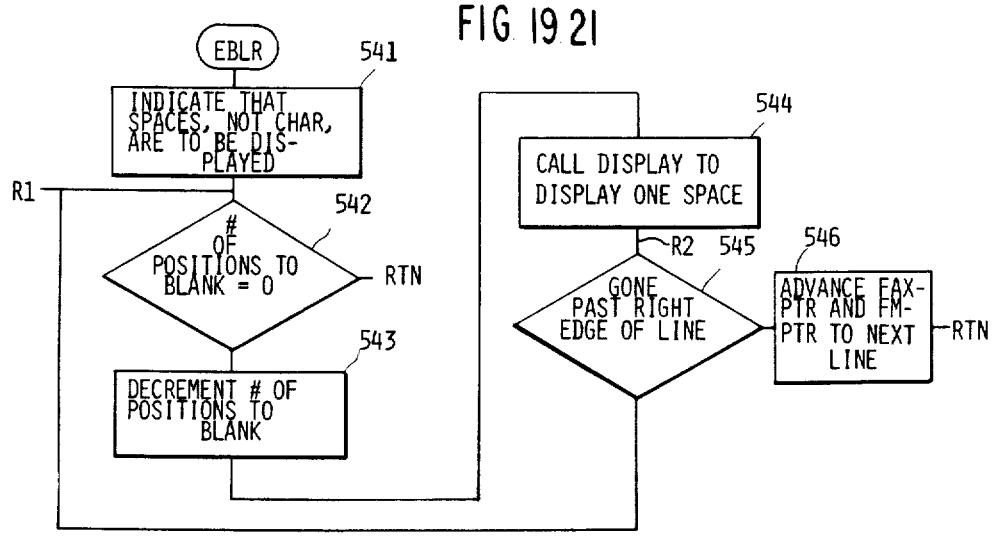

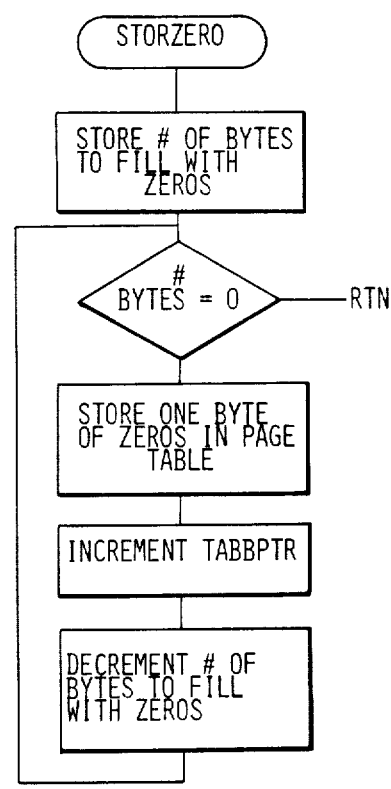# FIG. 19.23
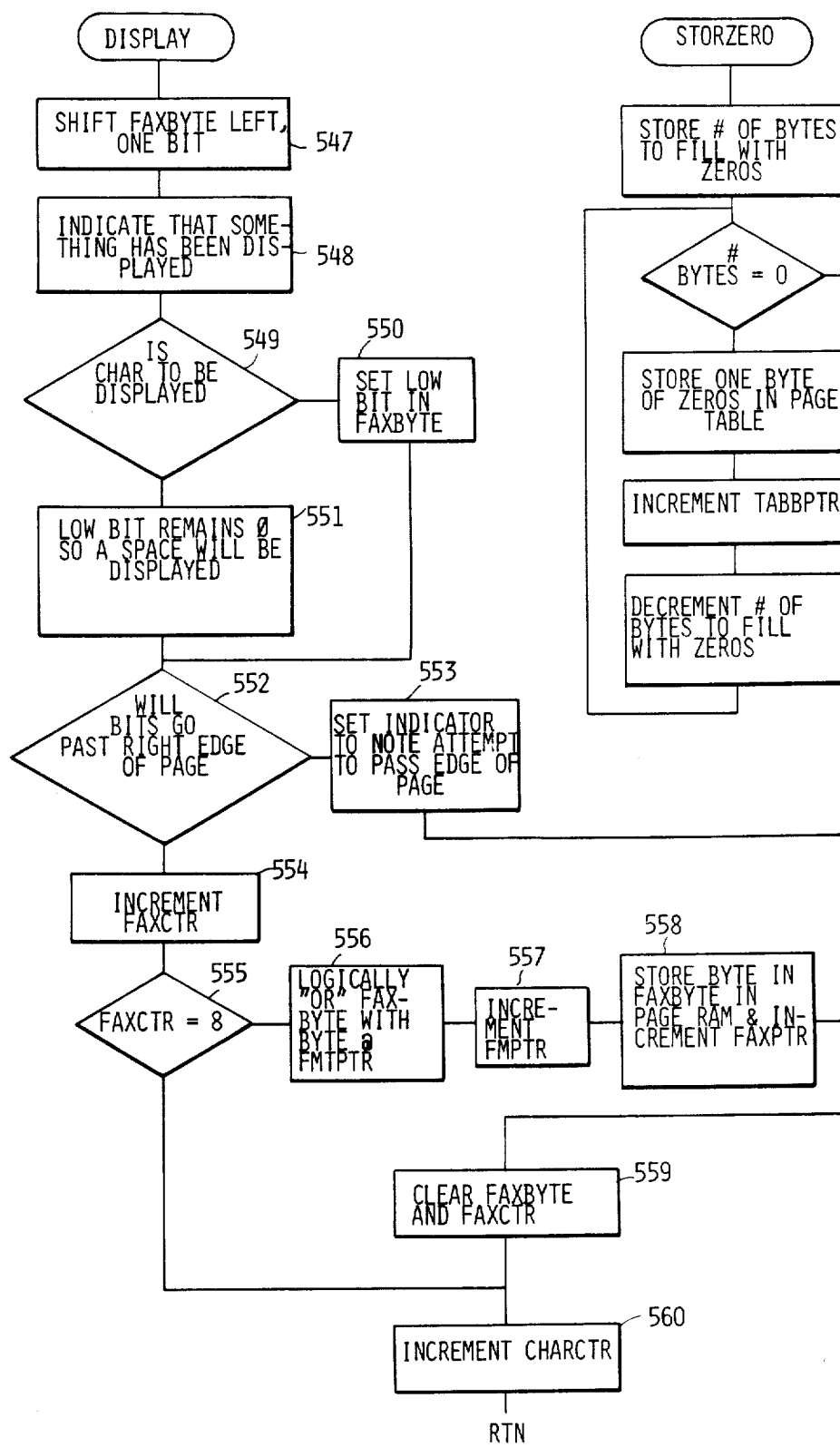
FIG. 19.22

FIG 19.24
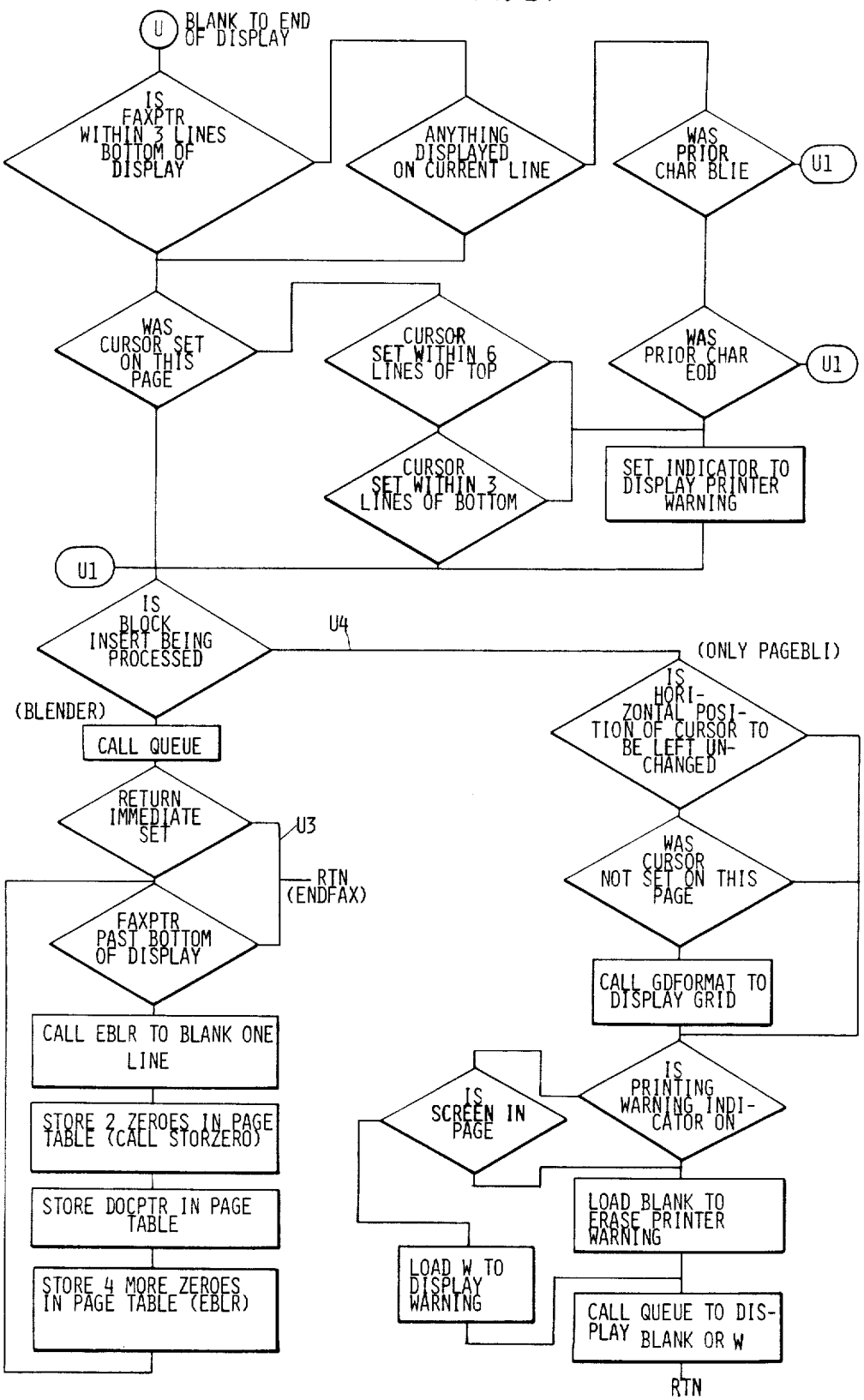

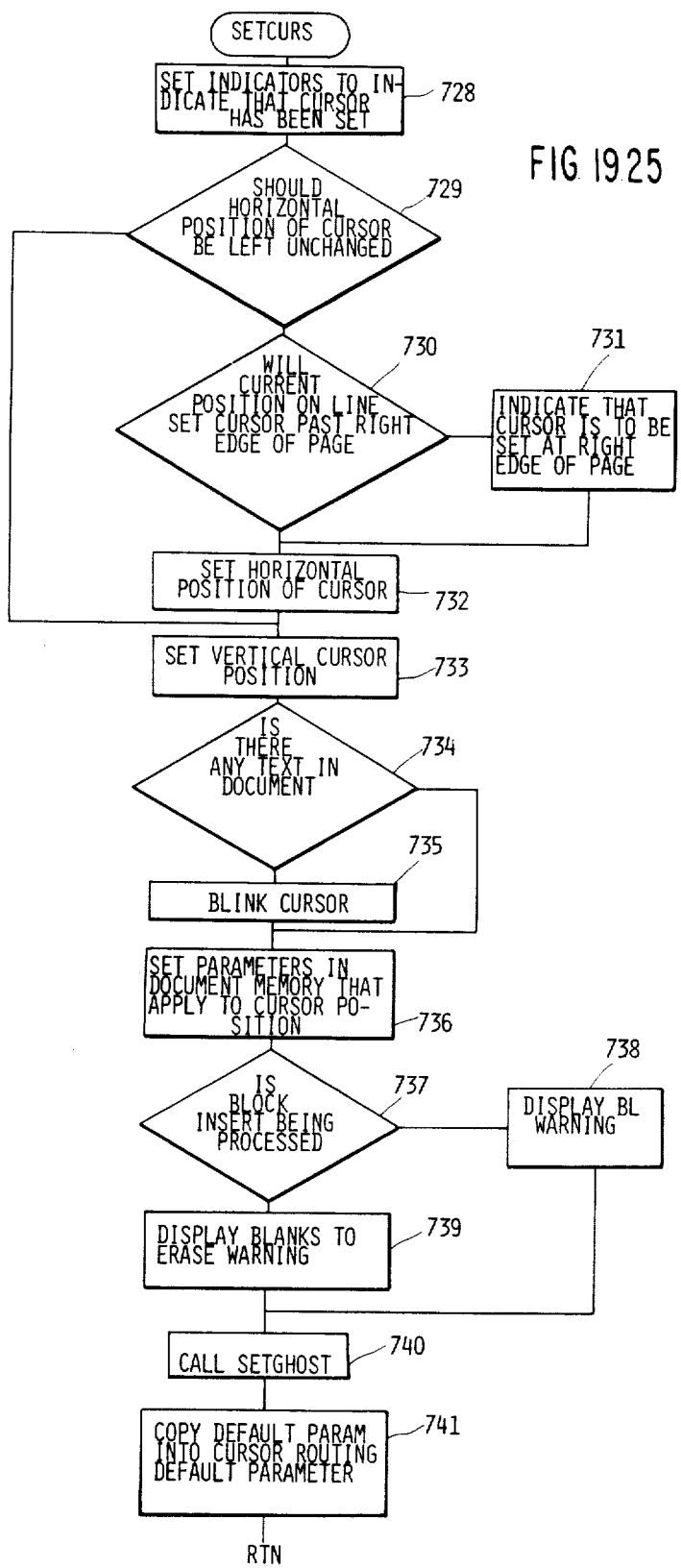

FIG. 19.26
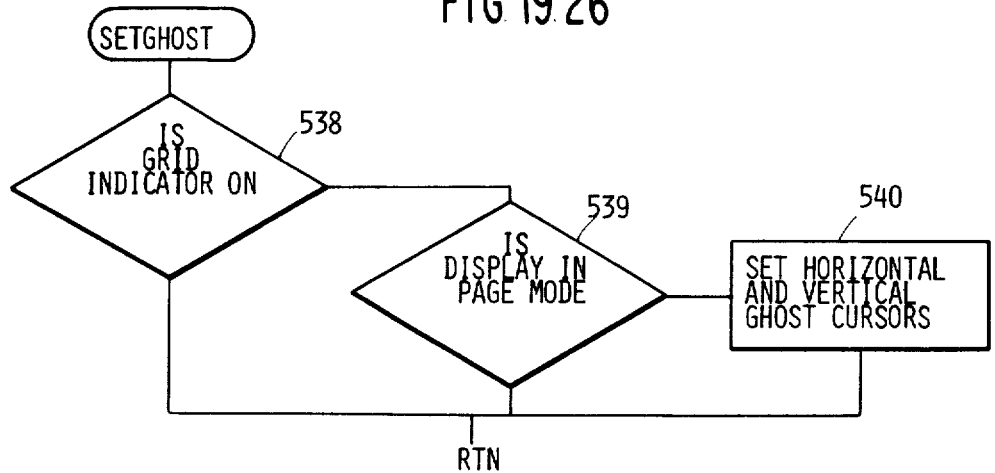
FIG. 19.27
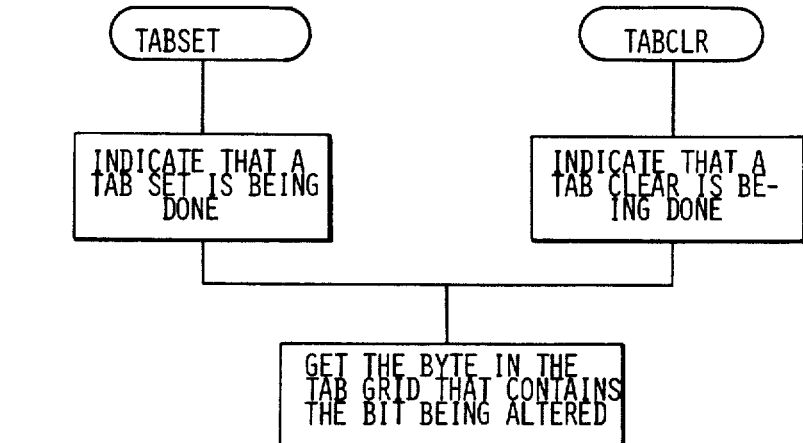

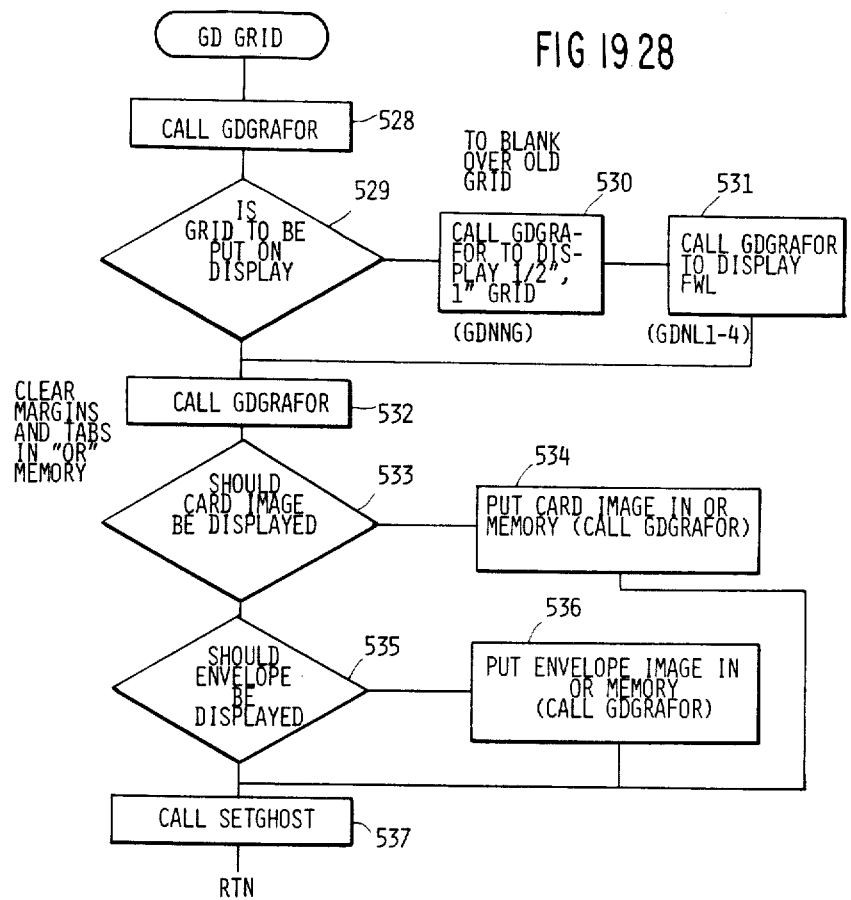
FIG 19.28
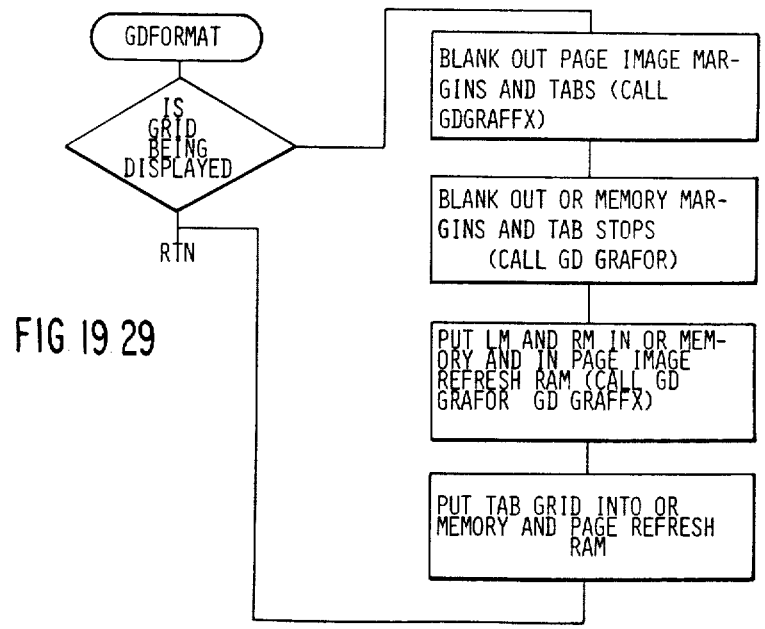
FIG 19.29

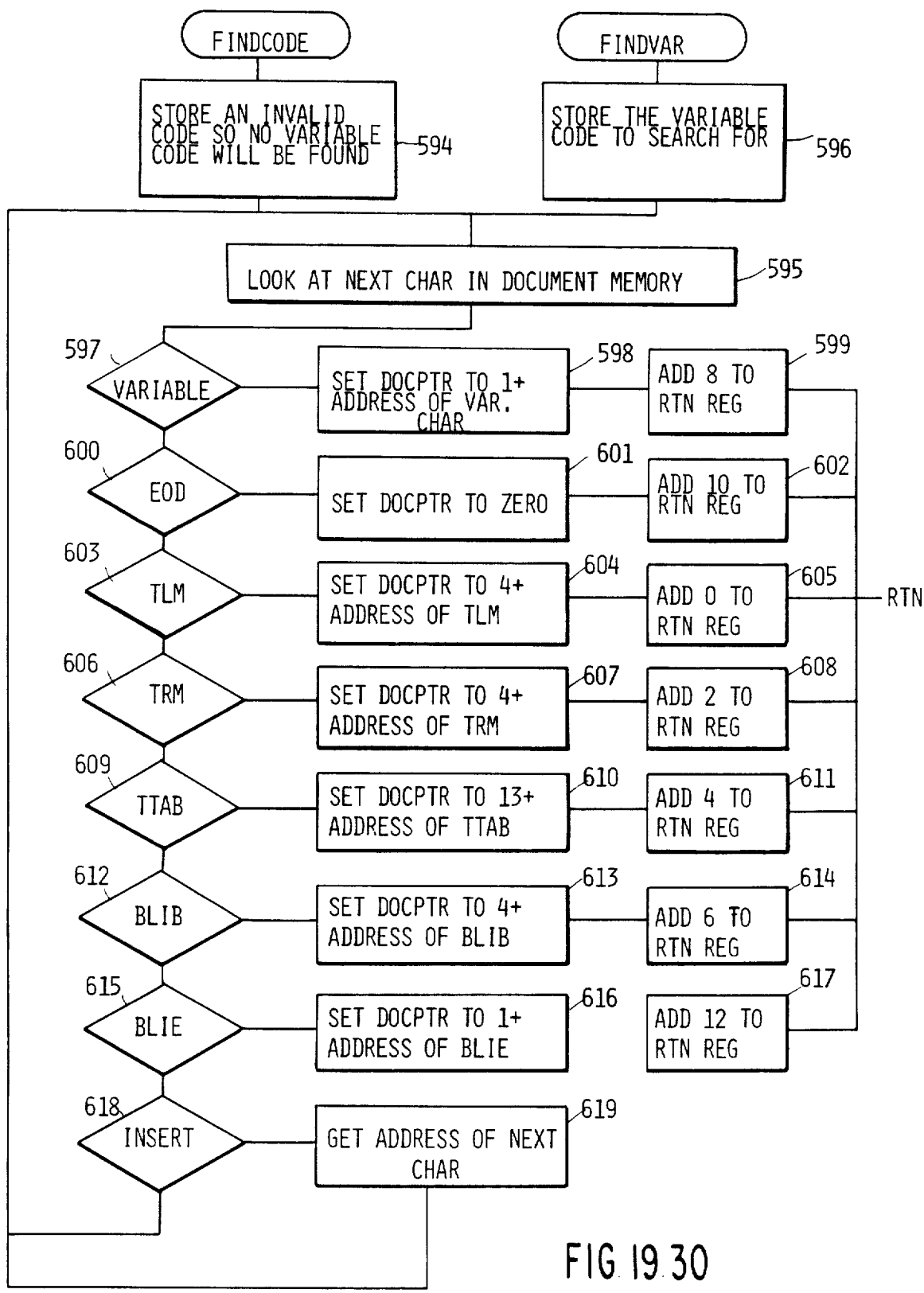
FIG. 19.30

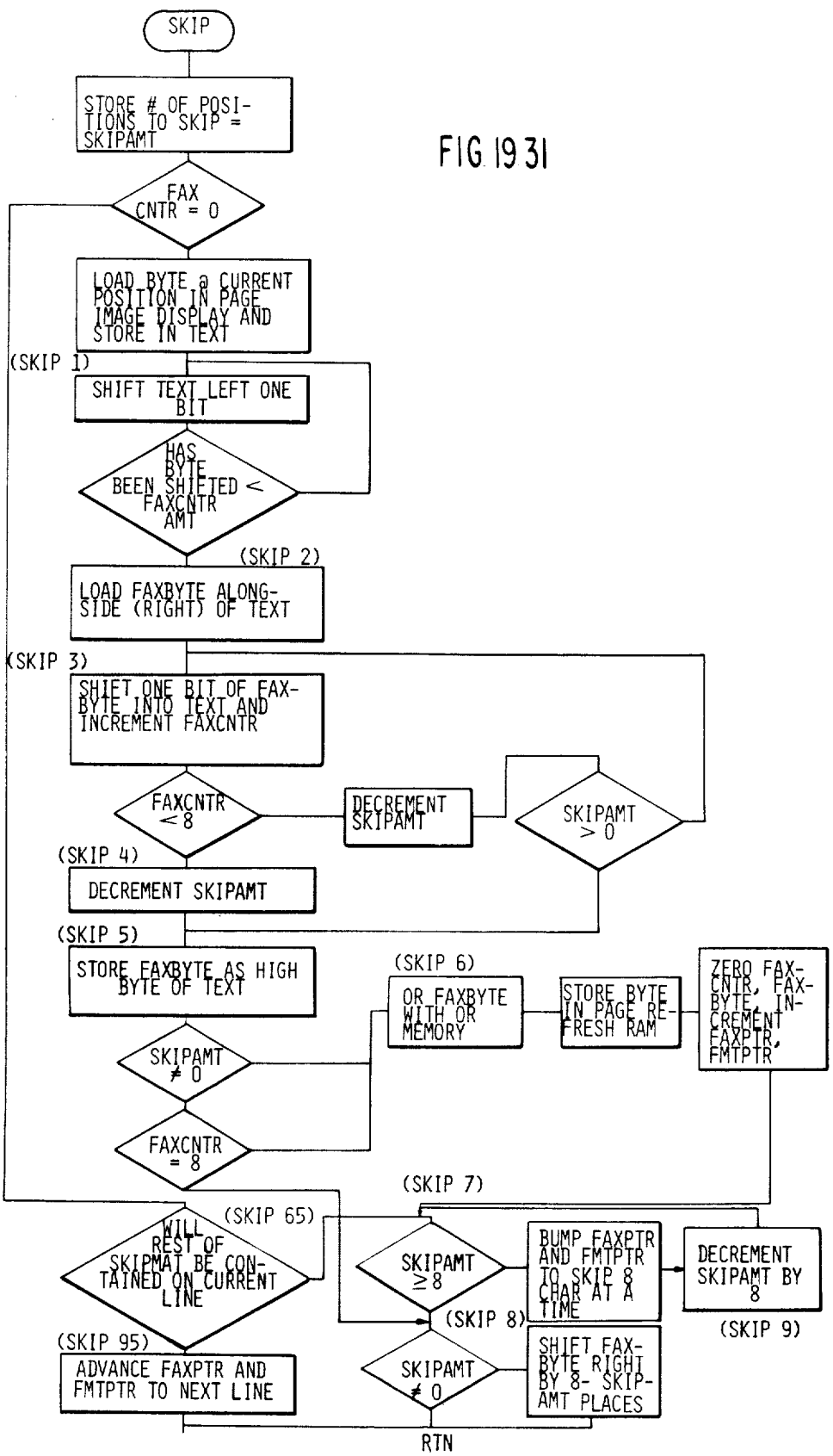
FIG. 19.31

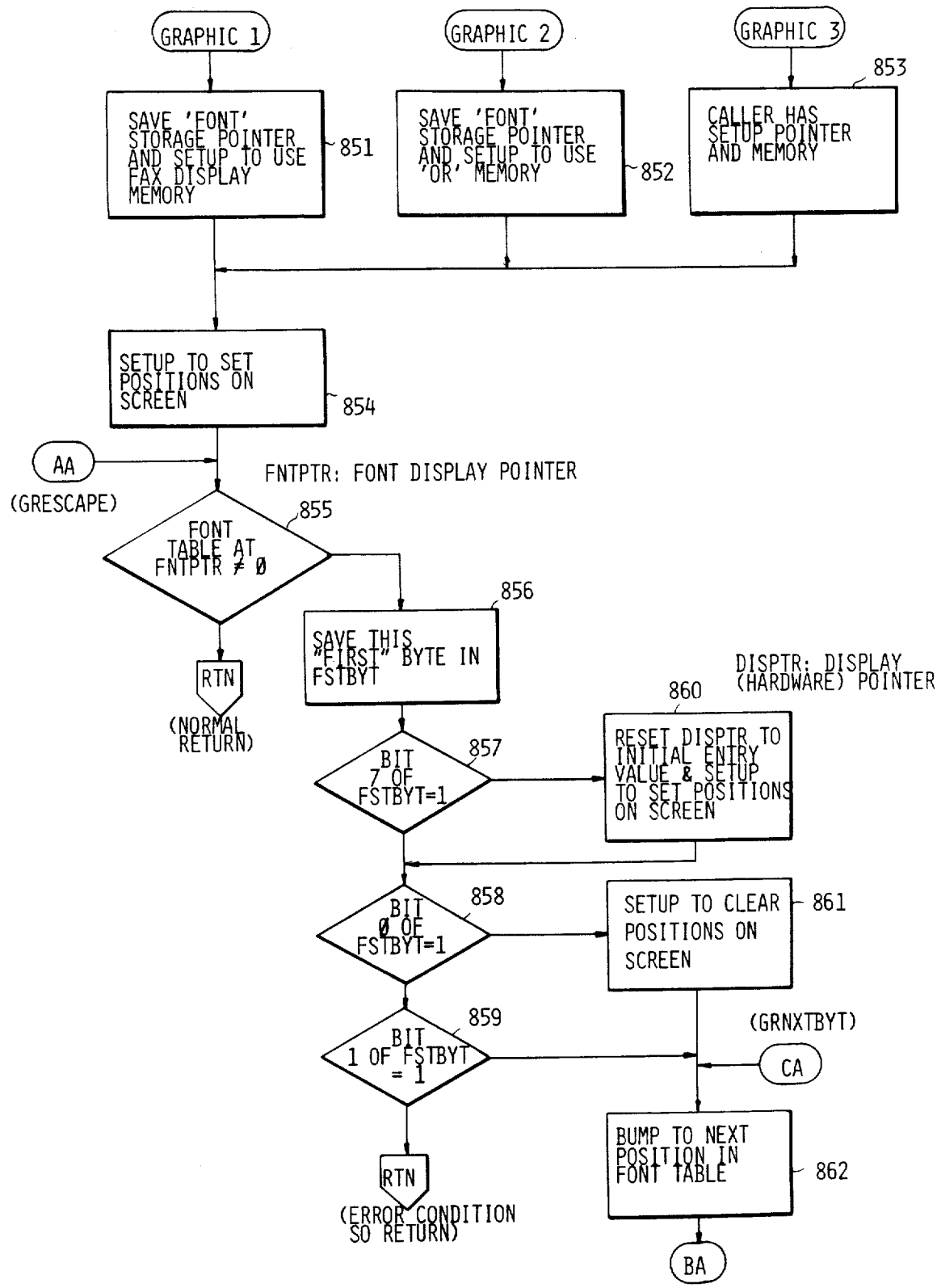

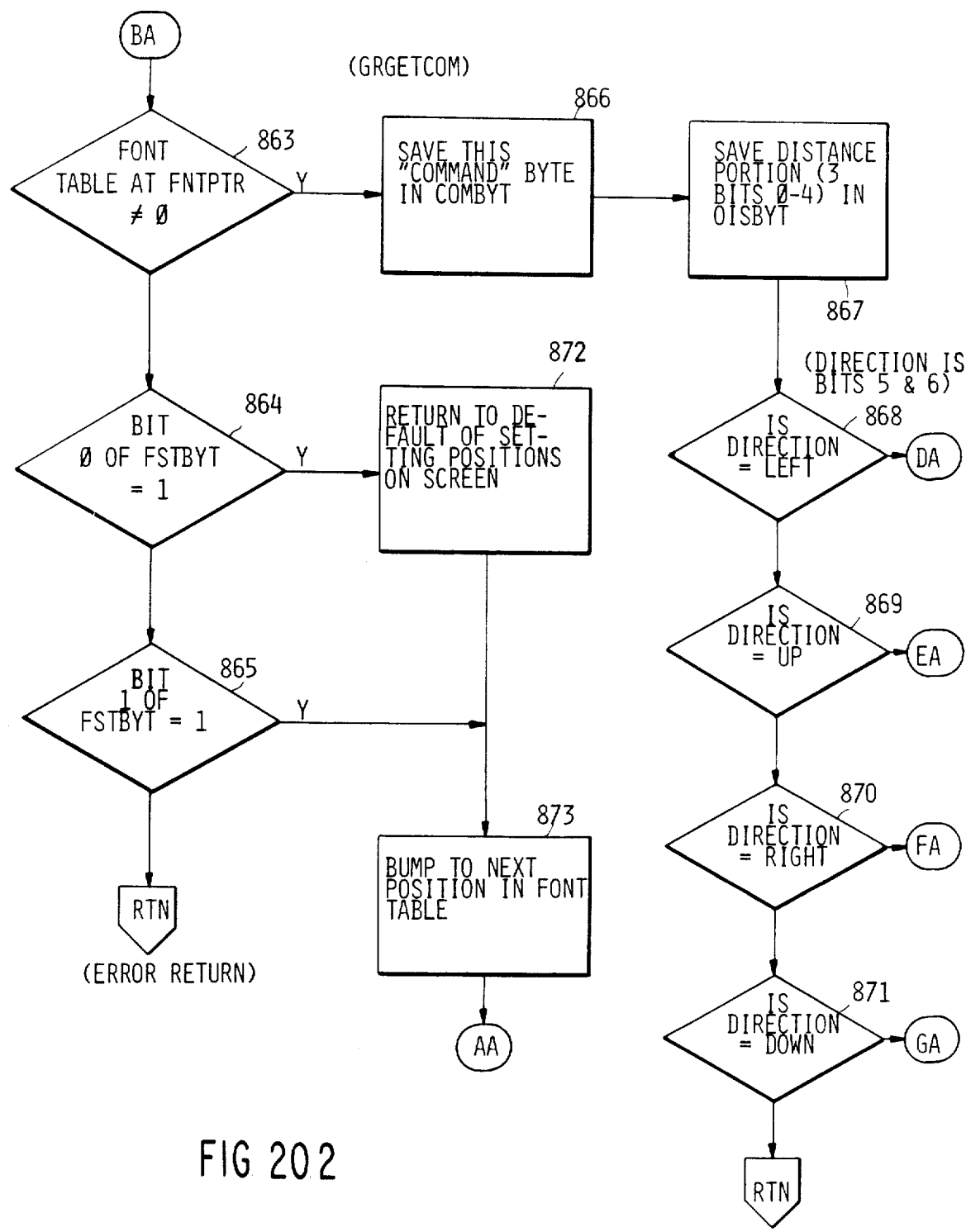
FIG 20.2

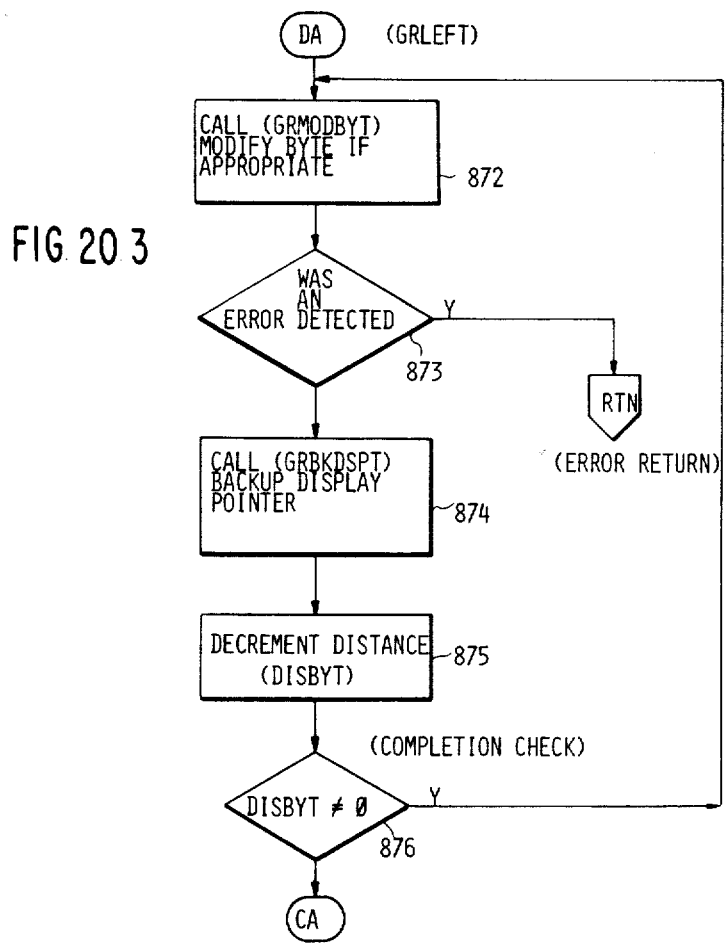
FIG. 20.3
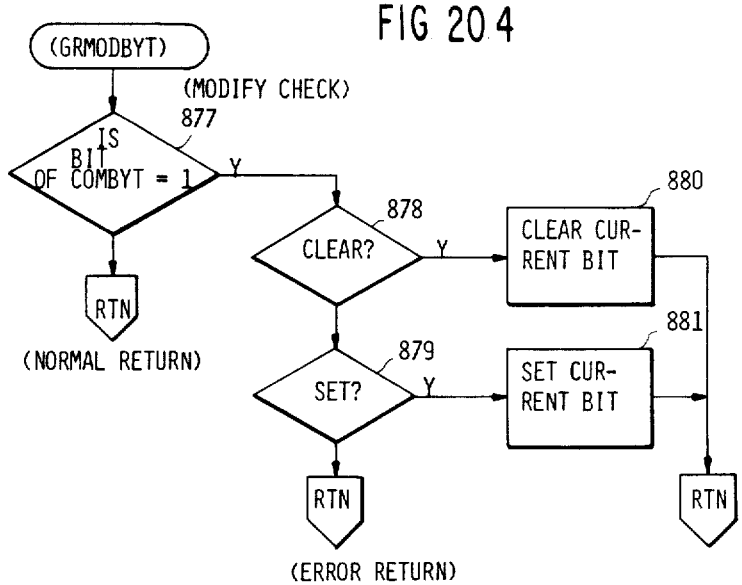
FIG. 20.4

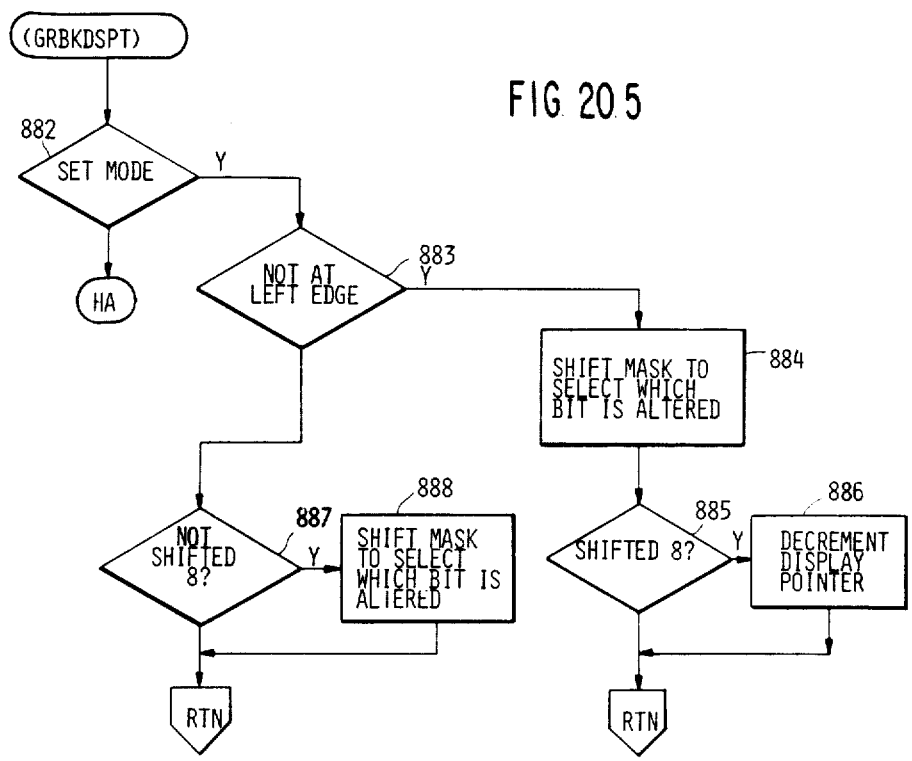
FIG. 20.5
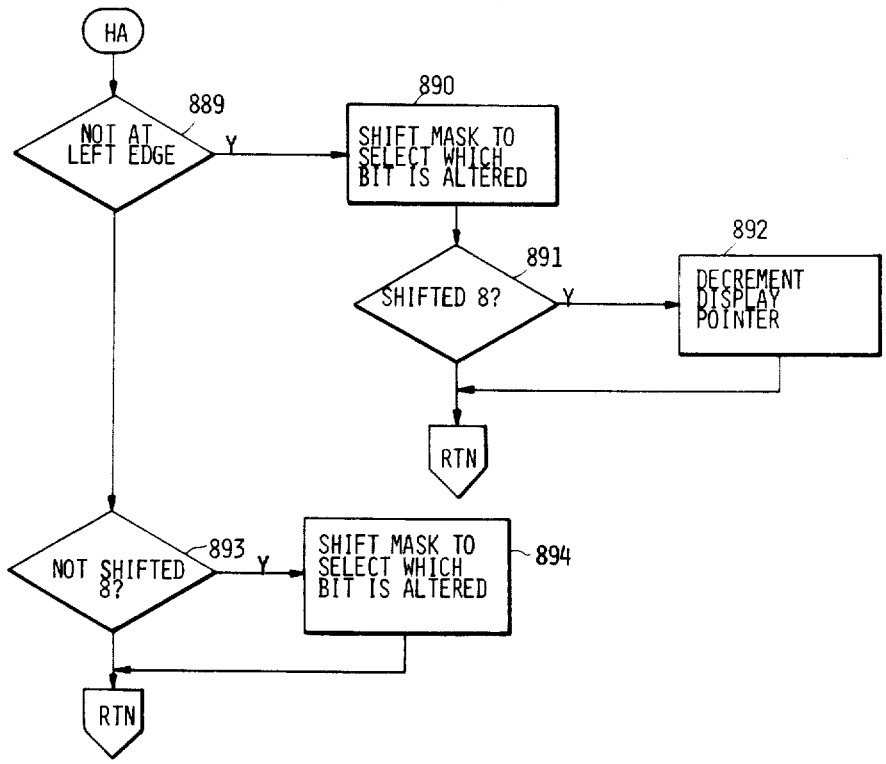
FIG. 20.6

FIG. 20.7
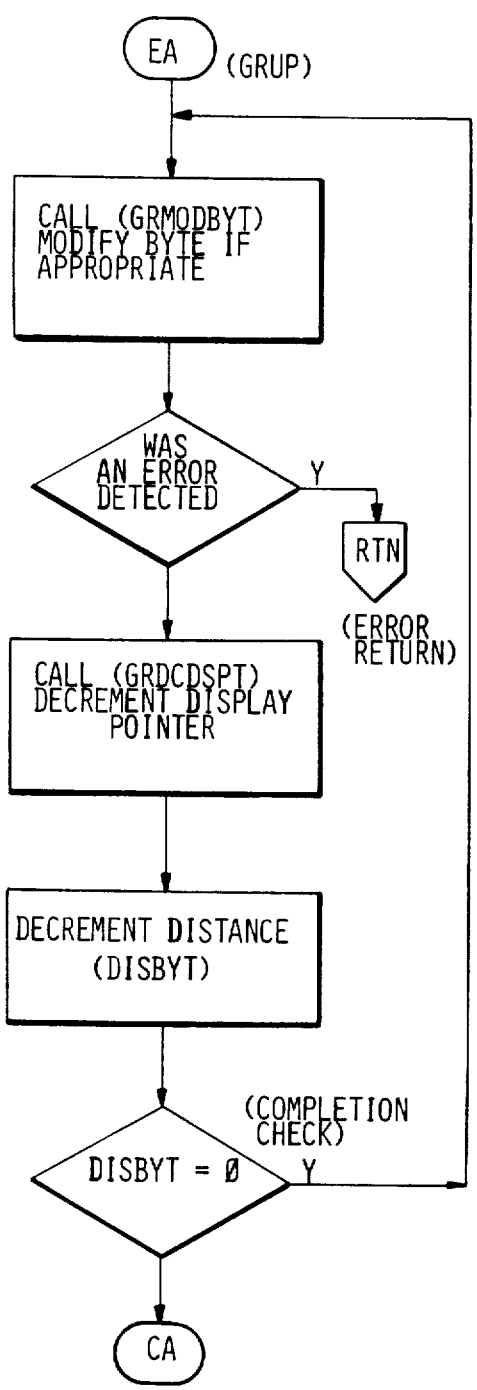
FIG. 20.8
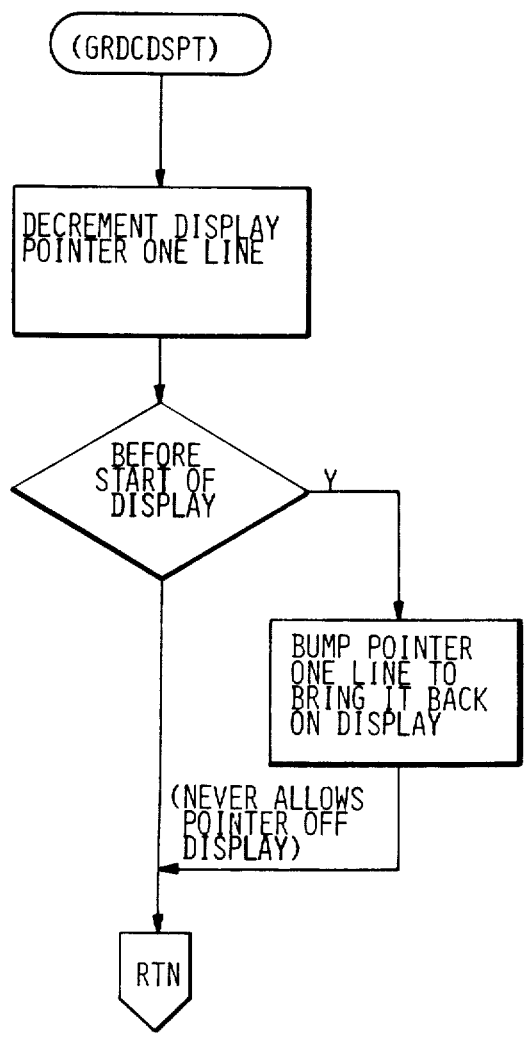

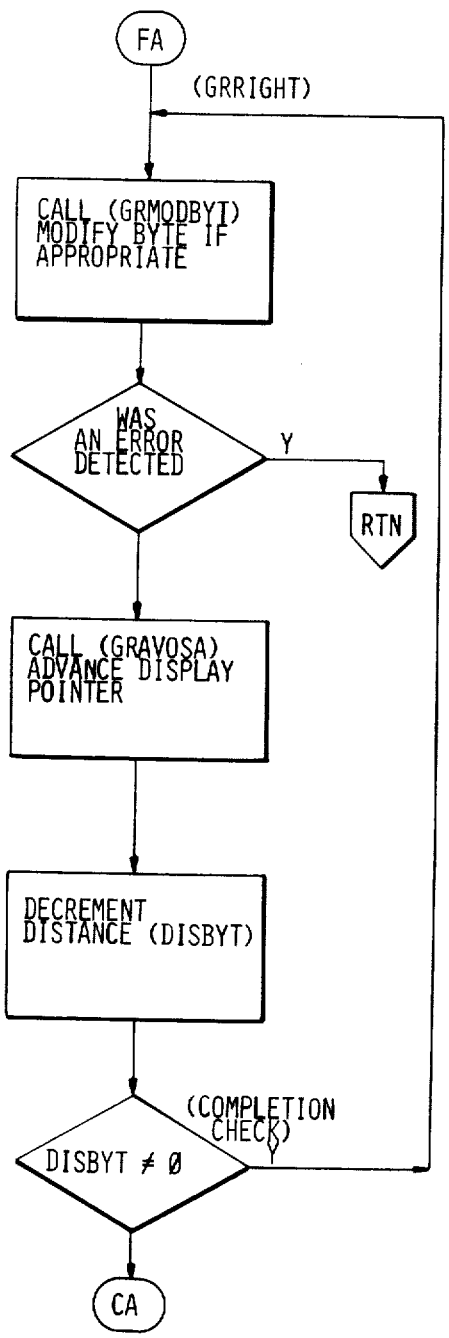
FIG. 20.9
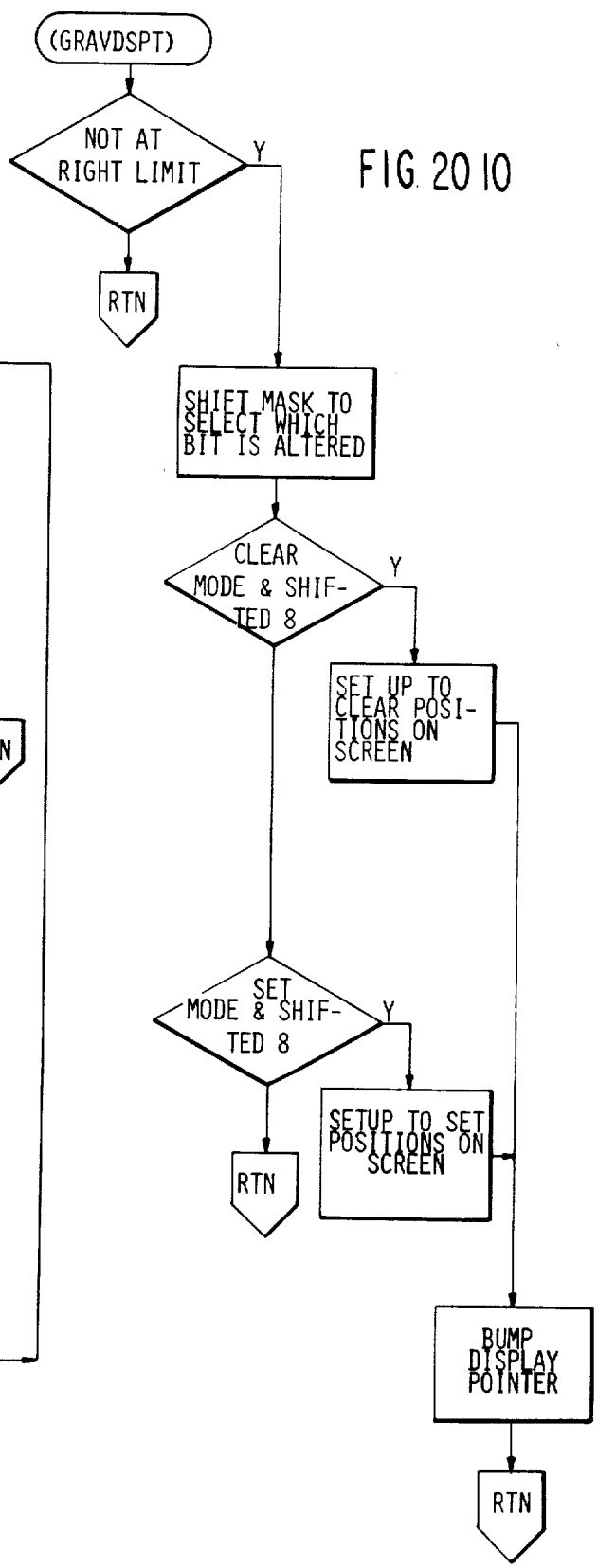
FIG. 20.10

FIG. 20.11
FIG. 20.12
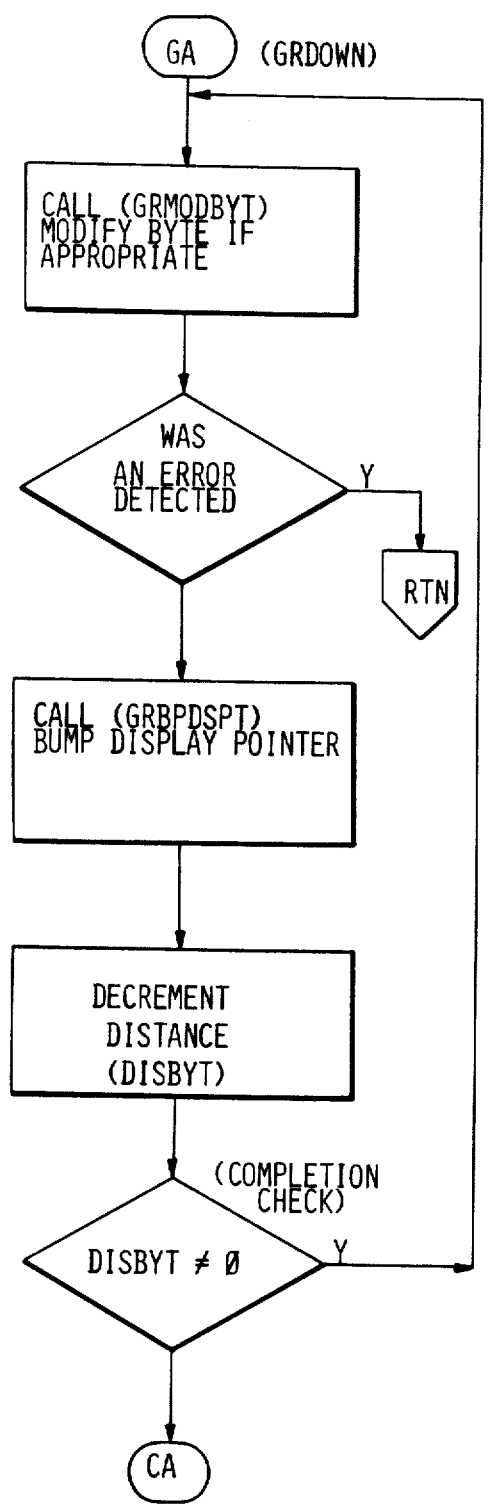
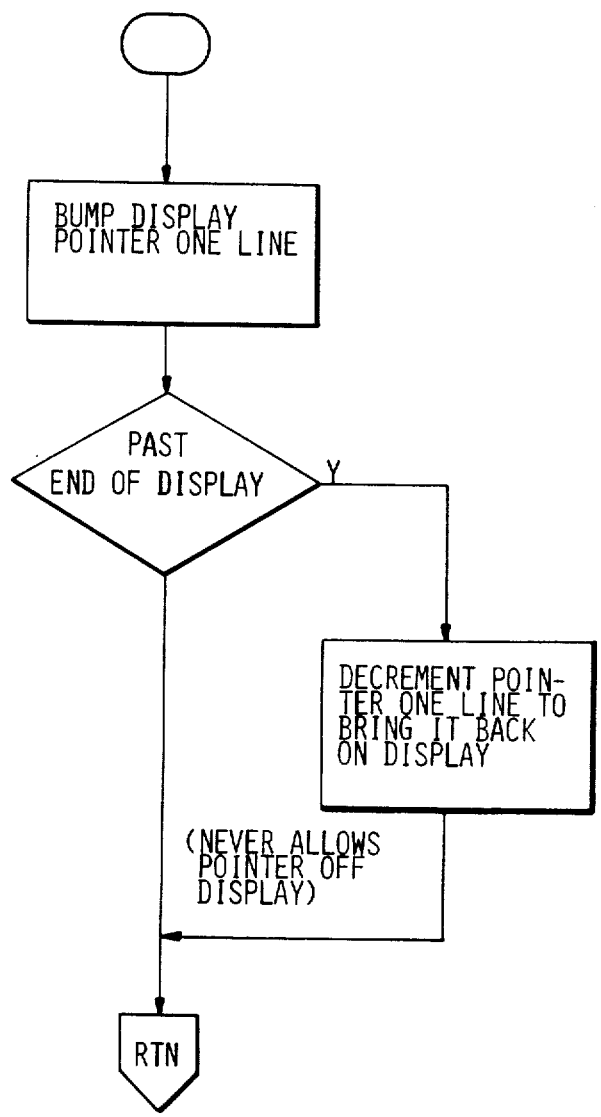

FIG. 21.1

RIGHT MARGIN
understanding

FIG. 21.2

RIGHT MARGIN
understanding ⌐⌐
AVERAGE RIGHT MARGIN

FIG. 21.3 g

RIGHT MARGIN
understandin⌐⌐
AVERAGE RIGHT MARGIN

FIG. 21.4 ing

RIGHT MARGIN
understand⌐⌐
AVERAGE RIGHT MARGIN

WORD PROCESSOR AND DISPLAY

FIELD OF THE INVENTION

The present invention relates to text manipulating devices or word processors arranged to respond to operator selected text and format for ultimately producing documents, but at an intermediate state for producing a visible image to assist the operator in selection and formating decisions especially during editing. The present invention is more particularly directed to those word processors which include displays (such as for example, cathode ray tubes) having the capability of producing a visible image of multiple lines of text, although it should be apparent that the invention can be employed in general purpose digital processors to effect word processing functions.

APPENDIX

Program listings corresponding to the flow charts are attached as an appendix including pages A1-A257.

BACKGROUND OF THE INVENTION

There are, at the present time, a wide variety of commercially available devices within the field of the invention and the capability of these devices is truly remarkable. They can be characterized as including a keyboard with a plurality of keys thereon (similar to a typewrlter). Depression of one or a combination of keys generates a unique coded signal (or keycode) which has the effect of providing a particular graphic or executing a function (such as carrier return, tab, etc.) with corresponding code storage; the keyboard forms one of the two major input capabilities. The other input capability is provided by a device for reading/recording on replaceable media; typically today, that media is magnetic, in the form of a card, tape or disc. Devices within the field of the invention also include some type of printing arrangement for printing with an impact, ink jet or other printer, a document including multiple lines of text in operator selected format; typically the document is the final desired product. Another output capability is provided by the display (usually an electronic display such as a cathode ray tube) which is capable of displaying a visible image made up of multiple lines each with multiple character locations. Responding to the input devices and controlling the output devices, is typically a microcomputer (although mini-computers and even main frame computers can also be used).

Notwithstanding the truly remarkable capability of devices currently available, there is a desire for further improvement. One very important area in which improvement can be obtained is that relating to the electronic display where a number of trade-offs have been made in the past. Some devices have what is termed "full page" display capability in that the electronic display is capable of displaying up to 66 lines of text (which can be considered to constitute an entire page). Since it is the purpose of the electronic display to enable the operator to preview what the printer would produce if it were initiated into action, it was believed essential that the operator be able to distinguish, on the electronic display, all the various characters which the printer is capable of producing. This implies a certain minimal level of visible resolution. This resolution requirement coupled with the capability of displaying up to 66 lines of text, each line including generally 80 to 100 characters or more, dictates size of the electronic display, and this size carries with it cost and space requirements that it is one objective of the invention to improve. Other devices within the field of the invention include electronic displays which are incapable of displaying a so-called full page of text, and typically these electronic displays produce a visible image consisting of from 6 to about 30 lines of text. Obviously, with this reduced requirement, the size of the electronic display can be relaxed without sacrificing resolution. Since, however, this electronic display does not produce an image corresponding to an entire "page" it is impossible for the operator to accurately preview the appearance of an entire page.

The prior art does illustrate prior approaches to the solution of this problem. Fackler et al, in, "Light Emitting Diode Editing Display" *IBM TDB*, Vol. 22 No. 7 December 1979, pp 2614-16 illustrates how two rows of vibrating LED's may be used to display a fully readable single line of text and an associated image of a full page of text displayed at a resolution inadequate for resolution of each character but adequate for format presentation. Other suggestions directed at CRT displays are Bringol,"Abbreviated Character Font Display", *IBM TDB*, Vol. 19 No. 9 February 1977 pp 3248-49; Webb, "Combination of Alphanumeric and Formatting Data on CRT Display" *IBM TDB* Vol. 15. No. 7, page 2136 December 1972 and Lindsay, "Segmented Display" *IBM TDB*, Vol. 14 No. 5 October 1971, pp 1528-29. Bringol illustrates a new font which can give a viewer quick access to a particular portion of a page without actually displaying text. Webb illustrates a CRT display which, in addition to displaying a few (3) lines or line portions of text simultaneously displays format information to locate the displayed line portions. Finally, Lindsey shows how a display of 40-70 characters in length can be used to access various line segments as selected by an operator for editing.

In addition, U.S. Pat. No. 4,168,489 discloses Full Page Mode System for Certain Word Processing Devices which allows a full page of text to be displayed on a 10×5 inch screen which is generally considered too small for displaying a full page of text. This is accomplished by displaying only five of the fourteen dot rows per character vertically and reducing the current to the CRT horizontal deflection circuit by a factor of three by switching an inductor into the deflection circuit. See also Haak U.S. Pat. No. 4,230,974. The assignee of U.S. Pat. No. 4,168,489 announced a video type 1000 which has one mode of display with a 23 line capacity, but has another mode for displaying 66 lines on the same 10x5 inch CRT.

It is thus one object of the present invention to provide a display which is of the size normally associated with less than full page displays, but which is capable of giving the operator an accurate preview of what the printer would produce.

Commercially available electronic displays and components can be arrayed in a spectrum of relatively simple devices having relatively limited resolution, up to more complex, bigger and more expensive devices with increasing resolution. At the lower end of the spectrum is a standard TV set and a standard TV monitor, which is identical to a standard TV set with the radio frequency circuitry eliminated. As is well known to those skilled in the art, characters can be displayed on an ordinary cathode ray tube screen by employing coded signals each character being associated with a different code. A character generator is provided which responds to different codes and generates video signals capable of causing a dot-like image of associated characters to be displayed. Commercially available componentry includes video control integrated circuits for controlling the interaction of such a character generator, and horizontal and vertical synchronizing signals to convert a string of coded signals representing characters into a video signal which, when displayed on a cathode ray tube will portray a visible image comprising a sequence of the characters corresponding to the sequence of coded signals. The commercially available integrated circuits are, however, configured to be compatible with the resolution of standard TV sets, so that the number of characters per line and number of lines per screen is limited to less than the number of character spaces per typical line of text, and less than the number of typical lines per page. It is another object of the present invention to enable the foregoing capability, i.e., that of giving the operator the benefit of a full page preview from an electronic display whose area is inadequate to display a full page of text with adequate resolution, and to achieve this object using commercially available cathode ray tube integrated circuits (chips).

Another area of improvement relates to the insertion and deletion of the underscore symbol. Present technology complicates the insertion or deletion of the underscore symbol especially when the insertion or deletion is to be effected without disturbing pre-existing character symbols. In addition it is desirable to allow insertion or deletion of multiple underscore symbols, relative to pre-existing character symbols with a minimum of operator action.

Present day technology allows the operator to change format of existing text by altering margins relative to page boundaries. However, it is also desirable to allow the operator to alter the relationship of the text to existing page boundaries without altering the format of the text relative to itself.

To assist the operator in editing functions it is common to use a cursor symbol on a display to indicate exactly where in existing text any editing will be accomplished. To vary the editing location to any selected location of pre-existing text the operator has available on the keyboard, cursor positioning controls to allow the operator to move the cursor position to the desired editing location. However, it is sometimes necessary to position the cursor with respect to a rectangular grid as opposed to pre-existing text. It is therefore desirable to allow the operator to readily identify cursor position with respect to such a rectangular grid.

In order to assist the operator in editing functions the display, in one mode, shows both tab and indent tab function locations via unique graphics. Other functions, e.g., carrier returns (CR) temporary left or right margin (TL,TR) are not displayed unless the cursor is positioned to overlie such functions. At that time, the function is displayed via further unique graphics.

In the same mode of display since less than a full page of text is displayed the machine supports scrolling. To maintain contextual reference, however, scrolling (vertically only) breaks screen displays at convenient paragraph or sentence boundaries, if possible.

In some word processors the insertion operation may serve to generate an unusually confusing display. More specifically, the insertion functions must relocate each display element beyond the insert location, one display element space to the right for each display element added to the document. Since the quantity of text to be added is developed time sequentially the serial relocation of many lines of text can be distracting. To avoid this effect, once an insert function is identified, the entire line to the right is opened up (a hole is created) for insertion, by relocating all characters to the right of the insert location, in a single step. Thereafter, as inserted characters are added the "hole" is filled. When completely filled an addiitonal hole is created until the insert is completed.

In one mode (unformatted) of display, the unnecessary word spaces on the display are created for display convenience and have no real existence relative to the document being created or edited. Accordingly, the cursor controls prevent the cursor from being located in any area not occupied by text and/or functions.

In another mode (formatted) of display a novel hyphenation function is supported which shows the operator information respecting not only the hyphenation candidate in its relation to the right margin but also its relation to the average preceding line ending. This allows greater uniformity in line endings without the necessity for justification.

In order to further assist operator formatting decisions, on request the display will indicate the right and left margins and tab grid. Since these parameters may well vary within a document the actual locations identified for these parameters is dependent on cursor location.

Contrary to the unformatted display, in the formatted display non-text filled locations have a real existence and therefore the cursor controls allow the cursor to be positioned within or without the text filled area. Performing an insert function to a document location outside of existing text produces a text matrix having special attributes. For one thing such text matrix (termed a block) can be treated as an entity separate and apart from the document text. It can be moved in a simple fashion relative to other document text or deleted, for example.

To produce the formatted and unformatted displays the processor uses the same basic document but applies different rules in creating the display. The former display is created by observing constraints imposed on the document by margins, indents, tabs, etc. In addition, the specific effect of any of these constraints can be varied under operator control. To achieve the effect of a full page formatted display without the necessary resolution to distinguish each display character, the display provides resolution sufficient to resolve only printable character/graphic filled locations from unfilled locations, i.e., each printable character or graphic is treated and displayed identically. On the other hand, the unformatted display simply extracts a string of text characters or punctuation graphics and strings them along, breaking lines substantially only when display capacity is reached i.e., margin effects are not displayed as such.

Finally, using high rate digital signals in connection with CRT's whose phosphors were not designed for such signals can produce an effect termed "blooming" i.e., the image actually displayed is increased in size as a consequence of the interaction between CRT characteristics and the particular driving signal. By use of appropriate logic to monitor the video signal along with signal shaping the effect of "blooming" can be controlled.

SUMMARY OF THE INVENTION

The invention meets these and other objects of the invention by providing an electronic display for a word processor operating in two different modes; in a first (or text) mode the electronic display is capable of producing a visible image including a number of lines, less than the normal number of lines included on a full page, each line including a number of character locations which are less than typical number of character locations on a line of a page. This mode is employed when the operator is initially keying in and editing text characters, and the display is essentially unformated in that the operator's decisions as to the number of lines per page, the location of the margins on a page, and most other formating decisions do not influence the format of the display. For example, aside from paragraph endings the operator need not key in line endings.

The same electronic display, is, however, capable of operating in a second mode, and in this second mode it is capable of displaying a preview of a full page; however, since the area of the electronic display is incapable of displaying a full page with a resolution required to distinctively identify each character, the display merely indicates whether or not a character is located at each character position. In this second or page mode the display is fully formated in that character filled positions are located between the operator selected margins and on a number of lines per page which is operator selected.

Architecturally the inventive word processor includes a display (for example, the aforementioned cathode ray tube) and apparatus to generate a composite video signal including horizontal and vertical synchronizing signals necessary to properly drive the display. The composite video signal is generated from one of two refresh random access memories (RAM), one for each mode of the display. The output of each of the refresh RAMS is coupled to a tri-state bus which provides an input to one of two character generators, a conventional character generator for the first (or text) mode, which is capable of displaying a number of different graphic characters (including text, puncutation, etc.) used by an operator in making up a document, and the other character generator which may only distinguish filled from unfilled character locations. The foregoing apparatus is capable of operating the display in the two aforementioned modes with the use of a standard CRT chip by appropriately selecting the font for a character filled location in the second mode of display to be less than the space normally occupied by a character, so that the limited capability of the standard CRT control chip is nevertheless capable of designating what appears to the operator to be a number of character locations greater than the control chip was designed for. However, in order to achieve the foregoing functions the processor which responds to key operations provides a document memory into which are stored the unique keycodes generated by the keyboard in response to the actuation of each key or group of keys. When the operator is inputing text for the creation of a document, the computer loads one of the associated refresh RAMs as text characters are keyed in so that the operator continually sees a display of the document being created. This first (text mode) display, however, carries essentially no format information therefore comprising essentially only a text stream to normally fill each line text of the display. Two exceptions are operator keyed carrier return and tab functions (or required carrier return and tab). However, in order to maximize the amount of text included on each display line, in this first or text mode, a tab function is displayed as a sigle unique graphic, regardless of the number of spaces actually associated with the operator keyed tab function and stored in document memory. In addition when reviewing already keyed text, other functions are not displayed unless the cursor, under operator control, is located to coincide with the operator keyed function, at which time a unique graphic which identifies the function at that location is superimposed over the cursor. At any time during the keying of text, or after text keying is completed, the operator can switch to the second (or page image) mode. On such command, the processor loads the ohter refresh RAM so as to control the display in the page image mode. While the time taken by the processor to write either of the refresh RAMS is short, it is percievable, however, once the RAMS are written, the operator can switch from one display mode to the other almost instantaneously. In the second or page image mode, the operator has available a number of formating commands such as readjusting global or temporary margins, moving the initial writing point, adjusting the number of lines per page as well as others which will be described.

The keyboard also has associated with it a number of cursor positioning control keys which can be used by the operator to move the cursor. The cursor can be used, in the second (or page image) mode to indicate the new location of a margin, writing point, last line per page, etc. The cursor can also be employed in the first display mode (text) to indicate the memory position at which some editing function is to be performed. In keeping with the philosophy for the use of the two different display modes, the cursor, in the text mode, is constrained to move only within a pre-existing text field; whereas in the page image mode the cursor can be moved out of a pre-existing text field, although it is constrained to remain within an operator selected page size. When the cursor is moved out of the text field, in the page image mode, the cursor is blinked. Since the page image mode is intended to represent a preview of the printer produced document, the display within the operator selected page area consists only of printable graphics, i.e., functions are not displayed. However, in the page image mode, a split screen display is generated and various prompt commands or mode indicators are displayed external to the outline of the page.

While the keyboard includes function keys for switching from text mode to page image mode or back, the processor will automatically induce a transition in the display mode, if the operator keys a printable character in the page image mode. The text displayed following such a selection of a printable character will be the text in the vicinity of the cursor position, since it is that position at which the operator has selected the addition or insertion of the printable character. In addition to editing (inserting, deleting, etc.) text from previously typed or stored text, the processor is also capable of manipulating text segments (or blocks) which the operator has designated to be inserted outside the pre-existing text. These blocks are inserted, in the page image mode (and hence in the ultimately produced printed document) at the position designated by the operator by positioning the cursor. For text mode display the blocks are shown at the paragraph boundary following the block insertion. Each block has associated with it its own format including margins, tabs, etc. Once inserted, blocks can be manipulated separate and apart from the text, that is, they can be moved relative to the text, or their margins adjusted by simple commands keyed in at the keyboard. At the same time, operator invoked first writing point changes will also affect the associated text blocks in the same fashion as other text is affected.

In accordance with a further feature of the invention underscore operation is simplified in a number of respects. Firstly, one bit of the byte which identifies a character in document memory is dedicated to the underscore graphic. Accordingly, an existing text character can be underscored, or an underscore of such character can be deleted, by simply setting or resetting the dedicated bit. This operation, of course, does not affect adjacent characters or their pre-existing coded representations. Furthermore, the underscore function is enhanced to perform a full word underscore or word underscore deletion. The same operation (setting or resetting the dedicated underscore bit) is merely repeated once for each character in a word, selected by cursor location, when the command is asserted. The word boundaries are determined by spaces, or functions surrounding text graphics.

In accordance with a further feature of the invention, hyphenation function is simplified for the operator. Some prior art word processors are arranged to request a hyphenation decision from the operator when no word ending is located in a "hot zone" in the vicinity of the end of the line. The operator, however, in connection with these prior art devices is required to make the hyphenation decision based only on the relation of the word ending to the right margin. In accordance with the present invention, in addition to this information, the operator is presented with information as to the average location of line endings for an immediately preceding number of lines, and in this fashion, the operator's line ending decision can result in a line ending which is more uniformly aligned with the immediately preceding line endings.

In accordance with another aspect of the invention, the electronic display in the page mode can display an operator selectable page outline from among one or more predetermined page sizes. Margins are specified with respect to the selected page outline, and cursor positioning is also constrained by the selected page outline.

In accordance with another aspect of the invention, the page image mode, in addition to displaying an operator positionable cursor, provides, as an operator option, display of a pair of ghost cursors, each tracking the position of the cursor in one of horizontal and vertical dimensions so that cursor position at any location in an imaginary rectangular grid can be obtained.

In accordance with still a further aspect of the invention, the particular lines included in a text mode display (or screen) are selected in accordance with not only cursor location, but also sentence boundaries so that, if possible, when scrolling forward the beginning of a sentence or paragraph boundary which appeared on the last line of the previous screen appears on the first line of the display.

Finally, while the page image displayed is not normally used for entry or deletion, under certain limited conditions it can be so used. For example certain functions (CR, RCR, TAB, etc.) can be inserted in page image. Those same functions can be deleted in an error correcting backspace operation in page image.

BRIEF DESCRIPTION OF THE DRAWINGS

The invention will now be explained so as to enable those skilled in the art to make and use the same in the following portions of the specification when taken in conjunction with the attached drawings in which like reference characters identify identical apparatus and in which;

FIG. 1 is a block diagram illustrating significant components of the present invention;

FIGS. 3A-3C illustrate a correlation between text and a portion of a page image mode display for an alternate embodiment of the invention;

FIGS. 11A-11D illustrate the page image mode display for the same document with a cursor positioned at four different locations;

FIGS. 11E-11G are three text mode displays required to illustrate, in text mode, the entire document displayed in the page image mode displays of any of FIGS. 11A-11D;

FIGS. 15A-15C provide a detailed flow diagram of the interrupt handler processing;

FIGS. 16.1-16.18 provide a detailed flow diagram for the main system routine in accordance with the present invention;

FIGS. 17.1-17.12 illustrate a detailed flow diagram for text mode processing in accordance with the present invention;

FIGS. 18.1-18.11 illustrate a detailed flow diagram for the cursor related processing in accordance with the present invention;

FIGS. 19.1-19.31 illustrate a detailed flow diagram for the page image mode processing in accordance with the present invention;

FIGS. 20.1-20.12 provide a detailed flow diagram of the graphics processing in accordance with the present invention; and FIGS. 21.1-21.4 illustrate typical hyphenate function displays in accordance with the present invention.

DETAILED DESCRIPTION OF PREFERRED EMBODIMENTS

Figure 2:
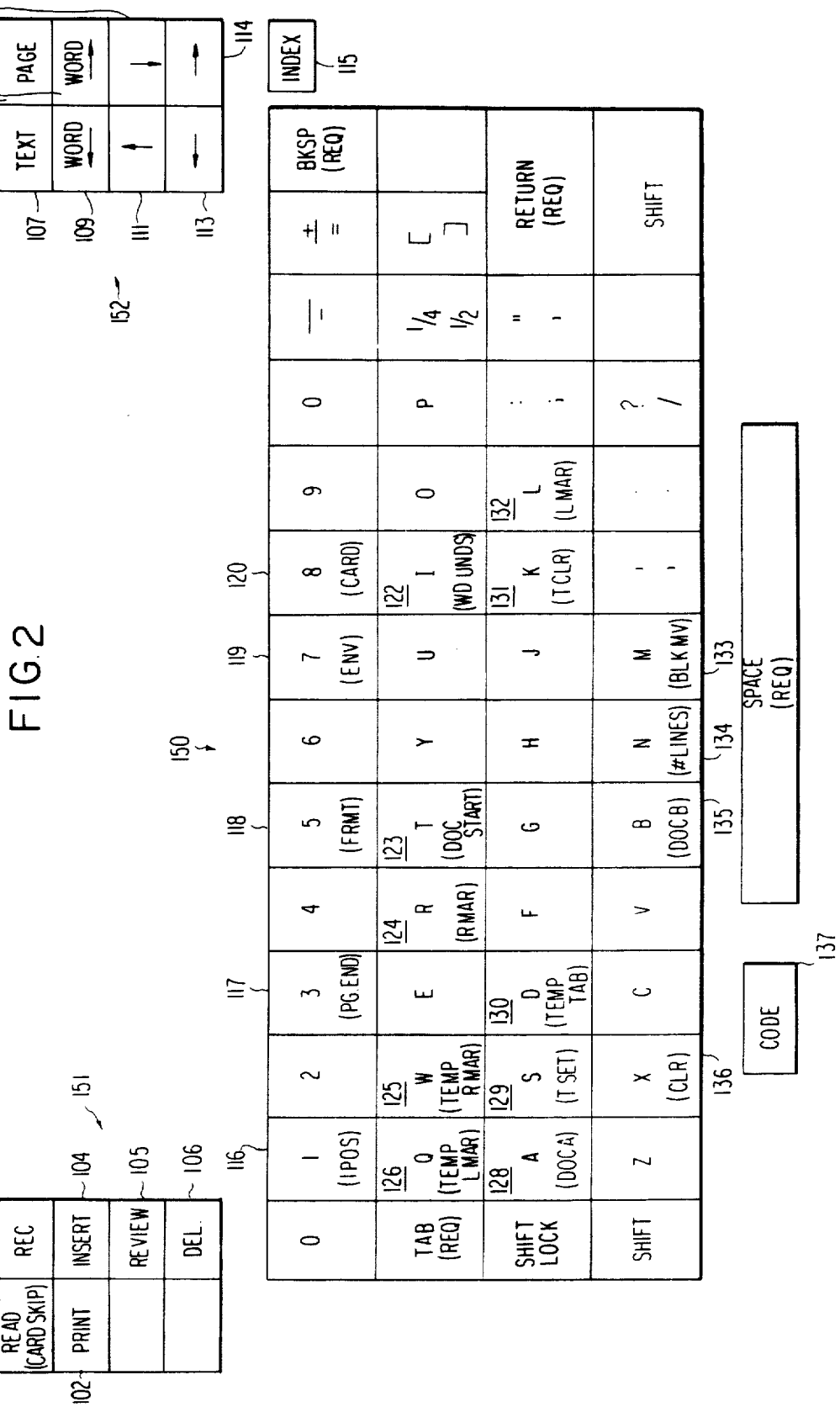
FIG. 2 is an illustration of the typical keyboard which forms one of the input devices for use with and a component of the present invention.

The basic objective of the invention is to provide the operator with an instrument which is natural and easy to use without, at the same time, sacrificing a great deal in terms of equipment complexity or cost. To this end, the system of the invention includes at least a keyboarding entry unit, a processor or processor like device for responding to the input information and manipulating that information so that it can be employed by the remaining system components, a printer which is arranged to print the completed document when it has achieved the form desired by the operator, replaceable media memory to allow the document to be stored, and later recalled and edited or printed without requiring re-key boarding of the information which had been previously keyboarded, and a display unit to assist the operator in entry, editing and formatting functions.

Preferably, the display unit is a cathode ray tube, and features of the invention impose minimal burden on the CRT so that a relatively inexpensive cathode ray tube even down to and including a conventional TV set or monitor can be used as the display. Associated with the display, to enable it to be used effectively, is additional hardware providing at least for refresh memory and associated logic and control hardware for use of the display in either of its two modes.

In a first or text mode, typically used when the operator is keyboarding text, the display is unformatted in that the operator's previous selections as to margins (either permanent or temporary, tabs, page length) and the like play no part in the form of the display viewed by the operator. The display consists of a series of lines of text starting with the first line keyboarded by the operator, line length being dependent almost solely on the amount of text that can be accomodated in a horizontal text line on a display. The operator need not key in carrier returns and thus, initial keyboarding is essentially unformatted. The only format decisions which are reflected on the display are operator entered carrier returns (for example, such as those used at the end of a paragraph) and required (indent) tabs (for example, at the beginning of a paragraph). The former format decision is exhibited on the display typically by prematurely terminating a line, the latter format decision is illustrated on the display by the use of a single unique symbol, (regardless of the actual length of the desired indent tab which the printer will ultimately produce).

On succeeding lines an indent will occur on the display aligning the text to the right of the rightmost previous required tab. This indenting is terminated by a required carrier return. Some functions are displayed by unique graphics when the cursor is at their location.

At any time during the initial keyboarding the operator can preview what the keyboarded text would look like if printed, by switching the display to the page image mode with the use of controls readily accessible on the keyboard.

In the page image mode the same display is capable of allowing a preview of an entire page of text (for example, up to 78 lines of text). Resolution limits imposed by the size of the display screen force a change in character font, so that any character or punctuation graphic regardless of its identity is displayed in identical fashion. Accordingly, it will be impossible for the operator to read the page previewed on the display in the page image mode, but on the other hand, the format of that page, i.e., text filled versus empty locations will be readily apparent.

Readily accessible controls on the keyboard allow the operator to change the format of this page or the entire document by altering left or right margins (permanent) or imposing or altering temporary left or right margins. Likeimposing wise, the length of the page (the number of lines of text) can be increased or decreased (up to the limit of 78 lines displayable on the screen). In addition, the first writing point on a page can be altered; selected portions of the text can be moved with respect to other portions of the text or the tab grid can be altered. And in response to any or all of these format changes, the display will, substantially immediately provide the operator with a preview of a page that would be printed under the newly imposed format.

To assist in formatting commands in the page image mode, a cursor (the intensity of which is greater than text) is provided whose position is controlled by control keys on the keyboard. Various format commands are interpreted in connection with cursor position, so that for example, if the operator desires to move the left margin, the cursor is first positioned horizontally at the appropriate location for the desired left margin, and then the left margin command is asserted. To further assist in format changes the operator may superimpose a grid on the page showing the right margin, left margin, tab points, first writing line and last writing line. Each of these functions is controlled from the keyboard either on a document, temporary or page end basis. When the cursor is positioned at a location which is occupied by text, it is on continuously, however, when it is moved to a location outside of the text filled area, it will blink, and if the operator performs an insert concurrent with a blinking cursor, a block insert is provided which automatically assumes independent formatting for the block (temporary margins, tab points, etc.) based on the starting point of the insertion. The text forming the block is inserted in a special location in document memory and is movable as a unit in the page image mode with respect to text not in the block.

In the page image mode, the previewed page does not occupy the entire area of the screen, rather a split screen effect can be implemented with the right hand portion of the display utilized for prompting messages and the like.

In the page image mode the page being previewed is illustrated along with an outline of a page size, and while a default page size is the typical $8.5 \times 11''$, other and special page sizes can be employed and will be appropriately shown on the display.

While the text mode is the normal mode used for input operations, it is also normal mode used for editing functions. To assist the operator, the text mode also provides a cursor, which is movable under operator control However, in contrast with the page image mode, in the text mode, the cursor cannot be positioned outside of a text filled area. When the cursor position corresponds to that of a function (which is normally not shown) a unique graphic will be shown to identify the function existing at that location so that the function may be deleted, for example. If the operator desires to insert text whether it be character, word or longer, an insert command is asserted; responsive to the insert command, the line of text to the right of the cursor is moved to the next line, leaving the remaining portion of the line on which the cursor exists, available for insertions. If the operator's insertions exceed that capacity, a new blank line is displayed for additional insertions, and so on until the operator again asserts the insert command which has the effect of removing the system from the insert mode and deleting any unused insert blank spaces.

In the text mode, in addition to displaying text keyed in by the operator, the first line of the display is employed for mode and prompting indicators.

As the operator keys in text, either during normal input operation, or in the insert mode, automatic pagination is effected.

Another powerful revision feature implemented in accordance with the invention is the information presented to the operator at the time a hyphenation decision is required. Typically, a hyphenate decision will be encountered in the page mode, after the operator has specified left and right margins. As is conventional, the last five or six character spaces on a line are considered a "hot zone" so that if a word ending does not fall in the "hot zone", a hyphenate decision is required. Under these circumstances the display will automatically switch out of the page display mode to a hyphenate mode in which the entire word requiring a hyphenation decision will be displayed, and in addition the operator's selected right margin will be displayed via a graphic character such as an arrow, a further graphic character or second arrow will indicate the actual average line ending for a previous predetermined number of lines on the page. The operator then merely positions the cursor at the location at which the hyphen is desired (and the cursor is constrained to move only within the word) whereafter asserting a special command will both return the display to the page mode and record the operator's hyphenate decision.

Reference is now made to FIG. 1 which is a block diagram illustrating important characteristics of the invention particularly related to the display features. As is shown in FIG. 1 the inventive system includes an input unit, the keyboard 10, for a processor 20. In an embodiment of the invention which has been constructed, the processor 20 is implemented via the IBM OPD minicomputer which is more completely described in U.S. Pat. No. 4,170,414; those skilled in the art will understand, of course, that the use of this particular processor is not at all a feature of the invention. As is shown in FIG. 1, the processor also is arranged to control a printer and a replaceable media recorder (such as magnetic tape, card or disc); these devices are not further shown or described in this application since, while they provide important capabilities to the overall word processing system they are, in and of themselves conventional, as is their association with the processor 20.

FIG. 1 also illustrates data and address bus 21 and 22 respectively of the processor 20. Data bus 21 is buffered and coupled to internal bus 31, which in turn, is coupled both to a text refresh random access memory (hereinafter text RAM 25) and a page display refresh random access memory (hereinafter page RAM 26) as well as the CRT controller 27. Outputs of the text RAM 25 or page RAM 26 along with the CRT controller 27 are input to the character generator 28 or psuedo character generator 29 to drive logic 30 to effect drive of CRT 32. As the operator keys in text, or as text is read from replaceable media, it is used to fill the "document memory", which is actually random access memory internally available to the processor 20. In an embodiment of the invention which has actually been constructed, the document memory consisted of a memory capable of storing up to two documents, so that, for example, while one was being printed, the operator could work with the other; hereinafter when we refer to the "document memory", we will be referring to the active document memory. The document memory contains information indicating the text characters keyed in by the operator and the order in which they were keyed in along with the typewriter functions normally associated with such text, along with functions to be defined hereinafter. The document being created is also partially defined by one or more tables which are also created by the processor 20 in the course of text entry. Thus, the document itself is defined partially by the contents of the referred to tables. It should be noted that this form of document memory distinguishes from the many prior art word processors in which a document memory maps to the final printed document. In any event, in addition to responding and storing the codes generated by the keyboard in the course of operation, the processor 20 also writes the text RAM 25 since it is from the text RAM 25 that the CRT 32 is driven. In an embodiment of the invention which has been constructed text RAM 25 was arranged to allow the display of 14 lines of 52 characters per line; and without significantly altering parameters it is believed that this capacity can be increased, for example, to 16 lines each of 64 characters since text RAM had 1024 byte capacity, 7 bits of each byte defining the font and the eighth bit used for undercore. In order to generate the text mode display on the CRT 32, the CRT controller 27 repeatedly addresses the text RAM 25 so its contents are placed on the internal display bus 31 which, as is illustrated in FIG. 1 is coupled to a character generator 28 and a psuedo character generator 29, the reason for which will become clear hereinafter. However, the combination of text RAM 25, bus 31 and character generator 28 operate in an entirely conventional manner. For example, a series of 8 bit character defining codes from the text RAM 25, defining a line of text, are provided repeatedly to character generator 28 to result in a series of binary signals which are used to intensity modulate the CRT 32 and provide thereon a display consisting of the line of text. Thus, for example the character generator 28 may include a typical read only storage character generator. As is shown in FIG. 1 the serial output string from the character generator 28 passed through logic circuit 30 before presentation to the CRT 32; the function of this logic circuit 30 will become apparent as this description proceeds, at this point suffice it to note that signals are added in the logic circuit 30 to denote the cursor position, for example, and in some embodiments of the invention to control the Z axis modulation for image enhancement purposes especially when the invention is used with a CRT 32 which is not particularly designed for text display.

Those skilled in the art will recognize, in the CRT controller 27 a conventional device, which, in response to clocking signals, provides addressing signals to the text RAM 25 so as to read it out to provide the appropriate input to the character generator 28 properly coordinated with CRT deflection. The CRT controller 27 is programmable via the processor 20, within limits to provide a selected number of characters per row and rows per screen. Among the various parameters of the CRT chip which are selectable, scans/data row, characters/data row and data rows/frame are the most significant. The software, in one embodiment, sets the parameters as shown below:

| Parameter | Text | Page Image (FAX) |
|---|---|---|
| Scans/data row | 15 | 3 |
| Characters/data row | 64 | 132 |
| Data rows/frame | 16 | 64 |

The term scan refers to a single sweep and data row, corresponds to a line, such as a line of text. Therefore, 15 scans/data row allows each character to include 15 pixels, vertically. Likewise 16 data rows/frame allows 16 lines of text to be displayed. In practice, several character positions (horizontally) and data rows or lines (vertically) are not used. In addition, two lines of those available in text mode are used in the message line, leaving 12 lines of text. In page image, of the 132 positions available only 85 character positions are used for display of a page and its contents, the remainder (less positions not used) are dedicated to various prompts and messages.

In the text mode the CRT chip 27 is capable of addressing the required number of characters. As will be described the page image RAM 26 cooperates with the CRT controller 27 in exactly the same fashion. That is, the CRT controller reads the RAM 26 to supply, on the bus 31 a byte stream representing the desired image, which is seralized and used to control the CRT. While FIG. 1 shows the RAM's 25 and 26 as separate from each other that separation is only functional as there is no reason why they cannot be located on the same partitioned chip. In addition, since the RAMs are used alternately they can in fact be implemented by a single RAM of capacity sufficient, at any one time, to perform the function of either text RAM 25 or page RAM 26. Furthermore, there is no fundamental reason why this RAM capacity cannot be integrated with the processor's internal RAM so long as either a DMA operation is used for refresh or some time multiplexing is used so both the processor 20 and CRT 32 can both use the same memory chip. In the embodiment we built the page RAM 26 also had 1024 byte capacity, however, each bit represented a character, so it was capable of storing 128 characters per row for 64 rows per screen. Of these we used 85 characters per row for our page image, the rest, 43 characters per row was available in out split screen for prompts, etc.

While this, and other available CRT control chips are programmable in that they are capable of varying the number of characters per row and the number of rows per screen, they do typically have limits which makes it impossible to display a full page. That is, for example, up to 156 characters per row and 78 rows per page or screen. Of course, RAM 26 would have to be extended (beyond 1024 bytes) to store an 156×78 character screen or page. In order to provide the desired display we must somehow provide a translation between the text characters (for example, the alphanumerics that the operator desires to appear on the printed page or the display) and the display characters, since the CRT control chip is incapable of providing a one-to-one correspondence between display characters and text characters. Accordingly, in one embodiment of the invention we group text characters into a two-by-two array, and define that two-by-two array of text characters as a single display character identified by a single byte. Now our limits of 156 characters per row is reduced to 78 display characters per row, well within the capability of the control chip, and the requirement of 78 rows per screen is reduced to 39 rows per screen, also well within the capability of these conventional chips. While we have suggested a 2×2 array it is of course possible to employ other, larger arrays, for example 3×2 or 2×3 with existing 8 bit bytes. While there is no theoretical reason why even larger arrays could not be used, 3×3 or larger arrays would require 9 bits or more to distinguish the various combinations of filled and unfilled locations.

FIG. 3A illustrates an exemplary two-by-two array of text characters containing, respectively, upper case e, space, lower case g and period; FIGS. 3B and 3C illustrate, respectively, 10 pitch and 12 pitch displays corresponding thereto. It will be noticed that any character location, regardless of character identity, is displayed as a pel array which is 3 high by 3 or 4 wide within which is a two-by-two pel array which is turned on if any character or punctuation is present and is off if the location is empty. To implement this, the page RAM 26 stores bytes which are significantly different from that stored by the text RAM 25. The text RAM 25 stores, as is well known to those skilled in the art, an 8 bit byte for each character (or space), which is translated by the character generator 28 into a sequence of binary signals for use by the display. On the other hand, the page RAM 26 stores an 8 bit byte for each two-by-two array of text characters, corresponding to a single display character. Since there are 15 different combinations in which the two-by-two array can be filled or unfilled, 4 bits will suffice to define the particular array configuration. The remaining 3 or 4 bits can be used for other functions, such as defining cursor placement with regard to any one of the four different text characters represented by this display character. Of course, it is necessary for the processor 20 to write the appropriate signals to the page RAM 26, and the manner in which that is effected will be described. From the preceding, it should be apparent that the pseudo character generator 29 then has the function of interpreting the 4 bits defining the particular stored display character and serializing the resulting binary signals so that the appropriate display is produced, for example, that shown in FIG. 3B or 3C.

The preceding description of a display scheme is not that actually employed in an embodiment of the invention actually constructed. In that embodiment the CRT controller 27 was a CRT video timer-controller (VTAC) designated CRT 5027 and available from SMC Micro Systems Corp., Hauppauge, N.Y. This particular chip is capable of displaying up to 132 characters per row, but if 132 characters per row are chosen, then it will only provide addressing for 32 rows. Otherwise, (for 96 characters per row, or less) it will address 64 rows per screen. In the embodiment we contructed we selected 132 characters per row and used the most significant row address bit DR4 and divided it by 2 in a flip-flop, to generate an equivalent to the unavailable DR5 which we called DR6. This gave us the ability to address 64 rows per screen and addressing for 132 characters per row.

It is also possible to go beyond the 132 character/row and 64 rows/screen with this particular chip as follows. Either parameter is established by the chip's addressing outputs, used to read RAM 26. That is, the chip will read or output 132 different addresses between horizontal flyback, and likewise address 64*132 addresses between vertical retraces. To increase these parameters we take the least significant bit of an address and multiply its rate. Thus, take H0-H7 where H0 is the least significant bit and halve the pulse width with a faster clock, giving an externally generated H(−1) to indicate the externally generated bit is less significant than the internally generated H0. So, instead of eight address bits per row (limited to a maximum count of 132) we now have nine bits which are limited to 264. With this new address set we can address up to 264 characters per row, or any lesser number with any one of a variety of decoding schemes. Further, we can, as we do, split the page image screen and put 85 characters per row in about 50% of the screen width. By using the same technique we can increase the row count, per screen, above 64.

Before describing the apparatus in detail, reference is made to FIG. 2, which illustrates the keyboard 10, as it appears to the operator. The keyboard 10 is, in many respects similar to conventional word processors in that it includes a first field of keys 150 which include typical typewriter alphanumeric symbols and functions. In order to further widen the number of unique key codes available from the keyboard 150, a code key 137 is provided which is used, in connection with the simultaneous depression of another key within the field 150. The combination provides a key code which is different from that which is obtained when only the other key within the field 150 is depressed. Thus, for example, a first code is produced by the keyboard 10 when key 136 is depressed and a second different code is produced when the keys 136 and 137 are depressed simultaneously.

Two additional control key fields, 151 and 152 are also provided. Key field 151 includes keys 101-103 to effect, respectively, a media read, a printing operation, and a media recording operation. In addition, keys 104-106 provide for placing the device in an insert mode, a review mode or a delete mode, respectively. The insert key 104 can be asserted in text or page image mode. When asserted in text mode it will cause the processor 20 to remove any text on the line at which the cursor is positioned, which is to the right of the cursor, that text is moved down to the next adjacent line, and the following text is adjusted accordingly, so that the operator sees, on the display 32, at least a portion of a line which is available for text insertion. If the operator's insertion exceeds this capacity, when in the insert mode, an additional blank line is provided, and all following text is moved down accordingly. In page image, insert will perform a text or block (if the cursor is blinking) insert depending on the cursor position. In either event if a (printable) character is entered the device will switch thereafter to the text mode.

Review can be asserted in text or page image mode. In the latter mode, each subsequent assertion will produce an image of the next sequential page on the display, unless key 111 (up cursor) is simultaneously asserted in which case the next preceding page image is produced. A similar effect is produced in text mode, except that rather than pages, each assertion will call up a different screen (maximum of 12 lines) either the next screen or the preceding screen if the up cursor (key 111) is also asserted. Rather than displaying an entirely different set of 12 lines per screen, the processor will attempt to maintain a sentence or paragraph continuity, on default the last (or first) line of one screen is the first (or last) line of the next.

The delete key is a modifying command and therefore must be used with another command. It has the expected effect, namely it can delete a block of text (in the page mode) or in text mode it can delete a character for each depression of cursor right (114), a word (key 110), as well as word (122) or character underscore. It can also be used to delete previously entered functions as is explained later.

The remaining key field (152), includes control keys 107 and 108 which can be used by the operator to control the display mode, either the text or page image mode. In the page mode asserting key 108 has no effect. However, in the text mode, asserting key 107 will align the beginning of a sentence/paragraph containing the cursor to the top line of the screen. The manner in which this is effected will be described hereinafter.

Keys 109-114 are provided to control cursor movement. Keys 109 and 110, for example, move the cursor one word to the left or right, respectively in text mode. In page mode these keys are ineffective. In a similar fashion, keys 111-114 are provided to move the cursor up or down, right or left, either a single line space or character space per depression. As will be explained, in the text mode the cursor is constrained to move within the field of existing text. That is, cursor right (key 114) will, at the end of text in one line, go to the leftmost character in the next line, even if the line ending is not at the right edge of the screen. In text mode, with the cursor at the top of the screen asserting cursor up (key 111) will scroll the screen up. Similar action occurs with cursor at the bottom of the screen and assertion of cursor down (key 112). Like action can be effected with cursor left and right. In page image the cursor can be moved anywhere within the page boundaries, the cursor blinks when it is not over text. The manner in which the key codes generated by assertion of any of these keys is used to implement the function will be described hereinafter.

Within the key field 150 itself, a majority of the keys and the results produced are conventional and will not be further described. However, the effect of actuating certain of the keys is worthy of brief comment. Several keys produce typewriter functions, i.e., index, backspace, carrier return, tab and space. The backspace is an error correcting backspace only when initially keying the document, continuing to key the document, revising in insert mode or under certain special conditions in fax mode. Otherwise, backspace is similar to a left cursor command. The Req backspace is always merely a cursor left.

Each of the keys to be discussed hereinafter will produce the function described when the key itself is depressed in combination with actuation of the code key 137 (i.e., a coded function).

Depression of key 116 enables the operator to change the position of the first writing point. For example, with the page image display, the operator can move the cursor to the point at which it is desired the text to begin. Actuation of key 116 will then effect this function. The reformating effected by changing the first writing point does not alter the integral relationship of the document and this is effected by appropriately changing the global and temporary right and left margins along with first and last writing line in a manner to be explained hereinafter.

Depressing the key 117 provides a page ending code which is used to demark the end of a page. This is used by the processor 20 to format text, as will be described.

Depression of key 118 puts the inventive apparatus in a format mode; this is used to superimpose on the page image a tab grid and horizontal and vertical ghost cursors each parallel to an associated grid, which track the document cursor in a single dimension, respectively. Second depression of key 118 restores the original page image.

In the page image mode the display includes a representation of the document boundaries so the operator can view the relationship of margins, etc. with respect to the document boundaries. For example, a common document boundary size might be $8\frac{1}{2} \times 11''$. Keys 119 and 120 can be used to display document boundaries of different but predetermined sizes. For example, key 119 can cause an envelope display, and key 120 might cause a display simulating the shape of an IBM card. Similar document boundaries could be called up by other conventional techniques.

Keys 125 and 126 respectively, establish temporary right margins and temporary left margins at the present cursor position. Therefore, an operator desiring to change or insert a temporary right margin, for example, would first move the cursor, using any of the keys 109-114 to an appropriate location, and then actuate key 125. The temporary margins will be applied, by the processor 20 to the text in the paragraph at which the cursor is located. The effect of temporary margins are cancelled at required carrier returns as is the effect of other temporary parameters. Margins affect text display only in page image mode.

Permanent margins for the document can be selected by the operator in a similar fashion using keys 124 and 132, respectively. However, only in page image mode.

Key 123 provides a key code requiring return to the beginning of a document, and is used in either mode.

Key 122 provides for word underscore in text mode only. In use, the operator positions the cursor to lie somewhere within a word which it is desired to underscore. At that time, key 122 is asserted, and the processor 20 sets an underscore indicating bit in the document memory for each byte associated with each character in the identified word.

Keys 129 and 131, respectively, provide for tab sets and clears, used in page image only. Key 130 is similar except it provides for temporary tab registers. Temporary tab registers are, like temporary margins, effective until a required carrier return is encountered. Keys 129 and 131, respectively, set or clear the temporary or global tab register depending on cursor location when the command is asserted.

Keys 128 and 135 allow the processor 20 to switch between the two documents in the document memory, key 128 calling up document A and key 135 calling up document B. In addition, when recalling document B, for example, after working on document A, the portion of document B which is displayed and the position of the cursor within document B are the same as the conditions existing when document A was called up.

Key 134 is used, in page image, to designate the number of lines on a page. In use, the operator positions the cursor at what is desired to be the last line on a page and then asserts key 134.

Key 133 is used to move blocks of text and is used in page image, only. In accordance with the present invention the document is broken down into main text, and one or more text adjuncts which are termed blocks. Text blocks, or simply blocks, while constituting a portion of the document, have an identity separate and apart from the main text, and key 133 allows blocks to be moved, individually, relative to the main text. A block insert is implemented, after keying in the main text. This is effected by simply positioning the cursor in the page image mode outside of main text. Since the cursor is outside the main text field, the display 32 will show it blinking; asserting the insert key 104 places the machine in a block insert mode. The operator can thereafter key in text, and as text is keyed in, display 32 shifts to the text mode to display the keyed in text. The text is stored in the document memory, along with the main text, but its beginning and end carries block delimiters to identify the block. Key 133 then can be used, by firstly positioning the cursor at a desired location for the block and then asserting key 133 to move the block thereto. If there is more than one block in the document, the block which moves in response to assertion of key 133 is the block last operated on.

Similar techniques could be used for simplifying operator action on initially keying in main text by suitable modification to the system disclosed herein. More particularly, rather than requiring the operator to identify a left margin and first writing line before inserting text, the software could be modified to pick up these parameters from the operator's cursor positioning decision when initially keying in text.

Many of the functions briefly described in connection with the key field 150 can be deleted in a similar fashion by operating the delete key 106 along with another key. This places the machine in a delete condition such that rather than inserting the thereafter asserted keys function, that function, if present at the cursor position, is deleted. This applies, for example, to permanent or temporary margins, temporary tabs and word underscore. Likewise, a block can be deleted, by asserting the block move key 133 when the inventive device is in the delete condition, in text mode. The delete condition is active when (and only when) the delete key is depressed, i.e., it is not a toggling function like insert, for example.

Finally, key 136 provides for clearing the document memory; in the embodiment of the invention in which the document memory is capable of holding two documents, the clear function is effective for the document being worked on.

Although some of the functions described above in relation to the keyboard are implemented via codes which are generated by simultaneous depression of more than one key, those skilled in the art will have no difficulty in understanding that this is not at all essential to the invention, and, with the addition of one or more keys, or a rearrangement of the functions performed by the available keys, the particular function implemented by simultaneous action of more than one key, could be implemented by the action of only a single key, the only requirement being that different functions are identified by unique key codes, generated by the depression of a key or group of keys.

Figure 4:
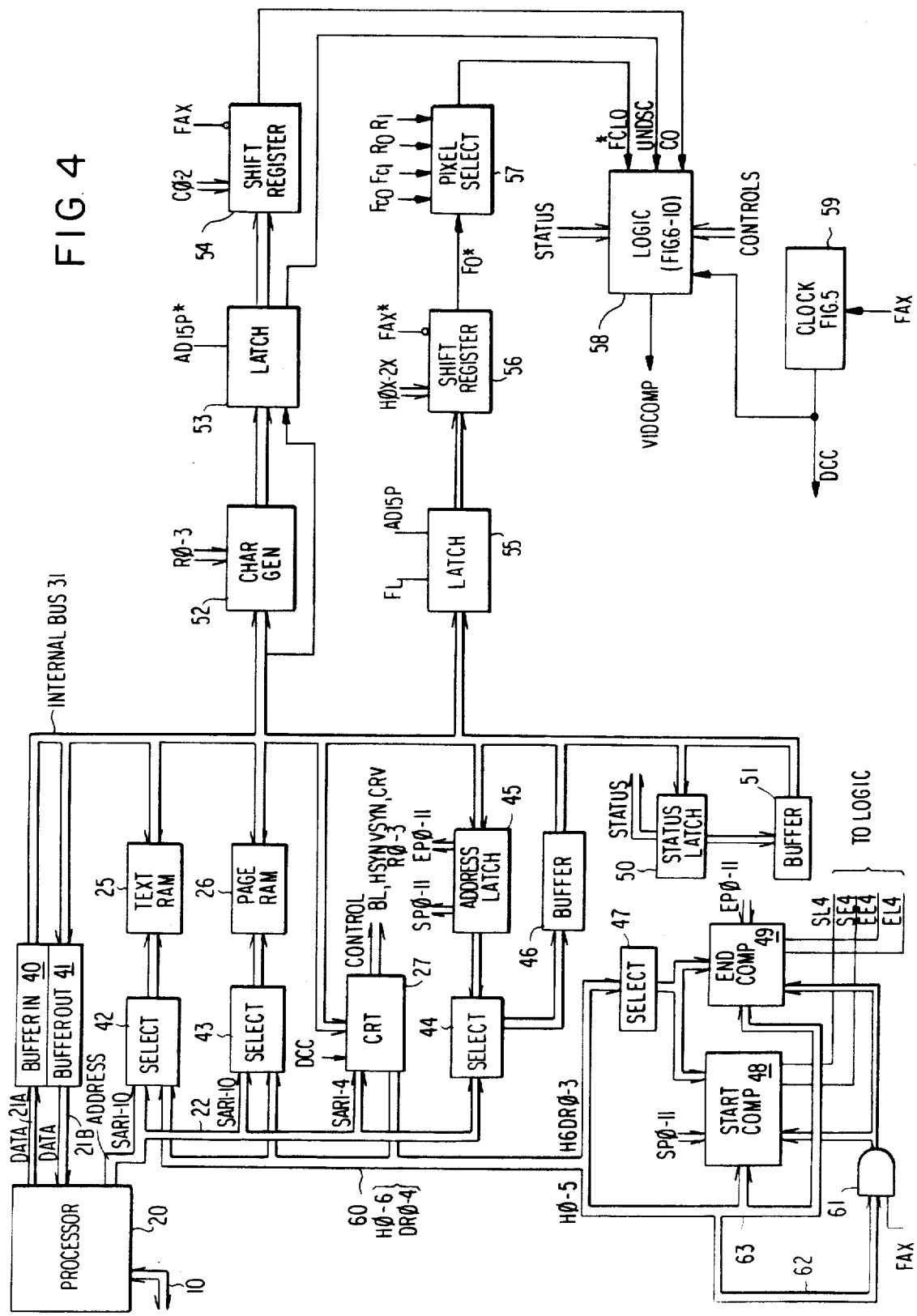
FIG. 4 is a more detailed block diagram of portions of the inventive apparatus, particularly associated with the display.

Refer to FIG. 4; a detailed block diagram of the apparatus interacting with the processor 20 and the display 32. As is shown in FIG. 4, the processor 20 has a data out bus 21A which may, for example, be 8 bits wide which is provided as an input to a buffer 40, the output of the buffer 40 is coupled to the internal bus 31 which may also be, for example, 8 bits wide. A second buffer 41 drives a data input bus 21B to the processor 20 which may, for example, also be 8 bits wide, from the same internal bus 31.

The processor 20 also has an address bus 22 which may, for example, be 10 bits wide which provides an input to selectors 42 and 43 which have a multiplexing function in that they select one of their two inputs and provide it as an addressing output to the associated text RAM 25 or page RAM 26. The other inputs to the selectors 42 and 43 are provided by the output of the CRT controller 27 over a bus 60. Control signals input to the selectors 42 and 43, from the logic 58 make a selection; of course, when the processor is writing into the text RAM 25 or page RAM 26, the selector passes the address from the processor address bus 22, whereas, when it is actually desired to display, the selector 42, 43 passes addressing information from the CRT controller 27 to read out the associated text RAM 25 or page RAM 26. The internal bus 31 is also used to transfer status informaton from the processor 20 to a status latch 50 which provides various controls to the logic circuits 58. The status latch 50, in an embodiment of an invention which has been constructed includes a bit for page image mode, a bit for highlight, a bit for black on white or reverse image, a bit for blanking, a bit for ghost cursor (split), a bit for blinking and a bit indicating when the vertical sync pulse, from the CRT controller 27, is active. The buffer 51 enables the processor 20 to read the contents of the status latch 50 at any time; since it is mainly useful for experimental operations, it is not at all necessary for providing the features described herein.

Display of cursor position is partly controlled by the CRT chip 27 which receives cursor position information from the processor 20 over the data bus 31. However, several features of the invention provide ghost cursors, a vertically moving ghost cursor identifies the horizontal row of the cursor, and horizontally moving ghost cursor defining the vertical column of the cursor. Display of these cursors employs a pair of comparators 48 and 49 indicating the location of the horizontal and vertical ghost cursors, respectively. To provide these signals the comparators are provided with information as to the real time development of the raster, and this is implemented via the bus 60 which carries 10 bits of sweep identifying information, 7 bits providing character counts and 4 bits providing what is in effect line count information. Selector 47 provides the line count, and lowest order bit of character count to the comparators 48 and 49, for comparison purposes. The other input to comparators 48, 49 is SP$\emptyset$-11 and EP$\emptyset$-11 from address latch 45 which provides 12 bits of address for each cursor.

The output of the comparators (the signals SE4, from start comparator 48; and EE4 from end comparator 49) are provided to the logic circuit 58 to form the ghost cursor illumination which is merged with the basic video signal in a manner to be explained.

The output of the comparators (SL4 and EL4) are provided to logic 58 to form a highlight condition (from start position SL4 to end position EL4) to be merged with the basic video signal in a manner to be explained As will be explained hereinafter, in the course of text entry, the processor 20 forces the display apparatus to the text mode, and in that mode continually updates text RAM 25, so that it reflects the contents of the internal document memory of processor 20. When the processor 20 is not actually engaged in writing text RAM 25, the RAM is read out on a continuous basis via the control signals provided by the CRT 27. Each 8 bit byte in the text RAM 25 corresponds to a different character, space, etc., which is input to the character generator 52, in concert with 4 bits of row count information to generate, for that byte, an N bit word where N is the width of any character box. In the embodiment we constructed each character is 10 pels or columns wide by fifteen pels or rows high. This count is provided to latch 53. Actually, only seven bits of the 8 bit byte are used by the character generator 52, the eighth bit corresponds to the underscore bit. This is coupled directly to the latch 53. The latch 53 loads a shift register 54 with the N bits, and the contents of the shift register are read out by the appropriate timing signals to generate a serial signal stream CO which is input to the logic circuit 58. The underscore bit is read out of latch 53 and provided directly to the logic circuit 58. The underscored bit is simply a binary signal indicating, during the appropriate row time, whether an underscore graphic is to be displayed. The CO signal stream is the binary signal stream identifying the character, UNDC is the underscore signal stream.

In an entirely similar manner, but with substantially different results, the page RAM 26 is read out by the CRT controller chip 27. However, in the page image mode when the page RAM 26, is read, the signals on the internal bus 31 are coupled through a latch 55 to a shift register 56, which performs functions substantially similar to the function of the shift register 54. As will be explained hereinafter, the page RAM 26 is written by the processor 20 on a one bit per character basis in a fashion that maps directly to the CRT screen, in this respect, similar to the text RAM 25 where each byte corresponds to a character or space. Accordingly, each memory location in the page RAM 26 corresponds to a unique position on the CRT screen. The presence of a one bit at a memory location in the page RAM 26 corresponds to the presence of a character (or punctuation graphic) on the CRT screen at the corresponding location. The page RAM 26 is read out a byte at a time, and the 8 bits are serialized in the shift register 56. Each bit, provided to the pixel select circuit 57 is used to generate a binary signal depending on the presence or the absence of a bit from the page RAM 26 Thus, the timing signals $F_{c0}$, $F_{c1}$ (corresponding to one of four columns) and $R_0,R_1$ (corresponding to one of three rows) is used to generate the serial bit stream F*CLO which is input to the logic circuit 58. The pixel select network 57 could be any fixed switching network (such as a ROM) which is enabled by a bit from the shift register and which is addressed by the timing signals.

Accordingly, the input to the logic circuit 58, either F*CLO, or the combination of CO and UNDSC (in the page image mode or text mode, respectively) serve to define, for the most part, the basic configuration of the display. The logic circuit 58 adds to this signal stream, in a manner to be explained, cursor position, any highlighting by the processor 20, ghost cursors, if selected, and character enhancement.

Figure 5:
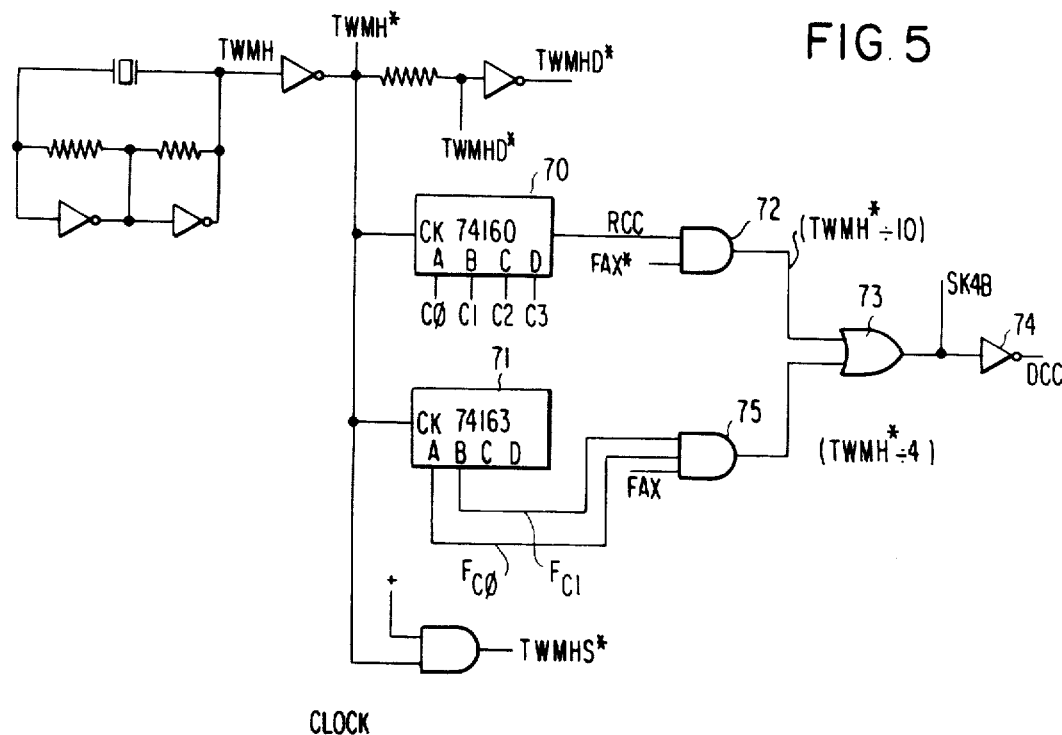
FIGS. 5-10 are schematics of the circuits used in different ones of the functional blocks of FIG. 4.

Before describing the logic circuit 58, reference is made to FIG. 5 which describes the clock circuit 59.

As is shown in FIG. 5, the clock circuit 59 which provides timing signals for the CRT chip 27 and the logic circuit 58, comprises a crystal oscillator operating at appropriate frequency (in one embodiment of the invention the crystal operated at 12 MHz). The signal is provided to a pair of counters 70 and 71, both operated as dividers. The counter 70 provides a carry out (RCC) which divides the input rate by 10. This output is coupled to an AND gate 72 where it is ANDED with the signal FAX*. Thus, in the text mode (not FAX or page image) the output of AND gate 72 is a clocking signal at 1.2 MHz which is coupled through OR gate 73 and inverter 74 to provide the dot carry clock (hereinafter DCC). In addition, the counter 70 provides column count signals (C$\emptyset$ through C3) which divide the input rate by progressively high powers of 2. The signal DCC provides one pulse per character.

In a similar fashion, the counter 71 is operated as a divider and its 2 outputs ($F_{c0}$, $F_{c1}$) are respectively the input rate divided by 2 and 4. These signals are coupled to AND gate 75 whose third input is the signal FAX. Thus, in the page image mode the output of AND gate 75 is at a 3 MHz rate (12 MHz divided by 4) which, when coupled through the OR gate 73 and inverter 74 provides DCC. The outputs of the counter 71 are also used in other portions of the logic circuit as well as, for example, in the pixel select circuits 57. Thus, in page image the character clock is 2.5 times as fast as in text, this accounts for our ability to display at a rate of approximately 130 characters per row in page image versus 52 characters per row in text.

The logic circuit 58 is shown in schematic fashion in FIGS. 6 through 10.

Figure 7:
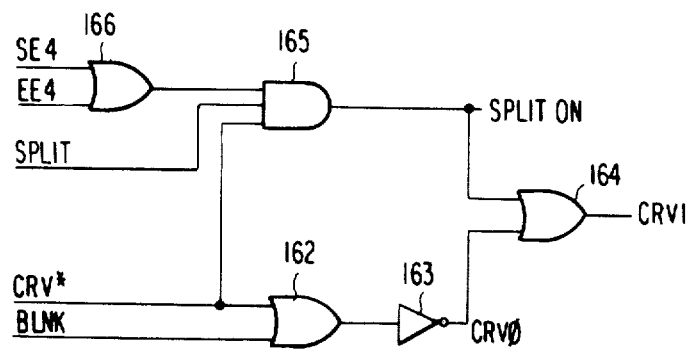
Figure 6:
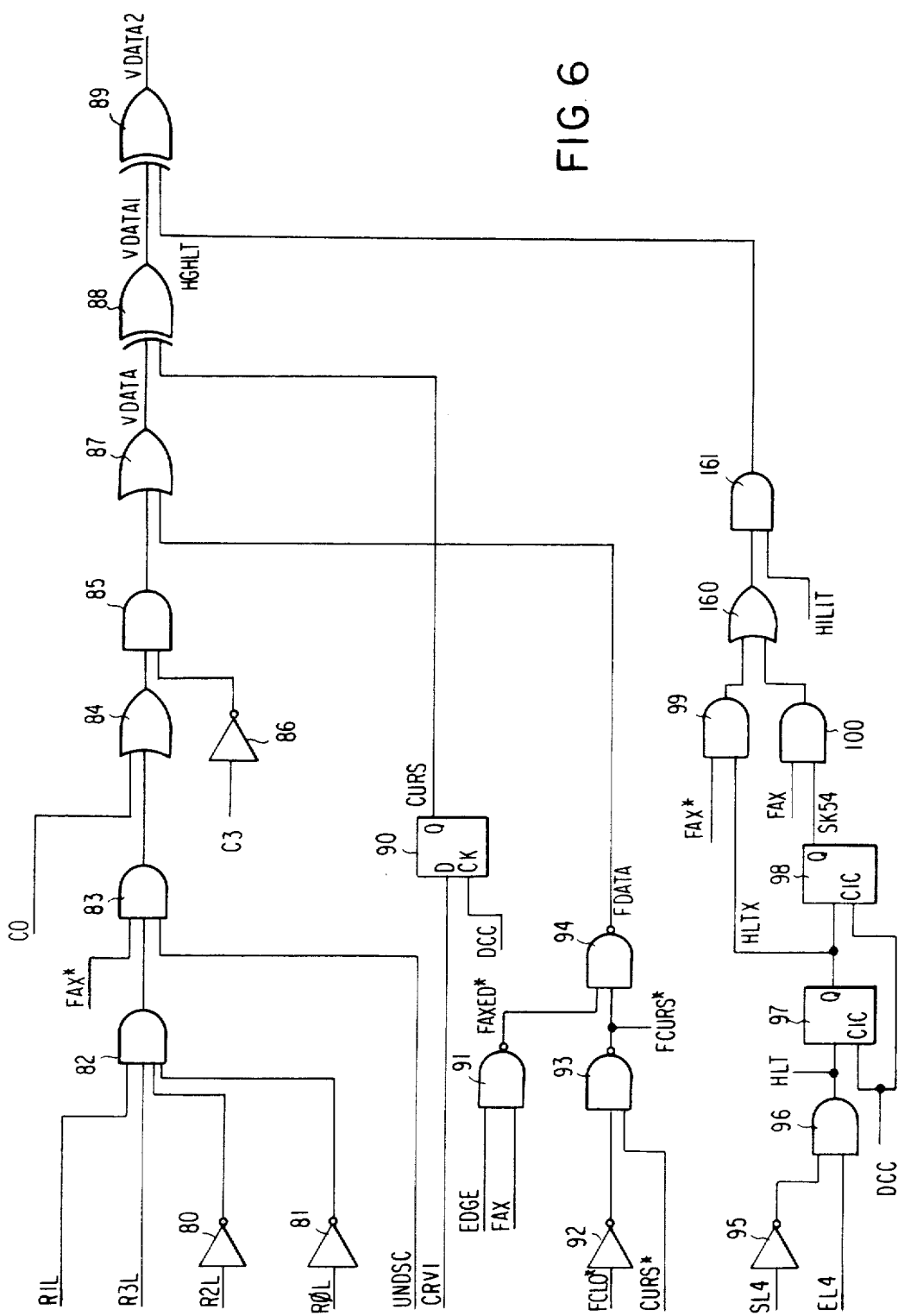
Figure 8:
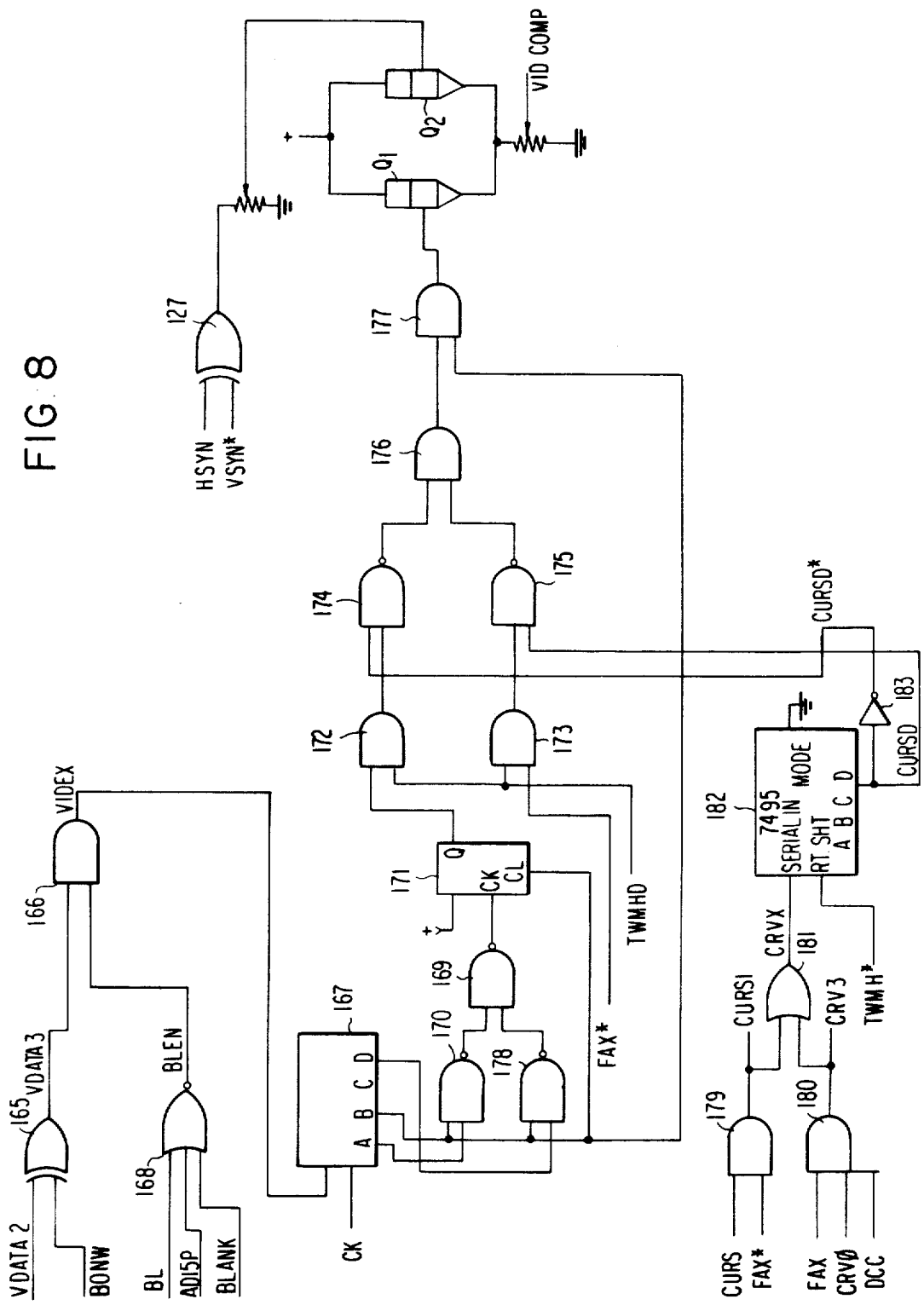
Figure 9:
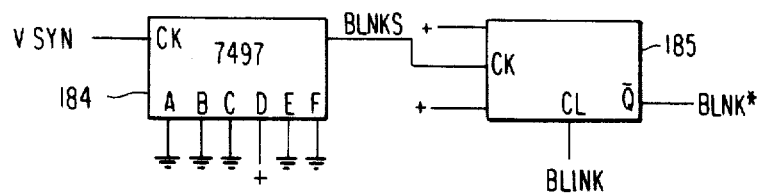
Figure 10:
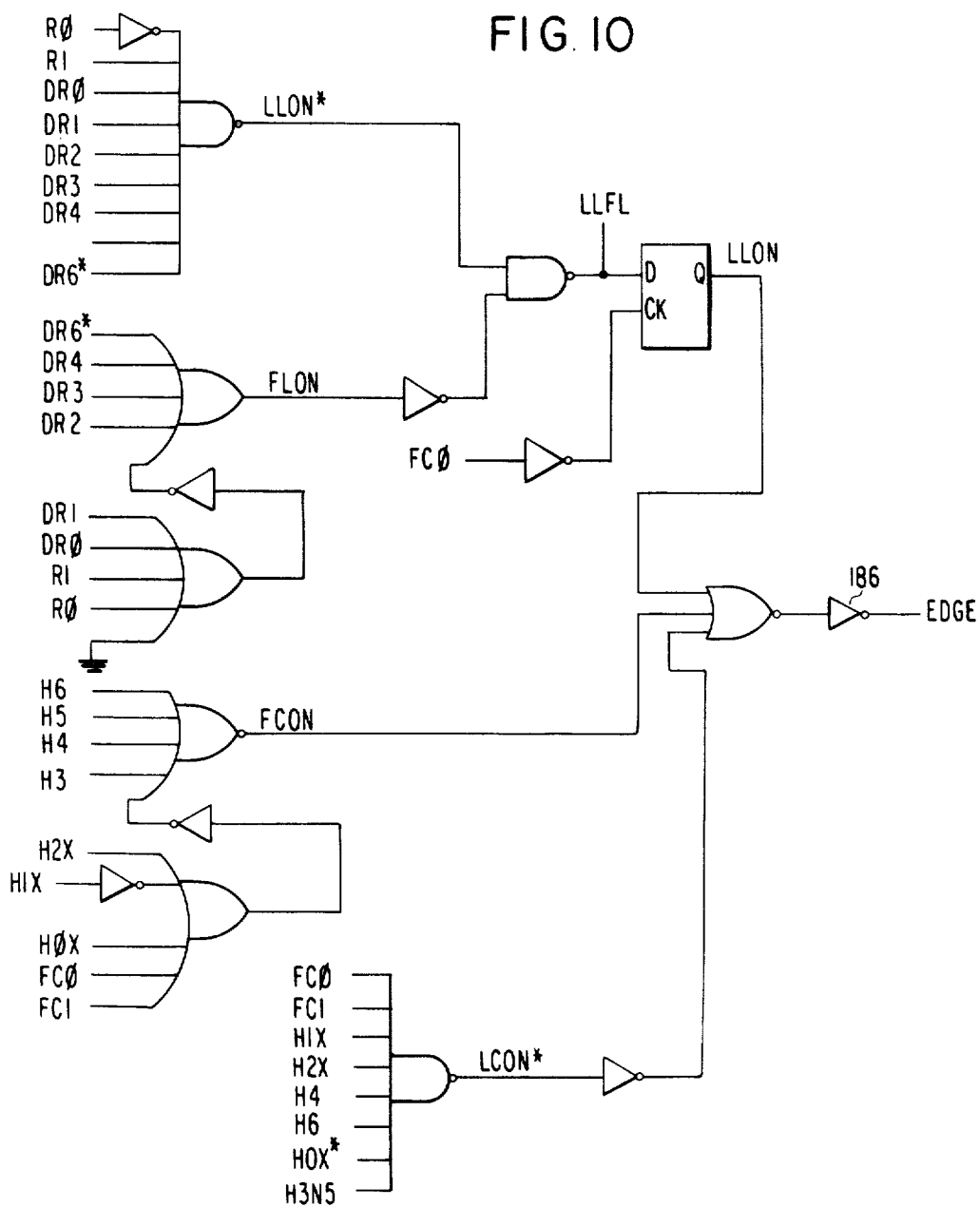

Referring now to FIG. 6, circuitry is illustrated to develop the signal VDATA2. FIG. 8 illustrates how that signal, in conjunction with several others is used to generate the composite video VIDCOMP. FIGS. 7, 9 and 10 illustrate the development of certain input signals used in the circuits of FIGS. 6 and 8.

Referring again to FIG. 6, AND gate 82 is provided with input signals R1L, and R3L as well as the output of inverters 80 and 81 which are driven by R2L, and RØL respectively. Each of these input signals is basically one of the row defining signals RØ through R3 provided by the CRT chip 27 in respose to DCC, synchronized with HSNYC (also provided by the CRT chip 27). Accordingly, AND gate 82 is satisfied for the 10th row of each character, which is a row which is illuminated for the underscore graphic. The output of AND gate 82 is provided as one input to AND gate 83 whose other two inputs are FAX* and UNDSC. Accordingly, AND gate 83 provides an output for each character (whose underscore bit has been set), during the tenth row of that character's display and only in the text mode. Thus, the output of AND gate 83 is the underscore graphic. This is added to the basic binary signal stream CO in OR gate 84, and provides one input to AND gate 85.

Since each character in the text mode is ten columns wide inverter 86 driven by the timer output C3 is used in conjunction with AND gate 85 to blank columns 9 and 10 which are cleared on signal CØ. Accordingly, the output of AND gate 85 is the display stream with underscore graphic added for text mode display. For page image display the basic binary signal stream F*CLO is coupled through inverter 92 to NAND gate 93 whose other input is the signal CURS*. The output of NAND gate 93 is input to NAND gate 94. The other input to NAND gate 94 is developed in the NAND gate 91 by combining the signals EDGE and FAX. The first signal is, as will be explained hereinafter, developed to draw document boundaries in the page image mode and the second is the status signal indicating page image mode. Thus, the output of NAND gate 94 is the page image binary signal for all locations (with FAX data cleared at the cursor location). This signal is ORed with the text image defining stream in OR gate 87. Of course, only one of the inputs to OR gate 87 is active at any time since FAX and FAX* are mutually exclusive.

To see the development of the cursor image in the page image mode reference is made to FIG. 7. As shown in FIG. 7 OR gate 162 is provided with signals CRV*, a signal developed in the CRT chip to define the position of the cursor, and the signal BLNK which is alternately high and low if the cursor is to be blinked, which it is in the page image mode, when the cursor is outside a text field area. The output of OR gate 162 is provided to inverter 163, the output of which is provided as one input to OR gate 164. The output of OR gate 164 (CRV1) is provided as a signal input to a flip-flop 90 whose clock input is coupled to DCC. The output of the flip-flop 90 (CURS) provides an input to the exclusive OR gate 88 whose other input is the output of OR gate 87. Accordingly, the output of exclusive OR gate 88 is a signal stream which is either text mode video (including underscore characters) or a page image video including the page boundary and cursor video, for both text and page image.

The use of a ghost cursor feature has already been explained, and the location of the ghost cursors are determined by the comparators 48 and 49, producing the signals SE4 and EE4 (for the location of horizontal and vertical ghost cursor, respectively). These signals are provided to an OR gate 166, the output of which is coupled to AND gate 165. The other two inputs to the AND GATE 165 are SPLIT (one of the status signals, which is on in the page image mode and only when the ghost cursors are to be displayed) and the signal CRV* (to clear the ghost cursors/FAX data at the main cursor location). Thus, the output of AND gate 165 defines the ghost cursors and is the other input to OR gate 164. Accordingly, the signal CRV1, in addition to defining cursor location for both text and page image mode, in the page image mode also defines the position of the ghost cursors. As a result, the signal CURS also carries cursor and ghost cursor information as an input to exclusive OR gate 88.

Exclusive OR gate 89, one of whose inputs is the output of OR gate 88, provides a highlighting feature. The presence of the gate allows areas to be highlighted (displayed as a reverse image). In other words, for the portion of the screen which is highlighted, an otherwise normally on pixel is off and an otherwise normally off pixel is on. This is simply effected by rendering the other input to exclusive OR gate 89 active for the entire period during which the highlighted portion of the screen is being displayed. The signals SL4 and EL4 provide respectively, time definitions of the start and end of the highlighted field. Thus, the combination of inverter 95 and AND gate 96 provide a signal which is high during the portion of a field to be high-lighted. This signal, delayed by one clock count in the flip-flop 97 is provided to pass AND gate 99 (in the text mode). The signal HILIT, a status signal partially enables AND gate 102 to provide the active input to exclusive OR gate 89 to provide the highlighting functions. In the page image mode the delayed highlighting output of flip-flop 97 is further delayed in flip-flop 98 where, in a similar fashion it is coupled through AND gate 100 in the presence of FAX through OR gate 160 and AND gate 161.

Accordingly, the signal VDATA2 includes all character graphics, cursor position, underscoring and highlighting.

Reference is now made to FIG. 8 to illustrate the further development of the video signal. A status signal BONW is input to exclusive OR gate 165 the other input of which is the signal VDATA2. Accordingly, in the presence of the signal BONW the entire screen is highlighted or reversed imaged. The output of exclusive OR gate 165 (VDATA3) is one input to AND gate 166 the other input to which is the NOR gate 168. The output of NOR gate 168 (BLEN) enables the video which would otherwise be output by AND gate 166 to be blanked. The inputs to NOR gate 168 define three conditions, any one of which is sufficient for blanking. Blanking can be accomplished by the status signal BLANK which is effective for the entire screen. The signal AD15P (which is indicative of processor writing into an active refresh memory, and is therefore active for the processor access time) or the signal BL provided by the CRT chip 27 which defines those portions of the video which are outside the area being written. It is therefore, effective only for those portions of the screen for which the signal BL is active. Thus, the output of the AND gate 109 (VIDEX) is the blanked video.

The remaining portion of FIG. 8 is used for character enhancement, and may not at all be necessary depending upon a particular monitor or the display being used. For those high resolution displays with phosphors arranged for digital display, the enhancement provided by the remaining logic of FIG. 8 may not be essential. FIG. 8 is useful, however, when the CRT being used is that of a commercially available TV receiver or monitor whose phosphor is subject to "blooming" when driven by a digital signal of repetition rate higher than a predetermined rate. Character enhancement or prevention of "blooming" is effected by reducing the duty cycle of the drive to the grid of the CRT depending on the frequency of its input. Since this can only be determined by noting a successive number of pulses to the video, the output of AND gate 166 is provided as an input to a four stage shift register 167. This enables the remaining logic to look one bit in the future (at stage A) and two bits in the past (stage D). The "present" video output provided is one input to AND gate 177. This partially enables AND gate 177, the other input will determine the pulse width. Under certain circumstances (particularly bit combinations in the register 167) the other enabling input to AND gate 177 will be a half pulse width. The NAND gates 169, 170, 178 pick out particular bit combination patterns and clock flip-flop 171 for the patterns (in stages A-D) of 0101; 0111; 1100; 1101; 1110; and 1111. Whenever such a bit pattern is detected flip-flop 171 is set, gate 172 is partially enabled, and is fully enabled at the rate, and duty cycle of TWMHD (a 12 MHz signal). On the other hand, gate 173 passes the signal TWMHD for all text mode (FAX*) display; as will be seen, the upper pair of gates 172 and 174 handles all non-cursor representing pulses and the lower row of gates 173 and 175 handles the cursor representing pulses. Since one input to gate 173 is FAX*, the FAX cursor is not subject to width limitation as a result of the gates 169-170 and 178.

For non-cursor signals in text mode which are selected by the gates 169-170 and 178 (and hence set flip-flop 171) the signal TWMHD passes gates 172, 174 and 176 to, in effect, slice the pulse width output of gate 177. Accordingly, for selected pulse combinations, a single pulse has its width reduced by gate 177 to limit "blooming". Similar action is produced in gates 173, 175 for text cursor representing pulses, i.e., one or more of the pulses will be reduced in width.

The gates 174 and 175 are personalized for noncursor and cursor representing pulses by their inputs from inverter 183 and shift register 182, respectively. In text mode, cursor representing pulse times are identified by an output of gate 179, which is suitably delayed in register 182 to match the delay of register 167 and flip-flop 171. This partially enables gate 175 which is fully enabled at the 12 MHz rate and duty cycle by the output of gate 173 (in text mode only). On the other hand, in page image mode, gate 180 is enabled. Because one input is DCC, the normally four pulse wide CRV∅ is reduced to three pulse widths at the outputs of gates 180, 181. This reduced width page image cursor is coupled through the inverter 183 to pass gate 174 and 177. Although the actual pulse count out of gate 177 for the page image cursor is only three, the visual effect is that of a four pel wide cursor because of "blooming" on the monitor.

Transistor Q1 and Q2 provide, in effect an OR gate to sum the horizontal and vertical sync, through exclusive OR gate 127 with the output of AND gate 177 which is the complete video exclusive of the synchronizing signals. The result, available at the tap, is VIDCOMP which can be directly provided to a CRT display. Accordingly, the logic 58 develops an unformatted VIDCOMP in text mode and a formatted VIDCOMP in FAX mode.

FIG. 9 illustrates how the signal BLNK* (used as an input to OR gate 162 in FIG. 7) is developed. That is, the signal VSYN (available from the CRT chip 27) is used as a clocking input to a rate multiplier 184. The output of the rate multiplier is used to clock a flip-flop 129 which is cleared by the status signal BLINK. Accordingly, the signal BLNK alternates in polarity once for each eight times VSYN is produced. This provides for the blinking cursor in that the cursor is illuminated for eight screens and blanked in the next eight. (Of course, only when the signal BLINK is active).

FIG. 10 illustrates the production of the signal EDGE. The input signals to the gates of FIG. 10, that is, R∅, R1 define the third row of any character box in the page image mode. The signals DR∅ through DR6 define character lines, the signals Hn or Hnx (where n is an integer) are column signals defining character columns and the signals FC∅ and FC1 define dot positions within a column. The logic in FIG. 10 thus provides an output through the inverter 186 concurrent with the sweep writing first line, last line, first column and last column. The concatenation of these signals is the signal EDGE defining the boundaries of the document. In a manner to be explained, documents of other sizes can be provided on the display screen.

We can now explain how our display in page image can illustrate 85 characters per data row with 64 data rows per screen using a CRT chip capable of writing either 132 characters per data row with 32 data rows per screen or 96 characters per data row with 64 data rows per screen. We set up the CRT chip to write 132 characters per data row and provide a simulated least significant row address bit, expanding row addressing from 32 to 64 rows. Our refresh RAM had 1024 byte capacity which, since we used 1 bit per character allowed for 8192 characters or more than enough for our 64 rows of 85 characters each.

Figure 12:
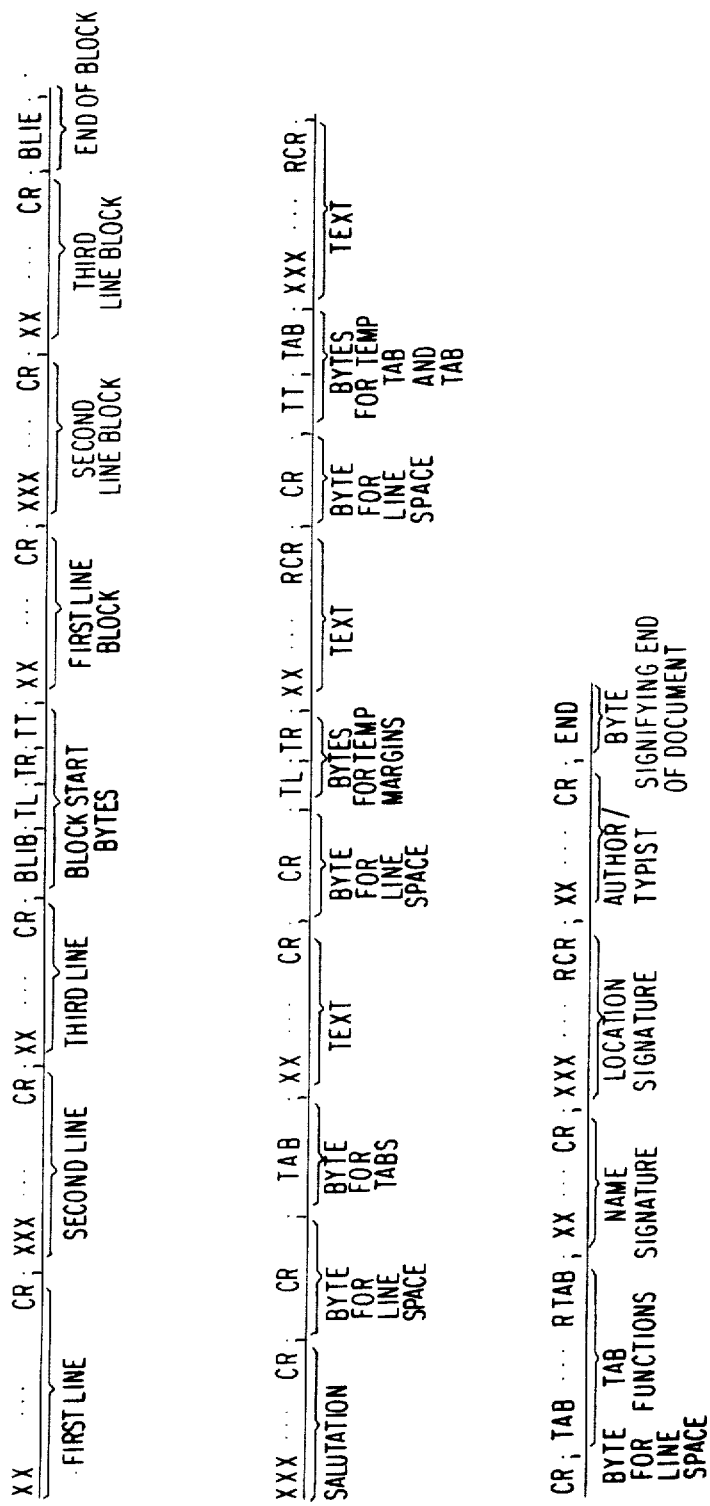
FIG. 12 is a representation of document memory which will produce the display as shown in FIGS. 11A-11G, in connection with the present invention.

FIGS. 11A through 11G illustrate respectively, several different page image and text mode displays of a single document and FIG. 12 represents a map of document memory which will produce the displays shown in FIGS. 11A through 11G.

FIGS. 11A-11D illustrate four different page image mode displays of the same document, the only difference between the four displays is caused by the fact that the cursor is located in different areas in each of the four displays. Because the number of lines of text in the page being displayed in FIGS. 11A-11D exceeds the text mode display capacity, the document which is shown in the display of FIGS. 11A-11D cannot be illustrated on a single text mode screen. Rather, three different screens are required. FIG. 11E shows the first screen constituting roughly the first one-third of the document, FIG. 11F shows the second screen constituting essentially the middle third of the document and FIG. 11G shows the last or third screen constituting essentially the last third of the document.

A comparison of FIGS. 11A-11D with FIGS. 11E-11G will illustrate effectively that the text making up the document is not readable in the page image mode displays whereas it is readable in the text mode displays; on the other hand, the document's format which is explicitly illustrated in FIGS. 11A-11D is not directly revealed in FIGS. 11E-11G.

Referring now to FIG. 11E, and reviewing the screen vertically from the top, the uppermost feature of the screen is "the message line"; this is an area of the screen which is set aside for operator prompts and the like, and it is effectively used, for example, to indicate to the operator what mode the machine is in (for example, insert mode, etc). The message line is demarcated from the document text by the dotted line. While the message line is generic to all page image displays, the remainder of FIGS. 11E-G is specific to an exemplary document display. Immediately below the dotted line separating the message line from the text, is text relating to the addressee, brief reference to FIGS. 11A allows the reader to correlate the location of the addressee data in page image mode display. Immediately below the addressee text, and contained within a pair of horizontally directed dotted lines and a pair of vertically directed lines, is addressor data, which is shown in text mode vertically below the addressee data. Reference to the page image display shows that the addressor data is actually a text block, and as formatted will appear on the same lines of the document as does the addressee data but displaced to the right. Thus, it should be apparent that the horizontal dash lines set off block from main text; and as will be discussed the vertically directed solid lines indicate temporary margins. The small rightward directed arrows adjacent each of the vertically directed solid lines indicates that the temporary margins are to the right of the global margins.

Immediately below the dashed horizontal line demarcing the block from the main text, is a continuation of the main text of the document. Note that the tab preceding the "W" (merely shown as a rightward directed arrow) is actually reflected in the page image mode display as a plural space indent; as has been described above the text mode display does not illustrate, except symbolically, the actual extent of a tab.

Referring now to FIGS. 11E and 11F, note that the last two lines of text in FIG. 11E form the first two lines of text in FIG. 11F. This is an example of the overlap between two adjacent text mode screens, which as will be demonstrated below, is a function of sentence/paragraph boundaries.

The fourth through the eighth lines of text in FIG. 11F (braced by a pair of vertically directed solid lines) begins with a pair of graphic symbols indicating temporary margins, the relation between the temporary and global margins is indicated by the leftward directed arrows. The absence of horizontally directed dash lines indicates that while this paragraph is subject to temporary margins, it is a component of main text and does not comprise a block.

The last two lines of text on the screen shown in FIG. 11F is preceded by another graphic indicating a tab. Reference again to any of FIGS. 11A-11D indicate the extent of the tab, a parameter which is not explicitly illustrated in the text mode display. Finally, reference to FIG. 11G clearly indicates the concluding lines of text in the document; note also that the first line of text in FIG. 11G is the last line in the text in FIG. 11E.

In the text mode display of FIG. 11G, the plural rightward directed arrows indicate several tab functions, concluded with a required tab (shown as an underscored tab graphic), reference to any of FIGS. 11A through 11D indicates the actual effect of these tab functions.

Returning now to FIGS. 11A-11D, this page mode display is atypical in that the Figures illustrate the page mode display including format assisting graphics, which are only displayed as an operator actuated option. The format assisting graphics include the horizontally moving ghost cursor, the vertically moving ghost cursor, an indication of the first writing line, an indication of the left and right margins which are applicable to the text associated with the cursor location, as well as an indication of the effective tabs which are also associated with text in the vicinity of the cursor location. Note, for example that the cursor location is different in FIGS. 11A and 11B, and so is the indication of the left and right margins. Note also the difference between the effective tab positions. Inasmuch as the cursor, in the display of FIG. 11B is located within the block, the message "BL" appears outside the document area in the display, this message appears so long as the cursor is located within this or any other block. Reference to FIG. 11C illustrates that the cursor is located within the text subjected to margins different from the document margins, and this can be confirmed by comparing the margin indicators in FIGS. 11A and 11C. Finally, the cursor in FIG. 11D is located in still another portion of text associated with a tab grid which is not the same as either FIGS. 11A or 11C, although the right and left margin indicators are identical in FIGS. 11A and 11D.

FIG. 12 is a representation of a portion of document memory, and the information contained therein, which is capable of generating the display of FIGS. 11A-11G. In FIG. 12, text information (or codes) is indicated by the character X, other functions are illustrated by the use of various combinations of alphabetic symbols and in some cases some of these alphabetic symbols are separated by semicolons, it should be emphasized that the semi-colons in the drawing are solely for purposes of illustration and have no counterpart in document memory. The codes TL, TR and TT are multi byte codes indicating horizontal location as well as the particular function. The tab code (TT) we used is 13 bytes long including a bit for each character position, which bit is set or reset to indicate the presence or absence of a tab stop. Further, the horizontal lines are also used for purposes of explanation and do not have any counterpart in document memory. Document memory is, as has been mentioned before, one contiguous memory; FIG. 12 is broken into several parallel lines solely for illustrative convenience, it would be more appropriate to illustrate it the document memory as a single unbroken line or storage array.

Referring now to the upper lefthand portion of FIG. 12, the first line of text display is indicated as comprising a plurality of character codes concluded by a carrier return CR. Likewise, the second and third display lines are similar and each concludes with a CR. As will be seen in discussing other portions of text, the line ending CR is only used when the operator intends to prematurely terminate the line, (relative to display width) otherwise no line ending at all need be keyed by the operator. Immediately following the third CR are a number of block start bytes, a block insert begin code, and two codes TL, TR providing for temporary left and right margins, and finally, a temporary tab TT code. Immediately following the block start bytes are three lines of text for the block, each terminated by CR. Concluding the block is an end of block byte (BLIE). The actual TT codes are not shown in FIGS. 11E–G since those codes are not displayed in this embodiment. If desired, of course, they could be displayed by changes which should be apparent. Following the block codes are a series of codes representing the salutation, terminated with CR. This is followed by a further CR byte to provide the line space between the salutation and the remaining text, see FIG. 11A, for example. Note that this line space is not evident on the text mode display. A code indicating an indent tab follows which is represented in the text mode display by the rightwardly directed arrow graphic. Following that is a sequence of codes for a plurality of characters forming the next three lines of text, this sequence terminates with a CR, since the operator intends the line to terminate early, as is illustrated in any of FIGS. 11A–11D. Following this code is a byte for another line space. Thereafter, codes are inserted for the temporary left and right margins. Following the temporary margin codes is another sequence of codes corresponding to the text in the intermediate paragraph of the document; this sequence concludes with a required carrier return (RCR). This is used rather than the normal carrier return so that the effect of temporary left and right margins is terminated in the following portions of the text. This code is followed by a further byte for a line space. The last paragraph of text is initiated with several bytes for temporary tabs. After the tabs are established another text sequence follows, concluded by another required carrier return; this is used to cancel the temporary tab register set up immediately before this text sequence. After another CR code for a line space, the signature line is provided. This includes a tab sequence concluding with a required tab. Following that is several text characters concluded with a CR code. Because of the required tab, the line below the signature line begins at the same place as the signature line and this location in text is concluded by a further required carrier return, to cancel the indent tab. Thereafter, the author/ typist initials appear followed by a CR. The last byte in the document memory is EOD indicating end of document.

The manner in which operator input is stored in document memory to achieve a result illustrated for example, such as that shown in FIG. 12, and the manner in which a document memory containing a sequence such as that as shown in FIG. 12 results in the display shown in FIGS. 11A–11G will be explained in the following portions of the specification including a series of examples and description of associated flow charts.

Before discussing the functions of the processor 20, in response to operator keyed inputs, in order to explain how the functions alluded to hereinbefore are actually achieved it is worthwhile to outline the functions performed by the processor. Thus, FIG. 13 is a simplified flow diagram of the processing, and FIG. 14 is a memory map of the processor's internal RAM.

Figure 13:
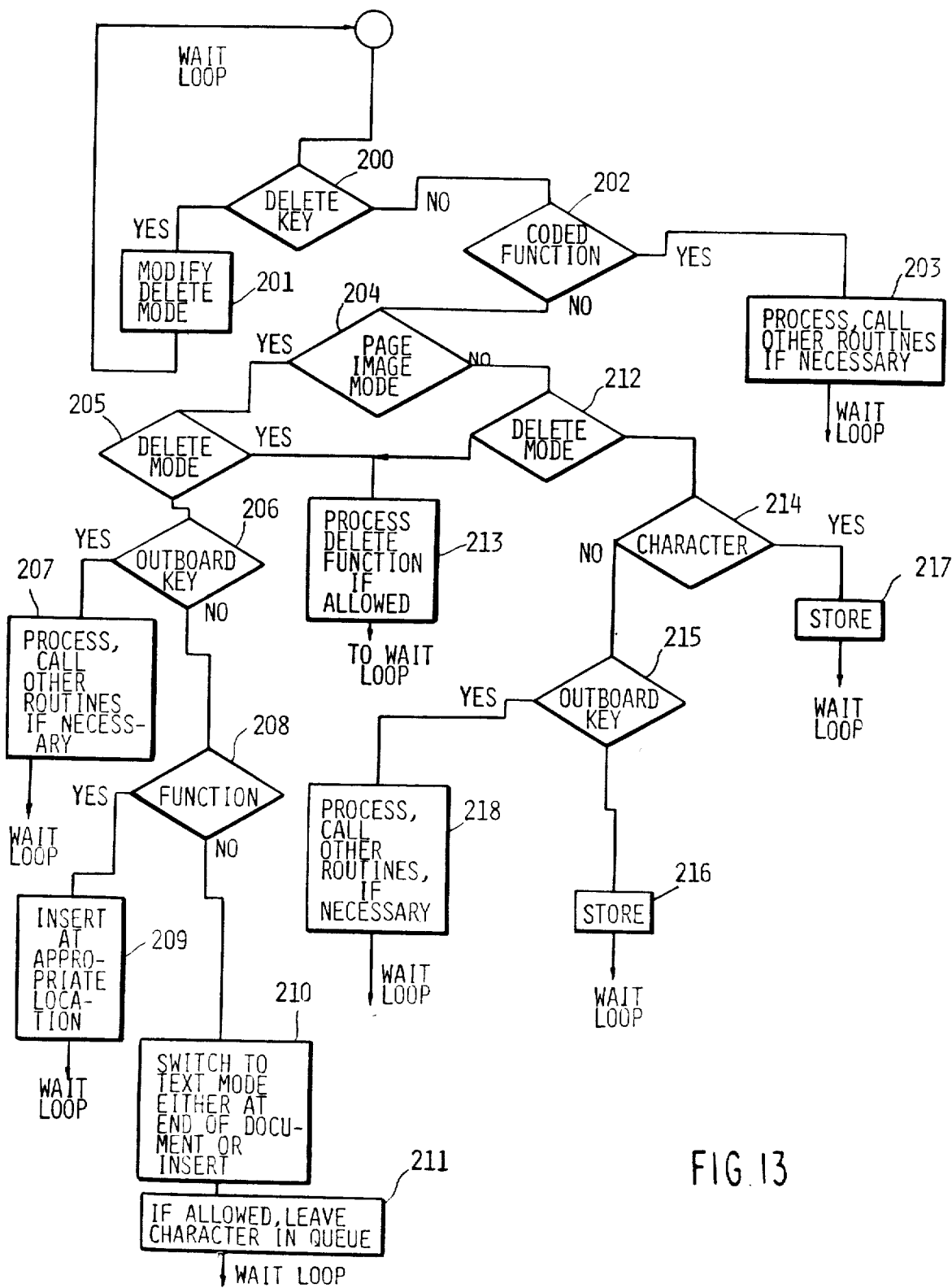
FIG. 13 is a high level flow diagram which is useful in understanding the overall processing performed in accordance with the present invention.
Figure 14:
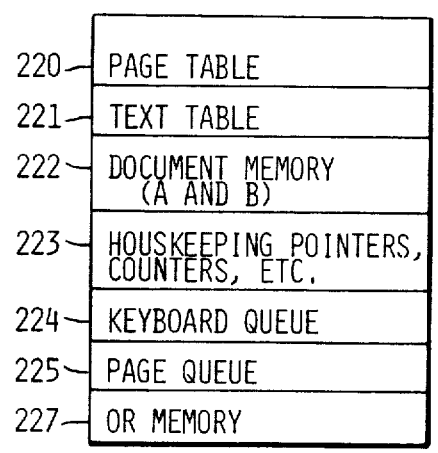
FIG. 14 is a map showing several significant functional components of system RAM in accordance with the present invention.

As shown in FIG. 13 the processor 20 goes through a sequence of steps in order to respond to operator key actuation to provide the operator with the appropriate display. The processor 20 is normally in a wait condition waiting key operation detection. When processor 20 recognizes key actuation, it determines at function 200 if a delete key is actuated (depressed/released). If it has been, the processor merely sets/resets a delete condition (a flag) at function 201 and returns to the wait loop to await further key actuations.

On the other hand, if the delete key was not the actuated key, then the processor determines at function 202 if a coded function has been actuated. If it has been, function 203 processes this function, and may call other routines if necessary. The particular processing depends, of course, on the function itself. Following the processing, the processor 20 returns to the wait loop for additional key actuations.

On the other hand, if function 202 did not detect actuation of a coded function key, then function 204 determines whether or not the machine is in the page image mode. If it is, function 205 determines whether or not it is also in the delete condition by checking the flag set back at function 201. If it is, then function 213 processes those delete functions which are allowed, and that concludes the processing in response to the particular key actuation.

Function 206 and 215 relate to actuation of outboard keys, i.e., keys in the set 151 or 152 (see FIG. 2), and of course, the particular processing depends upon the particular actuated key.

Function 208 operates on function key actuation, and in that event function 209 provides for insertion of the function at the appropriate location in document memory and perhaps in the display itself, and the processor returns to the wait loop. The location in which the function is inserted depends on cursor location, and perhaps on other factors which will be explained hereinafter. If, in the page image mode the key actuation was neither an outboard key nor a function, then it must be a character. As has been explained, the page image mode does not display unique characters and therefore it is not desirable to use this for text entry. Accordingly, in that event function 210 switches the display to the text mode, either for addition of text, if the cursor is located so as to continue typing into the document, or in the insert mode. When the condition stated above is true, function 211 will allow the character to be left in the keyboard queue (if untrue, the character will not be placed in the queue) and thereafter the processor returns to the wait loop.

The processor 20 also supports strikeover typing where the operator keys in text over existing text (not in an insert mode). This action replaces the existing text, character for character, with the keyed in text.

If back at function 204 it was determined that the machine was not in the page image mode, then function 212 (similar to function 205) is performed. If not in the delete condition, function 214 determines if the key entered was a character key. If so, function 217 stores the code corresponding to the character in the document memory at the appropriate location (of the cursor) and the machine returns to the wait loop. If not a character key, function 215 determines if it is an outboard key if it is function 218 is performed (similar to function 207). If not an outboard key nor a character, the key must be a function which is then stored by function 216 at the appropriate location.

Not shown in FIG. 13, of course is the particular processing carried out in response to actuation of different keys, nor how the display is controlled in either text or page image mode.

Prior to discussing particulars of the programming of processor 20 reference is made to FIG. 14 which indicates in a general fashion the manner in which internal RAM of the processor 20 is employed. Omitted from the memory map of FIG. 14 is the memory area allocated to program storage itself. Although in an embodiment of the invention which has been constructed, that program was present in the internal RAM, those skilled in the art will understand that is not essential to the invention since a program could also be stored in ROM. Initially, as the operator actuates various keys, coded signals corresponding to actuated keys are progressively stored in the keyboard queue 224. The processor 20 extracts codes from the queue usually in the order in which they are entered, and eventually generally stores the related coded signals in the document memory 222. During text entry, the machine is in the text display mode and to effect a text display, the processor 20 generates a text table (or table A), which is located in portion 221 of of the RAM. In conjunction with generating the text table 221 and document memory 22, the processor 20 writes in a text RAM buffer 25 to effect a display in connection with the apparatus shown in FIG. 4. In the course of this processing, the processor 20 also keeps track of various parameters in a number of pointers, counters, etc., which are generally included in the RAM area 223. At any time in the course of text entry, or thereafter, the operator may select the page image mode. In page image the processor must format the entire document up to the page selected for display to determine how to format the page selected for display. Once this is accomplished the processor 20 reviews the contents of the document memory 222 and creates a page table (or table B) which is stored in portion 220 of the RAM. From the data stored in document memory 222 the processor 20 then writes in a page image RAM buffer 26, to effect the appropriate display. In a fashion entirely similar to the text display processing, the page image display processing also relies on a variety of pointers and counters from the RAM portion 223.

The writing of page boundaries for a single page size is provided for in the logic of FIG. 10. Other page boundaries may, in the alternative, be displayed with the use of the OR memory 227. This is a 1K byte portion of RAM into which page boundaries of a selected size is written by the processor 20 on appropriate command. When writing page image RAM 26, the processor OR's each byte, as it is developed, with the corresponding byte of the OR memory 227. If desired, the logic of FIG. 10 could be eliminated and all page boundaries could be implemented via the OR memory 227. The particular page size written into OR memory 227, and from there to the display, is determined by software (or firmware), examples of which will be described. In the alternative the EDGE developing hardware could be modified to make it more flexible so it could generate a selected page outline from a repertoire of outlines.

SYSTEM SOFTWARE

In general the processing effected to write either text or page image display has similar purpose. The processor examines document memory in the vicinity of the cursor and based on a set of fixed rules (different for page image and text) displays sequentially the characters found and arranges the display (line endings, etc.) based on a combination of mode and codes encountered. Since the text mode display is essentially unformatted, display of any portion of document memory can begin at any point. To the contrary, the page image display, since it is formatted, depends heavily on preceding text format to determine the location of the first character on a page as well as the margins in effect for the beginning of the page. If the document had previously been formatted (and if the format is not altered) the processor saves significant signposts to allow rapid writing of the page RAM 26. The information forms the page queue. If the page queue is not available or no longer accurate, it must be recreated before display can begin in page image for at least the portion of the document which precedes the displayed segment. The software which controls processor 20, to effect the functions briefly described above, and to be described in more detail hereinafter, can be divided into six segments. An interrupt processor (shown in FIGS. 15A–15C) the purpose of which is to respond to changes in the keyboard state, that is, depression and/or release of the various keys, and from this to build a keyboard queue for use by other routines. The main system program (shown in FIGS. 16.1–16.18) the function of which is to firstly respond to the keyboard queue and from that information, build the document memory, and call other routines as necessary to respond to the information passed or derived from the keyboard queue. A sentence processor, or text mode associated set of routines (illustrated in FIGS. 17.1 through 17.12) which, when called and based on information in the document memory, builds the text table referred to hereinafter, and in conjunction with the text table and the document memory writes into the text mode refresh RAM 25. A set of cursor routines (illustrated in FIGS. 18.1 through 18.11) which manage cursor position in both the text and page image display modes. A set of FAX or page image routines (illustrated in FIGS. 19.1 through 19.31) which, when called and in response to the document memory both build the page table and page queue referred to hereinbefore as well as write to the page image refresh RAM 26. And finally, a series of graphic routines (illustrated in FIGS. 20.1 through 20.12) which are used by the page image routines for the purpose of drawing page outlines other than the standard 8½×11 page outline which is, in effect, "drawn" by the hardware referred to previously. The graphic routines also put up the tab grid, temporary margins, ghost cursors and active margin indicators, as well as first and last writing line indicator.

The main function provided by the interrupt handler is to translate codes derived from the keyboard 10 into internal system codes, and store, in the order of receipt, the codes in a keyboard queue. The main system control program initializes various portions of the system hardware on power up, and thereafter is in a wait mode which is terminated when one or more signals are detected in the keyboard queue. The main system control program examines the contents of the keyboard queue in response to the particular contents of that queue either processes it itself, or calls other routines for processing, or both. These other routines can be divided into those routines directed to page image display mode, and other routines directed to text display mode. Both these groupings of routines respond to the various inputs, to alter the associated display if necessary in accordance with the input as well as in accordance with previously input text, functions, etc. Both of these groupings of other routines operate with the document memory, various page parameters such as left and right margins, number of lines on the page, etc. Both the text routines and page image routines, in the course of writing the associated text RAM or page image RAM also construct an associated table to speed up the processing, especially cursor control. Each of these tables is line organized, that is, there is an entry for each line on the display. In a first table (table A) which is related to text mode operations, the table includes 5 bytes per (display) line for the entire document, the first byte comprising 6 bits indicating a PAD distance (that is, the distance from the left edge of the screen to the first displayable character in the line) and two control bits, one indicating the presence of a carrier return (or required carrier return) in the line and the other indicating the presence of a sentence ending in the line. The second and third bytes for each line point to the location, in document memory, of the first character on the line. The fourth byte indicates a quantity for an indent tab, if such exists on the line as well as bits indicating the presence of active temporary left or temporary right margins. Finally, the fifth byte is reserved for an indent amount on the line for any block in that line. The other table (table B), related to page image display, includes six bytes per line of the portion of the document on the display. The first byte includes seven bits for the quantity PAD, and a single bit indicating format change on that line. The second byte indicates the length of the line segment in character spaces. The third and fourth bytes point to the location, in document memory, of the first character for the line. The fifth and sixth bytes of an entry in table B contain the address to another entry in table B which describes an additional segment on the line, if any.

INTERRUPT HANDLER

FIG. 15 A–C is a flow diagram of the interrupt handler.

Figure 15B:
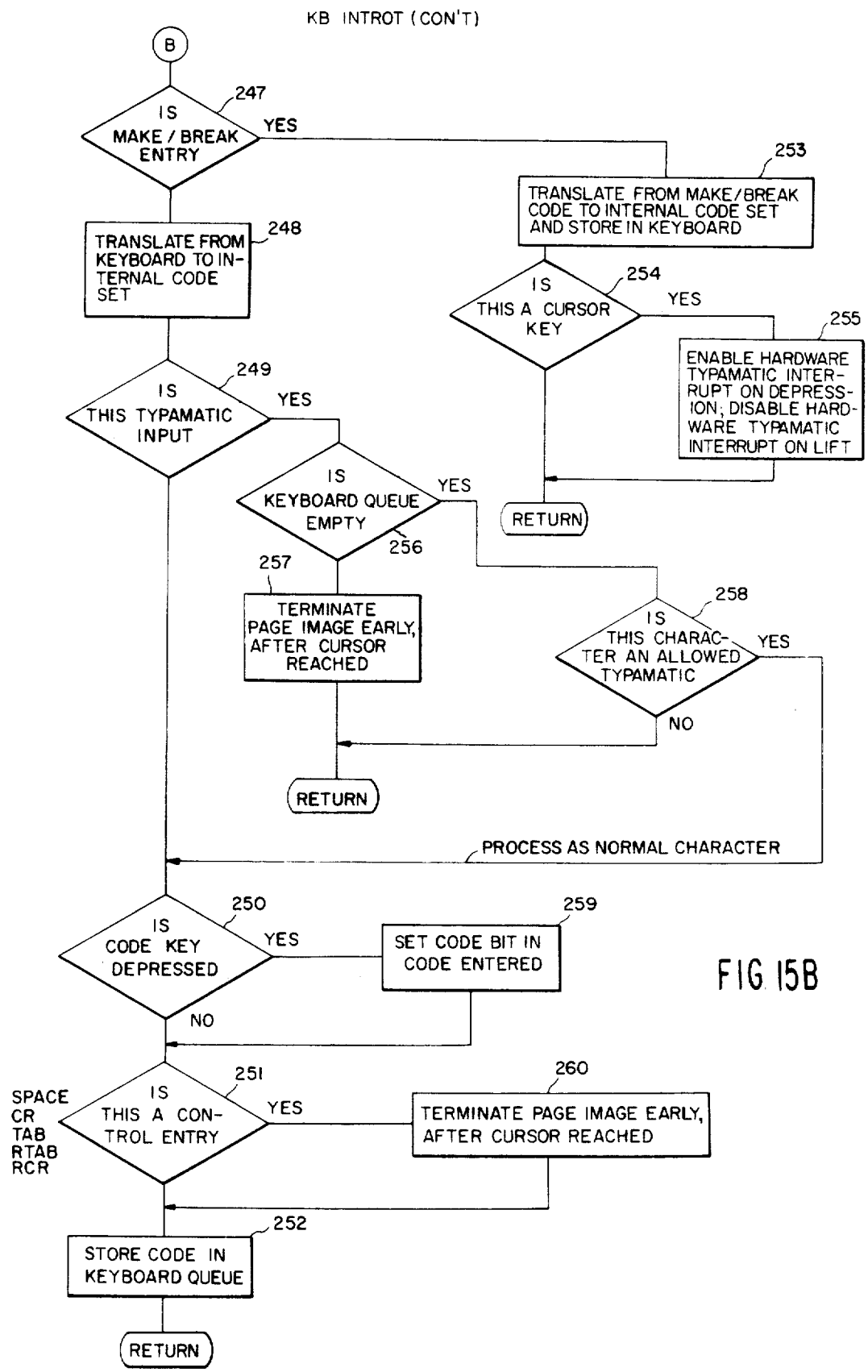

As shown in FIG. 15A, on detection of an interrupt, the processor 20 determines the source of the interrupt, printer interrupts or recorder interrupts are appropriately handled by routines not disclosed herein. If the processor determines that the interrupt is neither printer, recorder or keyboard originated, it is considered an extraneous interrupt and is merely reset. On the other hand, when a keyboard originated interrupt is detected, processing continues at decision blocks 244–246. The first determines if a keyboard inhibit bit (flag) is on, which is set in the course of servicing a printer or recorder interrupt. If that is not the case, and if this is considered a normal keyboard interrupt, then the processing skips to function 247 (FIG. 15B). The normal keyboard interrupt is that whose source lies in a key depression or release. In addition, certain repeat key capabilities are provided when a key remains depressed, and this function is implemented by a timer on the keyboard interface, when enabled. Thus, decision block 246 determines whether or not the timer has been enabled due to depression of a particular one of a selected one of the keys on the keyboard 10.

Function 247 determines whether or not the key is a make/break entry, meaning that a different code is generated on making as opposed to breaking. In either event, (functions 248 or 253) the keyboard interrupt code is translated to an internal code set. If the particular key made is not a make/break entry, decision block 249 determines whether or not it is a typamatic input. If it is such input, decision block 256 determines whether or not the keyboard queue is empty. If it is not, function 257 sets a flag to terminate page image processing early. Note however, that the code is not stored in the keyboard queue, this is to prevent storing a series of similar codes in the queue. If on the other hand, the queue is empty then decision block 258 determines if this particular character is an allowed typamatic (if it is not, this indicates the character is not a typamatic and no further processing is performed). If it is allowed decision block 250 checks to see whether the code key is depressed, and if it has been, function 259 sets the code bit. Regardless of prior processing, function 251 determines if this is a control entry, referring to a space, carrier return, tab, required tab or required carrier return. For any of these functions it is necessary to terminate the page image processing early, and therefore, function 260 sets a flag to this effect. In any event function 252 stores the translated code in the keyboard queue for processing by the main system program.

Also illustrated in FIG. 15B is the processing performed in the event that the key depression is a make/break entry, subsequent to translation of the code to an internal code set and storage in the keyboard queue. Decision block 254 determines if the key depressed is the cursor key, if it is then function 255 enables the typamatic interrupt, that is enables the referred to timer, and that concludes this processing.

Figure 15C:
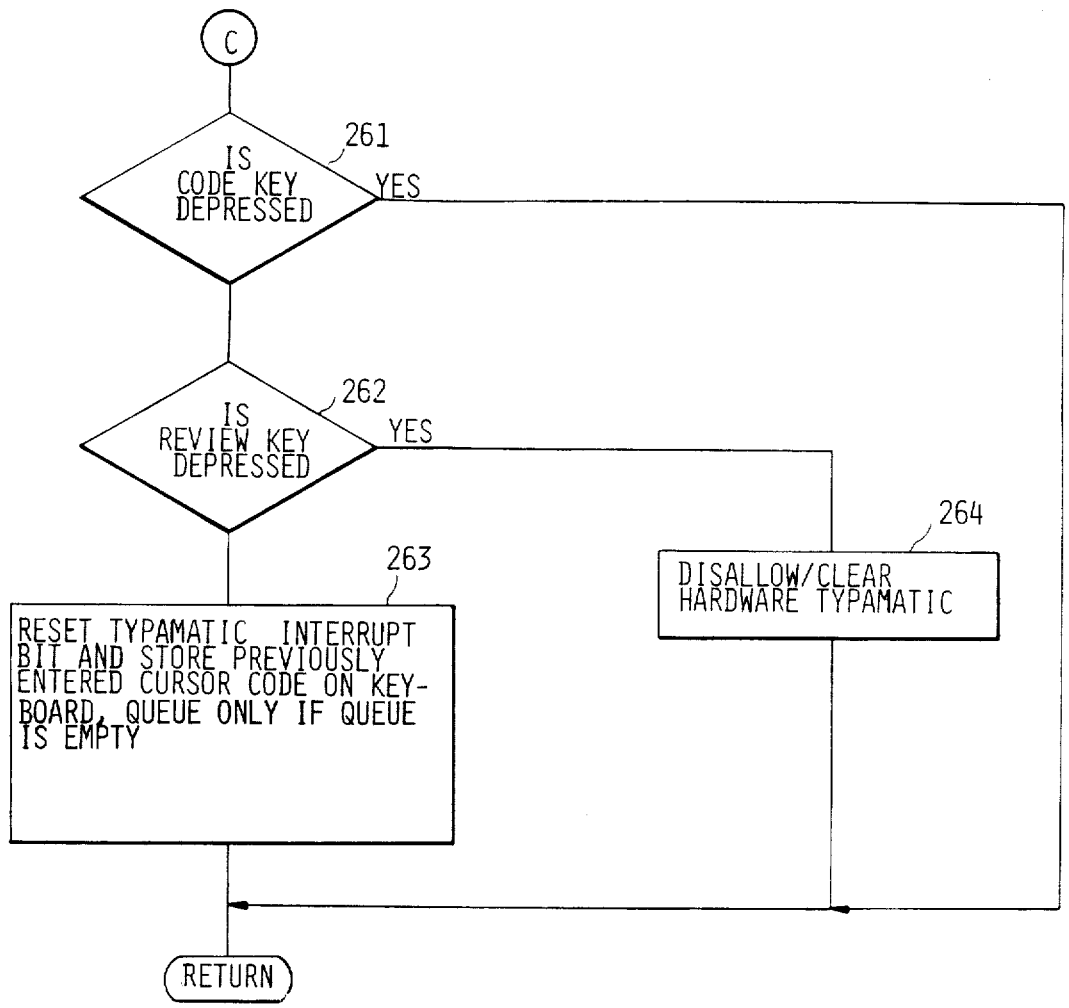
Figure 169B:
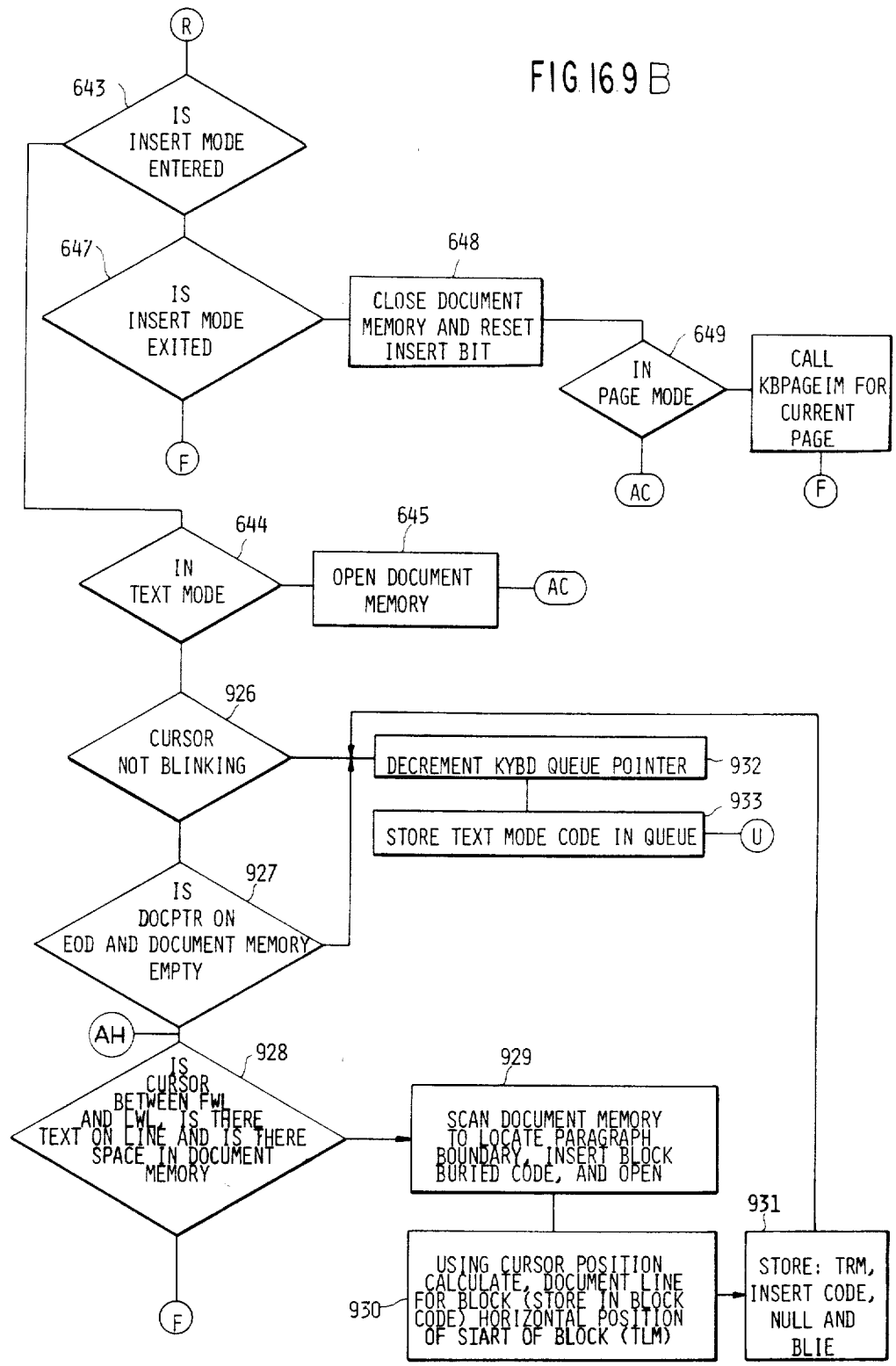
Figure 171:
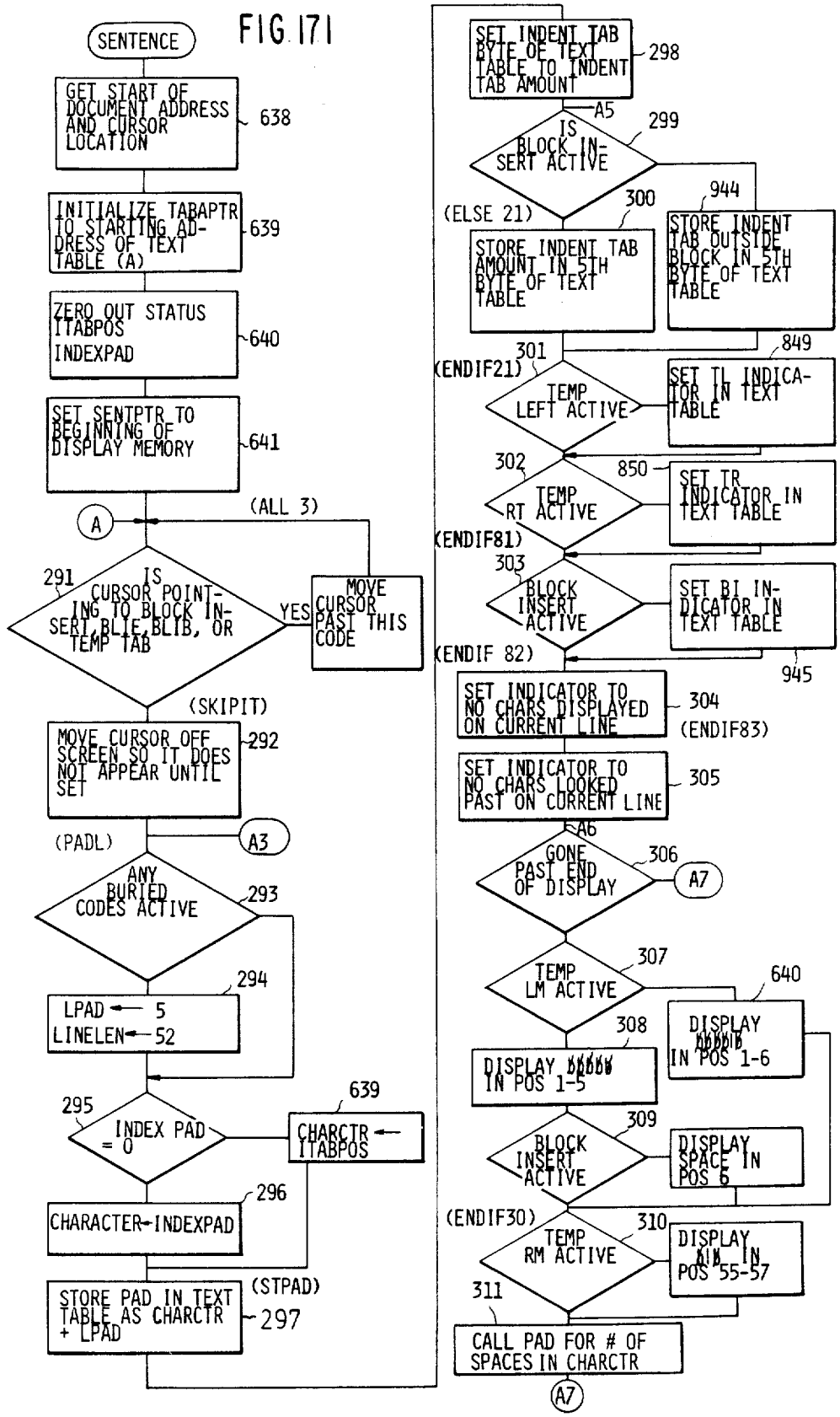
Figure 172:
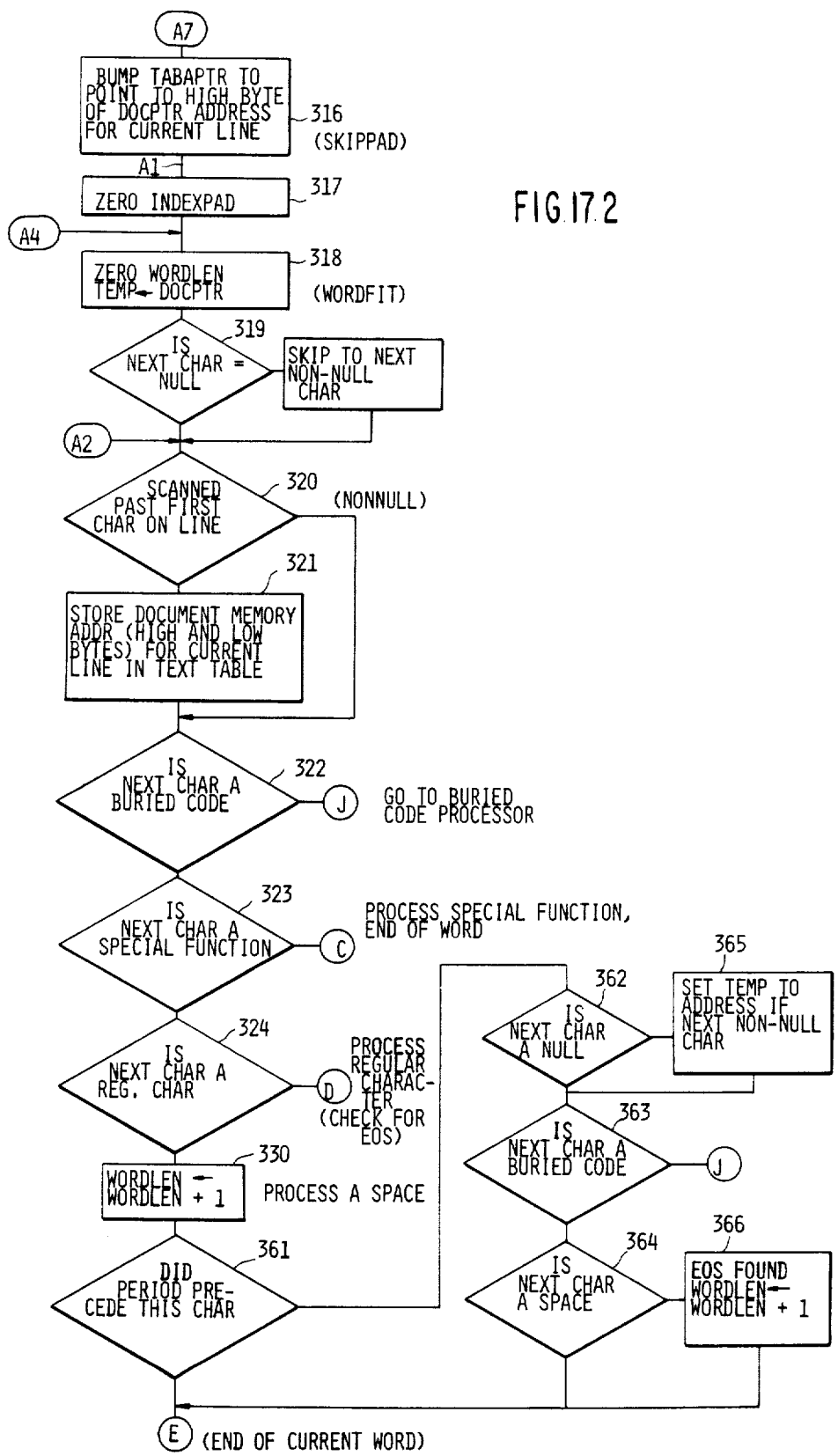
Figure 173:
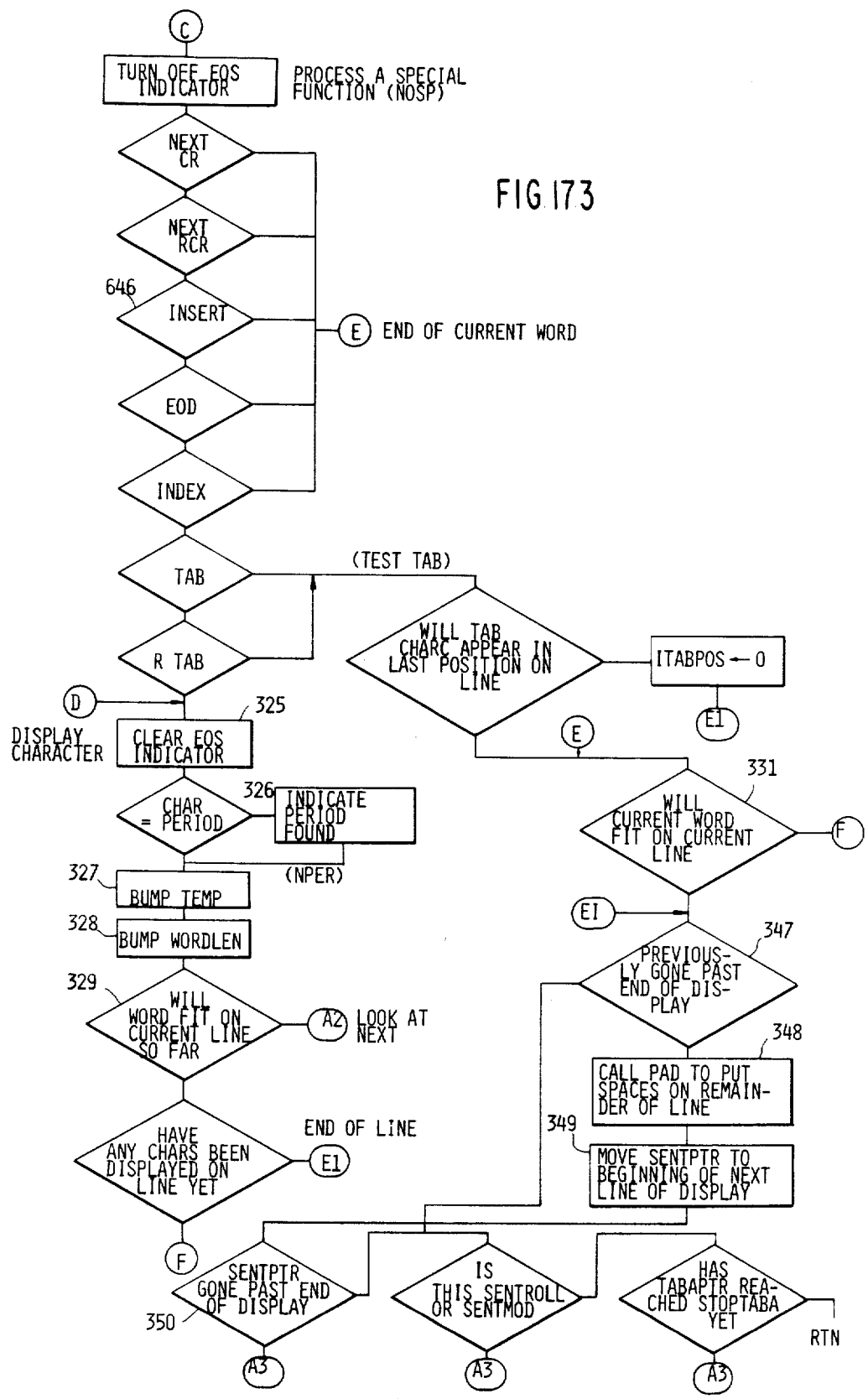
Figure 189:
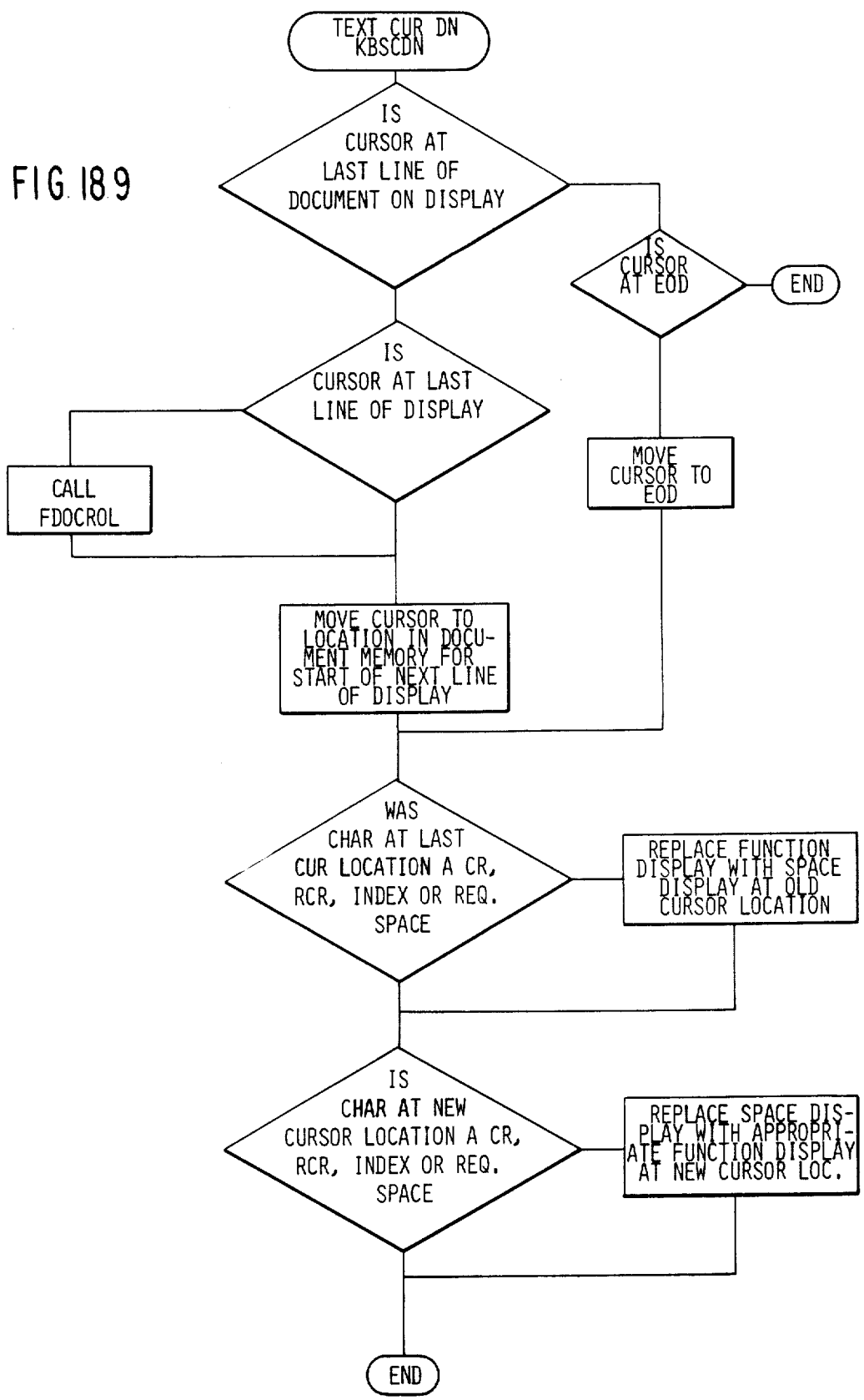
Figure 191:
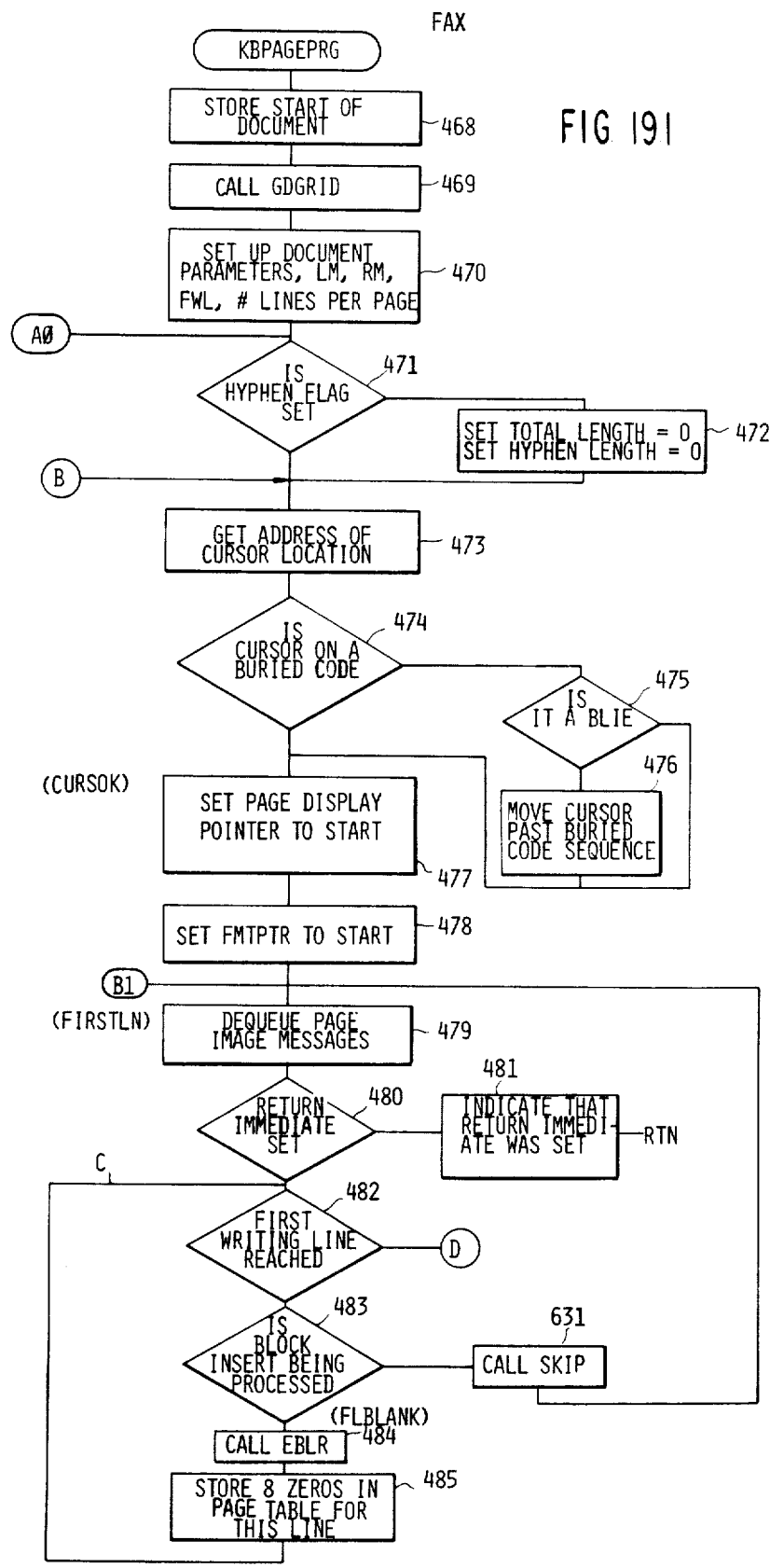

Returning now to FIG. 15A, if decision blocks 245 and 246 responded to a make/break typamatic interrupt, then the processing performed is shown in FIG. 15C. If decision block 261 indicates that the code key is depressed, then processing is terminated, i.e. the interrupt is ignored. If the review key has been depressed, as determined at decision block 262, then function 264 merely disallows or clears the referred to typamatic or timer interrupt. If the review key had not been depressed function 263 resets the typamatic interrupt bit and will store the previously entered cursor code on the keyboard queue if the queue was empty, otherwise the code is not stored. Reviewing FIGS. 15A to 15C, it will be seen that a keyboard queue is built, in response to sequential key actuations of the keyboard 10. Under certain conditions flags will be set to terminate page image processing early, the effect of this will be seen as this description proceeds.

Referring now to FIG. 16.1 through 16.18, and especially FIG. 16.1, functions 265 through 269 are performed only on power on or reset. As illustrated, these functions provide for initializing the apparatus including appropriate internal status pointers, document memory, the text and page image refresh RAMs, the "OR" memory as well as setting up the CRT controller parameters for the page image mode. Function 269, to complete the initialization operation calls the routine KBFAXSET which itself calls KBPAGEIM (the latter shown in FIG. 16.12). Set up of the CRT controller merely refers to passing certain parameters to that chip so that it will appropriately coact with the other devices to refresh from the page image RAM 26.

Once the processor returns from the routines called at function 269, function 270 is performed to check the key-board queue, if empty, the processor remains at function 270 until the keyboard queue has one or more codes therein for processing. If the queue is empty FAX messages, if any, are dequeued and displayed.

TEXT DISPLAY MODE

In order to describe the manner in which the routines illustrated in FIGS. 15 through 21 operate in the text display mode, those functions will be described including writing to the text refresh RAM, and in that regard, effecting cursor movement in response to actuation of the various cursor movement keys, providing for word underscore, delete word underscore, character underscore, delete character underscore as well as scrolling.

Before beginning the discussion some terms will be defined to assist the reader in understanding the description. Firstly, the processor 20, in the text mode, supports a number of registers, the majority of which are internal to the processor RAM. The one external register is STATUS (corresponding to the status latch 50 (FIG. 4). The following internal registers shown in the table below maintain the quantities identified opposite their name in the table.

| Register | Function |
| --- | --- |
| ITABPOS | Indent tab position |
| INDEXPAD | Quantity or amount to pad for index found on previous line |
| SENTPTR | Pointer to next unfilled location in text refresh RAM |
| WORDLEN | Counts length of word during a look ahead to see if the word will fit on the current line |
| WORDCTR | Counts the length of a word as the word is displayed |
| CHARCTR | Counts the number of characters that have been displayed on the current line |
| DOCPTR | Pointer to the address in document memory of the next character that has not yet been displayed |
| TABAPTR | Pointer to the text table (table A) |
| LPAD | Amount to pad with spaces from the left edge of the display to first displayable character |
| LINELEN | The maximum length of a line on the display |

For this description we will assume that the machine is in text display mode, and that the operator is keying in characters or functions. In initially keying in a document the operator actuates key 123 (T) in concert with key 137 (code); resulting in a "coded T". This is recognized by KBINTROT and stored (function 252 FIG. 15B) in the keyboard queue. The main system recognizes the entry (function 634 FIG. 16.2), sets DOCPTR (function 635) and, if in text mode calls KBSENTEN (function 638 (FIG 16.3)). The latter is illustrated beginning at FIG. 17.1. There, functions 638-641 initialize certain (software) registers. If there is no text in memory this concludes the processing. In that case there is no need to use coded "T".

Thereafter, significant processing awaits insertion of further data representing the desired document. Assuming the operator keys in information for a new document then function 270 (FIG. 16.1) will recognize that the keyboard queue is not empty, the processor will examine the contents of the first position of the keyboard queue, and in our example, function 271 will recognize a character or required space. Function 272 will store that code in the document memory. Function 273 then calls KBSNMDRT (routine to call the sentence modifier routine (see FIGS. 16.17)). As shown, function 274 calls KBSENMOD (see SENTMOD in FIG. 17.6). As shown, functions 277 and 278 obtain the text table (table A) pointer and the address of the cursor, i.e., the location in document memory relating the cursor to text on the display. Function 279 sets a bit in STATUS to indicate that sentence modify processing is taking place and function 281 sets LPAD and LINELEN. The parameters which are used, namely a PAD amount of 5 character spaces and a line length of 52 characters are parameters which have been employed in an embodiment of the invention which has actually been constructed. As pointed out previously, these may be varied well within available technology and components, and particularly, the line length may be increased for example up to 64. Functions 285-287 determine whether or not the particular line has an active temporary left margin, right margin or a block insert, and this is determined by reference to the text table. Thereafter, function 280 sets INDEXPAD if there is a preceding index function. Function 282 gets ITABPOS, function 283 obtains the value DOCPTR and function 284 computes the address of the text table at which point processing will terminate. Since the text table is in a rigid format, this is easily determined from TABAPTR. The routine thereafter skips to a point A (FIG. 17.1).

In keying the first character of a document the processing is relatively simple, requiring only writing the appropriate text table entries and inserting one byte to RAM 25 to display the character. As more and more characters are entered into the keyboard queue (and from there to document memory) additional entries are made to the text table and to the RAM 25. The RAM is rewritten beginning with the line the cursor is on. To explain this processing we will, in the following description, assume that a quantity of text exists in document memory and the refresh RAM 25 is being written.

As shown in FIG. 17.1, the processing determines if the cursor is pointing to a block insert, BLIE, BLIB, (BLIE and BLIB refer to internal codes designating block insert end and block insert beginning, respectively), or a temporary tab. Assuming it is not, function 292 moves the cursor off the screen. This merely requires setting the cursor location to some non-displayed location. The processing continues through functions 293 and 294 with no significant effect. At function 295, if INDEXPAD is not zero, function 296 is performed to load CHARCTR with INDEXPAD. The sum of CHARCTR plus LPAD is, as a consequence of performing function 297 stored as the PAD in the text table. On the other hand, if INDEXPAD is zero, then ITABPOS is transferred to CHARCTR (function 639). Function 298 writes into the indent tab byte of the text table. Thereafter, functions 298 through 303 are performed with no significant effect at this time. Function 304 sets a flag to indicate that no characters have yet been displayed, and function 305 sets a flag to indicate that no characters have been looked past on the current line. As will be seen, before anything is displayed, the processing determines if a particular word containing the first character on the line will fit on the line, the flags set by functions 304 and 305 are used to keep track of this look ahead process. Function 306 determines if the process has gone past the end of the display, and this is determined by comparing the present position (the contents of CHARCTR) with LINELEN. Function 308 thereafter displays five required blanks (the required blank is indicated by the character b). On the other hand, if a TLM is active then function 640 is performed to load b in position 1-4 and 6 and "1" (vertical bar) in position 5. Since functions 308, 640 write to the refresh RAM 25, the result of performing function 640 on each line subject to a TLM is the vertically directed solid line, as seen in FIG. 11F, for example. Function 311 calls a routine PAD and passes to it the quantity in CHARCTR. This routine is shown in FIG. 17.8, and it is used in effect to write the text refresh RAM. The writing occurs at function 314, and the register SENTPTR keeps in step with the writing so that it always indicates the next unfilled position. The processing then returns to point A7 (FIG. 17.2). Via function 316 DOCPTR is obtained. Functions 317 and 318 provide for zeroing of INDEXPAD and WORDLEN, and saving the contents of DOCPTR in a register TEMP. Thereafter, function 321 stores the DOCPTR in the text table, providing a ready cross-reference in the text table to the document memory address of the first character on the line. Since we have assumed that the code which initiated this processing referred to a regular character, function 324 will branch to point D (FIG. 17.3). There an EOS (end of sentence) indicator is cleared (function 325). Functions 327 and 328 then increment TEMP and WORDLEN, which provide an access to the next character in document memory and track of the length of the word that is being processed. Function 329 determines if the current word will fit on the line so far; this merely requires comparison between WORDLEN plus CHARCTR and LINELEN. Assuming it will, the processing branches to A2 (FIG. 17.2) where on this pass function 320 determines that the first character has indeed been passed. Therefore, function 321 need not be performed. Similar processing continues until the end of the word is recognized, such as for example, at function 330. Assuming that this is a normal end of word, the program jumps to point E (FIG. 17.3) where function 331 determines if the current word will fit on the line. Assuming it will, the program jumps to point F (FIG. 17.4) where function 332 resets the register WORDCTR to zero. Thereafter, function 333 compares the contents of WORDCTR with WORDLEN, since the latter indicates the length of this word whereas the former is zero, functions 334 et seq. will be performed. In effect, functions 333 through 339 form a loop which is traversed once for each character in the word, and depending on the character, the routines CDSB or DSB are called, the former to display (i.e. write to the RAM) a space or a character depending on cursor position, the latter to display (i.e. write to the RAM) a character. Each time the loop is traversed WORDCTR is incremented. The routines called are shown in FIG. 17.1. Depending on the entry points to these routines function 348 (FIG. 17.7) may or may not be performed, it is only performed to indicate that the character in this location will be displayed only if the cursor is on it. Reference to FIG. 17.4 indicates that CDSB is called to display a required space or an underscored required space. As will be seen, carrier returns (CR) as well as required carrier returns (RCR) also call CDSB rather than DSB. In any event function 349 (FIG. 17.7) sets a flag to indicate at least one character has been displayed on the current line, function 350 determines whether or not to set the cursor on this character, by comparing the character position found in SENTPTR, with the cursor position. In the event the cursor is not to be set on the character then function 351 is performed to determine if the processor has gone past the end of the display. Assuming it has not, function 352 is performed and, if the character to be displayed is not a character (such as a CR, RCR, etc.) then some or all of functions 353-355 are performed to determine what must be displayed. In any event, function 358 through 360 are performed to display the character (that is to write to the text refresh RAM), and increment SENTPTR, CHARCTR and DOCPTR. The process then returns to the calling routine (FIG. 17.4) wherein the loop is again repeated until such time that function 333 determines that the entire word has been displayed. When it is determined that the entire word has been displayed function 344 determines if the previous character was not a space, for it is was not, then a special function must be processed. If the previous character was a space then function 345 determines if the end of sentence was found. Assuming it was not the program loops to point A4 (FIG. 17.2) wherein the next word is examined in a manner similar to that previously described.

At some point in this processing, function 331 (FIG. 17.3) will indicate that the current word will not fit on the line. In that event function 347 is performed to determine if processing has gone past the end of the display. Assuming it has not, functions 348 and 349 are performed, the first calls PAD (FIG. 17.8) to fill the rest of the line with spaces (in other words, since the word will not fit on the line no portion of the word will be displayed there and any former contents are blanked out) and function 349 increments SENTPTR to point to the address of the location in the text refresh RAM corresponding to the first position on the next line of the display. Thereafter, function 350 is performed to determine if SENTPTR has gone past the end of the display. Assuming it has not the program loops back to point A3 (17.1) where the parameters LPAD and LINELEN are again reset (function 294) and additional characters are examined and displayed to fill out the new line. At some point in the processing, an end of sentence may be recognized. If function 361 (FIG. 17.2) determines that a space was preceded by a period then some or all of functions 362-366 are performed. End of sentence is recognized as a period space space sequence. Function 366 sets in table A an indicator (to be used in the cursor routines) for end of sentence (EOS). Function 366 also increments WORDLEN by unity to account for the second space, and the next word is examined.

During the display operation, if at any time function 344 (FIG. 17.4) determines that a word ending was not via a space, then a special function has been recognized, the program loops to point G (FIG. 17.5) for that processing. The character's identity is determined, in a specified order, in one of functions 367 through 374. As shown in FIG. 17.5, when a carrier return is recognized (function 375) a bit is set to indicate a CR for appropriate writing in the text table (function 376) and a call to CDSB, to display a space unless the cursor is on it. Required carrier returns, in addition, terminate indent tabs, and any temporary margins. After a return from CDSB entered via a carrier return, processing loops back to point E1 (at function 347—FIG. 17.3) indicating end of line.

On the other hand, tabs and required tabs both call DSB (functions 380-381, 383-384—FIG. 17.5) for display of the right directed arrow (see FIG. 11E, F and G for examples). The corresponding functions 382 and 385 reset the status bit to indicate no characters have been displayed on the current line and the return is to point A4 (function 318—FIG. 17.2). Recognition of an insert code results in a display (functions 378-379—FIG. 17.5) similar to the end of a current line. This leaves the remainder of the current line blank for the inserted characters. As will be seen, when insert is again encountered any remaining space is deleted and the display is closed up. Indexes are recognized (function 372) to ensure that an index is effected and maintaining current horizontal position, INDEXPAD is loaded with CHARCTR (function 386), via functions 387 and 388 CDSB is performed and the return is as the end of a current line.

End of document code is recognized (function 373) and function 389 appropriately writes the text table. Function 390 re-initializes LPAD and LINELEN, so as to be ready for additional keying and display, function 391 calls CDSB for display. Function 392, in the event the end of display is not reached, calls BLEND (function 393) which blanks to the end of the display.

The routine BLEND is shown in FIG. 17.9. As shown there functions 394 through 396 determine how far to blank on the current line and then call PAD (FIG. 17.8) to effect that purpose. On return, function 397 through 399 form a loop, blanking an additional line on each iteration of the loop until function 398 determines the end of the display has been reached.

Accordingly, via the foregoing functions the initial text entered by the operator results in building a keyboard queue, which is then used to both fill the document memory and then write the text table and the text refresh RAM.

The operator can, after keying in initial or "normal" text, key in text "blocks", a discussion of that however will be postponed until after a description of the page image mode. Prior to that discussion, however, reference will be made to the cursor routines to indicate how cursor motion is constrained during text mode display.

TEXT CURSOR PROCESSING

Assuming the operator has actuated one of the cursor keys; in the course of processing (of FIG. 16.1) function 400 will identify a code, in the keyboard queue, corresponding to a cursor movement key, and the processing loops to point J (FIG. 16.8). At that point, the display mode is determined, and assuming that function 401 determines that the machine is in the text mode, function 402 examines whether or not the function input was cursor right. Depending on the particular cursor motion required, one of the routines KBSCRT (for cursor right), KBSCLT (for cursor left), KBSCUP (for cursor up) or KBSCDN (for cursor down) is called (assuming the processor is not in the insert mode which is tested for at functions 403-405). These routines are shown in FIGS. 18.5, 18.8, 18.6 and 18.9, respectively. On the other hand, if an insert mode different processing shown at entry AE (FIG. 16.8) or at entry point AF (FIG. 16.10) is effected. Discussion of cursor processing in insert mode will be postponed.

Turning to FIG. 18.5, a text cursor right is executed as shown. Function 450 determines if the next displayed character from the document memory is on the next line of the display. Since the text table indicates the address in document memory of the first character on the next line of the display, function 450 need merely compare the address of the next displayable character with the corresponding entry in the text table for the next line of display. Assuming that the next display character is not on the next line, function 451 determines if the cursor is on an EOD code; for if it is, the cursor cannot be moved forward, in fact, it is not moved at all. If that is not the case, the cursor is moved to the next displayed character by writing an appropriate address in the CRT chip at function 452. On the other hand, if the next displayed character is on the next line, function 453 determines if the cursor is presently on the last line of the display, if it is, the routine DOCROLL is called to scroll the display. Either at the conclusion of scrolling, or if no scrolling is required, function 454 moves the cursor to the first displayed character on the next display line by appropriately writing to the CRT chip. Thereafter, function 455 determines if the cursor was last on a character which is displayed only with the cursor thereon. If that is the case then the function which has previously been displayed is replaced by a space, at function 456. Function 457 looks at the new character the cursor is on, and if it is one of those which must be displayed only if the cursor is on it, then function 458 replaces the space with the appropriate function by altering the contents of the text RAM at the cursor location. From the foregoing it should be apparent that the operator is not capable of moving the cursor, in text mode, to any location which does not presently contain a character (or space) which is actually being displayed. More particularly, the operator cannot position the cursor on blanked areas of the display. Furthermore, specially defined functions, i.e., CR, RCR, INDEX or REQUIRED SPACE are normally displayed as a space, and will only carry an appropriate graphic if the cursor is located thereon. FIG. 18.8 illustrates the processing carried out for cursor left, which is to a similar effect.

The processing carried out for cursor up is shown in FIG. 18.6. As shown there, function 413 determines if the cursor is on the first display line. If it is, function 414 determines if the cursor is at the start of document, for if it is, the cursor cannot be moved up or back at all, and this ends the process. On the other hand, function 416 determines if the cursor is on the first line of the display, and if it is, then the routine RVDOCROLL is called to scroll the document back so as to allow the cursor to move up. After the processing, or if that routine is not called, function 417 moves the cursor to the start of the prior line, i.e., the leftmost displayed position. Thus, not only does the cursor up move the cursor up one line if possible, it also moves the cursor to the start of the previous line. Thereafter, functions 418 to 421 determine whether or not the previously displayed character must be changed since the cursor has left it, or if the character newly associated with the cursor must be changed because the cursor is on it. Again, the processing illustrates how cursor movement is constrained. The processing for cursor down motion is shown in FIG. 18.9; in view of the preceding discussion, discussion of this processing is not believed necessary.

As seen, because of cursor movement, a scrolling may be effected, either forward or reverse. The routine RVDOCROLL is shown in FIG. 18.7. As shown, functions 422 through 425 set a display line counter to zero, and then examine the first line of display to determine the presence of CR, RCR, or EOS. If a line thus examined has one or more of these codes then the loop is exited to function 427. In this fashion, the first line in the display having one of those codes is selected, and the display line counter, which has been incremented each time the loop was traversed, function 424, identifies the first line so found with that code. If, on the other hand, the screen did not contain any of these codes, then at the last line of the display, function 425 jumps to function 426 to reset the display line counter to zero. Accordingly, either following function 423 on identification of one of these codes, or following the completion of function 426, function 427 calculates the top line of a new display by reducing the present value of the display top line by 11 less than a number in the display line counter. This provides for a "carry-over" in a reverse scroll to maintain sentence or paragraph boundaries. With this calculated top line value, function 428 calls SENTROLL. This routine is shown in FIG. 17.6. The routine SENTROLL, starts with the new top line as calculated, to create a new display from the text table and document memory.

The forward document scroll, FDOCROLL, is similar to the processing shown in FIG. 18.7 with three exceptions, instead of examining the first line of the display, as does function 422, the last line of the display is examined. Rather than looking at the next line of a display, at function 426 an earlier line is examined, and instead of reducing the old top line value to achieve the new display top line value, in doing a forward scroll that value is calculated by increasing the present displayed top line number by the appropriate amount.

In addition to simple cursor motion right, left, up or down, the cursor can be advanced one word forward or back (in text mode only) via keys 109, 110 (FIG. 2). When one of these keys is depressed an indicative code is inserted in the keyboard queue. It is examined by the main system program, via K (FIG. 16.1 to FIG. 16.5) where it is recognized at function 701. Processing skips, via O (to FIG. 16.11). Depending on whether key 109 or 110 (for forward or reverse motion, respectively) was depressed either function 702 or 703 will recognize the code. Accordingly, functions 704 or 705 will determine if the machine is in insert mode, if not, either KBSWCFW or KBSWCBK is called via functions 708 or 709. Discussion of cursor motion in insert mode will be temporarily postponed. The sub-routines are illustrated in FIGS. 18.10 and 18.11, respectively.

FIG. 18.10 shows the processing for moving the cursor forward one word. Functions 712, 715 and 718 form a loop which is traversed once per character until a word ending is located. Each time the loop is traversed TEXT CUR FWD (TEXT and SEN refer to the text mode processing) is called (FIG. 18.5) to move the cursor forward one character. When a space is located function 714 (FIG. 18.10) sets the function flag. On reaching the character or required space beyond the word ending the flag is reset (function 717) and processing returns. Similar processing is carried out for word reverse (FIG. 18.11) except that TXT CUR RV is called (function 725) to back up the cursor. In either processing if EOD or start of document is encountered processing terminates.

UNDERSCORE

In this section we will discuss the functions underscore, delete underscore, word underscore and delete word underscore.

If in the course of processing the keyboard queue the processor determines, at function 437 that an underscore code is detected, then function 438 is performed. At function 438 the document memory location corresponding to the present cursor position is examined. This is found by referring to DOCPTR. This point in the document memory is examined and if a character is located there the underscore bit for that character (bit 7) is set; a similar storage will be effected in the text refresh RAM as will be explained. On the other hand, if the document memory does not contain a character at this location, then the operation is ignored. Thereafter, function 273 calls KBSMDRT which will call KBSENMOD to modify the display. On the other hand, if the operator had asserted keys 137 and 122 (see FIG. 2) simultaneously, indicating a desire to perform a word underscore, then in the course of processing, function 439 determines that a coded function has been read from the queue. The function 441 (FIG. 16.3) recognizes a coded I (the word underscore key-122) and therefore functions 442 and 443 would call firstly KBWUSCOM (FIG. 16.13) passing a "set" flag.

To see this processing in detail we now refer to FIG. 16.13.

KBWUSCOM begins at function 444 to scan the document memory backward to find the beginning of the current word. This is determined by locating a space (or a function or a buried code) immediately preceding a character. Thereafter, function 445 scans the document memory forward until the end of the current word is found, this again requires locating a character followed by a space (or function or buried code). In the course of forward scanning through the document memory, from the beginning of the word, function 445 either sets or clears the underscore bit of each character. Since the program was entered, at function 443 passing a "set" flag, each underscore bit in the document memory is set via function 445. After function 445 the subroutine returns to FIG. 16.3. Function 443 is a call to KBSWCBK, the processing for which is shown in FIG. 18.11. The function of this subroutine is to move DOCPTR to the beginning of the word, so that when KBSENMOD is later run to re-write the display, the entire word becomes underscored. More particularly, with DOCPTR now pointing to the beginning of the word, following the call to KBSWCBK, function 273 (FIG. 16.1) calls KBSNMDRT (FIG. 16.17) which calls KBSENMOD (FIG. 17.6) to rewrite the text display from the cursor location forward. To ensure that the coded I (key 122) produces underscoring of an entire word, the processing first writes document memory (KBWUSCOM—FIG. 16.13), moves the cursor backward to the word initiation (KBSWCBK) and then rewrites the text display (KBSENMODFIG. 17.6).

Before describing operation of delete underscore and delete word underscore we will examine how the processor enters and leaves the delete condition. When the operator asserts the delete key 106 (FIG. 2) the code in the queue is recognized at function 446. Thereafter, function 448 sets the delete condition on depression and resets the delete condition on lift; the delete condition is merely a flag maintained by the processor, so that the flag is set so long as the key is depressed, but as soon as the key is released, the flag is reset. Accordingly, delete is a mode or function modifier, by itself it has no function. Processing then skips to function 449 to look at the next entry in the queue.

Accordingly, when the next code is recognized, the processor at function 459 determines that the processor is in the delete condition (assuming the delete mode flag is set). Accordingly, the processing skips via point I to function 460 et seq (see FIG. 16.7). In the course of this processing, function 462 will recognize that the entry is the delete hyphen or delete underscore and the cursor is on a character. Accordingly, function 463 deletes the underscore bit of the character in the display refresh RAM (located at cursor location) and in the document memory, (located via DOCPTR). Following that function 464 calls KBSCRT for a cursor right function. Thereafter, the processing returns to function 449 to read the next code in the queue.

If, rather than a simple delete underscore, the I (key 122) was actuated in a delete condition, then function 642 would recognize the code. Accordingly, processing similar to that described in connection with word underscore is effected except that rather than "setting" the underscore bit in document memory, that bit is cleared by function 643. Processing continues at function 644, to call KBSWCBK and then with KBSENMOD to rewrite the display.

Most of the rest of the processing in FIG. 16 relates to FAX or page image modes (which will be discussed below) except for the insert mode operations.

INSERT

If, in processing the keyboard queue the processor recognizes assertion of the insert key 104 (FIG. 2) function 465 directs the processing via point Q to FIG. 16.9A.

Functions 650 and 934 direct processing to R, see FIG. 16.9B. At this point function 643 recognizes an entry to the insert mode. Function 644 checks that the machine is in text mode, and if so, function 645 opens the document memory. By this function, all codes in document memory to the right of DOCPTR are moved down to the maximum extent possible so that all available memory is directly adjacent DOCPTR. The processing then skips (AC) to function 273 (FIG. 16.1) to call KBSNMDRT (FIG. 16.17). There function 274 calls KBSENMOD (FIG. 17.6) to rewrite the display. This rewriting begins at the beginning of the display line in which the cursor is located. KBSENMOD rewrites the lines on the display, however when the document memory had been opened (function 645) an insert character was recorded in document memory. In the course of rewriting the display, when that character is encountered (function 323—FIG. 17.2) the processing skips to point C (FIG. 17.3). There function 646 recognizes the insert character, this results, at function 348, in blanking the remainder of the line. Thereafter the remainder of the text display is written. Accordingly, going to insert mode opens up both document memory and the portion of the display to the right of the cursor. However, the "opening" or "hole" is of different extent. In document memory the "hole" is as large as possible. In the refresh RAM the "hole" is the remainder of the line the cursor is on. As new text is now added, KBSENMOD adds the new text into the previously blanked area on the display by continually moving the insert character ahead of inserted text. When the inserted text completely fills the previously blanked space, the insert character is pushed down to the next line with similar results, i.e., the next display line is blanked for the provision of additional inserted text. On the other hand when the main program recognizes the insert character in the keyboard queue, and the machine is in insert mode, then function 647 (FIG. 16.9B) recognizes an exit from insert mode. Accordingly, function 648 closes the document memory, resets the insert bit (exiting insert mode) and function 649 directs the processing to call KBSNMDRT which in turn calls KBSENMOD to rewrite the text display to in effect "remove" any existing blank space to close up the display. If in insert mode, the operator operates either key 109 or 110, move forward or reverse, then function 701 (FIG. 16.5) directs processing (via O) to FIG. 16.11. Since the machine is in insert mode, function 706 or 707 is performed to look for a next or preceding word initiator, when found function 710 or 711 moves the "hole" in document memory to that location. Processing then skips, via AC, to function 273 to rewrite the display to illustrate the new insert location.

PAGE IMAGE OR FAX MODE PROCESSING

To explain the processing performed to write the page image display (refresh RAM 26) we will assume that the operator has keyed in some text, and now wishes to examine the image the already keyed in text will produce if printed. To effect this the operator asserts key 108 (FIG. 2) the page image key.

When the code corresponding to that key is detected at function 465 (FIG. 16.1) the processing skips to Q (FIG. 16.9A) where function 650 recognizes the code and causes function 652 to be executed.

Before describing the page image processing in detail, some terms will need to be defined to assist the reader in understanding the description. Firstly, the processor 20, in the page image mode supports a number of registers, the majority of which are internal to the processor. The internal registers shown in the following table maintain the quantities identified opposite their name in the table.

| Register | Function |
| --- | --- |
| WORDCTR | Counts the length of a word during a look ahead to see if the word will fit on the current line. |
| CHARCTR | A character counter giving the present position on the current line; this position or count does not include anything in PAD (left margin, temporary left margin or index amounts) but does include indent TAB amounts on the line in which the indent TAB occurs. |
| DOCPTR | Points to document memory. |
| FAXPTR | Points to the page image refresh RAM display memory. |
| INDEXPAD | Pad amount for index found on previous line. |
| TEMPLMAR | Current temporary left margin amount. |
| TEMPRMAR | Current temporary right margin amount. |
| DEFLMAR | Default left margin. |
| TABBPTR | Table B pointer. |

Table B, as mentioned above is the page image or FAX table created during running the page image program for cross-reference between cursor movement and document memory. The table provides 8 bytes for each line in the display of display memory, these include one byte for the PAD amount plus an indicator indicating whether or not temporary parameters are modified on the line, one byte for the length of the line in character counts, two bytes for the address in document memory of the first character on the line, and two bytes for a link to the next segment, this may be to the next line or to a location in document memory for a block insert if such appears in that line, and finally two bytes for each line are presently unused.

On POWER UP or RESET function 269 sets the CRT controller 27 for page display, via KBFAXSET and KBPAGEIM shown in FIG. 16.1. As shown in FIG. 16.12, when KBPAGEIM is called, function 466 calls KBPAGEPRG passing to it the location in document memory of the start of the current page. On first processing text for a page display a page review queue or simply page queue is created which, among other things identifies for each page the start of the page, i.e., the address in document memory of the first character on the page, as well as an indication of the tabs and margins in effect at the beginning of a page. In the absence of any changes to text on preceding pages, function 466 merely refers to the page review queue for the necessary information. KBPAGEPRG is shown in FIG. 19.1. Initially, function 468 stores the start of a document, i.e., a document memory address. Thereafter, function 469 calls a subroutine GDGRID (FIG. 19.28) which can put up or delete the format line and columnm. As shown therein, this subroutine calls GDGRAFOR (see FIG. 20.1) which merely ensures that the grid area of the display memory is blanked (function 528). Following that function 529 determines whether the GRID is to be displayed. If it is, functions 530 and 531 are performed, and when the subroutine GDGRAFOR is discussed, the manner in which this is effected will become clear. At this point, however, assume the GRID is not to be displayed. Function 532 calls GDGRAFOR to clear the "OR" memory of any margins or tab display. Functions 533 and 535 determine whether a different page outline is to be displayed. Assuming no such special page outline is to be displayed, function 537 calls SETGHOST. FIG. 19.26 illustrates that subroutine. Function 538 determines if the GRID indicator is on. If it is, functions 539 and 540 may be performed. However, assuming it is not then SETGHOST returns and thereafter GDGRID returns.

The preceding description is based on the assumption that the special page images "CARD" and "ENVELOPE" are not required. Normally the hardware (via EDGE) writes the image of a 8.5×11 inch page on the screen to both inform the operator of the correct paper size for printing and to allow the operator to see the relationship between the document margins and the actual page boundaries. In accordance with the invention the operator can select other page sizes, "CARD" refers to an 80 column punch card outline (an IBM card) and "ENVELOPE" refers to an envelope outline. Assertion of keys 119 to 120 (see FIG. 2) selects one or the other of these images. Thus functions 533 or 535 check to see whether one of the special images had been selected; if so the OR memory is appropriately written. The manner in which this is effected is described in connection with a discussion of FIGS. 20.1-20.12. However, it should be emphasized that other images could also be written in this fashion.

Thereafter, function 470 (FIG. 19.1) sets up the document parameters, for example, margins, location of first writing line and number of lines per page. If these have not previously been selected by an operator, default parameters are selected and stored. Thereafter, function 471 determines if the hyphen flag is set, we will later explore the processing in the event that flag is set, but at this point we will assume it is not. Thereafter function 473 gets the address of the cursor location and function 474 determines if the cursor is on a buried code. Functions 474-476 are arranged to jump the cursor past a block insert. In the course of writing the page image or FAX refresh RAM, first the main text is written, that is "blocks" are skipped via functions 474-476. Thus, if either the cursor is not on a buried code or once the code has been passed, function 477 sets the display pointer FAXPTR to START, i.e., the beginning of the refresh RAM 26. Thereafter, function 478 sets FMTPTR. This is a pointer to the format or "OR" memory. Function 479 dequeues page image messages. These messages result in mode indicators or prompts on the display; "BL" in FIG. 11B is an example. Function 480 checks to see if the return immediate flag is set. That flag may be set at functions 257 or 260 (see FIG. 15B). Assuming it is not function 482 determines if the first writing line has been reached, and assuming that the first writing line has not been reached, function 483 will be performed to determine if a block insert is being processed. Assuming it is not, function 484 calls EBLR indicating an entire line is to be blanked (see FIG. 19.21). As shown in FIG. 19.21 the subroutine includes a loop of functions 542-545 which calls DISPLAY (FIG. 19.22), to display a space each time DISPLAY is called, and it is called once per loop. Each time the loop is traversed the number of positions to be blanked is decremented, and when either the number of positions to be blanked is equal to zero or a number of character spaces are blanked which is greater than the number of spaces on a line, the loop is terminated. In the latter event, function 546 advances FAXPTR and FMTPTR to the next line and a return is effected. Reference to FIG. 19.22 shows how DISPLAY operates. A register, FAXBYTE eight bits long is loaded serially, and when it is full it is output to the FAX RAM at a location addressed by FAXPTR. The bit which is loaded on each pass of DISPLAY is a 1 if a character or graphic is to be displayed by a dot at that location, and is a 0 otherwise. If a 1 is loaded from FAXBYTE to the refresh RAM, then a 4×4 pixel is illuminated, otherwise it is not. Referring now in more detail to FIG. 19.22, function 547 shifts FAXBYTE left, 1 bit. Function 548 sets an indicator to indicate that something has been displayed on this line. (This indicator will be checked by other routines). Function 549 determines if a character is to be displayed or not. If it is, function 550 sets the low bit. Otherwise, function 551 does not set the bit. Function 552 determines if the bits in FAXBYTE will go past the right edge of the display and if they would function 553 sets an indicator to note an attempt to pass the edge of the page. If that is not the case function 554 increments FAXCTR and function 555 determines whether or not it is equal to eight, i.e., is FAXBYTE full. If it is, function 556 logically OR's FAXBYTE with the byte at the address pointed to by FMTPTR (the format memory or OR memory). Thereafter, functions 557 and 558 increment FMTPTR so it points to the next byte in the format or OR memory and function 558 stores the result of the logical OR operation mentioned above in the refresh RAM at FAXPTR and then increments FAXPTR.

Function 559 clears FAXBYTE and FAXCTR. Thereafter, function 560 is executed to increment CHARCTR to increment the number of characters written on the current line. This function is also performed in the event that FAXBYTE is not full.

The display routine in summary is used to display a single character as either a dot or space. To do this FAXBYTE is shifted to the left one position, the rightmost bit is either set or not set depending on whether a dot is to appear at that position or not, and when FAX- BYTE is full it is put into the refresh RAM and cleared out to accept eight more bits.

When EBLR returns (FIG. 19.1) function 485 stores eight zeros in the page table for this line inasmuch as there is nothing on the line. The loop of functions 482-485 is continued until the first writing line is reached. At that point, processing skips via point D to function 486 (see FIG. 19.3).

As shown in FIG. 19.3 in the initial processing, function 497 increments the number of lines displayed on the page so far, in the course of our example the result of function 497 would be 1. Function 498 checks INDEX-PAD, and if it is non-zero, function 499 sets the PAD amount to INDEXPAD.

On the other hand, if INDEXPAD is zero, then the TEMPLMAR (temporary left margin) is used to set PAD (function 500). Thereafter, function 505 zeros INDEXPAD and the PAD amount is stored in the page table. Function 503 thereafter calls EBLR for the PAD amount. As before EBLR blanks out the PAD amount and function 504 zeros CHARCTR, thereafter the processing skips to point F (FIG. 19.4). In pertinent part this processing includes zeroing WORDCTR (function 508) and assigning a temporary document pointer TEMP used in the look ahead to determine if the next word will fit on the line. Thereafter, function 509 gets the next character from the document memory; this is pointed to by TEMP. Functions 510 through 517 examine this character to determine if it is an insert code, block insert begin, a space or some other special function. Assuming it is not, function 518 increments WORDCTR and function 519 determines if the word will fit in on the line so far. Assuming it will, function 520 checks to see if the hyphen flag is set and assuming it is not, the processing loops back to function 509 to get another character from the memory. In this fashion, a series of characters are retrieved to either find a space (function 514), a special function (function 517) or determine at function 519 that the line length has been exceeded. Assuming a space is first found the processing skips through point H2 (see FIG. 19.7) to display the word, assuming the hyphen flag is not set. Functions 563 through 567 check for an insert code, a block insert and for the presence of the cursor, assuming none of these are true, then function 569 determines if this is the first character to be displayed on this line. In our example, it is, and thus processing moves to function 570 to check whether DOCPTR bytes have been set in the page table; assuming they have not, functions 571 and 572 are performed to determine whether this is a special function (and assuming it is not) whether the character is a space. If it is, function 573 sets an indicator that this is a space, on the other hand, function 574 sets an indicator that this is a character. Thereafter, function 575 calls DISPLAY to display a space or character depending on the indicator that had been set at functions 573-574. Since we have already discussed the manner in which DISPLAY operates, we will continue with the processing, where function 576 determines whether or not the character just displayed was a space. Assuming it was not, the processing skips through point H1 to continue displaying the present word. Function 577 increments DOCPTR to point to the next location in the document memory and similar function continues. When the end of the word is reached function 576 skips to point F (FIG. 19.4). The processing at this point first looks to see if the next word in the document memory will fit on the line, and if it will, similar processing is effected.

In this fashion, each line of the page RAM is written, taking into account first the page width and page margins. In this first processing as we have noted at function 512, the processing skips past blocks in document memory.

Aside from characters and spaces, the character retrieved from document memory could be a special function which is recognized at function 517 (FIG. 19.4). In that case, the processing skips to point H (FIG. 19.7). After processing through functions 561, 563, 565, 567 and 569, if function 571 recognizes a special function, the processing skips via point K to what is in effect, a directory, shown in FIG. 19.8. There, depending upon the specific special function found, the processing skips to one of a number of different points. For example, if the special function found is a carrier return, processing continues to point M1 (FIG. 19.12). There, functions 577 and 578 increment DOCPTR and CHARCTR and set a flag to indicate the text has been processed in this block or line; the processing then skips to point G1 (FIG. 19.6). There function 579 checks to see if CHARCTR is less than 85, if it is, function 580 sets the byte in table B for the length of the line to the quantity in CHARCTR. The remaining functions 581-586 provide for writing other parameters in the page table. In the event that CHARCTR is greater than 85 then function 587 sets the length in the page table equal to 85. In the event that a block insert is being processed function 588 calls SKIP to skip to the end of the line. In the event that the special function was a required carrier return rather than a carrier return, then preceding function 577 (FIG. 19.12), functions 589 and 590 would be performed to indicate in the page table that a temporary parameter is set (since required carrier returns terminate temporary margins and other temporary parameters) and accordingly, function 590 resets the temporary parameters.

Processing for a required space merely requires a call to DISPLAY since it is not considered a word ending (see FIG. 19.9).

Processing for an index is shown in FIG. 19.10. Function 777 stores in INDEXPAD the sum CHARCTR plus PAD. This is the character position on the display at which the index was encountered. Function 778 increments CHARCTR and function 779 sets a flag to indicate that text within the current block has been processed so that any temporary parameters encountered will not modify the default parameters. Thereafter, processing skips via G1 to FIG. 19.6 where line ending housekeeping is performed.

When the next line is processed (see FIG. 19.3) function 498 will determine that INDEXPAD is non-zero (since it was written at function 777). Accordingly, that value is transferred to PAD at function 499 and INDEXPAD zeroed at function 505. Accordingly, an index function ends one line, and begins the next vertically below the index.

Processing for a temporary left margin is shown at FIG. 19.17. Function 780 writes to the page table to indicate a temporary parameter has been changed on the current line. Function 781 checks if CHARCTR is non-zero. If it is, processing skips via G1 to advance to the next line (before processing the temporary margin). Since DOCPTR is not incremented the next line will begin with the TLM. There function 782 will advance FAXPTR to the beginning of the line and FAXCTR and FAXBYTE are zeroed (by function 783). Functions 784-787 ensure that TLM is legal (greater than zero and less than 85). Functions 788 and 789 store the new TLM and save the global left margin, respectively. To begin writing the new line assuming a block insert is not processed function 790 (FIG. 19.18) calls EBLR to blank the TLM amount. Function 792 zeros CHARCTR and function 793 advances DOCPTR past the TLM codes in document memory. Function 794 retains the PAD amount, function 795 sets a flag to indicate DOCPTR has already been set in the page table for the current line. Function 796 checks if this is a block insert, if so function 797 changes the default parameters to the TLM becomes a global left margin for this block.

Processing for a temporary right margin is shown in FIG. 19.13. The primed functions 780', 784', et seq. all have counterparts in the left margin processing; accordingly, no further discussion is deemed necessary.

Processing for an indent tab and tab is shown in FIG. 19.16. The tab processing comprises functions 901–903. Function 901 determines the current display position from the left margin. Function 902, with a pointer to the active tab grid compares the present distance to the next higher tab position. The quantity is returned at function 903. Function 906 calls EBLR to blank out the required amount to the next tab point. Assuming the function is not an indent tab (checked at function 904) the next word is checked.

On the other hand, for an indent tab, function 900 is first performed to set a flag to distinguish tab and indent tab. The flag is checked at function 904. For indent tabs, function 905 is performed which sets TLM to the current position.

Processing for a temporary tab is shown in FIG. 19.11. In order to ease tab limitations, the processor manipulates each different tab grid as a unit. It is located in document memory and a pointer is used to access the grid when required. In the processing, function 907 provides for writing a bit to the page table to indicate a parameter change. Function 908 rewrites the tab grid pointer to point to the new tab grid. Function 909 increments DOCPTR past the tab bytes. That concludes the processing unless a block insert begin is being processed. If that is the case function 911 changes the default parameters to point to the active tab grid.

Comparing the foregoing page image mode processing with the corresponding sentence (or text) mode processing reveals that in text mode, carrier returns, required carrier returns and index functions are displayed as unique graphics only when coincident with the cursor (see FIG. 17.5). On the other hand, tab and required tab are always displayed, however tab and required tab do not display the actual tab function (see FIG. 17.5). Temporary left and temporary right margins are also displayed as a vertical line corresponding to the margin with a left or right arrow indicating the relation between the temporary margin and the previously effective margin (see FIG. 17.11).

In contrast, as just explained, in page image mode the functions are not displayed via graphics; however, the effects of the functions are displayed by displaying text formatted in accordance with the functions.

At the conclusion of writing the page refresh RAM for the main text, the processor returns to process any blocks. This processing is either at the conclusion of a page or the end of a document, where if processing was not terminated early, function 467 (FIG. 16.12) calls KBFAXBI, at function 589. That processing is shown at FIG. 19.2.

As shown there function 590 sets a block insert indicator, to indicate that a block insert is being processed. Function 591 moves the page table pointer (TABBPTR) to the beginning of the block insert section, i.e. an unused portion of table B and function 592 sets the document pointer to the beginning of document memory. Thereafter, function 593 calls FINDCODE; that subroutine is shown in FIG. 19.30. In general, the processing here looks for a specified character code in document memory incrementing DOCPTR until the required code is found. Function 594 stores an invalid code for the comparison so that the first test, at function 597 will never be satisfied. The processing loops through functions 595 through 618 looking for a match. In the subject under discussion, function 612 will find a block insert beginning code and correspondingly, function 613 sets DOCPTR to 4 plus the address of the block insert begin code, so that on the return the DOCPTR points to the first character in the block insert, and function 614 adds 6 to the return register to indicate to the calling program what type of code was found. As will be explained later, a block insert includes an initial 3 byte sequence comprising BLIB (a block insert begin byte) TL and TR (temporary left and right margins). Returning now to FIG. 19.2, therefore, functions 620 and 621 can determine whether the code found is temporary left, temporary right, temporary tab or EOD (by using the return register as a multiple branch point). Assuming that the temporary code found is not any of these then it can be assumed that the block insert begin code had been found. Function 622 gets the document line number for this block, this is accessible via the table B pointer. Functions 623 and 624 can therefore determine if the document line number, determined at function 622, is on this page, if not, the processing loops back to function 593 again looking for a block insert on this particular page. Assuming a block insert for this page is found, functions 627 through 630 are performed. As shown in FIG. 19.2 these functions make the appropriate entries to the table B, namely, function 627 sets up a link in a table B entry for the block insert line number; function 628 stores the document parameters in the default parameters; function 629 stores the active parameters and function 630 indicates that no text has yet been displayed in the current block so any temporary parameters found will modify the default parameters. Processing thereafter skips to point A0 (shown in FIG. 19.1). In this pass, contrary to the previous description, when function 482 is performed then the program skips to point D (FIG. 19.3) function 486 will indicate that a block insert is being processed, thereafter functions 632 and 633 are performed to follow the links to the last link and to store the address of the block insert for table B at the last link; this provides a link from the main text document line to the block insert which is to appear at the same line on the display. Following that processing, function 492 again determines that a block insert is being processed, and processing skips to point E1. At this point functions 498 through 500 are performed again to set a new PAD amount. Thereafter, when decision point 501 determines a block insert is being processed, function 502 is called to skip past the PAD amount (subroutine SKIP is shown in FIG. 19.31). The overall purpose of the subroutine is to skip in the OR memory and the refresh RAM past the previously written text, instead of blanking as is done with the PAD amount for main text. The processing shown in FIG. 19.31 should be apparent to those skilled in the art in that FAXCTR and FAXBYTE are used as previously described, except that zeros are not loaded. Instead the values already in refresh RAM remain unchanged. Thereafter, CHARCTR is zeroed (function 504) and the processing skips to FIG. 19.4. Each line of the block insert is processed identically to main text except that, through the use of SKIP instead of EBLR, the previously written text is maintained instead of being blanked over. Furthermore, by maintaining links in table B between main text on a line and the block for the line, coordination between CURSOR movement is maintained, as will be explained.

ALTERNATE DISPLAY EMBODIMENT

Now that writing the FAX refresh RAM has been explained, we can illustrate how that RAM is written for the alternate display embodiment of FIGS. 3A–3C. In the embodiment illustrated in FIGS. 19.1 to 19.31, each bit of the refresh RAM is mapped to a unique location on the display. Since our CRT chip 27 did not provide us with a sufficient address space, we expanded the addressing capacity. In the alternate embodiment we can live with the limited addressing capacity since we are not uniquely mapping each bit of the refresh RAM. Rather we define a display character as comprising a 2×2 array of text, reducing our addressing requirements in half, both vertically and horizontally. Now the CRT chip which gave us 96 characters/row and 64 rows/screen or 132 characters/row with 32 rows per screen is entirely adequate since to display 132 text characters per row we need only half that number of unique addresses horizontally (thus the 96 is sufficient). Alternatively, the 32 vertical addresses per screen is adequate since we need only that many to show 64 rows. Note that both FIG. 3B and FIG. 3C show a single display character (stored in one byte of refresh RAM) but actually represents four text characters in a 2×2 array. However, to write the RAM we must first format two lines, i.e. following all active formatting rules identify which character positions on each of two lines are occupied by an alphanumeric or punctuation graphic. The processing described in FIGS. 19.1–19.31 provides the function for only one line at a time. Thus, it must be modified to first format two lines. Once the two lines are formatted, each 2×2 array is examined. Depending on its filled vs. unfilled conditions a 4 bit code is derived and a buffer such as FAXBYTE stores the code representing that display character. This code is then written to RAM since each such code maps to the display. As the RAM is read by the CRT chip, the code is used with a ROS character generator to provide the display character of FIGS. 3B or 3C.

CURSOR MOVEMENT IN FAX

In order to explain cursor motion in page image or FAX mode, we will assume that the operator has keyed in some quantity of text, and that text is being displayed in the page image mode; and thereafter, the operator keys one of the cursor control keys; e.g., 109–114 (see FIG. 2). As explained, the interrupt routine places a code corresponding to the particular depressed key in a keyboard queue; subsequent to the interrupt, the main system program, at function 270 (FIG. 16.1) determines that the keyboard queue is not empty. Processing skips via point J (FIG. 16.8) where, since we have assumed we are neither in text mode nor in insert mode, one of functions 433–436 would recognize a cursor right, cursor left, cursor up or cursor down, respectively. Note that word cursor left or word cursor right is not recognized at all in page image mode (recognized in text mode at function 701 (FIG. 16.5) and if a key is depressed in that mode, the processing, after passing function 436 loops back via point F to function 449 (FIG. 16.1) to bump the keyboard queue, in effect disregarding either of these key depressions.

Depending on which cursor key was actuated, either KBFCRT, KBFCLT, KBFCUP, OR KBFCBN is called via functions 428–431. The processing in response to a cursor right motion (function 428) is illustrated in FIG. 18.4, the processing in response to a cursor up motion is shown in FIG. 18.1 and the processing in response to a cursor down motion is shown in FIG. 18.2. The processing in response to a cursor left is not specifically illustrated, but will become clear as FIG. 18.4 is discussed.

Turning now to FIG. 18.4, it will be recognized that in page image mode cursor right will only move the cursor within a line, and therefore, at function 651, if it is recognized that the cursor is at the end of a line, the processing terminates. Assuming that the cursor was not at the end of the line prior to the cursor right command, function 776 increments the register (horizontal) defining cursor position. Then function 652 checks to see if the format grid is being displayed, if it is, function 653 increases the value of the character counter which is tracking the horizontal ghost cursor, so it will be moved one character to the right. Thereafter, function 654 sets a value "anticipated segment" to be equal to the former segment in which the cursor was located, in Table B. With this parameter function 655 calls FINDSEG, the processing for which is shown in FIG. 18.3.

The routine FINDSEG is used to locate a segment, a particular main text line, or block in which the cursor will be located. The sub-routine is entered with the parameter ANTICIPATED SEG, already set.

Referring now to FIG. 18.3, function 660 sets another value TEST SEGMENT to be equal to the segment which begins at this particular display line; this is extracted from Table B. Thereafter, functions 661 and 664–666 examine each segment in turn, by determining first whether the segment contains data, and thereafter, if the cursor is located before the beginning of the segment or after the end of the segment. Assuming for purposes of discussion that the first segment examined contains data, but the cursor is located beyond the segment, i.e., the cursor is not to the left of the end of the segment, then function 662 checks to see if this line in the display has an additional segment. If it does, function 676 increments the test segment to identify the next segment on the line and the preceding functions are repeated. Movement of the cursor forward, can result in the cursor being located (1) beyond any segment on the line containing data, (2) located in an area of the line between segments, (3) maintained in the existing segment, or (4) entered into a new segment. Taking these particular cases in order, if the cursor has moved beyond any segment on the line then function 662 will identify the fact that the line has no additional segments, thereafter function 663 sets the blink flag. This will result in a blinking cursor which indicates that the cursor is not pointing to any text. Thereafter, function 675 sets the parameter segment found equal to the last segment on which the cursor was located, function 674 checks if the reformat flag is set (on cursor right it will never be set); if it is, function 672 calls the subroutine REFORMAT, and thereafter function 673 sets the parameter, associated segment (TABBPTR) equal the segment found, thereafter the subroutine returns.

If in the alternative (2) the cursor is located on a position on the display line between text segments, at some point function 664 will identify the cursor as not being to the right of the segment start (that is, as soon as it is past the segment that the cursor is immediately to the right of) function 665 will set a low flag and the loop will continue examining additional segments to the right of the cursor, each such examination will result in additional passes through function 664, 665 until function 662 identifies that all segments on the line have been examined, and then function 663 et seq., previously discussed is then repeated with the same results.

On the other hand (3), the cursor can remain in the anticipated segment. In this event function 664 and 666 will indicate that the cursor is right of the segment start and left of the segment end, when the particular segment in which the cursor is located, is identified. Under our assumptions function 667 will determine if the segment is the anticipated segment, and therefore, function 675 et seq. are again performed.

The final possibility (4) is that the segment in which the cursor is found is changed from the anticipated segment. In this event, function 667 is performed but the exit is to function 668. If the segment that the cursor is in, is found to be a block, then function 669 writes the warning BL (see for example, FIG. 11C). On the other hand, if the segment is not a block then function 670 ensures that any BL warning is deleted. Function 671 then sets the segment found equal to the test segment and functions 672 and 673 are performed.

Accordingly function 655 finds the segment in which the cursor is located. Function 656 determines if a format change has occurred (the manner in which this is determined and the results which follow will be explained). Depending on the outcome at decision block 656, function 657 may or may not be performed. Functions 657-659 execute housekeeping functions. Function 657 controls the contents of registers identifying the horizontal and vertical ghost cursors; function 657 may increment or decrement either the horizontal or vertical register (in the CRT chip 27) by one count to move either the horizontal or vertical cursor forward or back. Function 658 implements the decision made at function 663 (see FIG. 18.3) which changes the bit in the status register indicating whether or not the cursor is to be blinked. Finally, function 659 controls the horizontal and vertical registers which identify the cursor position, either incrementing or decrementing one of those registers by one count.

Although not illustrated, the routine page image cursor reverse KBFCLT is identical to the functions shown in FIG. 18.4 with the exception that function 651 determines if the cursor was at the beginning of a line rather than the end and function 653 decreases rather than increases the ghost cursor position.

In addition to moving the cursor forward or back, page image mode also supports moving the cursor up or down. KBFCUP or cursor up is shown in FIG. 18.1, and KBFCDN is shown in 18.2i and 18.2ii.

As shown in FIG. 18.1 function 677 determines if the cursor is on the first line of the display. If it is, it cannot be moved up and therefore, the processing ends. Assuming it is not on the first line of the display function 678 subtracts one from the cursor register indicating vertical position, this in effect, will move the cursor up one line on the display because the cursor position is determined in this register. Function 679 determines if the format grid is being displayed, if it is, function 680 must be performed so that the vertical ghost cursor tracks the vertical position of the cursor. Function 681 calls a routine to determine if a printer warning is appropriate (to prevent the operator from moving the cursor too close to the top of the page, so close that the page cannot be adequately supported by the paper bail). Function 682 and function 683 determine if the cursor was above or below text (cursor blinking), in either event function 697 sets the anticipated segment register to be equal to the last segment in which the cursor was located and function 698, with this parameter, calls FINDSEG. The cursor need not be located on text, but as will become clear it must be associated with some text in order to appear in the text mode display if a switch is made without moving the cursor, this processing ensures that the cursor, even through it is not on any text, is associated with some text in the document.

On the other hand, assuming that the cursor was not off text, function 684 determines if the prior line (the line the cursor is being moved into) is empty. If it is, then an above text flag (see function 685) is set to indicate that the cursor is above a text segment. Thereafter, function 699 stores the segment the cursor was previously associated with as the anticipated segment and then calls FINDSEG function 691.

On the other hand, if the prior line is not empty, then function 686 determines whether the line the cursor was moved from had a format change. If so, function 687 must be performed to set the reformat flag to call the subroutine REFORMAT during the FINDSEG routine, so that the cursor is maintained relative to the appropriate format. In the event the reformat flag need not be set or after it is, function 688 sets the anticipated segment to the prior segment, the segment the cursor was associated with prior to its movement. Function 689 determines if this segment had a required carrier return, which also may change the format. If it does, then function 691 sets the reformat flag. After the flag is set, or if setting is not required then FINDSEG is again called (function 691).

A review of this processing indicates that FINDSEG is called after identification is made for the anticipated segment, and after certain flags have been set indicating whether reformatting is required and indicating whether or not the cursor has moved off text. FINDSEG, previously discussed locates the actual segment associated with the cursor (if one exists). Thereafter, function 692 calls FINDDOCX. The information developed so far has identified the cursor location in terms of the display (that is a horizontal and vertical position for the cursor) has also identified a particular segment of text within which the cursor is located, or with which the cursor is most nearly associated. Using this information as well as the other information in Table B, FINDDOCX returns with a document memory address DOCPTR (this is either the address of the character with which the cursor is associated, the leftmost character in a block if the cursor is off text and to the left of the block, the rightmost character in a block, if the cursor is off text and to the right of that block, a particular character in the first line of a block if the cursor is off text and above that block, or a particular character in the last line of the block if the cursor is off text and below that block). Function 693 determines if the format has been changed, i.e., whether REFORMAT was run during the running of FINDSEG. If it has been, function 694 is called to adjust the ghost cursor position. Thereafter function 695 and 696 are performed for the purposes previously described.

Referring now to FIG. 18.2*i* and 18.2*ii*, the processing for a cursor down motion is described (KBFCDN) and in many respects this is similar to the processing shown in FIG. 18.1, but will be briefly described. Function 700, rather than checking for the cursor on the first line, checks for the cursor on the last line. Function 701 and 705 relate to an alarm function for the printer, if cursor movement will result in inadequate gripping of the paper by the paper bail. Function 702 adjusts the cursor register in the CRT chip and function 704 performs the same function for the ghost cursor location. Function 708 (FIG. 18.2*ii*) determines if there was a format change on the last segment (the segment with which the cursor had been associated) since the cursor down motion is moving forward in the document. If there had been no format change, function 713 uses the location of the next segment as the anticipated segment in calling FINDSEG. On the other hand, if a format change had occurred, function 709 determines if that was because of an RCR. If it was, function 722 determines if the prior segment was in text, and if it was then function 723 sets the active right and left margins and tab grid to those at the beginning of text, since that is what is required by the RCR. If the prior segment was not in text then function 724 sets the REFORMAT flag so that the appropriate formatting can occur during the running of FINDSEG. If the format change was not due to a RCR, after the preceding processing, functions 710 and 711 determine if the last character was the end of a block or main text. Depending upon the outcome, and whether or not the last character was an EOD or EOB, either the next segment is used as the anticipated segment or, at function 712 the below text flag is set and the previous segment is used as the anticipated segment in calling FINDSEG. Following the running of that subroutine, the processing continues identically to that previously discussed for page image cursor up.

In the course of processing document memory in order to write the page image or FAX RAM, processing for each new word begins at point F (FIG. 19.4). At this point, depending upon what the code encountered in document memory is, the processing adapts accordingly, for example, an insert code results in a skipping to the next non-null character in document memory, i.e. processing skips over the "hole", a block insert begin calls a subroutine to skip past the block insert (block inserts are processed by FAXBI, called after the main text processing is concluded), a space character is indicative of the end of a word (assuming the hyphen flag is not set) and processing skips to point H2 (FIG. 19.7). Aside from a regular character the only other codes recognized fall into the category of special functions, this is recognized at function 517, and the processing skips via point H to FIG. 19.7. A word ending can be either a space or a special function, so long as it is not a required space. Thus, at FIG. 19.7 function 727 determines if the code is a required space, if it is, it is treated as merely another character in a word to be displayed and the processing skips via point F2 back to FIG. 19.4. On the other hand, if this is a word ending that is a space, or a special function other than a required space, then processing continues (FIG. 19.7) at function 561 (either from function 727 or skipping to H2 from FIG. 19.4). At this point, assuming the hyphen flag is not set and assuming that the code is not for an insert or a block insert begin, function 567 determines of the cursor should be set on the current character. Cursor location in the page image mode may or may not correspond to a location in document memory. It does if the cursor is within main text or a block, but if the cursor is in neither location, which is achieved by cursor motion then there is no address in document memory which corresponds to the cursor location. Function 567, to determine if the cursor is to be set, merely requires comparing the document pointer to the location saved when the FAX routine was entered. If they are equal then SETCURS is called via function 568. Assuming for the moment that they are not the same, then the processing continues to display that character, including calling DISPLAY at function 575, and assuming the character displayed is not a space, processing loops back via H1 to increment DOCPTR and then reenter the loop just discussed. If in the course of displaying the current word the cursor location is encountered (i.e., DOCPTR is equal to the cursor location), then SETCURS is called as described above. That processing is shown in FIG. 19.25. As shown, function 728 sets an indicator to indicate that the cursor has been set. Function 729 determines if the horizontal position of the cursor should be left unchanged. This flag (detected by function 729) is set by the main program on temporary margin changes from the keyboard so that the cursor and DOCPTR track with the paragraph in which the cursor was located. Function 730 determines if the current cursor position would move the cursor past the right edge of the page; since the right edge of the page is a relatively fixed parameter, depending on the particular page outline being displayed, it can be easily determined whether the counter position would place the cursor past the right edge of the page. If so, function 731 indicates that the cursor is to be set at the right edge of the page. Function 732 effects setting the horizontal position of the cursor, i.e., writing to the horizntal cursor position register in the CRT chip 27. Thereafter, function 733 sets the vertical position of the cursor similar to function 732. This requires writing to a particular (vertical cursor) register in the CRT chip 27. Function 734 determines whether there is any text in the document, this is easily effected by referring to Table B. If there is no text in the document, then function 735 blinks the cursor; this is effected by setting the appropriate bit in the status register (see FIG. 4). Function 736 is executed after function 735 or function 734, depending on whether there is any text in the document, to set parameters in the document memory that apply to the cursor position. If the cursor is located in a block, these parameters are determined at the beginning of the block, if the cursor is contained in main text, then beginning with the global parameters, and by scanning through the page table looking for format parameter changes, the current parameters can be determined and written to appropriate registers. For example a register is maintained to point to document memory with the active (for the present cursor location) tab grid. Function 737 determines if a block insert is being processed, this merely requires checking a flag to that effect. If so, function 738 displays the BL warning (see FIG. 11B). On the other hand, if a block insert is not being processed then function 739 is performed to display blanks in the warning location to ensure that no warning is displayed. Function 740 calls SETGHOST (which is discussed immediately below). Thereafter, the subroutine concludes after executing function 741 to copy the default parameters into a cursor routine default parameter location.

Referring now to FIG. 19.26, the subroutine SETGHOST is illustrated. As shown, function 538 first determines if the grid indicator is on, and this merely requires reference to a specific flag to that effect. If it is not, there is no need to set the ghost cursors and therefore the subroutine returns. On the other hand, if the grid indicator is on, then function 539 determines if the display is in page mode, if not, the ghost cursors are not displayed and the subroutine can return. If both outcomes are positive then function 540 sets the horizontal and vertical ghost cursors. The discussion in connection with move cursor routines illustrated that the routines adjusted counters tracking horizontal and vertical ghost cursor position. As those skilled in the art will understand those counters are software counters. Function 540 requires writing the parameters in the counters into the hardware registers 48 and 49 (see FIG. 4) and the manner in which these hardware registers operate to cause the horizontal and vertical ghost cursors to be illuminated has already been explained. After function 540 the subroutine returns.

INSERT PROCESSING IN PAGE IMAGE

If the operator selects insert (key 104-FIG. 2) with the machine in FAX mode, the keycode is recignized at function 447A and processing skips through H to FIG. 16.6. Function 447B recognizes the insert keycode and processing skips through Q to FIG. 16.9A. Function 643 (FIG. 16.9B) recognizes the insert entry but since the machine is in page image, function 926 determines whether the cursor is blinking. A blinking cursor indicates that it is off main text. Assuming the cursor is not blinking, then functions 932-933 preceeds the insert code with the text mode code and processing returns to function 270 to process the switch to text mode. Alternatively, if the cursor was blinking, then functions 932-933 are not performed. Function 927 checks to see if there is any text. If not processing identical to that effected for a non-blinking cursor is effected. However, if there is text in the document memory, function 928 determines if a block insert is possible. If not the processing terminates, i.e. the function is ignored. If a block insert is available, functions 929-931 prepare for a block insert and functions 932 and 933 are also performed.

An implicit insert operation (insert without use of the explicit insert mode) is effected if the operator selects a CR, RCR, TAB, RTAB, R Page End, Index, Space or R Space in FAX mode. Processing for any of these codes proceeds in FIG. 16.1 through function 447A to FlG. 16.6. There, functions 100A-104A recognize different ones of these codes. Function 105A determines if DOCPTR is a valid location for insertion. If not processing terminates and the entry is ignored. If a valid DOCPTR address, function 106A effects an implicit insert by storing the codes and moving following codes one code unit to make room for the new code. Function 107A then increments the keyboard queue. If the queue is empty or if the next character is a graphic then function 110A calls KBPAGEIM to rewrite the display. Processing returns to FIG. 16.1 when DOCPTR is located on the displayed page. Alternatively the queue is processed until the conditions of either functions 108A or 109A become true. This conditions results in a call to KBPAGEIM.

If the operator had entered a character with the machine in page image, processing is initiated in the manner described, but function 113A (FIG. 16.6) recognizes a character keycode and processing skips to R (FIG. 16.16). If the cursor is not blinking and DOCPTR is on an insert code, EOD or BLIE (a valid location for an insertion) then function 114A stores a KBCHCD, a code to switch to text mode. Processing then returns to function 270 to process the change to text mode unless this is the first entered character. In that event function 115A initiates format setting as if a coded 1 had been entered and then processing skips to function 270. If the cursor is blinking, this is not the first entered character, and DOCPTR is not on EOD then a check is made (processing skips via AH - to FIG. 16.9B), at function 928 et seq., to see if a block insert is available. If so a block insert is effected, otherwise processing terminates, i.e. the operator's entry is ignored.

On the other hand, if the operator depressed the BKSP key (without depressing the code key 137) and the cursor was positioned (in page image) so that the preceding code was a CR, RCR, TAB, RTAB, Index or the cursor was positioned over EOD or BLIE and the preceding code was a space, then that preceding code will be deleted. The deletion will occur without leaving page image. No other codes are deleted in this fashion.

The processing follows a path, beginning on FIG. 16.1, where function 447A recognizes the FAX mode-processing skips to FIG. 16.6. Function 120A recognizes the error correcting (non required) backspace code—processing skips to FIG. 16.18. Function 121A checks to see if DOCPTR is at the start of a page. If not, function 122A determines if the prior code is not a buried code (buried code deletion via the FAX error correct backspace is not allowed). If not, function 123A checks for the remaining conditions. If any of the tests imposed at functions 121A-123A are failed, function 127A determines if FAX was terminated early. Depending on whether or not FAX was terminated early processing continues at function 449 (FIG. 16.1) or function 107A (FIG. 16.6). In either event the backspace function is not performed.

However, if the tests imposed at functions 121A-123A are passed then function 124A checks for insert mode. If in insert mode DOCPTR points to that code. If not in insert mode then function 126A closes up document memory by deleting the byte prior to DOCPTR. Because of function 123A this is one of the specific codes enumerated in that test. If DOCPTR does point to an insert code, then function 125A is performed. Decrementing DOCPTR causes it to point to the prior code, writing an insert code deletes the code previously stored there, writing the NULL code overwrites the insert code previously stored beyond the deleted code. Processing, after either function 125A or 126A picks up at function 107A (FIG. 16.6).

CURSOR MOVEMENT IN INSERT

Cursor motion in text and FAX modes are explained above. The effects of cursor motion vary when the machine is in insert mode. That processing and the resultant effects are now described.

Actuation of a cursor key (text mode-insert mode) is recognized at function 400 (FIG. 16.1), processing skips via J where function 401 recognizes the text mode. Depending on whether a cursor left or right, functions 404 or 403 check for insert mode. If insert mode is detected processing skips to either AE-FIG. 16.8 (cursor right) or AF-FIG. 16.10 (cursor left). For cursor right and assuming DOCPTR is not at the end of the document, function 130A determines the length of the next code and function 131A moves the "hole" to the right of the next code. Functions 132A and 133A check a further code and the one just moved past to see if they are non-displayed. If either is, functions 130A and 131A are performed again; the loop of functions 130A–133A is performed until either of the tests imposed at functions 132A and 133A are not met. At that time function 134A stores an insert code and NULL code at DOCPTR. The net effect of cursor right is to move the "hole" in document memory past the next displayed code. Thereafter, function 273 (FIG. 16.1) is performed to rewrite the display to move the "hole" in the display to correspond to the beginning of the "hole" in document memory. The processing shown in FIG. 16.10 also effects a movement of the "hole" in document memory, but this movement is to the left, otherwise the effect is similar. Function 135A is included to get the cursor past the non-displayed code after KBSCLT moves the cursor to the left.

Alternatively, if the operator had selected a cursor up or down then, before functions 411 and 412 are called to process this cursor motion, function 405 removes the machine from insert mode. Thus cursor left or right is effective, in insert, to move the insertion location, other cursor motion cancels the insert mode.

On the other hand if a cursor key is operated in FAX mode the processing is via function 447A (FIG. 16.1) where function 136A (FIG. 16.6) recognizes the cursor key code. Processing picks up at J (FIG. 16.8) where function 137A is performed as is function 138A (since we have assumed insert mode). Function 138A has the effect of removing insert mode by closing up document memory and rewriting the display. Following function 138A, processing calls the appropriate cursor motion subroutine. Thus, in page image, any cursor motion cancels insert mode.

HYPHENATION

As is well known to those skilled in the art hyphenation is conventionally an interactive function whereby the operator is informed, by the processor, in some fashion or other, that a particular word extends beyond a margin, and the operator indicates whether or not hyphenation is to be effected, and if so, the point at which the hyphen should be placed. As pointed out above it is an advantage of the invention that, in the course of hypehnation, in addition to providing an operator with an indication of the extent to which the word extends beyond the margin, the operator is also informed as to the average length of the preceding lines on the page. In this fashion a more uniform right margin may be achieved. The hyphenation function is a special modifier of the page image mode. Thus, one technique for asserting the hyphenation function or requesting hyphenation information, is achieved by simultaneously depressing the page image key 108 (FIG. 2) and the code key 137. Other techniques for entering the hyphenation mode will be apparent to those skilled in the art. The operator's depression of the foregoing key combination results in the storage of the keyboard queue of a code identifying that particular combination. When the main system program is run, and that particular code is encountered (refer to FIG. 16.5) function 465 recognizes the code corresponding to the page image or FAX key and the processing skips via point Q (FIG. 16.9A) wherein function 650 identifies the page image mode key 108, and function 651 recognizes that it is a coded function. Accordingly, function 742 sets the hyphen flag and function 743 changes the CRT chip to the page image mode (in the manner discussed above) and calls KPBPAGEIM passing to it the identification of the current page. The latter subroutine is shown in FIG. 16.12 wherein function 466 calls KBPAGEPRG, and passing to it again, the start of the current page. This subroutine is shown in FIG. 19.1.

Before describing the processing in detail, we will first describe how the operator and machine interact to achieve the overall hyphenation function. For this description we will assume that the operator has keyed in a coded page image command and in the course of writing the FAX display the processor encounters a word which crosses the right margin. For purposes of example, we will assume the word crossing the right margin is the word "understanding". At that point the writing of the FAX RAM ceases, the processor switches to text mode and produces a display on the CRT of the form shown in FIG. 21.1. As shown in FIG. 21.1 what is displayed is the word which crosses the right margin, an arrow, and an identification of the meaning of that arrow (right margin); meaning that the letters "tanding" of the word are to the right of the right margin. Without any further operator action, the display then changes to that shown in FIG. 21.2. As shown, in addition to the preceding, a second arrow is illustrated along with the legend "AVERAGE RIGHT MARGIN", indicating that the arrow indicates the location of the average right line ending for a preceding given number of lines above the line ending in the word "understanding". The given number of lines could be all the lines on a page preceding this line, or it could be a smaller fixed number of lines above the line ending in the word "understanding". The given number of lines could be a smaller fixed number of lines. The manner in which this quantity is determined will become clear as the processing is described in detail. Also shown in FIG. 21.2 is the cursor which is illustrated to the right of the last character in the word. At this point the processor inserts a hyphen and waits operator action. The operator may then actuate the cursor left key, and each time the cursor left key is actuated the cursor moves left one position and in effect first opens up a "hole" in the word by moving the last character to the right (to the next line) of the cursor location one character space. Thereafter the "hole" is moved one space left each time cursor left is operated. Thus, for example FIG. 21.3 illustrates the appearance of the display after the operator has actuated the cursor left key, once. The operator then continues operating the cursor left key until such time as the cursor is in the position at which a hyphen is desired. When the cursor is in the correct position for hyphenation the operator actuates the page image key (108-FIG. 2) to indicate the processing should terminate and the portion of the word to the left of the cursor should be maintained on the current line a hyphen added thereafter, and the remaining characters of the word moved to the next line in the document. Now the manner in which this foregoing interaction is achieved is explained in detail.

The processing beginning at FIG. 19.1 proceeds much as did the processing for the uncoded page image, of course, the only difference being that now the hyphen flag is set. In the course of the processing, now function 471 will recognize the hyphen flag being set and therefore function 472 zeros two software counters TOTAL LENGTH and HYPHEN COUNT. The processing again proceeds in the manner discussed above, and when the first writing line is reached, (function 482) the processing begins to verify that each word found will fit on the line, when a word is found which fits on the line being processed, the word is displayed; when a word will not fit, the next display line is begun and the appropriate entries are made in Table B. Before identification of a first word, two additional software registers OLD DOCPTR and WORD LENGTH are also set to zero by function 507.

The look ahead processing to determine if a word will fit on a line is shown in FIG. 19.4. Each time through this processing, if the hyphen flag is set, function 507 zeros the registers OLDDOCPTR and WORD LENGTH. When a space is recognized on a line, by function 514, function 515 checks to see if a hyphen flag is set, if it is, function 516 sets the end of word flag, the processing skips via point H2 to display the word. At the conclusion of displaying the word the processing loops back to that shown in FIG. 19.4 where the next word is examined. On each pass WORDCTR is incremented, function 519 checks to see if the word will fit on the line so far. Assuming the hyphen flag is set (checked at function 520) each character, other than the character immediately following a space results in a negative determination at function 521, since the end of word flag is set. For the first character of a word following a space, which is within the page margins, function 521 results in resetting the end of word flag, at function 522. If, on the other hand, the space, which was the word ending for the preceding word is within the right margin, but the next character is outside the right margin, function 519 will determine that the word will not fit on the line so far, and function 523 checks to see if the word flag is set. If it is, then function 525 resets the end of word flag and functions 526–527 are performed. Function 526 adds one to the register HYPHEN COUNT which had been set to zero on entry of the hyphenate mode and function 527 adds CHARCTR (the total length on the line just ended ) to the register TOTAL LENGTH (which had also been zeroed on entry to hyphenate). In this fashion, each line which occupies at least the entire left margin to right margin space increments HYPHEN COUNT by one, and TOTAL LENGTH by the number of positions on the line.

In the more typical case, when the character which crosses the right margin is preceded by another character, rather than a space, the scenario is a little different. Let us look at the processing on the first character of the word which includes a character crossing the right margin. In that processing, function 519 will determine that the word will fit on the line so far (since we have postulated that it is not the first character of the word that crosses the right margin). Accordingly, and assuming the hyphen flag is set, when function 521 recognizes that the word flag is set, function 522 will reset it. Thereafter, since the same word crosses the right margin, the word flag will remain reset so that when a character is reached which crosses the right margin then function 519 determines that the word will not fit, function 523 sees the word flag reset, and therefore, function 525 is not performed. In this case, since the hyphen flag is set the processing skips to point F3 (FIG. 19.5).

At that point, function 744 loads a hyphenate memory (a portion of RAM) with three carrier returns; function 745 adds 24 space codes and function 746 adds codes or bytes selected to display the phrase "right margin". Function 747 then adds a carrier return and 24 additional space codes. This portion of RAM or the hyphenate memory is being created as a pseudo document memory which will be read by the text mode routine to effect a display. The code thus far entered into the pseudo document memory provides for line spaces from the top of the screen and then spaces over to the approximate center of the screen, provides for displaying the phrase "right margin" drops down another line spaces, over to a location immediately below the r in the word right. Thereafter, function 748 provides a byte selected to display a left-downwardly pointing arrow followed by a carrier return. This brings the display to the line on which the word "understanding" is displayed in FIG. 21.1. Thereafter, function 749 adds a number of space codes equal to 24-WORDCTR, that is the number of spaces from the beginning of the word to the right margin, this provides for spacing over to the beginning of the word. Thereafter, function 750 transfers bytes designating this word from document memory, starting at DOCPTR (which is pointing to the beginning of the word which crosses the right margin) to the hyphenate memory. The foregoing functions thus provide for creating a document memory which can provide for display such as that shown in FIG. 21.1.

Function 751 saves the cursor location (since it will be moved) and function 752 sets the cursor location to the next position in the hyphenate memory, i.e., succeeding the last character in the word; this provides for displaying the cursor as shown in FIG. 21.2. Thereafter, function 753 sets the software register WORD LENGTH to the length of this word, that is, the length of word crossing the right margin. Function 754 adds an insert code and a carrier return, the insert code is that which is recognized by the processor as effecting a change into or out of insert mode. The following carrier return will in effect move to display writing to the next line. Function 755 determines if this is the first line of a document or a block of text, if it is there is no point in determining what the average right margin is, since there are no preceding lines from which to determine an average. Assuming, however, that the word overhanging the right margin is not on the first line of text in the document page or in a block, then functions 756 through 758 provide for the display shown beneath the word "understanding" in FIG. 21.2. More particularly, function 756 adds a number of spaces equal to the algorithm shown in FIG. 19.5. The expression in the inner parenthesis is the average right margin, since it is the ratio of total length (which had been accumulating line lengths ending at or beyond the right margin), and the quantity hyphen count which is the number of such lines. This is subtracted from the difference between the left and right margin and the difference is subtracted from 24; the position from which the display of FIGS. 21.1–21.4 is written. Thus, at this point function 757 writes the left-upwardly directed arrow followed by a carrier return to move the display down another line. Function 758 adds a number of spaces in this following line which is equivalent to the quantity determined by function 756, so that the first character written will be immediately below the left-upwardly directed arrow. And at this point, function 758 adds the phrase "average margin". Function 759 then adds an EOD byte to indicate that this is the end of the (pseudo) document memory.

Thereafter, function 760 calls the sentence subroutines to write the text RAM, passing the address at the beginning of the hyphenate (pseudo document) memory. The sentence routine operates in a manner described above to write the refresh RAM. When the subroutine returns, function 761 replaces the insert graphic, in the text RAM with the hyphen graphic. Function 762 then alters the parameters in the CRT chip to the text mode, thereby effecting the display as shown for example in FIG. 21.2. At this point, function 763 is in a wait mode, awaiting operator action. The only meaningful action that can be taken by the operator is operation of the cursor left key or operation of the page image key. Each time cursor left is depressed functions 765–770 are performed. More particularly, the insert code (in the pseudo document memory) is interchanged with the prior code or codes. Thus, for example, if the operator actuates the cursor left key once, the cursor position, originally following the g, now precedes the g, as shown in FIG. 21.3. Function 767 adjusts the quantities in WORD LENGTH and cursor location address, function 769 calls the sentence subroutine to rewrite the display and function 770 then replaces the insert graphic with a hyphenate graphic, similar to function 761. This loop is performed each time the cursor left key is depressed, such that the first time it is depressed the display of FIG. 21.3 results, and if the operator depresses cursor left two additional times, the display of FIG. 21.4 results.

At this time we assume that the operator actuates the page image key indicating the conclusion of hyphenate interaction. Function 766 determines if the cursor has been moved. It it has, processing skips via point H* to function 771 where the discretionary hyphen graphic is located in document memory as the sum of OLDDOCTPTR plus WORD LENGTH, OLDDOCTPTR pointed to the beginning of the word which was the hyphenate candidate, the sum of that quantity plus WORD LENGTH indicates the number of characters in the word which will remain on the line which is now ended, so that the hyphen graphic is placed in document memory in a manner such as shown in FIG. 21.4. Thereafter, functions 772–775 are performed, and these same functions are performed if at function 766 it was determined that the cursor was not moved. More particularly, to determine the actual length of the line the quantity WORD LENGTH is added to TOTAL LENGTH, HYPHEN COUNT is incremented, the sum in CHARCTR is added to TOTAL LENGTH, and function 775 restores the cursor location address to that saved at function 751. Moving now to FIG. 19.7, as the word "understanding" is being placed in the FAXBYTE and the hyphen flag is set (decision 561), when the "i" is encountered decision 562 will be true and force the display line to be terminated after the discretionary hyphen by turning the program to the routine which simulates a CR (G1-see FIG. 19.6).

The attached program listings do not include the hyphenation function.

GRAPHICS

The graphic subroutines, illustrated in FIGS. 20.1–20.12 are called in the page image or FAX mode using data passed to it in order to assist in formatting functions. To provide this assistance the graphics routines provides for the writing, on the display of horizontal and vertical grids with half inch and one inch markings, respectively, the graphics routine also identifies, on a horizontal line at the upper portion of the screen, active tab locations, as well as the margins in effect at the location of the cursor in the document. At the left side of the screen dots represent vertical position of first and last writing line. In addition, the graphics routine also draws the page outline, if that outline is to be something other than the standard 8.5 inch × 11 inch page; and it should be understood by those skilled in the art that, while the present embodiment employed hardware to generate the 8.5 × 11 inch page outline, the graphic subroutine could have been used instead. The graphics routine is driven by compacted data located in a font table defining the image to be drawn, this compacted data consists of a plurality of bytes of one of two classes, either a "FIRSTBYTE" or a "COMMANDBYTE". The processing performed by the graphic subroutines manipulates the data and is capable of setting and/or clearing bits in RAM. The graphics routine capabilities can be used to either directly write the page image refresh RAM, or to write the OR memory, and this capability is used to write both memories; the page outline and horizontal and vertical grids are written in the OR memory, active tab and active left and right margins as well as the first writing point and last writing line are written directly into the refresh RAM.

In operating on the compressed data, the processing routine first looks at a "FIRSTBYTE" to determine the effect of the succeeding one or more "COMMANDBYTES". The first byte determines, whether or not each selected bit location is to be set or cleared, whether or not the pointer should be reinitialized to that in existence at the time the first byte is read. The COMMANDBYTES, in effect provide for manipulation of a pointer, pointing into the memory to be written, and the pointer is manipulated so as to selectively locate certain bits for manipulation. In the course of manipulating the pointer the bits passed over may be either set, cleared or skipped (in the latter event of course, the bits remain in their previous condition).

Turning now to FIG. 20.1, the entry point to the graphic subroutine as illustrated, and as shown there are three different entry points, a first entry point, headed GRAPHIC 1, a second entry point, headed GRAPHIC 2, and a third entry point, headed GRAPHIC 3. The first entry point will result in modification of the page image refresh RAM, the second entry point provides for modification of the OR memory and the third entry provides for modification of some other RAM location which is identified when the sub-routine, at the third entry point is called. In the embodiment of the invention actually constructed, this third entry point is never used.

Accordingly, as shown in FIG. 20.1, function 851 at the first entry, saves the FONT storage pointer which was passed by the calling routine, and retrieves an offset address into the refresh RAM, so memory locations in the refresh RAM can be modified. Similarly, function 852, at the second entry point, provides for storage of the FONT pointer, and uses an offset address to the OR memory so locations in that memory can be modified. Thereafter, regardless of the entry point function 854 sets a bit to require setting of each memory location, if the "FIRSTBYTE" provides for clearing or skipping, the bit set at function 854 will be modified. Function 855 checks to see if the entries in the FONT TABLE are non-zero at the address specified by the pointer. Assuming the locations are non-zero (identifying an active table entry) function 856 retreives the FIRSTBYTE, and stores it at a location identified as FSTBYT. Function 857 branches on bit 7 of FSTBYT; function 860 being performed if that bit is set. Function 860 provides for resetting the memory pointer (DISPTR) to the initial entry value and re-effecting function 854. After completing function 860, or if it is not performed function 858 is performed to check bit zero of FSTBYT. If set function 861 clears the bit set at function 854 or 860 so that thereafter memory bits are cleared rather than being set. If function 861 is not performed, function 859 is performed to check bit 1 of FSTBYT, if reset the routine returns via an error condition; but if set, or if function 859 is not performed, function 862 is performed to advance FNTPTR to the next position in the FONT TABLE. Thereafter, the processing skips to point BA (see FIG. 20.2).

Since FNPTR is now incremented, it points to what should be a command byte rather than a first byte. Accordingly, function 863 checks to see if this entry is non-zero. If the entry is zero, then function 864 is performed to check bit zero of FSTBYT. If set, function 872 is performed to return to the default or initial setting of the display pointer and function 873 advances the FONT TABLE pointer. However, if bit zero was reset then function 865 is performed to check bit 1 FSTBYT. If set function 873 is performed to advance the FONT TABLE pointer, if reset an error return is performed.

In the normal course of events, the FONT TABLE entry is non-zero and therefore function 866 is performed to copy this byte into COMBYT. Thereafter, function 867 copies bits zero to four of COMBYT to DISBYT. Bits 5 and 6 of COMBYT are direction bits, and depending on the bit combinations they can direct the hardware pointer left, up, right or down and this is detected by one of functions 868–871. Depending on the bit combination processing skips to one of points DA–GA. For purposes of explanation we shall refer to point DA, assuming the bits 5 and 6 combination in COMBYT is pointing left.

Refer to FIG. 20.3. As shown, the processing provides a loop which is performed once for each count contained in DISBYT. In the course of this loop, function 872 first calls GRMODBYT; the processing for which is shown in FIG. 20.4.

Substantively, function 877 checks bit 7 COMBYT. If reset, no modification is required. If set, then one of functions 880 or 881 will be performed to either clear or set the bit at which the display pointer is pointing. Which function is performed is determined by checking bits 0 and 1 of FSTBYT. Depending upon the condition of those bits, detected by one of functions 878 or 879 the current bit is either set or reset and a return effected. Function 873 determines if an error was detected (the error return of FIG. 20.4) and assuming no error was detected function 874 is performed to call GRBKDSPT; the processing for which is shown in FIGS. 20.5 and 20.6. The processing in FIG. 20.5 is effected if the graphics routine is in the bit setting mode, and the processing of FIG. 20.6 is performed if the graphics routine is in the bit clearing mode. Referring first to FIG. 20.5, and assuming that function 882 has determined that the processing is in the set mode then function 883 determines if the display pointer is at the left edge. The display pointer points to a byte, and to select bits within the byte a mask is used, the mask normally pointing to the first bit of a byte, but after that bit has been operated on the mask may be shifted up to 7 times whereafter it returns to its original position and a display pointer is decremented. Accordingly, if the display pointer is not at the left edge, then function 884 shifts the mask to select a different bit, function 885 determines whether or not the mask has been shifted eight times; that concludes the typical processing. Once the mask has been shifted 8 times it is back at its original position and therefore, function 886 is performed to decrement the display pointer to point to a different byte. If the display pointer is at the left edge, determined in function 883, then function 887 is performed to determine whether or not the mask has been shifted 8 times. If it has not, then function 888 can be performed to shift the mask one bit position. If it has been shifted 8 times then it cannot be shifted any further and that concludes the processing.

Similar processing is effected for the processing of FIG. 20.6.

At the conclusion of GRBKDSPT, function 875 is performed to decrement DISBYT. This loop is performed a number of times indicated in DISBYT, and function 876 checks to see if the loop has been performed the required number of times. When it has the processing returns to function 862 (FIG. 20.1) to select the next byte from the FONT TABLE.

Accordingly, it should be apparent that the processing will allow the setting or clearing or skipping of selected bits in RAM. While the leftward motion has been discussed in detail essentially similar processing is performed for other possible directions of motion, i.e., up to the right and down.

With the ability to advance through memory, setting, clearing or skipping bits as determined by FIRSTBYTE, coupled with the ability to return to the initial setting and operating in a different direction, it should be apparent that this routine is capable of writing a vertical or horizontal line, or both, and writing the relatively short and slightly longer horizontal or vertical line indicating ½ inch and one inch markers, as shown, for example, in FIGS. 11A–11B.

In addition, in order to identify first writing point, last writing line, and the active left and right margins as well as the tab grids, it should also be apparent how the FONT TABLE can be loaded during the course of processing with the active parameters defining the locations of these points, so that when graphics routine at entry point 1, calls the FONT TABLE, those active parameters will be derived and used in a similar manner to locate the first writing point, last writing line, and active left and right margins as well as the active tab grid.

BLOCK PROCESSING

As has been mentioned above, the operator can, after initially keying in, or when editing, a document including some text, add one or more text matrices which have special characteristics, allowing the operator to move such a text matrix as a unit with respect to other text in the document, or to delete the text matrix in a very simple fashion. Such a text matrix is termed a block, and in order to explain block operations we will assume that the operator has a document with some text in memory and the document is being displayed in the page image mode.

In a manner described above the operator positions the cursor to an area which is outside of the main text, and accordingly, in a manner also described, the cursor is blinked.

When the operator begins keying in text with the machine in this condition, the insert mode key is depressed followed by the desired text. As the keyboard queue is processed, function 465 (FIG. 16.1) recognizes the insert mode code and processing skips via point Q (See FIG. 16.9A). At this point, function 643 recognizes an entry to the insert mode, and function 644 determines that the machine is not in the text mode. Thereafter, function 926 determines that the cursor is not, not blinking and thus function 927 determines if DOCPTR is on EOD and the document memory is empty. Since, in our example, this is not the case function 928 is performed to determine if the cursor is between the first and last writing lines and there is text on the line and there is space in document memory. Assuming all these conditions are passed, function 929 is performed to scan the document memory to locate a paragraph boundary (following the position of the cursor) and at this point the document memory is opened, much as in the case of typical insert mode operation and a BLIB code is entered at the beginning of the open area. This code indicates the beginning of a block. Function 930, using the cursor position determines the document line number for the block and the horizontal position of the block, the latter parameter is stored as a temporary left margin for this block, the former is stored in the BLIB code. Thereafter, function 931 stores a temporary right margin, as the document right margin a temp tab register (with five unit settings), an insert code and a null code. The tab register referred to provides tabs at each fifth character space. This can be modified by the operator. The BLIE code is stored at the end of the "hole" in document memory. Inasmuch as this insert mode code on a keyboard queue has now been processed, function 932 decrements the keyboard queue pointer and function 933 stores a text mode code in the queue. In this condition, the processing returns via point U and determines that the keyboard queue is not empty, since at least the text mode code (inserted at function 933) is stored there. Since this code is that of the text mode key function 465 again recognizes the code and the processing skips via point Q again to FIG. 16.9A. At this point function 934 recognizes the text mode code. Function 935 determines that DOCPTR is not on a BLIE code (it was left on the insert code at function 931). Function 937 changes the CRT chip to display in text mode. Function 938 calls KBSENTEN (FIG. 17.1) to display the document in sentence or text mode. The processing then begins at start of the document and rewrites table A. Function 939 then determines whether or not the cursor is on the first screen of the document; if it is not function 940 is performed to call KBSNDOCR (SENTROLL) (see FIG. 17.6). At this point function 941 gets the TABAPTR and function 942 sets SENTPTR to the beginning of the display memory or refresh RAM. Function 943 obtains the cursor location address. Thereafter, the functions previously performed in relation to FIG. 17.6 are executed; this includes, at function 283 getting DOCPTR corresponding to the screen which will be displayed. The processing then skips via point A (see FIG. 17.1). The display proceeds much in the manner as previously described until a buried code, for example BLIB is detected. This provides, via function 944 and 945 (FIG. 17.1) appropriate entries in the text table. Since the BLIB is considered a buried code function 322 (FIG. 17.2) skips the processing to the buried code processor via point J (see FIG. 17.11). Function 801 checks WORDLEN. Since the buried code is considered a word ending, if it is not separated from a word by a space, processing skips to point E to determine if the word thus far developed can be displayed on the line which is then being displayed. If it can, the processing will return to the buried code processor to process the buried code. Accordingly, we will assume that at this point WORDLEN is equal to zero. Accordingly, functions 802, 813 and 816 determine if the buried code is a temporary right margin, temporary tab or temporary left margin. Since we have assumed that the buried code is a block insert begin, the processing would skip via point L (See FIG. 17.12). At this point function 831 checks to see if the buried code is a block insert begin. Assuming it is, function 832 sets the block insert indicator, and loads LPAD with the quantity 6. Function 833 checks to see if we have gone past the end of the display. Assuming we have not, function 834 effects the special display (for block insert) starting line. This is accomplished by calling BLKINS10. That processing is shown in FIG. 17.10. As shown, 845 moves SENTPTR TO position 4 on the line. Function 846 displays the special character (the downwardly directed arrow) and function 847 continues the line by displaying a sequence of hyphens, function 848 terminates the line with another downwardly directed arrow (for an example of this display see FIG. 11E). That concludes BLKINS10. Function 835 indicates a special starting line in text table (to prevent the text cursor from entering this line) and function 836 skips past the block insert code and the processing then skips to point E1 (see FIG. 17.3). At this point functions 347-349 set up to display the next line. Since back at functions 930 (FIG. 16.9B) a temporary left margin code was inserted, in the course of the processing in text mode function 293 (FIG. 17.1) would identify that buried codes were active. Since the temporary margin is another buried code function 322 (FIG. 17.2) directs the processing again to the buried code processor (FIG. 17.11). At this point, function 816 identifies a buried code which is a temporary left margin. Function 817 sets the TL indicator in the text table. Function 819 provides for the display of the vertical line (again see FIG. 11E) and assuming that the temporary left margin is greater than the global left margin function 821 shows the rightward directed arrow. On the other hand, if the temporary left margin was less than the global left margin then function 822 and 823 would result in the display of a leftward directed arrow. After displaying these special graphics, function 830 bumps the DOCPTR past the buried codes and the processing skips via point A4 (See FIG. 17.2) to display the text in the block. After displaying the text, DOCPTR reaches the buried codes corresponding to BLIE. This again directs the processing to the buried code processor wherein function 837 (FIG. 17.12) identifies a block terminator, BLIE. Accordingly, function 838 resets the block insert indicator, the temporary left, temporary right indicators, resets LPAD and LINELEN to the global parameters. Function 839 resets the indent tab amount. If the end of the display has not yet been passed (detected at function 840) function 841 displays the block insert ending line with up arrows by again calling BLKINS10. Function 832 indicates a special line ending in the text table and function 843 skips past the block terminating codes to display the remainder of text on the line.

Accordingly, the preceding description should suffice to indicate the manner in which the block insert and associated text results in a display shown for example in FIG. 11E.

Furthermore, the description has indicated that when a block insert is detected an automatic switch to the text mode is effected so that the operator's entry of text in the block mode is made in connection with a text mode display. At the conclusion of keyboarding the inserted text, the operator is free to switch back to the page image mode.

In that event, and assuming that the cursor has not been moved off the page including the block insert, when the page image mode keycode is recognized in the the keyboard queue, function 465 directs the processing via point Q to function 650 (FIG. 16.9A). Since this is the page image mode key, function 651 determines if it is a coded function. Assuming it is not, function 652 changes the hardware display chip to display in page image by calling KBPAGEIM passing to it the identification of the current page. That processing, has already been discussed and is shown at FIG. 16.12. Essentially, the only processing is to call KBPAGEPRG (FIG. 19.1). As discussed, the initial processing to write the refresh RAM skips block insert codes, at the conclusion of writing the refresh RAM main text function 467 (FIG. 16.12) determines if a flag was set to terminate page image processing early, if such a flag was not set then function 589 calls KBFAXBI, to process block inserts. That processing is shown in FIG. 19.2, and is discussed above.

To effect a block move, the operator first positions the cursor to coincide with any character in a block desired to be moved. When the cursor is so located, DOCPTR is altered so as to point to the address in document memory of the character at which the cursor is located. Thereafter, if the cursor is moved wholly outside of the text filled area (that is it coincides neither with another block nor with any main text) then DOCPTR remains pointing at the character in the block from which the cursor was moved. At this point, when the operator has located the cursor in the desired new position for the block, key 133 is actuated concurrently with the code key 137 (see FIG. 2). This is a coded M or a block move instruction. When that code is reached in the keyboard queue function 447 will recognize the coded function and processing skips to point G (FIG. 16.2) wherein a number of coded functions are searched for. Processing continues through FIG. 16.3 until, at FIG. 16.4, function 912 recognizes the coded M concurrent with the fact that the machine is in page image mode and that DOCPTR is located within a block. Accordingly, processing skips via point AB (FIG. 16.15). At this point, function 913 determines that the cursor is located between the first and last writing lines. If it is not, processing terminates since the block cannot be moved beyond the last writing line or before the first writing line. Assuming however, that the cursor is properly located, function 914 determines if there is text on this line. This is accomplished by reference to Table B. Assuming there is, function 915 obtains the line number from the block (in document memory) and modifies it to match the vertical location of the cursor.

This code, stored in document memory, along with the links in Table B identify the location for the block, and thus function 915 has taken the first step to moving this block. When the block was stored, its left margin was determined by the location at which the cursor had been located when the block insert was recognized. Since the block is now being moved, this left margin value, which is also stored in document memory, may have to be modified. Therefore, function 916 retrieves the left margin value and calculates the difference between the left margin as stored in document memory, and the present horizontal location of the cursor. With this difference, function 917 begins searching through the block for a temporary left or a temporary right margin, when found, each is modified with the quantity calculated in function 916. When no further temporary left or temporary right margins are found, function 918 is performed to call KBPAGEIM to display the now modified page. The main function of that processing (see FIG. 16.12) is to call KBPAGEPRG. When first called, (see FIG. 19.1) main text is written. Assuming the running was not terminated early, then at the completion of main text function 589 calls KBFAXBI to display the blocks in the document. That processing is shown in FIG. 19.2. In the course of this processing function 592 starts DOCPTR at the start of memory and function 593 locates block inserts. For each block insert found, function 622 gets the document line number and assuming it is located on the page being displayed, then functions 627 et seq. make appropriate entries in Table B. In view of the preceding discussion, however, note that since that the block's document line number has been changed as a consequence of the block move function (see function 915—FIG. 16.15), the links written at function 627 et seq. will now be different than they had originally been because the document line number for the block is now different. Significantly, the location at document memory at which the block codes and associated text are stored, has not been altered. However, because the document line number for this block has been altered, it will be displayed in a new location.

Another function to which blocks are especially suited is deletion. For this function, the operator posiitons the cursor to lie somewhere within a block and then actuates the delete key 106 with key 133 depressed (see FIG. 2). This places a code in the keyboard queue corresponding to the delete condition. In the course of processing the keyboard queue, when this code is recognized at function 459 (FIG. 16.1) processing skips via point I wherein several tests are encountered for the particular code and associated machine conditions. Of particular interest is function 919 which identifies a delete mode, page image mode, cursor not blinking and DOCPTR located in a block. In that event, function 920 is conditionally performed to close the document memory if the machine is in insert mode; in our example, however, the machine is not. Function 921 is then performed to scan the document memory to locate a block insert begin code and a block insert end code straddling the DOCPTR. When those codes are found function 922 then closes the document memory for the number of bytes found between the codes, in effect wiping out the block insert codes and all codes lying therebetween. Function 923 is then performed to call KBPAGEIM to in effect rewrite the screen. Since the block has been deleted from document memory, on rewriting the screen, that block will of course, not be found and therefore will not be displayed.

REFORMATTING

In order to explain the manner in which reformatting can be simply effected we will assume that the operator has a document in document memory, the machine is in the page image mode and the operator simultaneously depresses key 118 and 137 (See FIG. 2) resulting in a coded 5. When this code is recognized in the keyboard queue, function 447 will first recognize the coded entry and the processing will skip to point G (See FIG. 16.2). At this point function 925 will recognize the code and the fact that the machine is in page image and function 924 will set a bit calling for the format line and column display. The resulting key actuations will call up a display for rewriting of the refresh RAM and with the bit set, the format line and column will be displayed. This concludes the processing; however the operator may now change document parameters. For example, assume the operator now positions the cursor to a position at which the left margin should be changed to. With the cursor thus set the operator simultaneously actuates keys 132 and 137 to produce a coded L. This code is recognized at function 946 (FIG. 16.2). Thereafter, function 947 checks to see if the machine is in page image and the cursor is to the left of the right margin, any other position of the cursor is not legal for a left margin. Assuming the test imposed by functon 947 is passed function 948 changes the left margin to the current horizontal position of the cursor. Function 949 (FIG. 16.3) calls KBPAGEIM passing to it the direction to start on page 1 or the beginning of the document. KBPAGEIM has been previously discussed and its function is to reformat the entire document with the new left margin. Function 950 thereafter locates the original position of the cursor on the screen, so that at the conclusion of the operation DOCPTR can be determined by reference to Table B. A similar result is effected if a coded R is asserted, to change the right margin (see functions 951–953) FIG. 16.2.

Instead of changing the left or right margins the operator could have changed a temporary left or right margin; this is effected by either a coded Q or a coded W (see FIG. 2). In that event functions 954 or 955 would recognize the entry, ensure the machine is in page image and the cursor is in a legal position for the new temporary margin. If any of the tests are not passed then the code is not recognized and no action results. However, assuming that the function is recognized one of functions 956 or 957 saves an indication as to whether or not it is the temporary left or temporary right margin which is being modified. Thereafter, function 958 calls KBSTRTMP, to store a new temporary code. That processing is shown in FIG. 16.14.

Firstly, function 959 is conditionally performed to close document memory if the machine is in insert mode. Assuming it is not, function 960 scans the document memory backward for a block insert end, block insert begin, carrier return or required carrier return. Since temporary margins are effective from such a point forward, that point must be found in order to locate the temporary margin which is to be changed. When such a code is found function 961 determines if the point located is in the correct order for the temporary code; the format of some of these codes differ and therefore, it may be necessary to relocate the scan point to point to the desired code to be changed. If the scan point must be changed function 962 is performed, each time it is performed the scan point is changed one code unit (such as BLIB, TL, etc.) until the proper byte is located. Function 963 determines if the code to be modified is already there. If it is not, function 964 stores a code in document memory, moving all the codes up to make room for the code. Thereafter, function 965 writes the code in the document memory, either temporary left or temporary right is stored as the cursor horizontal position. Temporary tabs are treated somewhat differently, and will be explained below. Function 966 determines if the temporary code is in a block. If it is not, function 967 must be performed to scan back in the page queue to locate the page where the temporary code is, since in reformatting, we must start from that location, note that function 960 scans document memory, whereas function 967 is scanning the page queue to locate a page number. If the code is in a block, then reference to the page queue is unnecessary since blocks do not cross page boundaries. Accordingly, function 968 sets a bit so that the page image program will only move the cursor vertically when DOCPTR is found to maintain it within the paragraph. Function 969 then calls KBPAGEIM to write the display. After the display is rewritten function 970 determines whether the cursor is on this page, and if not, function 971 is performed looking for the page located at function 967, so that the finally written display will include the cursor.

The coded D is associated with a temporary tab register and is associated with functions 972 and 973 (see FIG. 16.4) in much the same fashion. A temporary tab is larger than the code for a temporary left or temporary right margin and thus, when function 965 is performed firstly, the five unit tab grid is stored in the temporary tab register. Setting or clearing tab points is effected with keys 129 and 131, respectively (see FIG. 2). The coded S (tab set) or coded K (tab clear) is recognized by the main program (see FIG. 16.4) to call KBFXTBST (TABSET) or KBFXTBCL (TABCLR) (see FIG. 19.27). The particular bit of the tab grid operated on is determined by cursor location, the tab register is located in document memory via a pointer to the active tab register. As shown in FIG. 19.27 setting or clearing a tab merely requeues setting or resetting (clearing) the appropriate bit.

Another reformatting process is effected by changes in the first writing position or first writing line. This is effected by the operator simultaneously depressing keys 116 and 137, a coded 1. This is recognized at function 974 (see FIG. 16.2). If the machine is not in the page image mode, the command is not recognized and no action results. If the machine is in the page image mode then function 976 alters the first writing point to equal the cursor location by changing the first writing lines left margin, right margin and all TLM and TRM parameters. Since all other temporary margins, etc., are relative to the global parameters, no other changes need be effected. Thereafter, function 977 calls KBPAGEIM to display the first page in the new format. Note that the number of lines per page remains unaltered, although the last writing line changes in the same direction and amount as the change in the first writing line, i.e. the text relationship to itself is unaltered, the only change is in the relationship between the text and the page outline.

What is claimed is:
1. A word processor comprising:
  input means including a keyboard with a plurality of keys associated with different graphic or function including at least two cursor control keys, said input means producing a unique key code for each key or group of keys,
  display means including a cathode ray tube for producing a visible image in response to a periodically repeating video signal and associated horizontal and vertical sync signals, said visible image includ- ing a cursor positioned in response to actuation of said cursor control keys, control means responsive to said input means for manipulating and storing said unique key codes and for controlling said display means, wherein the improvement comprises:

word underscore means in said control means responsive to one of said unique key codes for storing an underscore representation associated with each character of a word identified by the position of said cursor when said unique keycode is sensed.

2. The apparatus of claim 1 which further comprises:

word underscore deletion means in said control means responsive to another of said unique keycodes for deleting an underscore representation from each character of a word identified by the position of said cursor.

3. The apparatus of either claim 1 or 2 in which said control means, responsive to either said one or another unique keycodes, adds or deletes an underscore graphic from said video signal for each said character.

4. A word processor comprising:

input means including a keyboard with a plurality of keys associated with different graphic or function including at least two cursor control keys, said input means producing a unique key code for each key or group of keys, display means including a cathode ray tube for producing a visible image in response to a periodically repeating video signal and associated horizontal and vertical sync signals, said visible image including a cursor positioned in response to actuation of said cursor control keys, control means responsive to said input means for manipulating and storing said display means, wherein the improvement comprises:

word underscore deletion means in said control means responsive to a unique keycode for deleting an underscore representation from each character of a word identified by the position of said cursor when said unique key code is sensed.

5. The apparatus of claim 4 in which said control means, responsive to said unique keycode deletes an underscore graphic from said video signal for each said character.

6. A word processor comprising:

input means including a keyboard with a plurality of keys associated with different graphic or function including at least two cursor control keys, said input means producing a unique key code for each actuated key or group of keys, display means including a cathode ray tube for producing a visible image in response to a periodically repeating video signal and associated horizontal and vertical sync signals, said visible image including a cursor positioned in response to actuation of said cursor control keys, control means responsive to said input means for manipulating and storing said unique key codes and for controlling said display means, wherein the improvement comprises:

underscore delete means in said control means responsive to a unique key code for deleting an underscore representation associated with a character at which said cursor is positioned when said keycode is sensed.

7. The apparatus of claim 6 in which said control means includes means, responsive to said unique key code, for deleting an underscore representation from said visible image associated with said character.

8. A word processor comprising:

input means including a keyboard with a plurality of keys associated with different graphic or function including at least two cursor control keys, said input means producing a unique key code for each actuated key or group of keys, display means including a cathode ray tube for producing a visible image in response to a periodically repeating video signal and associated horizontal and vertical sync signals, said visible image including a cursor positioned in response to actuation of said cursor control keys, control means responsive to said input means for manipulating and storing said unique key codes and for controlling said display means, wherein the improvement comprises:

display control means in said control means for displaying a unique graphic representing a function, only when said cursor is positioned at a location corresponding to said function.

9. The apparatus of claim 8 in which said display control means includes means for displaying a unique graphic at a location corresponding to a tab or indent tab function and means for displaying a unique graphic for other functions when said cursor is positioned at a location corresponding to a location of any of said other functions.

10. The apparatus of claim 8 in which said display control means includes first means for generating a first video signal representing an unformatted display, second means for generating a second video signal representing a formatted display, and in which said first means generates a video signal including a unique graphic for each of a tab and indent tab function, regardless of an effect of said tab or indent tab function in said formatted display.

11. The apparatus of claim 10 in which said second means generates a video signal with a number of space functions for each of said tab and indent tab functions to accurately portray an effect of said function.

* * * * *

UNITED STATES PATENT AND TRADEMARK OFFICE
CERTIFICATE OF CORRECTION

PATENT NO. : 4,495,490

DATED : January 22, 1985

INVENTOR(S) : Rush et al

It is certified that error appears in the above-identified patent and that said Letters Patent is hereby corrected as shown below:

On the title page:

The first inventor's name should be changed from "Beth R. Hopper" to --Beth Rush--.

Col. 1, lines 28-29, change "typewrlter" to -typewriter-.

Col. 2, line 28, change "Lindsay" to -Lindsey-.

Col. 6, line 4, change "sigle" to -single-;

line 16, change "ohter" to -other-;

line 19, change "percievable" to -perceivable-.

Col. 9, line 7, change "re-key boarding" to - re-keyboarding -;

line 65, change "Likeimposing wise" to -Likewise-.

Col. 10, line 47, after "control" insert -.-.

Col. 12, lines 21-22, change "undercore" to -underscore-.

Col. 13, line 20, change "seralized" to -serialized-;

line 39, change "out" to -our-.

Col. 19, line 51, after "explained" insert -.-.

UNITED STATES PATENT AND TRADEMARK OFFICE
CERTIFICATE OF CORRECTION

PATENT NO. : 4,495,490
DATED : January 22, 1985
INVENTOR(S) : Rush et al

It is certified that error appears in the above-identified patent and that said Letters Patent is hereby corrected as shown below:

Col. 20, line 67, change "high" to -higher-.

Col. 21, line 28, change "respose" to -response-.

Col. 26, line 61, delete "it".

Col. 27, line 20, change "which" to -what-.

Col. 28, line 63, after "key" insert -,-.

Col. 29, line 23, change "22" to -222-.

Col. 35, line 5, change "b" to -b̸-;

line 7, change "b" to -b̸-.

Col. 36, line 18, change "it is" to -if it-.

Col. 37, line 15, change "as" to -at-;

line 58, change "an" to -in-.

Col. 40, line 49, change "KBSENMODFIG." to -KBSENMOD FIG.-.

Col. 44, line 35, change "θ" to -∅-.

Col. 50, line 10, change "KBFCBN" to -KBFCDN-.

Col. 52, line 19, change "through" to -though-.

Col. 54, line 2, change "of" to -if-;

line 39, change "horizntal" to -horizontal-.

UNITED STATES PATENT AND TRADEMARK OFFICE
CERTIFICATE OF CORRECTION

PATENT NO. : 4,495,490

DATED : January 22, 1985

INVENTOR(S) : Rush et al

It is certified that error appears in the above-identified patent and that said Letters Patent is hereby corrected as shown below:

Col. 55, line 27, change "recignized" to -recognized-;

line 35, change "preceeds" to -precede-;

line 64, change "conditions" to -condition-; change "functions" to --function--;

line 65, change "become" to -becomes-; change "conditions" to -condition-.

Col. 58, line 57, after "line" insert -,-.

Col. 60, line 10, before "drops" insert -,-;

line 11, after "line" insert - and-; delete ",".

Col. 61, line 33, change "It" to -If-;

line 63, change "20.120.12" to - 20.1-20.12 -;

lines 65-66, change "routines" to -routine-.

Col. 62, line 68, change "retreives" to -retrieves-.

Col. 64, line 30, after "up" insert -,-.

Col. 65, lines 5-6, change "recongnizes" to -recognizes-.

Col. 66, line 22, change "TO" to -to-.

UNITED STATES PATENT AND TRADEMARK OFFICE
CERTIFICATE OF CORRECTION

PATENT NO. : 4,495,490

DATED : January 22, 1985

INVENTOR(S) : Rush et al

It is certified that error appears in the above—identified patent and that said Letters Patent is hereby corrected as shown below:

Col. 68, line 25, delete "that" (second occurrence);

lines 37-38, change "posiitons" to -positions-.

Col. 69, line 1, change "key" to -keys-.

Col. 70, line 46, change "lines" to -line,-.

Signed and Sealed this

Second Day of July 1985

[SEAL]

Attest:

DONALD J. QUIGG

*Attesting Officer*   *Acting Commissioner of Patents and Trademarks*